(12) United States Patent
Illowsky et al.

(10) Patent No.: US 7,596,227 B2
(45) Date of Patent: Sep. 29, 2009

(54) SYSTEM METHOD AND MODEL FOR MAINTAINING DEVICE INTEGRITY AND SECURITY AMONG INTERMITTENTLY CONNECTED INTEROPERATING DEVICES

(75) Inventors: Daniel Illowsky, Cupertino, CA (US);
Bruce Bernstein, Sunnyvale, CA (US);
Richard Mirabella, Palo Alto, CA (US);
Wolfgang Pieb, Cupertino, CA (US);
Raymond Sidney, Stateline, NV (US);
Richard Tiberi, Big Sur, CA (US);
Michael Wenocur, Palo Alto, CA (US)

(73) Assignee: DARTDevices Interop Corporation, Mountain View, CA (US)

( * ) Notice: Subject to any disclaimer, the term of this patent is extended or adjusted under 35 U.S.C. 154(b) by 745 days.

(21) Appl. No.: 11/149,078

(22) Filed: Jun. 8, 2005

(65) Prior Publication Data

US 2006/0015937 A1 Jan. 19, 2006

Related U.S. Application Data

(60) Provisional application No. 60/577,971, filed on Jun. 8, 2004.

(51) Int. Cl.
*H04L 9/00* (2006.01)
(52) U.S. Cl. .............................. 380/277; 726/18; 726/23
(58) Field of Classification Search ................. 380/277; 726/18
See application file for complete search history.

(56) References Cited

U.S. PATENT DOCUMENTS

| 5,870,749 A | 2/1999 | Adusumilli | |
|---|---|---|---|
| 5,946,674 A | 8/1999 | Nordin et al. | 706/13 |
| 6,324,619 B1 * | 11/2001 | Raverdy et al. | 717/120 |
| 6,549,932 B1 | 4/2003 | McNally et al. | |
| 6,594,530 B1 | 7/2003 | Glanzer et al. | |
| 6,732,218 B2 | 5/2004 | Overtoom et al. | |
| 6,738,813 B1 | 5/2004 | Reichman | |
| 6,748,559 B1 | 6/2004 | Pfister et al. | 714/56 |
| 6,832,242 B2 * | 12/2004 | Keskar | 709/204 |
| 6,836,839 B2 | 12/2004 | Master et al. | 712/29 |
| 6,850,252 B1 * | 2/2005 | Hoffberg | 715/716 |
| 6,859,806 B1 * | 2/2005 | Kamarei et al. | 707/10 |
| 6,922,665 B1 | 7/2005 | Guccione et al. | 703/14 |
| 6,985,996 B1 | 1/2006 | Nagshain | |
| 7,031,945 B1 * | 4/2006 | Donner | 705/64 |

(Continued)

OTHER PUBLICATIONS parc research, "Obje™ Software Architecture: Frequently Asked Questions (FAQ)", www.parc.com/research/projectes/obje/faq.html, 4 pages.

(Continued)

*Primary Examiner*—David García Cervetti
(74) *Attorney, Agent, or Firm*—Perkins Coie LLP

(57) ABSTRACT

System, device, method, and computer program and computer program products for providing communicating between devices having similar or dissimilar characteristics and facilitating seamless interoperability between them. Computer program software and methods of and systems and devices for sharing of content, applications, resources and control across similar and dissimilar permanently or intermittently connected electronic devices. Devices, systems, appliances, and the like communicating and/or interoperating within the framework provided. An interoperability security model, method, and system, such as a Dart Security model, method and system provide an infrastructure for protecting the integrity of a device and its content from viral, other malicious, or accidental damage.

50 Claims, 32 Drawing Sheets

U.S. PATENT DOCUMENTS

| | | | |
|---|---|---|---|
| 7,065,579 B2* | 6/2006 | Traversat et al. | 709/230 |
| 7,082,200 B2* | 7/2006 | Aboba et al. | 380/273 |
| 7,155,444 B2 | 12/2006 | Krishnan et al. | |
| 7,165,259 B2* | 1/2007 | Szucs et al. | 719/328 |
| 7,197,565 B2* | 3/2007 | Abdelaziz et al. | 709/226 |
| 7,222,187 B2* | 5/2007 | Yeager et al. | 709/237 |
| 7,254,608 B2* | 8/2007 | Yeager et al. | 709/203 |
| 7,263,560 B2* | 8/2007 | Abdelaziz et al. | 709/238 |
| 7,275,102 B2* | 9/2007 | Yeager et al. | 709/224 |
| 7,383,433 B2* | 6/2008 | Yeager et al. | 713/157 |
| 7,454,542 B2* | 11/2008 | Illowsky et al. | 710/62 |
| 7,505,592 B2* | 3/2009 | Russ et al. | 380/234 |
| 2001/0014888 A1 | 8/2001 | Tsuchida et al. | 707/2 |
| 2001/0042123 A1 | 11/2001 | Moody et al. | |
| 2002/0026499 A1 | 2/2002 | Cantone et al. | 709/219 |
| 2002/0059076 A1* | 5/2002 | Grainger et al. | 705/1 |
| 2002/0104091 A1* | 8/2002 | Prabhu et al. | 725/80 |
| 2002/0165912 A1 | 11/2002 | Wenocur et al. | |
| 2002/0178360 A1 | 11/2002 | Wenocur et al. | |
| 2002/0194483 A1 | 12/2002 | Wenocur et al. | |
| 2002/0194501 A1 | 12/2002 | Wenocur et al. | |
| 2002/0196935 A1 | 12/2002 | Wenocur et al. | |
| 2002/0198985 A1 | 12/2002 | Fraenkel et al. | |
| 2002/0199001 A1 | 12/2002 | Wenocur et al. | |
| 2002/0199096 A1 | 12/2002 | Wenocur et al. | |
| 2003/0009694 A1 | 1/2003 | Wenocur et al. | |
| 2003/0018666 A1 | 1/2003 | Chen et al. | |
| 2003/0028585 A1* | 2/2003 | Yeager et al. | 709/201 |
| 2003/0041110 A1 | 2/2003 | Wenocur et al. | |
| 2003/0044020 A1* | 3/2003 | Aboba et al. | 380/278 |
| 2003/0070070 A1* | 4/2003 | Yeager et al. | 713/157 |
| 2003/0115266 A1 | 6/2003 | Sweet et al. | |
| 2004/0018849 A1 | 1/2004 | Schiff | 455/522 |
| 2004/0030743 A1* | 2/2004 | Hugly et al. | 709/203 |
| 2004/0030794 A1* | 2/2004 | Hugly et al. | 709/230 |
| 2004/0031038 A1* | 2/2004 | Hugly et al. | 719/315 |
| 2004/0073791 A1* | 4/2004 | Vollmer et al. | 713/168 |
| 2004/0083138 A1* | 4/2004 | Silverbrook et al. | 705/26 |
| 2004/0088348 A1* | 5/2004 | Yeager et al. | 709/202 |
| 2004/0133640 A1* | 7/2004 | Yeager et al. | 709/204 |
| 2004/0148326 A1* | 7/2004 | Nadgir et al. | 709/200 |
| 2004/0162871 A1* | 8/2004 | Pabla et al. | 709/201 |
| 2004/0205752 A1 | 10/2004 | Chou et al. | 718/100 |
| 2004/0243665 A1* | 12/2004 | Markki et al. | 709/201 |
| 2005/0059379 A1* | 3/2005 | Sovio et al. | 455/411 |
| 2005/0086300 A1* | 4/2005 | Yeager et al. | 709/204 |
| 2005/0160425 A1 | 7/2005 | Falsett et al. | 718/100 |
| 2005/0220304 A1* | 10/2005 | Lenoir et al. | 380/255 |
| 2005/0257260 A1* | 11/2005 | Lenoir et al. | 726/21 |
| 2005/0289264 A1* | 12/2005 | Illowsky et al. | 710/104 |
| 2005/0289266 A1* | 12/2005 | Illowsky et al. | 710/104 |
| 2005/0289383 A1* | 12/2005 | Illowsky et al. | 714/2 |
| 2005/0289508 A1* | 12/2005 | Illowsky et al. | 717/106 |
| 2005/0289559 A1* | 12/2005 | Illowsky et al. | 719/318 |
| 2006/0005193 A1* | 1/2006 | Illowsky et al. | 718/100 |
| 2006/0015936 A1* | 1/2006 | Illowsky et al. | 726/18 |
| 2006/0015937 A1* | 1/2006 | Illowsky et al. | 726/18 |
| 2006/0019636 A1 | 1/2006 | Guglielmi et al. | |
| 2006/0020912 A1* | 1/2006 | Illowsky et al. | 717/103 |
| 2007/0270164 A1* | 11/2007 | Maier et al. | 455/456.2 |

OTHER PUBLICATIONS parc research, "Obje™ Meta-interfaces", www.parc.com/research/projects/obje/metainterfaces.html, 2 pages.

parc research, "the Obje™ Software Architecture", www.parc.com/research/projects/obje/, 3pages.

"Plug and Play External COM Device Specification", Version 1.00, Feb. 28, 1995, © Microsoft & Hayes, 1994-1995, 24 pages.

"Plug and Play ISA Specification", Version 1.0a, May 5, 1994, © 1993, 1994 by Intel Corporation and Microsoft Corporation, 70 pages.

"Clarifications to the Plug and Play ISA Specification", Version 1.0a, Dec. 10, 1994, 28 pages.

parc research, "Obje™ interoperability Framework", www.parc.com/research/projects/obje, 14 pages.

Newman, Mark W. et al., "Designing for Serendipity: Supporting End-User Configuration of Ubiquitous Computing Environments", DIS2002, London © 2002 ACM 1-58113-2-9-0/00/0008, 9 pages.

Edwards, W. Keith et al., "The Case for Recombinant Computing", Xerox Palo Alto Research Center Technical Report CSL-01-01, Apr. 20, 2001, http://www.parc.xerox.com/csl/, 19 pages.

Newman, Mark W. et al, User Interfaces When and Where They are Needed: An Infrastructure for Recombinant Computing:, no publication information, undated, 10 pages.

Edwards, W. Keith et al., "Using Speakeasy for Ad Hoc Peer-to-Peer Collaboration", CSW'02, Nov. 16-20, 2002, New Orleans, Louisiana, 10 pages.

"PostScript® Language Reference", Third Edition, Adobe Systems Incorporated, First printing Feb. 1999, Title page, Table of Contents, Tables of Figures, Other List of Tables, Preface, Chapter 1 (Introduction), Chapter 2 (Basic Ideas), 32 pages. [Note that the entire document is more than 800 pages, is available in printed form and on-line, and for reasons of copyright and volume concerns is not provided here, but will be provided at the request of the examiner or the U.S. Patent Office.]

"The Java™ Language Specification", Third Edition, Title page, Tables of Contents, Prefaces, Chapter 1 (Introduction), 39 pages. [Note that the entire document is more than 600 pages, is available in printed form and on-line, and for reasons of copyright and volume concerns is not provided here, but will be provided at the request of the examiner or the U.S. Patent Office.]

Harry Agius & Marios C. Angelides, Modeling and Filtering of MPEG-7-Compliant Meta-Data for Digital Video, Mar. 2004, ACM.

Berger et al. 2004, "Towards Pluggable Discovery Frameworks for Mobile and Pervasive Applications" Mobile Data Management, 2004 Proceedings. 2004 IEEE International Conference No. Berkeley CA, USA Jan. 19-22, 2004 Los Alaitos CA IEEE Comput. Soc., pp. 308-319.

Kvalvaag et al., 2001, "Facility Provision Using Mobile Agents" Database and Expert Systems Applications. Proceedings. 12th International Workshop on Sep. 3-7, Piscataway, NJ, USA, IEEE, pp. 696-700.

Understanding UPnp? A White Paper [Online] 2000, Retrieved from the Internet: URL: Http://www.upnp.org/download/UPNP_UnderstandingUPNP.doc. Retreiveed on Aug. 23, 2006.

* cited by examiner

Getting Eight Devices to work directly together takes 56 adaptations and requires 56 different test configurations Example of Recruitment for
shared Slide Show

10000

10010 Enumerate devices by sending procedures

10011 Can you run this slideshow? ⇨

⇦ 10012 Yes, here's my MIPs, preferred resolution...

10020 Send customized Dart to run on target

10021 Run attached Dart on target ⇨

10030 Slide change events serialized synchronized

⇨ 10031 Go to slide n

10032 Go to slide n ⇨

10033 Add slide as m ⇨

Recruitor Dart Device 10100

Recruited Dart Device 10200

FIG. 6

DartRuntime between teamed devices

DART Application Level Error Recovery

Step 1: A->B->C, Dart on A recruits B then B recruits C; all three devices run renditions of Dart originally part of the originating Dart on A as a team by sharing a set of synchronizing serialized events.

Step 2: A->B   C,  Connection to C  is lost, LostConnection type Event is generated by communication code on B, which automatically goes to A as well since it part of the recruited teamed.

Step 3: A->B  C, The Dart now running across A and B compensates for loss of C as best they can, for example:

a Not trying to synchronized events with C because C is not essential,  or b A and or B take over tasks of C, or c A->B->D,  A and or B recruit another device, D, to do the task of C and close the lost session, or d A and or B suspend their operation until C comes back or times out and closes down because C was essential to the intent of the originating Dart Step 4 A->B   C,  B's Communications system continues to look for C because C did not shut down using events, as long as  A and or B did not respond to the LostConnection event by closing the lost session Step 5 B's Communications re-establishes communication with C again, possibly over a different protocol.

Step 6 A->B->C The Dart rendition on B re-recruits C  with the current running state which may have changed while C was disconnected.

FIG 19

HAL
Device specific functions
650

FIG. 28

HAL File System Sandbox 5009

Location 5020

- Global 5021
- SharedByContentType 5025
- InDart 5026
- InRegistry 5027
- UserSpecified 5028

- Local 5022
- Parts 5023
- Events 5024

HAL Open File Parameters 5010

- Location 5011
- Name/number 5012
- Pointer to fileInfo 5013

Dart Virtual Pointer Example Fig 32

32 bit Dart Pointer value for virtual pointer 1 with block size of 64K 32bit words, block 0x5, block offset 1, Address in virtual pointer number 1's address space is the 32bit word at 0x50001

The data value is currently in Flash File with block address 00000101 superceding the old value in a Dart part

| msb | | | lsb |
|---|---|---|---|
| 01 | 00001 | 00000101 | 00000000000000001 |
| Pointer Type | Which virtual address space | Block address | Offset of 32bit word in block |

Pointer Type
00 data/stack
01 virtual ptr
10 C++ heap
11 shared

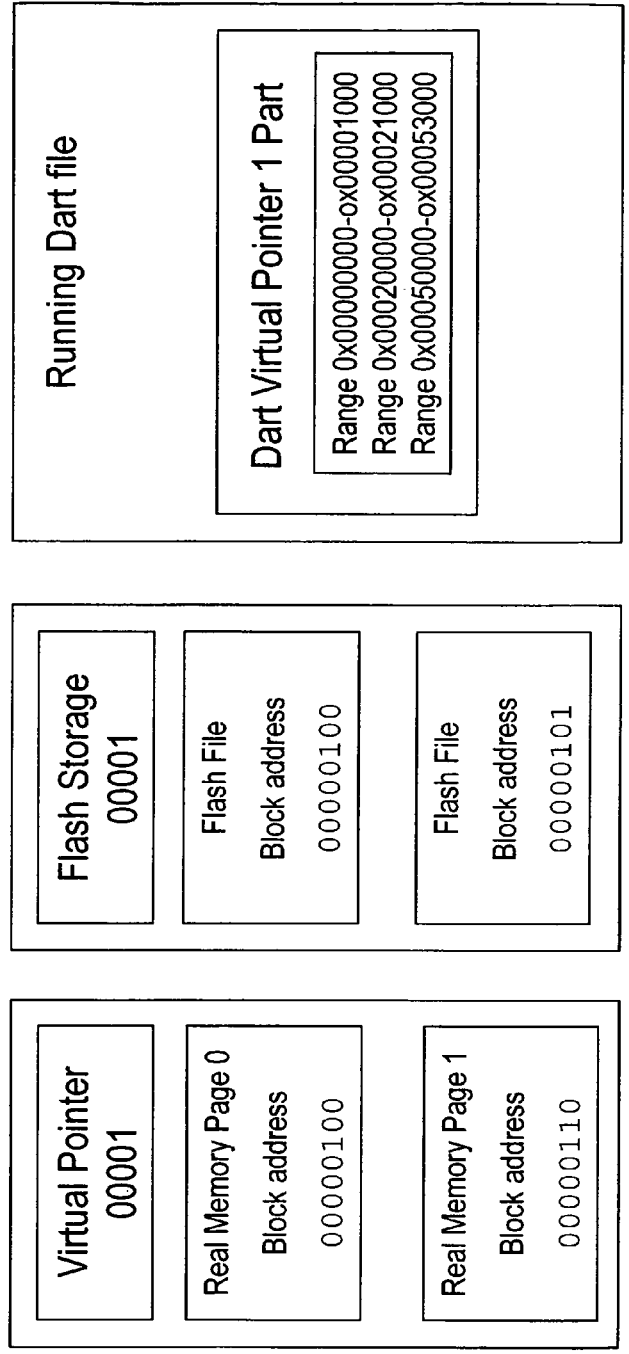

SYSTEM METHOD AND MODEL FOR MAINTAINING DEVICE INTEGRITY AND SECURITY AMONG INTERMITTENTLY CONNECTED INTEROPERATING DEVICES

RELATED APPLICATIONS

This application claims the benefit of priority under 35 U.S.C. 119(e) to U.S. Provisional Patent Application Ser. No. 60/577,971 filed 8 Jun. 2004 entitled Architectures Apparatus And Methods Thereof For An Efficient, Low Cost, Seamless Device Interoperability Software Platform and naming inventor Daniel Illowsky; which application is hereby incorporated by reference here in its entirety.

The following co-pending U.S. Utility Patent Applications and PCT International Patent Applications are also related applications and each is incorporated herein by reference in its entirety:

U.S. patent application Ser. No. 11/176,647 filed 8 Jun. 2005 and entitled Method And System For Device Recruitment Interoperability And Assembling Unified Interoperating Device Constellation;

U.S. patent application Ser. No. 11/149,076 filed 8 Jun. 2005 and entitled Method System and Data Structure For Content Renditioning Adaptation And Interoperability Segmentation Model;

U.S. patent application Ser. No. 11/149,074 filed 8 Jun. 2005 and entitled Method and System for Specifying Device Interoperability Source Specifying Renditions Data and Code for Interoperable Device Team;

U.S. patent application Ser. No. 11/149,465 filed 8 Jun. 2005 and entitled Device Interoperability Framework and Method For Building Interoperability Applications For Interoperable Team of Devices;

U.S. patent application Ser. No. 11/149,456 filed 8 Jun. 2005 and entitled Device Interoperability Tool Set and Method For Processing Interoperability Application Specifications into Interoperable Application Packages;

U.S. patent application Ser. No. 11/148,981 filed 8 Jun. 2005 and entitled Device Interoperability Format Rule Set and Method for Assembling Interoperability Application Package;

U.S. patent application Ser. No. 11/148,980 filed 8 Jun. 2005 and entitled Device Interoperability Runtime Establishing Event Serialization and Synchronization Amongst a Plurality of Separate Processing Units and Method for Coordinating Control Data and Operations;

U.S. patent application Ser. No. 11/149,086 filed 8 Jun. 2005 and entitled Method and System For Linear Tasking Among a Plurality of Processing Units;

U.S. patent application Ser. No. 11/149,454 filed 8 Jun. 2005 and entitled Method and System For Vertical Layering Between Levels in A Processing Unit Facilitating Direct Event-Structures And Event-Queues Level-to-Level Communication Without Translation;

U.S. patent application Ser. No. 11/149,455 filed 8 Jun. 2005 and entitled System And Method For Application Driven Power Management Among Intermittently Coupled Interoperable Electronic Devices;

U.S. patent application Ser. No. 11/149,077 filed 8 Jun. 2005 and entitled System And Method For Interoperability Application Driven Error Management and Recovery Among Intermittently Coupled Interoperable Electronic Devices;

U.S. patent application Ser. No. 11/148,977 filed 8 Jun. 2005 and entitled Device and Method For Interoperability Instruction Set;

U.S. patent application Ser. No. 11/149,078 filed 8 Jun. 2005 and entitled Method and System For Customized Programmatic Dynamic Creation of Interoperability Content;

U.S. patent application Ser. No. 11/149,084 filed 8 Jun. 2005 and entitled Method and System for Interoperable Content Player Device Engine;

U.S. patent application Ser. No. 11/149,087 filed 8 Jun. 2005 and entitled Method and System for Interoperable Device Enabling Hardware Abstraction Layer Modification and Engine Porting;

U.S. patent application Ser. No. 11/149,078 filed 8 Jun. 2005 and entitled System Method and Model For Maintaining Device Integrity And Security Among Intermittently Connected Interoperating Devices;

U.S. patent application Ser. No. 11/149,068 filed 8 Jun. 2005 and entitled System Method and Model For Social Synchronization Interoperability Among Intermittently Connected Interoperating Devices;

U.S. patent application Ser. No. 11/149,075 filed 8 Jun. 2005 and entitled System Method and Model For Social Security Interoperability Among Intermittently Connected Interoperating Devices;

U.S. patent application Ser. No. 11/148,961 filed 8 Jun. 2005 and entitled System Device and Method for Configuring and Operating Interoperable Device having Player and Engine;

U.S. patent application Ser. No. 11/149,066 filed 8 Jun. 2005 and entitled Method and System For Specifying Generating and Forming Intelligent Teams of Interoperable Devices;

U.S. patent application Ser. No. 11/148,978 filed 8 Jun. 2005 and entitled Method and System For Configuring and Using Virtual Pointers to Access One or More Independent Address Spaces;

PCT International Patent Application No. PCT/US2005/020362 filed 8 Jun. 2005 and entitled Architecture Apparatus And Method For Seamless Universal Device Interoperability Platform; and PCT International Patent Application No. PCT/US2005/020367 filed 8 Jun. 2005 and entitled Architecture Apparatus And Method For Device Team Recruitment and Content Renditioning for Universal Device Interoperability Platform.

FIELD OF INVENTION

The present invention generally relates to systems, devices, methods, and computer program software products for providing communicating between devices having similar or dissimilar characteristics and facilitating seamless interoperability between the devices; and more particularly, to software and methods of and systems and devices for sharing of content, applications, resources and control across similar and dissimilar permanently or intermittently connected electronic devices.

BACKGROUND

In an era when there has been a vast expansion in the number and type of electronic devices, particularly portable and wireless devices, as well as an expansion in the types of application programs and device types, there has been a corresponding need for data and code to be shared directly between these diverse heterogeneous different device types in order to carry out the intent of applications which can only be accomplished by employing the electronic and programmatic resources of a plurality of devices. A need has also arisen and continues to grow for a device user to be able to communicate with other devices that may or may not be set up in advance for the type of communication or data transfer or sharing that the user desires. For example, a user may have or wish to create a picture collection on a digital camera and then to be able to transfer that collection of pictures directly to a personal data assistant (PDA) type device, television, or projector for viewing, or to a storage device for storage or to a printer. The user may also or alternatively wish to transfer code which implements a sequenced slide show encapsulating the pictures, titles, index of slides, and the like to another device, such as to a device that has a larger screen resolution or better graphics capability than the device on which the slide images reside. The user may also want to be able to select and print some subset of pictures in the slide show on an available printer. There are many other examples of such code, data and content sharing.

Conventional Interoperability Issues, Problems, and Limitations

The sharing of data and code along with the sharing of associated device computing resources, and device control between similar (homogeneous) and dissimilar (heterogeneous) devices or device types is known in the art as "device interoperability," or simply as "interoperability". Some of the necessary and optional enhancement issues involved in providing this interoperability include the issues of: (i) content adaptation; (ii) content format; (iii) device drivers; (iv) device to device communication; (v) individual device resources and capabilities; (vi) application programs resident on the devices; (vii) loading application programs on the devices; (viii) costs associated with providing device resources to support interoperability; (ix) power or energy management of interoperable devices; and (x) robustness of code executing in an interoperability environment where connections between devices may be intermittent and unreliable. Furthermore, (xi) the scope of the development, deployment and testing efforts necessary to enable interoperability; (xii) the reliability problems inherent in having independently developed and or distributed interoperability components even where detailed interoperability standards exist; and (xiii) the difficulty of end users having to have a high level of technical knowledge and spend appreciable amounts of time and efforts administering interoperability; (xiv) the security of interoperability devices, data and content; (xv) the size, performance, power management and cost tradeoffs that can be made with respect to interoperability infrastructure, raises additional issues. These issues are addressed in additional detail below.

With respect to content adaptation, there is a need for intelligent scaling or adaptation of the content in terms of such parameters (application and data type dependent) as picture size, user interface, controls and special effects, content format, features, and the like that needs to be taken care of when transferring data, application programs (applications), or control from one device type to another. These are collectively referred to as "adaptation." The better the sophistication of the adaptation when sharing content, applications, and control, the larger the set of interoperable devices; and the more advanced the features on each device, the more efficient the transfer of data, information, and/or other capabilities can be, and the easier the devices and code data and content are to use to carry out applications.

A second interoperability issue arises from the undesirable requirement that the user may generally need to specify or at least consider the content format. If the user desiring interoperability with another device is not familiar with the content format and/or how the other devices will deal with the content format even if it can be communicated to the other device, this factor alone may preclude interoperability.

A third interoperability issue arises from the undesirable requirement that the user may generally need to specify, consider, or carry out the loading of one or more special purpose drivers, code, data or content on one or more devices before interoperability can be carried out.

A fourth interoperability issue arises from the undesirable requirement that the user specify, consider, or select the physical communications mechanisms and protocols to be employed in a communication between the user's device and one or more other devices, each of which may have or require a communication mechanism, protocol, interface, or the like.

A fifth interoperability issue arises from the undesirable requirement that the user may need to consider or chose which devices will have the capabilities and memory, processor and other features necessary to interoperate with his or her device or with the data or applications required.

A sixth interoperability issue arises from the undesirable requirement that the user may need to specify, consider, and/or load the applications that must reside on some or all of the involved and potentially interoperable devices.

A seventh interoperability issue arises from complete or partial application failure due to missing, outdated, or incompatible version of code, data or content on one or more devices.

An eighth interoperability issue arises from the undesirable requirement that devices need to have all the code to carry out applications that will be needed resident at the time of manufacture or at some time prior to the need for them arising, or be explicitly loaded on some or all of the devices by the user.

A ninth interoperability issue arises from the monetary cost associated with providing the amount of processor or CPU resource, memory resources, electronic gates or logic, or other physical infrastructure necessary to implement the communications and other protocols and applications on devices intended to interoperate.

A tenth interoperability issue arises from the desirability of providing effective power or energy management methodologies to extend battery life or reduce the size of the batteries needed for portable or mobile devices that are intended to interoperate. Although not specifically required for short term interoperability, such power management is highly desirable so that interoperating with other devices will not create such a battery power drain on such devices that users would rarely use the capabilities or be hesitant to permit another user to access their device.

An eleventh interoperability issue arises from the need for a degree of robustness of applications which need to continue to operate in an environment where connections between devices are often intermittent or transient and unreliable. For example, code to carry out an application on a first device that is interoperating with and in communication with a second device should not itself freeze, hang, or otherwise cause a major problem or result in the device itself freezing, hanging, or causing a major problem when the second device moves out of range or otherwise fails to reply to a communication from the first device. Furthermore, it is desirable for all the code, data and content necessary to carry out an interoperability application to be automatically restored and updated if such a second device becomes reliably available again.

A twelfth interoperability issue arises from the unreliability of applications where devices are produced by independent manufacturers, based on interoperability standards which are inherently weak in their ability to predict realistic and future device needs and capabilities, and in the ability of programmers or circuit designers to completely and correctly understand, implement and have such implementations correctly deployed. A thirteenth interoperability issue arises from the slow speed of executing code which cannot rely on optimizations necessary for graphics, video, sound, etc.

A fourteenth interoperability issues arises from the lack of availability of interoperable code, data and content to carry out applications and devices which might be employed for interoperability due to all the issues listed above which discourages both users and providers.

These fourteen interoperability issues are merely exemplary of the types of issues that do or may arise and are not intended to be a complete list or to identify issues that arise in all situations. For example, interoperability between two identical devices that are intended to interoperate with each other at the time of manufacture may not present any or all of the issues described here, but this type of homogeneous device interoperability does not represent the more common situation that device users are faced with today, and modest attempts to address heterogeneous device interoperability issues have been incomplete, not very insightful, and clearly not successful.

Conventional Static and Procedural Solution Attempts

Conventional attempts at providing interoperability solutions have generally fallen into two categories, namely (i) static interoperability solutions ("static"), or (ii) procedural interoperability solutions ("procedural"). Conventional static solutions require each device to support the same specific communications protocols, and send specific rigidly specified data structures with fixed field layout. In static approaches, the semantics, code, and display capabilities must be existent on all devices before interoperability can be established between those devices. Each content type, application, or device capability must be known, implemented and installed at the time of manufacture of all devices involved; or alternately, the user must install application programs, protocols, and/or drivers as required prior to initiating the desired interoperability of devices, software data or content. As the user may not be a trained information technology professional, or may not know or have a copy of the driver, application, operating system component, protocol, or the like, it may be impossible to provide the desired interoperability within the time available. Furthermore, often it is necessary with static solutions to implement a specific set of static solutions.

For example, the sharing of a set of pictures with slideshow capabilities between a digital camera and a television or display device (TV) might require a common static protocol, such as for example, a Bluetooth wireless capability for sending the slide image data and slide order or sequence information to a TV. It would also require a static content format for the slides and slide order information to be recognized on the TV as something it knows how to deal with. And at least one static slide show program that can render and control a slide show with the specific content format must exist on both the TV and the digital camera. The user may or may not have to separately initiate transfer of the images or pictures and slide order information, find and associate the information on the TV, and run the correct slide show application on the TV. Depending on the sophistication of the static slideshow programs on both sides, the controls on the digital camera may or may not be useable to control the slide show on the TV which was initiated on the camera. Where such camera based control is not possible some other mechanism for control may necessarily be provided. Static approaches can result is highly optimized solutions to well understood specific applications known at the time of manufacture of all the device types which can interoperate. Static approaches however have major limitations, including the requirement for most all capability to be known and custom implemented at the time of manufacture, limited ability to upgrade or fix errors after manufacture; and a conventional requirement that each static program implementation must be correctly and completely ported to run on the different devices and exist on all devices prior to interoperation. Often this is accomplished by the loading and updating of specific drivers for specific applications, communications mediums and the desired set of devices where interoperability is required.

Even when static solutions are available, reliability is compromised due to the inevitability of different versions of standards and applications. Hence when two devices wish to share data or procedures, failure can occur when the devices adhere to different versions of the standard, or the programs adhere to different versions of the standard, or different versions of the applications reside on the devices. Additional reliability problems arise from inadvertent errors or shortcuts made in the independent implementations of the set of standards used to interoperate. Such standards implementations may interact in unpredictable ways when any two implementations attempt to work together. In general it is often impractical or impossible to test all the permutations of all the standard implementations across all sets of devices, especially as all target devices which with an initiating device must interoperate with did not exist at the time of manufacturing of the initiating device.

One of the more significant limitations to static approaches is that the amount of work to make a number of N devices or applications interoperable grows very quickly as N for the number of devices and/or applications gets larger. Manufacturers currently are flailing at creating hundreds of static standards for content types, application programs ("programs"), communications protocols, and the like to try to make even limited size sets of devices interoperable over an ever increasing large set of devices and applications. This also conventionally requires that every device have the memory, screen size, controls and processor and battery power to support every static solution for every desired interoperability option across all desired interoperable devices. Otherwise true device and application interoperability is not achieved. To better illustrate this conventional problem and limitation, consider that currently, adaptation requires a software engineering development project for each type of device (N devices) that has to share with each other type of device (N−1 devices). From a development point of view this is an N×N or $N^2$ order problem because in a universe of N device types that all wish to interoperate with each other, there are N×(N−1) adaptations to consider, develop, implement and test.

Moreover, as the number of devices increases and the required adaptations rise toward $N^2$, the expense and difficulty of attaining a high-quality product tends to increase at an even faster rate due to the increased overall complexity. This is because the difficulty of attaining high-reliability and quality software and hardware solutions increases as overall complexity increases. This isn't purely a "size of source code" issue, but is due to just the kind of factors prevalent when trying to get devices from different manufacturers to work together, including unpredictability of behavior, unpredictability of events, unknown future capabilities, and so on.

For example, as the number of devices increases from 5 to 6, interoperability adaptation requirements increase according to the relationship N×(N−1) from 20 to 30. And as this increases the overall complexity of the project has grown even faster.

This N-squared order problem wherein getting N devices to work together requires substantially $N^2$ adaptations is illustrated in FIG. 1. It will be appreciated that conventional inter-device cooperation using a static approach may be relatively simple for a user to use but requires a high degree of development, administration and deployment effort and continual updating to maintain compatibility and interoperability between old devices, applications, and data types, and new devices, applications, and data types.

With reference to FIG. 2, there is shown the interactions for inter-device cooperation or limited interoperability for just eight device types using a brute force approach requiring fifty-six adaptations and additional fifty-six test procedures.

Separate from the $N^2$ problem of the brute force method, most static approaches also involve combining a number of standard or standards efforts. The Microsoft originated UPnP (Universal Plug and Play) approach has perhaps the largest following and scope of the static approaches. UPnP is a static non-procedural approach to solving some of the problems associated with device interoperability by incorporating a set of static (non-procedural based) standards, and attempting to enumerate all the different classes of devices and services, each with a different XML or data structure based description. However, even the UPnP approach suffers significant limitations, some of which are briefly described below.

First, UPnP is heavyweight in that it requires large collections of modules and code, power, and memory to run. This makes it unsuitable for thin low cost battery powered devices that may have a very modest processor, little random access memory, a small battery capacity.

Second, UPnP offers little content or feature optimization capability. UPnP generally assumes one size application, content, or user interface will work well on all involved devices. This may have been a reasonable assumption a decade ago for Microsoft Windows based desktop personal computers (PCs), but is now a poor assumption and basis for operation in a world filled with devices that must interoperate that are as different as a pager, a digital camera, and a personal computer, not to mention the likely set of hybrid and diverse electronic devices to arise in the next few decades.

Third, UPnP offers only a limited set of user interfaces that do not meet the needs of the large set of diverse devices now available.

Fourth, UPnP requires programs and drivers that are needed to perform the requested task to reside on all devices before they can be used.

Fifth, while the intent of UPnP is at least to partially avoid the N-Squared ($N^2$) problem, the reality is that using UPnP as a basis for the interoperability would still require a massive N-Squared ($N^2$) development/deployment/testing effort, as described above, to bring out new applications which require programs, code, data and content to be ported, distributed and tested for all interoperating devices if the all the permutations of independent implementations of complex standards is to result in reliable interoperability.

Sixth, UPnP programs, devices, content and standards must all be synchronized so that the same or at least compatible versions and updates are deployed simultaneously Seventh, as device and content capabilities evolve, existing UPnP programs, data and content based devices tend to fail to support the new device.

Eighth, the costs of maintaining compatibility of existing device, standards including UPnP, and applications versions increases the overall project complexity ever more rapidly.

Ninth, as the project complexity increases, due to the problems inherent in the complexity and diversity of UPnP as a standards-static-based approach, ease-of-use and reliability degrade.

Tenth, UPnP would still not address the requirements imposed by the frequent need to have one or many data structures sent between devices, especially where this data or these data structures are expressed in a human readable text format that require considerably more transmission bandwidth and time than binary representations. Furthermore, many of the data structures to be sent between devices are expressed in XML, a human readable text format, rather than in a binary or less generalized format, where using XML format requires significantly more CPU operations, memory, and/or software program code size to perform the CPU intensive parsing operations required for XML.

Finally relative to a few of the limitations imposed by conventional static approaches to device and application interoperability, static standards often limit the number of protocols, content types and application types to reduce the overall complexity and size of standards based implementations. An example is that UPnP only allows TCP/IP as a base communication protocol. This effectively eliminates the efficient use of other important existent communications protocols such as Bluetooth, USB, MOST, and IR and all other non-TCP/IP protocols.

Conventional Procedural Solution Attempts

An alternative to the static standards approach relies on creating a procedural standard. Procedural standards techniques implemented in hardware or emulated in software are ubiquitous. There exist a large number of hardware microprocessors, each with an instruction set and interfaces optimized to different classes of problems, and there are numerous higher level software emulated instruction sets and environments existent, that are optimized around specific task sets. These include for example, Java (an approach generally optimized for portability and ease of programming), Post-Script (an approach generally optimized to represent printed pages and printer control functions), and Storymail Stories (generally optimized for efficiently representing a very broad range of rich multimedia messages). Java and PostScript are well known in the computer arts. Aspects of Storymail Stories and related systems and methods are described, for example, in U.S. Patent Application Publication No. 20030009694 A1 published 9 Jan. 2003 entitled Hardware Architecture, Operating System And Network Transport Neutral System, Method And Computer Program Product For Secure Communications And Messaging; and naming Michael L Wenocur, Robert W. Baldwin, and Daniel H. Illowsky as inventors; in U.S. Patent Application Publication No. 20020165912 A1 published 7 Nov. 2002 and entitled Secure Certificate And System And Method For Issuing And Using Same, and naming Michael L Wenocur, Robert W. Baldwin, and Daniel H. Illowsky as inventors; and in other patent applications.

Procedural interoperability approaches, typically involve establishing or otherwise having or providing a common runtime environment on all devices that are to interoperate, so that programs, procedures, data and content can be sent between devices in addition to static data structures and static applications. Currently one leading interoperability procedural solution is the Java platform along with the JINI extensions to it. As an example of a Java-based procedural approach, a slideshow written in Java could encapsulate or reference the pictures and slide ordering or sequence data, interrogate the other device, adapt the content to the other device, and send the information and a Java slideshow program to the TV. The Java slideshow program could be run on the camera after manufacture and enable interoperability with a Java enabled TV even if the slide show program did not pre-exist on the TV.

While Java has been widely deployed and has some limited success in providing correspondingly limited interoperability, it has serious deficiencies that have prevented its broad use, especially for small mobile devices where cost, power efficiency, processor efficiency, memory efficiency for storing program code, data, and temporary buffers are very important issues. Also, the Java Virtual Machine (VM) approach to binary compatibility of applications running on different devices is in conflict with the very reason the devices exist. Java and other conventional procedural interoperability approaches have sever limitations. Five exemplary limitations are described below.

First, the Java Virtual Machine approach makes or at least attempts to make all devices look like the exact same virtual computer to applications in order to allow the same binary code (Java binary code) to run on all devices. In order to maintain binary compatibility, it is necessary to avoid attempts to access device capabilities that were not predefined as part of the Virtual Machine definition and implementation. Thus binary compatibility is lost across multiple devices if native functions are needed to access capabilities of any device that are not part of the common Virtual Machine definition. Since most non-PC device hardware and software are most often specialized or optimized for a particular purpose, form factor, price point, user interface or functionality, it is often the case that their basic unique native functions or capabilities must be accessed for the applications most often targeted for the device. For most portable or special purpose devices, the very reason for their existence is because there is a need for uniquely different capabilities and functions. This runs counter to the Java Virtual Machine approach of hiding the differences between devices to make them all look the same to the application.

Secondly, Java is a general purpose language optimized for ease of programming at the expense of efficient execution and efficient memory use. Therefore, it will not be the most efficient or effective solution for many thin devices with modest processing capability and little available memory or where cost is important.

Thirdly, multimedia content response times cannot be assured using a Java procedural approach. Most Java programs are heavily reliant on the frequent allocation and de-allocation of varying size memory structures causing memory fragmentation. This memory fragmentation often leads to periods when the processor within the device must stop rendering the content while it performs garbage collection within the memory. Users will often experience a breakup in smoothness of audio and video rendering when this occurs.

Fourthly, Java presents significant speed and size issues. Java and its associated technologies and libraries necessary for interoperability are relatively heavyweight and require a relatively large number of CPU cycles for execution and relatively large amounts of memory for storage. Interoperability programs written in Java that include user interfaces, multimedia rendering, device enumeration, robust cross platform device interoperability, dynamic adaptation of code and data to send to different types require a large amount of code to be written and exchanged because all of these functions must be built up using libraries, or special purpose Java code sequences, as none of these operations are native to the Java instruction set or environment. The result is that Java programs for interoperability are large and slow, limiting their use on devices where limited processor power, battery life or cost are important issues. Where the devices do not have sufficient resources a Java based interoperability solution is not possible.

Fifthly, Java at beast provides a limited and incomplete base implementation for interoperability. This makes it necessary for a large number of libraries to be existent on all devices to interoperate, or have a high speed always-on connection to servers which contain the necessary program code. Performance for operations not included in the base instruction set of Java must be provided in the Java language itself, greatly limiting the runtime performance verses that of native code that might otherwise be used to implement these operations. Missing interoperability base operations include native support for: (i) multimedia animation playback; (ii) adaptation of programs, data, content, user interface or controls to target other devices; (iii) computer generation of custom programs so that devices that originate content can automatically and easily marry that content with interoperability programs; (iv) device, service and resource discovery over a wide variety of protocols; (v) synchronization and/or serialization of processes running in different devices; (vi) device power management; (vii) application and synchronization recovery when devices intermittently lose and regain their connections.

Often when a Java VM specification proves to be deficient for a class of devices or applications, a new Java VM specification arises to address the now known native support needs of this new class of devices; however, Java programs written for one VM are not generally binary compatible or interoperable with devices which conform to different VM specifications. Java VM specifications exist for various devices classes, including the J2ME, MIDP 1.0, MIDP 2.0, and CDC, but this proliferation of ever more non-interoperable Java VM specifications and implementations continues to cause a form of fragmentation of the types and forms of programs and devices that achieve even a small degree of interoperability through the use of Java VMs.

Xerox Palo Alto Research Complex (PARC) has announced a variation on the Java plus Jini interoperability technologies which they call "Obje". Obje is explicitly based on Java, or as an alternative, an unspecified and unrealized similar virtual machine based technology. While Obje points to some ways of providing procedural methodologies needed to effectively team devices and eliminate the requirements for all devices to have the programs ported or resident on all machines, it is expected that Obje implementations will have similar capabilities and limitations as the Java plus Jini approach as they offer no details to indicate any divergence from the Java VM model for the procedural base to be used PostScript, another procedural approach, has been around for a considerable time and provides a printed page description language which has been very effective at establishing a high degree of interoperability between PostScript documents and PostScript printers. PostScript documents are programs which when executed on a PostScript software engine inside a printer, control the hardware printer engine and recreate the image of printed pages while taking advantage of the highest resolution possible on the printer that it finds itself on. PostScript is largely limited to the interoperability of documents and printers. Some of the reasons for this limitation include the fact that PostScript documents are expressed in human readable text. This expands the size of documents and programs greatly over binary programs. The text requires parsing operation when the programs are run, requiring more processor cycles and scratch memory then would be necessary if the programs were expressed in binary. Furthermore, PostScript does not provide any significant native support for: (i) Multimedia video/audio/animation playback; (ii) adaptation of application, data, content, user interface or controls to target other devices; (iii) device, service and resource discovery; (iv) synchronization and serialization of programs running in multiple devices; (v) device power management; (vi) finding and using other devices; (vii) maintaining robust connections between devices; or (viii) efficient access to various storage mediums, including the common flash memory now common on devices.

Storymail Stories provide a variable length procedural instruction set designed for encapsulating multimedia messages. Aspects of Storymail Stories and related systems and methods are described, for example, in U.S. Patent Application Publication No. 20030009694 A1 published 9 Jan. 2003 entitled Hardware Architecture, Operating System And Network Transport Neutral System, Method And Computer Program Product For Secure Communications And Messaging; and naming Michael L Wenocur, Robert W. Baldwin, and Daniel H. Illowsky as inventors; in U.S. Patent Application Publication No. 20020165912 A1 published 7 Nov. 2002 and entitled Secure Certificate And System And Method For Issuing And Using Same, and naming Michael L Wenocur, Robert W. Baldwin, and Daniel H. Illowsky as inventors; and in other patent applications.

The Storymail invention including the Storymail Story structure and associated technologies were invented by Daniel Illowsky the same inventor as in this patent. This Storymail instruction set allows trans-coded multimedia content to be represented in a universal procedural format called, "Stories" which provided significant advantages over multimedia content representations known theretofore. However, the Storymail technologies did not fully address device-to-device interoperability issues and should one attempt to apply the Storymail technology to achieve device-to-device interoperability, several problems and limitations will quickly become apparent. First, the Storymail instruction set is optimized for small engine size requiring the use of a lot of scratch memory. Second, the Storymail instruction set is burdened with the implementation of a specialized threading model while running content. Third, Storymail Stories require trans-coding of even basic content types, such as JPEG or Bitmap images. Fourth, Storymail Story technology does not provide native support for device, service, or resource discovery. Fifth, Storymail Story technology has no native base support for synchronization of programs running in multiple devices. Therefore, even though Storymail technology and the universal procedural media format provided significant advancements over the conventional arts of the day, it does not satisfactorily solve the device-to-device interoperability issues that are now apparent in the electronic and computer arts.

It will therefore be apparent that neither static nor current procedural approaches provide satisfactory device-to-device interoperability particularly for heterogeneous devices and a priori unknown applications. The problem is further compounded when the current client-server and peer-to-peer inter-device interoperability models are considered.

Conventional Client-Server and Peer-to-Peer Models

In the current state of the art, interoperating programs running on multiple devices generally use either a Client-Server model or a Peer-to-Peer model.

In a client-server environment model, one device (i.e., the server) provides the services and another device (i.e., the client) makes use of the services. This allows multiple client devices to take advantage of a single more capable server device to store and process data, while the lighter weight client device just needs to be powerful enough to make requests and display the results. A limitation of client-server approach is that generally the server must be registered on a network and accessible at all times to the clients with a relatively high speed connection.

In the peer-to-peer environment model, any interoperating device is generally assumed to have all the facilities necessary to carry out the application. Also in the peer-to-peer model, generally all devices that interoperate must have knowledge of the programs or services to be employed before establishing a connection so that they can agree on appropriate coupling and protocols. Having to have the full capabilities to carry out the application, and the need to have the peered program protocol layers pre-existing on all interoperating devices are significant limitations to applying a peer-to-peer model to device interoperability. In practice peer-to-peer devices will often encounter different non-perfect implementations or versions of software which will fail to cooperate do to unpredictable iterations of the differing non-perfect implementations. To correct these problems, often drivers or other software must be updated, distributed and installed. While this can often correct interoperability problems, the administration, implementation, distribution and frustration associated with failures and the complexity, sophistication and time needed to fix them remains a serious problem of peer-to-peer based device interoperability.

In the world of personal computers the current most popular though limited interoperability platform is the Microsoft Windows™ operating system. Under Microsoft Windows™, theoretically any application binary image can run and be useful on any standard PC architecture device running Microsoft Windows™ operating system, regardless of whether the PC was manufactured by IBM, Toshiba, Sharp, Dell or any other manufacturer. In practical terms, however, even Microsoft Windows has limitations with interoperability in real-world operating environments.

As computing devices and information appliances diverge from the generic general purpose Personal Computer model into more specific specialized devices such as mobile phones, mobile music players, remote controls, networkable media players and routers, and a mired of other devices, there is a need for an application platform that allows the quick and efficient development of applications that are not only binary compatible across all (or at least most) devices, but which can form ad-hoc teams of devices on-the-fly over multiple protocols based on the resources of each device. The applications need to be able to spread their execution across all the devices in order to carry out applications that no one device has all the software, hardware or other resources needed to implement on its own.

Currently in the state of the art, there is no effective software platform for creating programs that can run and spread themselves across multiple devices, particularly when the devices to be spread to are of diverse types and have heterogeneous device hardware, software, and operating system (if any) characteristics. Although there are many standardized embedded operating systems, because of the need for the applications to access the unique capabilities and features of the device, including the arrangement of displays and controls, there is little chance that a program built for one device will be useful if run on another different device, even if both devices use the same embedded operating system and processor. Thus, it is clear that there is a great need in the art for an improved method and system for providing reliable, easy-to-use device, application program, data and content interoperability, while avoiding the shortcomings and drawbacks of the prior art apparatus and methodologies heretofore known.

SUMMARY

The invention comprises a number of inventive systems, devices, apparatus, computer programs and computer program products, procedures and methodologies that together make device and system interoperability simpler, more reliable, more robust, more powerful, more cost effective and more secure than in the heretofore current state of the art. The technology employed is based on procedural interoperability techniques. The invention differs in important and profound ways from existent procedural interoperability techniques. While the existent techniques attempt to hide the differences between devices so that the same executable binary image can run on all devices, the invention celebrates and provides access to all the assets of devices to each other so that the application can form ad-hoc groups of devices and effectively spread its execution across the groups of devices much as if all devices in the group were one device.

Most existent interoperability technologies are extensions of techniques developed over the years for powerful general purpose computers in corporate or government networks that are always connected on reliable high speed networks, rarely reconfigured, have continuous access to ample power and are configured and maintained by trained full-time professionals. These techniques fall short when applied to the interoperability of mobile, battery powered, intermittently connected and cost constrained devices now becoming available, and are used by individuals who are not trained to and would rather not concern themselves with configuring and maintaining the software and hardware necessary for interoperability.

The invention necessarily involves a new software ecosystem of methodologies which work together to greatly advance the simplicity, robustness, cost effectiveness, efficiency and security of interoperability of mobile and other special purpose devices now entering the market at an increasing rate.

FIG. 3 shows exemplary components of an embodiment of the inventive new procedural and software ecosystem collectively referred to as the DartPlatform which itself is a form of interoperability platform. The source, here DartSource 100, contains all the code, data and content needed to carry out the intent of the application. The DartSource is processed by the DartTools 200 into an binary executable application package which encapsulates all that is needed to carry out the purpose of the interoperability application as originally specified by the DartSource. The binary image of the package conforms to the DartFormat 300. The encapsulated applications are called Darts, which are to be executed on one or more DartDevices 400. Any device which is running a DartPlayer which is native code executable program which contains the ported DartEngine 600, and has at least one communications protocol 401 for communicating with other DartDevices is itself a DartDevice capable of running Darts which can extend their execution across to other DartDevices to make use of their combined capabilities and resources. FIG. 4 shows an Exemplary DartDevice 3000. At the top there are shown three Dart applications 3001 running on the device 3000. The code of these Darts was generated by the DartTools, (See FIG. 3 200), to conform to an inventive DartInstructionSet whose individual operations are carried out in a secure manner by the portable portion of the DartEngine 3010 and the device specific portion of the DartEngine, the Hardware Abstraction Layer (HAL) 3020.

Note that the DartInstructionSet operations carried out by the DartEngine contain processor intensive operations needed for interoperability such as cryptographic operations, graphics and text processing. In addition there is built in support in the engine for inventive interoperability methodologies to be described in more detail later on in this section. The HAL contains a profile method accessed through the PROFILE_INSTRUCTION instructions of the Dart to determine the devices specific characteristics of the device and its functionality. The HAL also provides methods for the engine to access common Dart standard hardware functions where they exist. Perhaps most profoundly inventive is the portion of the HAL which can be used to expose all the native applications, functionality and resources of a device to Darts or portions of Darts running on the device which are then available for use by Darts whose execution extends to other devices.

Simplicity of interoperability, reliability and robustness is achieved in part by encapsulating all the code, data and content and the meta code, data and content needed for a particular application purpose to spread itself intelligently and efficiently across heterogeneous devices. Because all of the application code, data and content running on the interoperability devices originate from a single Dart package there are none of the incompatibility or administration issues associated with independently generated and distributed components. Having the data and code packaged together also eliminates common interoperability problems which arise from versioning incompatibilities between the data format and the application program chosen to manage the data.

There are at least twenty one uniquely described separate inventive systems, methods, computer programs and computer program products, and/or means which contribute to enhancements of robustness, power, efficiency and security for the interoperability of devices over the existent interoperability technologies which are largely extensions of techniques developed over the years for powerful general purpose computer networks. These innovations are briefly highlighted below and then described in more detail in subsequent portions of the detailed description. There are many more when each useful combination of separate inventive system, method, computer program product, and/or other means are combined. Many of the techniques used share the socialization aspects employed by humans as they form ad-hoc teams and work together to execute specific tasks. The fast growing world of ever more special purpose and mobile devices which need to form ad-hoc teams and are only intermittently connected, often has more in common with human like collaboration than with the general purpose computer networks from which conventional interoperability techniques are borrowed.

Recruitment interoperability model. Recruitment is an advantageous alternative to the existent client/server and peer-to-peer device interoperability models. Recruitment is used by a single software application package or Dart, to forms teams of devices based on their capabilities and content and then intelligently spread portions of itself to the teams of devices which then work together to carry out the intended purpose of the Dart application package.

Renditioning adaptation and interoperability segmentation model. Renditioning allows the segmenting of an interoperability application into a plurality of tightly integrated, yet separately executable programs. Individual Renditions are chosen during the recruitment process to be sent to run on other devices to provide coordinated access to the capabilities and content of individual devices.

DartSource/Interoperability Source. DartSource is a method for specifying all the program renditions and the code content and data needed for a packaged Dart interoperability application. DartSource extends the languages constructs commonly used to specify single executable program targeted to a specific device, into a language which can also specify the procedures necessary for intelligent recruitment of teams of devices and the renditions needed so that there is a suitable rendition to send to run on each recruited device to carry out that device's portion of the intended purpose of the application being specified.

DartFramework/Interoperability Framework. DartFramework is the portion of the DartSource provided for use by programmers in building interoperability applications which encapsulate access to many of the advantageous features of the DartPlatform eliminating the need for the programmer to have to understand and implement many of the desired interoperability features of the DartPlatform.

DartTools/Interoperability Tools. The DartTools process the DartSource application specification into the Dart application packages.

DartFormat/Interoperability Format. The DartFormat is the rules for putting together a Dart package which encapsulates all the code, data, and content needed for an interoperability applications which can then be loaded and run on DartDevices, which contain a running DartPlayer.

DartRuntime/Interoperability Runtime. The DartRuntime is a system for establishing the tight coordination of control, data and operations between separate processing units of a running Dart whether the processing units are running on a single device or across a team of recruited devices. This is accomplished by an event driven system which ensures the serialization and synchronization of events flowing thorough all processing units of the application so that all processing units can have access to all the directives in the same order needed to coordinate and synchronize the data and operations between the processing units.

Linear Tasking. LinearTasking is an advantageous alternative to the conventional pre-emptive and cooperative threading models commonly used on most devices so that multiple operations can be specified and run as if their actions were being executed simultaneously. LinearTasking ensures a simple, reliable, flexible and extensibe way for processing units to coordinate their activities in a very deterministic and easily tested manner. LinearTasking is part of the DartRuntime operating inside a single device.

Vertical Layering. VerticalLayering is an advantageous alternative to the horizontal layering of protocols in common use on most devices which requires different levels of protocols to communicate through all intermediate levels of protocols, often having to translate information to conform to the differing needs of each protocol interface. Dart processing units use VerticalLayering so that regardless of their level, processing units can communicate directly with all other processing units through the use of event structures and event queues which are accessible and understandable by all processing units without translation.

Application driven Dower management. Dart applications built using LinearTasking and or VerticalLayering as embodied at least partially in the DartFramework, always keep track of their exact response time needs so that efficient power management techniques such as slowing down the processor can extend the lifetime of batteries, limit the amount of energy consumed or limit the amount of heat generated on devices. In the current state of the art most applications do not keep track of their response time needs, and if they did would not be able to communicate these needs through existing layers of protocols which conform to specifications that do not include interfaces for communicating response time needs to the hardware of the device from the application.

Interoperability application driven error recovery. Device to device wireless communications connections are often unreliable due to interference, distance limitations, and abrupt shutdowns due to low battery power. In conventional horizontally layered protocol software implementations on devices a fatal error in any one layer will result in unrecoverable errors which will be difficult for an application to recover from, both because the application does not have standard interfaces to easily reestablish the connections and contexts of the connections, and because conventional application programs do not have much infrastructure for tracking and reestablishing shared state between applications running on different devices. The DartFramework keeps track of shared state, renditioning can be used to easily reestablish lost state between devices and VerticalLayering makes it simple for communications errors to be relayed to the Dart and for the Dart to relay recovery information directly to the communications processing units. Thus Darts running across devices can seamlessly recover from intermittent complete losses of communications between cooperating devices and the recovery of the shared state of the devices when the connection is restored even where the previously lost device has itself lost all its application state.

Interoperability Instruction Set. The InteroperabilityInstructionSet is used to represent the code portions of a Dart. The DartEngine executes these instructions. Along with the conventional fetching, storing, testing, computations and branching instructions of conventional processors, the InteroperabilityInstructionset includes instructions to enhance the speed of operations, carry out interoperability methodologies and expose the capabilities and content of devices to each other. Of special note is that there are instructions for exposing and the use of unique capabilities and content of devices to other device even when the other devices have no prior knowledge of the unique capabilities and content.

Creationism. Creationism is a method used by Darts to dynamically generate Darts highly customized for a particular target device and or communications session and or purpose. Instructions in the DartInstructionSet exist for programmatic generation of Darts from parts of the running Dart itself and any information that can be collected or computed by the running Dart.

Interoperability Engine/DartEngine. The DartEngine is software and or hardware used to execute the instructions of Darts on a device and carry out their intended purpose. The DartEngine and the device specific DartPlayer, in which it is encapsulated, provides the common execution and DartRuntime environment which allows Recruitment and Renditioning to establish efficient teams of devices and spread their code, data and content as best to carry out the intended purpose of Darts.

Interoperability Device Enabling. Interoperability Device Enabling is the process of turning a conventional device into a highly interoperable DartDevice through the porting of a DartEngine as part of a DartPlayer. In addition, implementation of the Hardware Abstraction Layer needed to access the device specific information, capabilities and content of the device is also required. At least one communications protocol must be implemented before a device with a DartPlayer becomes a DartDevice.

Interoperability Security Model/DartSecurity. DartSecurity is a system for providing the infrastructure needed for protecting the integrity of a device and its content from malicious or accidental damage.

Social Synchronization Interoperability Method/Dart Social Synchronization. Social Synchronization is an efficient and easy to administrate method for synchronizing specific sets of data and or operations across any number of devices and protocols without the need for every device to contact a master device, or for any device to act as a master. SocialSynchronization of devices and content is similar to the way humans share information and tasks and is an advantageous alternative to mastered synchronization techniques most often used in the current state of the art.

Social Security Interoperability Model/Dart SocialSecurity. SocialSecurity is a particularly simple to administrate method for forming webs of security between teams of possible intermittently connected devices. SocialSecurity works in a similar way to how humans often come to trust one another. The foundation for SocialSecurity is the use of SocialSynchronization to spread unique ids generated using the DartSecurity system along with the allowed access rights which travel transitively from device to device. Devices which have never directly communicated will often find that they are part of a team of devices which are allowed to interoperate with certain access rights without any need for further gathering permissions.

Interoperability Device/DartDevice. A DartDevice is a highly interoperable device by virtue of its running a DartPlayer containing a DartEngine and at least one communications protocol for connecting to other DartDevices.

Interoperability Platform/DartPlatform. The DartPlatform is any set of Dart methodologies which can carry out the specification, generation, intelligent teaming of DartDevices and facilitate the spreading and running of Dart interoperability applications across one or more DartDevices.

Virtual Pointers. VirtualPointers is a methodology for providing programmers with a simple and efficient way to access and use of one or more independent data address spaces in a single program. VirtualPointers used by software programs can adapt their use of main memory and storage devices to run efficiently on devices with differing sizes and speeds of a fast but small main memory and larger but slower storage.

BRIEF DESCRIPTION OF THE DRAWINGS

The Detailed Description of the Illustrative Embodiments should be read in conjunction with the appended figure drawings, wherein:

FIG. 6 is an illustration showing a diagram illustrating an example of the inventive Recruitment method for extending and sharing a Dart application (such as a slide show Dart application) running on a first DartDevice with a second DartDevice which originally knows nothing about the originating first DartDevice or the Dart application.

FIG. 19 is an illustration showing an embodiment of Dart Application Level Error Recovery according to one embodiment of the invention.

FIG. 28 is an illustration showing a diagram illustrating the non-portable DartDevice specific portions of the file system which may provide access to files from the Dart but does not provide any mechanism for access to files that are not considered part of the running Dart's protective Sandbox.

FIG. 32 is an illustration showing an example Dart Virtual Pointers being used to access a data element at a specific virtual pointer address.

DETAILED DESCRIPTION OF ILLUSTRATIVE EMBODIMENTS OF THE INVENTION

I. Overview and Introduction

Figure 1:
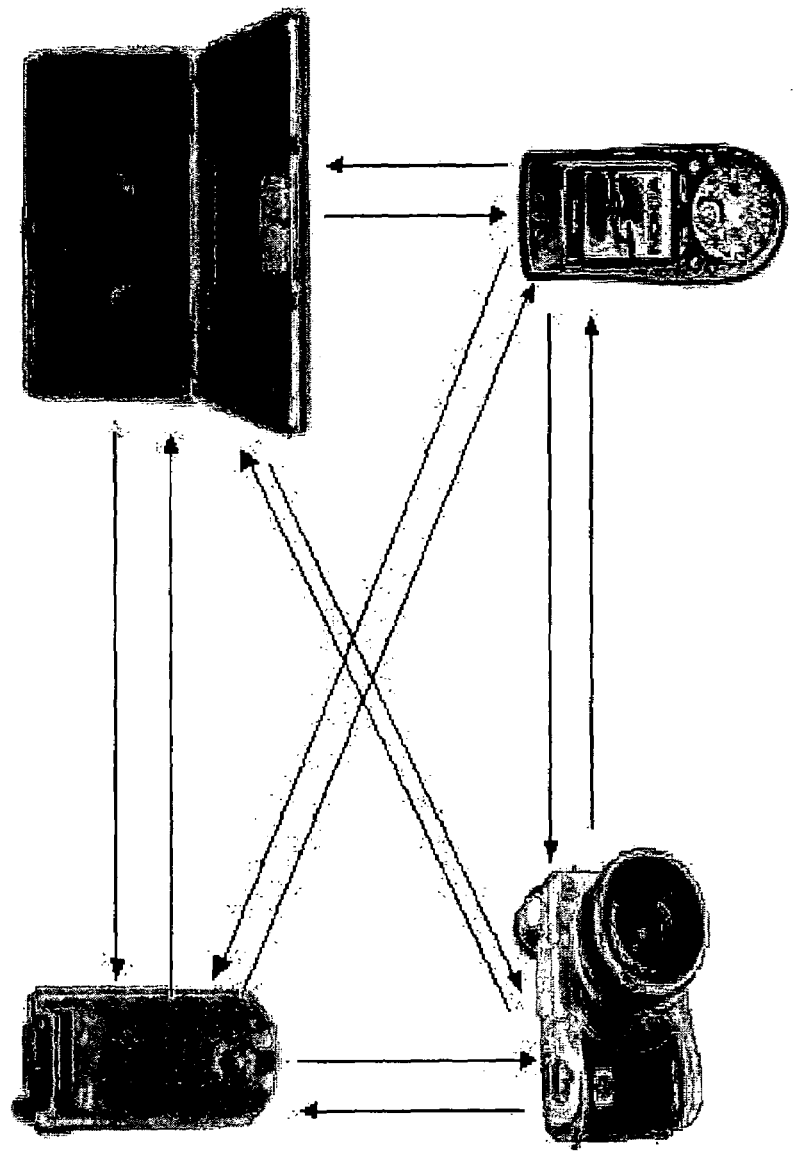
FIG. 1 is an illustration showing the situation in which getting N devices to interoperate or work together generally requires on the order of N-squared adaptations.

In one aspect, the present invention relates to methods of and systems for enabling devices to efficiently share a diverse set of content, control, resources and applications between similar and more importantly diverse and dissimilar sets of devices and systems. Aspects of the invention are embodied as the "DartPlatform." The name, "Dart," is intended to convey that the applications, data, and/or other hybrid forms of processes, procedures, data, intentions, and other information in the broadest possible sense are combined into Data that's smART, and also to denote the manner in which complete intelligent packages of procedures, content and data in the form of Darts, DartProcedures, and DartParts literally dart (or are communicated) between devices to achieve a high degree of simplicity, efficiency, robustness security and interoperability across a diverse set of devices, device resources and device capabilities.

Furthermore, in the description contained herein, it will be appreciated that the term Dart means or refers to one particular embodiment of the invention and that the term Interoperability is used as the generic term for aspects of the claimed invention of which a Dart is a particular form of interoperability.

The invention introduces many new technological system, device, method, and computer architecture and programmatic features that establish new paradigms not heretofore described in the literature. At least in part because the technical and computer terminology does not yet provide compact terms that by themselves may fully identify the innovative elements from conventional elements, this description frequently uses the term "Dart" or other "Dartism" as a prefix or qualifier for another term, such as used in the phrases Dart Procedures, Dart Parts, and the like. In some instances, the two terms are connected such as DartProcedures, DartParts, DartDevice, and the like. Furthermore, it will be appreciated that even more compact forms such as device, part, or procedure may be utilized in describing aspects of the invention.

The intended meaning should normally be apparent from the context of the description; however, it should be appreciated that capitalized single word forms such as "DartProcedures" are equivalent to multiple word forms such as "Dart Procedures", "Dart procedures", or even "procedures" when describing an aspect of the invention. This applies to other "Dartisms" as well, such as Dart Parts, Dart Player, Dart Platform, and the like.

Darts in their most general form are not simply data and not simply procedures or programs and not simply content, though Darts may be any and may combine elements of all. "Darts" can be thought of as a special integrated digital binary package of software, code, data, and/or content along with the code data and content that can be used to intelligently assemble, save and distribute itself or parts of itself across devices to carry out the intent of an interoperability application. The invention results in simple, efficient, reliable and secure interoperability between both homogeneous and heterogeneous devices.

Unfortunately the contemporary paradigm for computing and information systems and devices has become so entrenched in common practice of separating and distinguishing operating system (OS) components, device driver, computer program application programs, and user or other data components, that some commonly accepted terms used in the computer science arts do not strictly apply to elements of the present invention. Therefore to the extent possible, common computing and computer science terms are used when their meaning is appropriate even if not exact, and various "Dart" expressions and terms are applied when a more specific meaning is intended to avoid use of generic language with many qualifiers.

Some components, features, and advantages of embodiments of the invention are first described to orient the reader to the Dart Platform, system, method, and computer program elements. These and other components, features and elements are then further described in the remainder of the detailed description. It will be appreciated that not all components, features, or advantages provided by every embodiment of the invention can readily be listed in a few paragraphs, therefore the description below is exemplary of components, elements, and advantages found in some embodiments, including some optional but advantageous components and features, and should not be taken as a limiting description. It will be apparent that embodiments of the invention may provide and use or not provide or use some or many of the features described herein, and that other embodiments will provide and use many or most if not all of the features and components described here.

Existing methodologies for operating systems, program formats, programming tools, and communications protocols were developed largely for a world of ever more powerful general purpose computers which have access to ample reliable power supplies and reliable, high-speed, always on, communications protocols. Furthermore, networks of computers were relatively static and rarely had to be configured or reconfigured to work together. Also it was assumed that there would be a knowledgeable pool of human system administrators available for installing, configuring, reconfiguring, updating, fixing and otherwise maintaining computers, networks, operating systems and programs.

These existing methodologies are ill suited as commonly applied to the now quickly evolving world of special purpose devices which often run on batteries, have limited computing resources, communicate through lower speed unreliable wireless or power-line protocols and need to be dynamically reconfigured constantly to work with other devices, many of which are portable and only intermittently connected. Despite the increasingly dynamic configuration needs and diversity of devices and their capabilities which must work together, it is often highly desirable for these devices and associated software, to be used and maintained by people who are not knowledgeable as systems administrators.

The DartPlatform includes a set of new inventive methodologies and components of a software, and optionally hardware, eco-system designed specifically around the characteristics and needs of the now quickly evolving world of special purpose and communicating devices.

According to one embodiment of the invention, the inventive Dart Platform (DP) may advantageously include the following components:

1. DartInstructionSet—An interoperability instruction set
2. DartEngine—A portable interoperability engine
3. DartFormat—A file or bit-image format to encapsulate any possible combinations of data, content, codes, procedures, semantics or other information that may be necessary to run, save, optimize, copy and/or share the data, content, code, procedures, or other information optimally (or near optimally) on any device or subsystem that contains both a DartEngine and a mechanism for delivering DartFormat information (usually in the form of a set of digital binary such as in bit file(s) or bit-image(s) to the device for processing by the DartEngine.
4. Dartools—A set of software tools for creating Dart Format bit-images and files. Dart Tools may include a DartCompiler, a DartLinker, and a DartMasterPlayer, as well as other tools, each of which are described in greater detail herein below.
5. Dart or Darts—The package of bits, bit image and/or file instances created by the Dartools for processing by a device containing a DartEngine that conforms to the DartFormat file or bit-image format. The DartFormat may encapsulate combined data/content/codes and the semantics necessary to run, save, optimize, copy and/or share the data/content/code optimally on any device or set of devices that contain both a DartEngine and a mechanism for delivering DartFormat bit-images to the device for processing by the DartEngine. Darts is the plural form of Dart.
6. DartProcedure(s)—Self-contained lightweight procedure(s) and data made up of sequences of instructions from the DartInstructionSet combined with data images and data image values the instructions operate on.
7. DartPlayer—A software program designed to run on a particular subset of devices which employs a DartEngine to process Darts.
8. DartMaster—A Dart intended to be further optimized into one or more efficient and/or specialized Darts or Dart by processing the DartMaster with a special Dartool called the DartMasterPlayer.
9. DartFramework or DartObjectFramework—A set of source code which defines the data and methods for a set of base classes for use in building Darts. The DartObjectFramework assumes a certain initial execution point, initial object data pointer, and set of structures and semantics that govern the order that code and data and input data and code are processed. This embodies the device intra-device runtime portion of the DartRuntime which also extends the intra-device runtime into an interdevice runtime which synchronizes and serializes the runtime activities across any number of teamed devices.
10. DartRuntime—The DartFramework or DartObject Framework advantageously assumes a certain initial execution point, initial object data pointer, and set of structures and semantics that govern the order that code and data and input data and code are processed. This is referred to as the intra-device portion of the "DartRuntime." There is also an inter-device runtime which assumes that event structure instances which drive the governs the synchronization and coordination of activities and data exchanges amongst teamed devices are automatically serialized and synchronized between event queues one of which is maintained by the DartEngine of each device. Together the intra-device DartRuntime and inter-device runtimes together provide for a simple to use but highly robust and effective system for carrying out the intent of a Dart where possibly different renditions of the Dart are each running on a set of teamed devices.

Among other aspects, this invention is designed to improve interoperability between and among devices of any type and to solve the following problems and others in interoperability amongst intermittently interconnected or always interconnected devices, systems, or subsystems without limitation:

1. Adaptation and optimization of display, control, code, data and functionality when moving content, applications and controls between dissimilar or heterogeneous devices.
2. Remove the need for the device user to have to think about programs, content formats, drivers and/or files, when all they want is content that works (and preferably works as well as possible) no matter where the programs, files and or content goes.
3. Remove the need for the user to have to specify or even know about the type of device connection(s) or communications used between one or a plurality of devices.
4. Allow for the simple and efficient sharing of content, controls, and/or resources between all enabled devices.
5. Enable any device or system, from expensive and complex computer-aided tomography (CAT) scanners down to (thin processor/memory) light switches or other simple devices to make available, document and grant access to their functions, resources, capabilities and needs to other connected devices.
6. Bring the overwhelming development effort necessary using conventional non-procedural approaches to make some or all of the above possible down to a level that can be easily achieved with a dramatically lower number of development projects and costs.
7. Be lightweight (in terms of code size, execution logic, and memory) enough to be suitable for low-end, cost-constrained, and/or power constrained devices.
8. Insure that any number of DartDevices can seamlessly interoperate with all DartDevices, in most any manner that makes sense, such as for example by including intimately entwined native support for one or any combination of:
   (a) Dynamic multimedia rich interfaces whenever the device hardware can support it, and hierarchically less rich interface if the device hardware does not support it;
   (b) Device power management;
   (c) Device discovery;
   (d) Service discovery;
   (e) Resource discovery;
   (f) Isolating the Dart applications from needing to know the details of the various communications physical and protocol layers;

(g) Isolating the Dart applications from needing to know the details about physical display formats;

(h) Isolating the Dart application from needing to know details about maintaining synchronization with applications running across multiple similar or dissimilar devices;

(i) Requesting, retrieving and running optimized control panels to run locally, but actually control the device from which the control panels were retrieved; and (j) Loading, running and optimizing separately produced Dart content as child Dart extensions of the intra-device DartRuntime environment of one or more parent Darts.

9. Eliminating the need for programs, data or content to pre-exist on any of the devices other than the device (initiating device) that initiates the interoperability application embodied in a Dart on the originating device.

10. Allowing devices to efficiently share their resources based on all or some subset of devices capabilities and limitations, with no need for any device to be master or slave.

11. Allowing applications' code, data, content and hybrids of these (as embodied in Darts) to dynamically spread themselves to connected devices in a manner that allows the connected device to save the application for use and further spreading to other devices ad infinitum even after the original or initiating device is no longer connected.

12. Improving reliability of multi-device operations by encapsulating all the code, data and content of an interoperability application in a single package (or set of packages) which then spreads itself across other devices as required, eliminating the problems associated with mixing and matching separately generated and distributed application or protocol software implementations, code, data or content that otherwise would have to be separately generated and/or distributed to each device.

13. Accomplishing all the above in a simple, reliable and secure manner.

Figure 8:
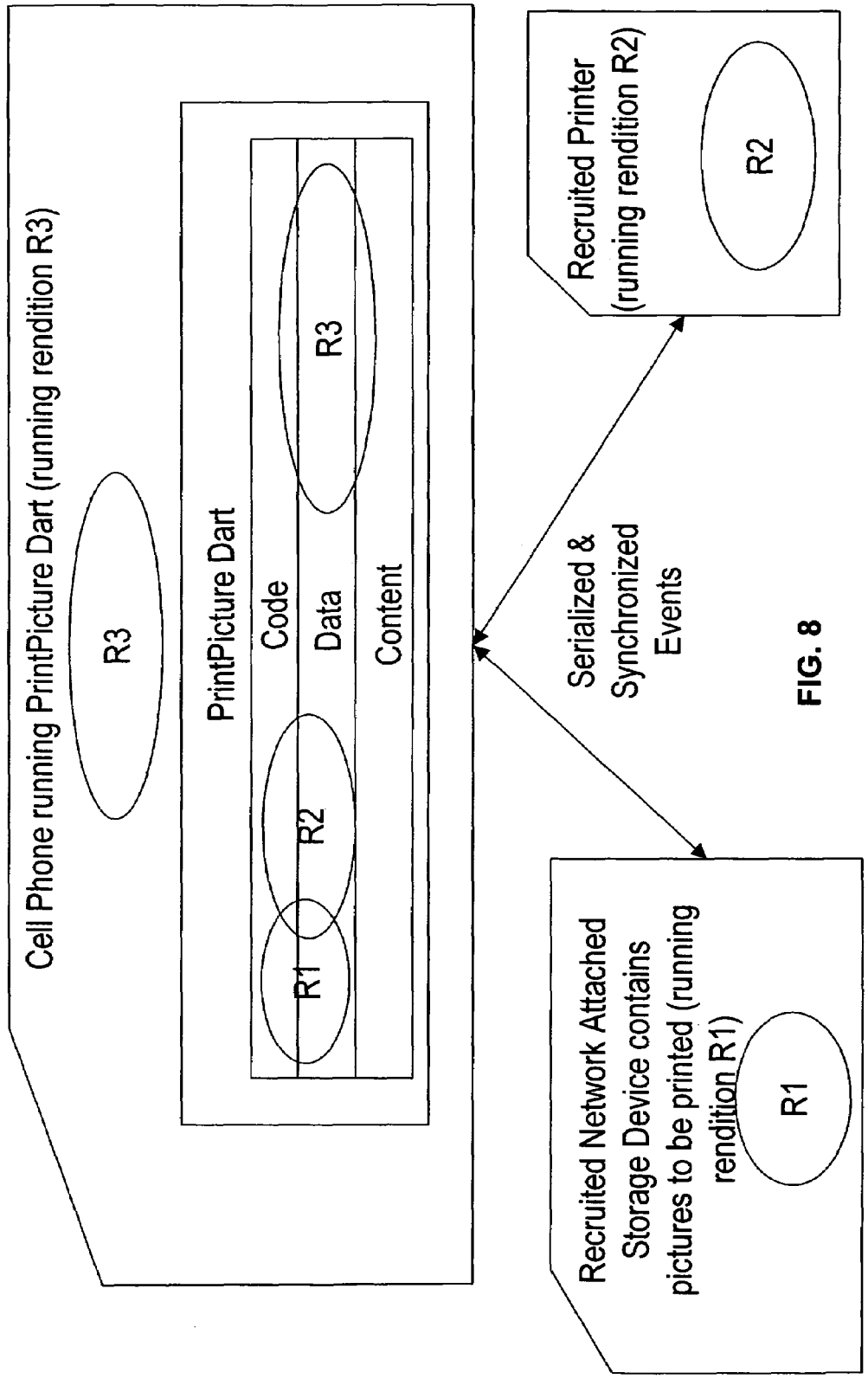
FIG. 8 is an illustration showing a diagram showing an exemplary embodiment of a print picture application expressed as a Dart running across a team of three devices each of which is running a different rendition of the originating Dart.

With reference to FIG. 8, there is shown an example PrintPicture Dart running on a cell phone which has recruited a network attached storage device to use as a source of pictures and a Printing device to serve as the destination for carrying out the printing of the pictures. All the devices are assumed to contain a DartPlayer that has been ported to each device.

The Dart on the cell phone contains the three renditions (R1, R2 and R3) which are each capable of serving as individually executable images when run on a DartPlayer. Rendition R3 is running on the cell phone and previously carried out the recruitment of the other two devices by sending DartProcedures to execute on the candidate devices which determined that the particular Network Attached Storage device would function as the best source for pictures, and that the Printer device would best function as the destination for printing pictures.

Rendition R3 on cell phone then generated the image for a Dart containing just the rendition R1 which contains event processing code for identifying and retrieving pictures from the Network Attached Storage (NAS) device. The Dart containing rendition R1 is then sent to the Network attached Storage device as part of a RUN_DART type event. When the RUN_DART type event is processed by the DartEngine on the NAS device, rendition R1 is loaded and begins execution which will process any synchronization events requesting information or pictures stored on the NAS device. Similarly, rendition R2 which handles the printing of pictures that are part of PRINT_PICTURE type events is formed and sent to run on the chosen Printer device.

Note that the three renditions were all generated from the same PrintPicture Dart that was originally only resident on the cell phone. This ensures a high likelihood of compatibility since the application is in effect talking to parts of itself rather than independently implemented, ported, and distributed component required for conventional interoperability methods.

Note further that the renditions also share code, data and/or content and understand an interrelated set of event types specific to the PrintDart application. The R3 rendition was able to spread portions of the PrintPicture Dart intelligently to DartDevices even though it had no previous knowledge of the other two DartDevices, and which devices had no previous knowledge of the cell phone or the PrintDart.

Now rendition R3 running on the cell phone can signal events to control the selection and printing of pictures between the recruited NAS and Printer devices across an event driven DartRuntime now established on and amongst the three devices.

Note additionally that any combination of protocols may be employed according to common protocols of the cell phone and the NAS device and independently chosen for use any common protocols of the Recruited Printer device. In addition, since all devices contain a ported DartEngine as part of the DartPlayer, the devices can interoperate even if they are running different operating systems on different processors.

As the invention involves a system with a large number of elements that may have closely tied complex interrelationships, some of the elements are first described in overview manner so that some understanding as to why an element may be present and how the element works and interacts with other element. Then each element will be described in even further detail with due regard for its interaction with other elements. Making the dramatic improvements to the state of the art in interoperability embodied in the invention required the creation of a largely new type of software ecosystem akin to the move from data passing to functions to the object oriented methodologies now in widespread use. In order to more easily describe the inventive, system, and data and code structures it is useful to first introduce some new terminology to describe the theory, concepts, characteristics and components of embodiments of the invention.

In one embodiment, the invention itself embodies the following nine enabling methodologies, some of which may be optional but are advantageously included: Recruitment, Interoperability Instruction-set, Renditioning, Creationism, Vertical Layering, Linear Tasking, Social Synchronization, Social Security, and Virtual Pointers.

Device "Recruitment" may include a device interaction model and associated structure and methods and is an advantageous alternative to the existent client/server and peer-to-peer models. The "Interoperability Instruction-set" is portable engine based instruction set which provides a common efficient executable environment across devices and inventively provides a programmatic mechanism for exposing the unique capabilities of a device to other devices "Renditioning" refers to structures and methods to enable easily tested and efficient adaptation of application, data, content, and/or other information. In some aspects renditioning may include efficiently segmenting groups of code, data and content into independently executable images, "Renditions," to be intelligently generated and distributed across a plurality of devices. "Creationism" refers to structures and methods to enable the dynamic efficient generation and distribution of application, data, content, and/or other information in differing forms across connected and intermittently connected devices. "Vertical Layering" enables efficient and effective implementation of features which by their nature involve close cooperation at the tool, application, framework, engine and instruction-set levels. "Linear Tasking" enables a simple deterministic flow of processor control and device resources between processing units of the devices, where the processing units can easily be reconfigured into a single hierarchy which includes processing units compiled into a Dart, separately compiled Darts, and even Darts or Renditions running on other devices. "Social Synchronization" refers to an inventive efficient system and method for synchronizing data or content across any number of devices with minimal or no user involvement. "Social Security" refers to an inventive and efficient system and method for easily establishing and maintaining groups of devices with the proper authorization to interoperate with minimal user involvement. These and other components may be implemented in the form of computer program code segments that include executable instructions for execution within a processor of a device. Furthermore, elements of these components may be embodied in hardware and or a combination of hardware with software and/or firmware and or microcode.

Another enabling methodology that may optionally but advantageously provided is referred to as "Virtual Pointers", and provides a variant of and significant improvement over virtual memory that has several advantageous properties, including for example:

(a) Multiple large independent address spaces
(b) Application specific control over the number of real memory pages.
(c) Device specific control over real memory page sizes to match storage device performance characteristics.
(d) No need for the programmer to predict or administrate the amount of memory needed for data structures or lists.
(e) Automatic saving of data in a form independent of page sizes or number of pages.
(f) Effectively caches data from a larger and possibly slower data store with a minimal amount of precious fast RAM allowing applications to run as if they have much larger RAM memories than they physically do.
(g) Simple and efficient base infrastructure for indexed database operations where the data and indexes are kept in different virtual pointer address spaces.

Having now described many of the methodologies, components, and features of the invention in overview manner, attention is now directed to detailed descriptions of embodiments of the principle methodologies, structures, and methods. It will be noted that many of the procedures and methodologies may be implemented by one or more computer programs or computer program products that may be executed on general or special purpose processing logic, such as micro-controllers, processors, microprocessors, central processing units (CPU), or other processing hardware or logic that is capable of executing or operating on computer program code whether in the form of software, firmware, or a combination of the two.

Section headers where provided are merely intended to direct the attention of the reader to portions of the specification where one particular aspect or methodology is described, but it will be appreciated that aspects of all the methodologies and structures are described throughout the specification and in the drawings and claims, and that no limitation should be implied by inclusion or exclusion of any aspect of the invention within a sub-headed section.

II. Recruitment Interoperability Model

"Recruitment" includes a device interaction model and methodology embodied throughout the implementation of the invention. It is an advantageous alternative to the Client/Server and Peer-to-Peer device interaction models and methodologies used in the current state of the art. The recruitment model and methodology utilizes a common procedural environment that runs on all devices that are to interoperate or be inspected for resources in contemplation of a possible interoperation. In one embodiment of the invention, this common procedural environment is provided by an instruction set, such as the Dart instruction set (e.g., the DartInstructionSet), or an instruction set by any other name that fulfills the requirements for the common procedural environment described here or its equivalent.

Figure 5:
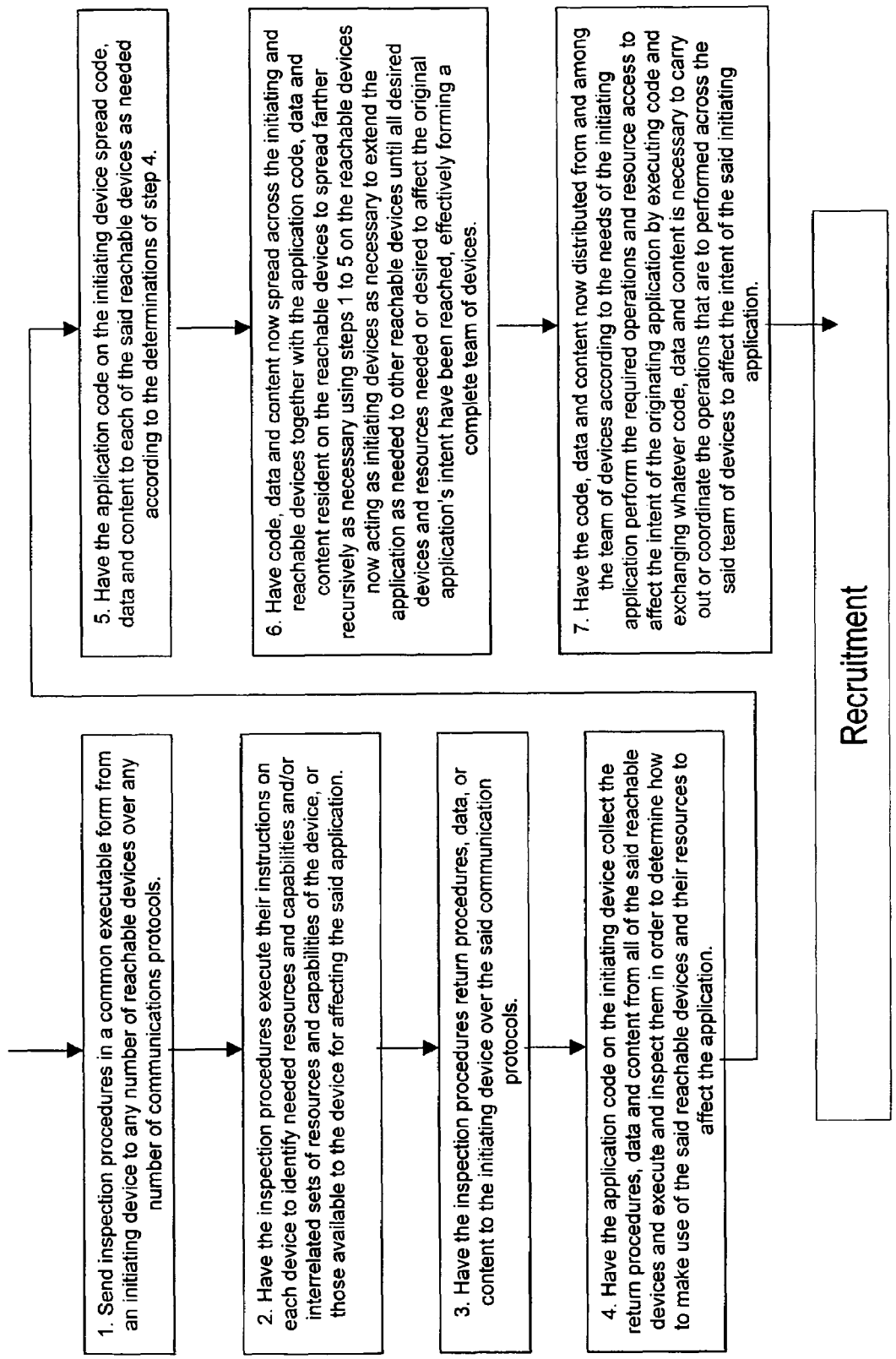
FIG. 5 is an illustration showing an exemplary embodiment of a recruitment procedure in the form of a flow chart.
Figure 7:
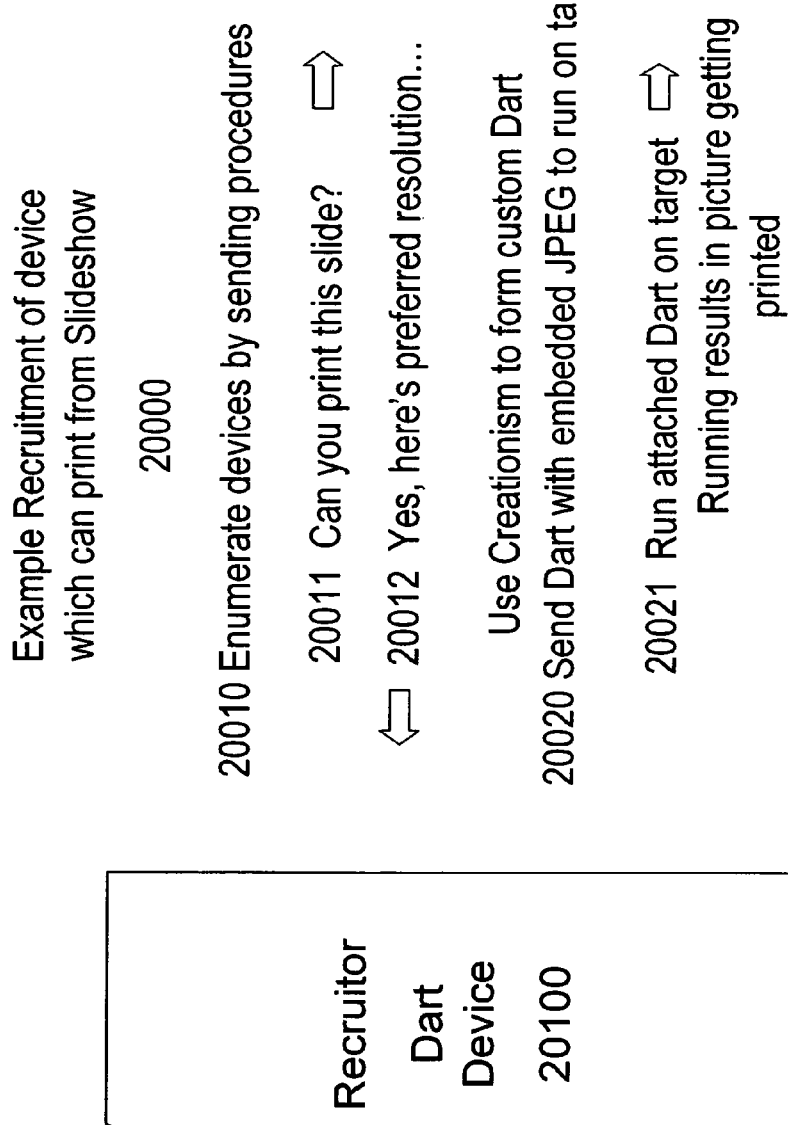
FIG. 7 is an illustration showing a diagram illustrating an example of Recruitment for remote printing from a slide show application running on an originating DartDevice on another DartDevice which originally knows nothing about the originating DartDevice or the slide show application.

With reference to FIG. 5 there is illustrated a flow chart diagram of an embodiment of a recruitment procedure that provides a method for a software application to recruit and effectively later run across a plurality or team of devices much as if they were one device with the combined resources of all the devices. Reference is also made relative to an example of recruitment for a shared slide show 10000 FIG. 6 and an example of remote printing of one or more slides from a slideshow 20000 FIG. 7 Device recruitment (or more simply, "recruitment" or "Recruitment") is performed. Recruitment provides a method for a software application to recruit and effectively run across a constellation, team, or other plurality of devices and/or systems much as if they were one device with the combined resources of all the devices.

A resource may be virtually any hardware, software, firmware, communication capability, configuration, data or data set, capability possessed or accessible by a device or system. A resource may for example be a processor, a CPU, memory, a list of contacts, a sound output device, a display type, DARTs, pictures, or any other procedural, structural, or information item without limitation. A capability may for example be computer code to sort a list, hardware or software to decode an mpeg file, communicate with Bluetooth™ devices, or the like. The recruitment procedure has the intelligence (by virtue or its programming and supporting frameworks, platforms, engines, and the like described herein, to independently of the initiating device, make complex determinations as to the suitability of the recruitable or recruited device to carry out the intent of the application which sent the procedure, or some portion of the intent of the application.

In one embodiment, the initiating device first sends or broadcasts a message in the form of an inspection procedure or procedures in a common executable form, from itself as the source or initiating device, to any number of reachable devices over any number of communications protocols, see FIG. 6 10011 and FIG. 7 20011. The initiating device forms and sends this message in an attempt to find other devices with needed resources or capabilities, a procedure or plurality of procedures structured, coded, or otherwise implemented in the common procedural environment is sent, transmitted, broadcast, or otherwise communicated over a connection or plurality of connections to other devices (known or unknown at the time of the communication) which also contain the common procedural environment. The initiating device need not know what devices may be reachable when it sends or broadcasts the message. Whether other devices are reachable may for example depend on the communications channels and/or protocols that the initiator device has as compared with the possible set of candidate recruited devices.

This source device is alternatively referred to as the initiator device because it initiates the interaction (see FIG. 6 10100 and FIG. 7 20100), the source device because it may be the source of a recruitment procedure, or the recruitor device because it is the device that is attempting to recruit other devices which may themselves be referred to as recruited devices, destination devices, target devices, or simply other devices than the initiator device.

If for example, the initiator device includes a Bluetooth™ wireless communications link, an Infrared communications link, and an IEEE 802.11(a)(b) or (g) communications link and broadcasts the message over each of these channels, only candidate recruitble devices then configured to receive communications over these communications links may receive the recruitment message. Of these, only those devices that provide the operating environment and understand and can execute the inspection procedure will respond. Note that even among such possibly responsive devices, a user of the otherwise recruitable device may selectively or globally block such recruitment or interrogation inspection procedures, for example according to security settings.

Figure 27:
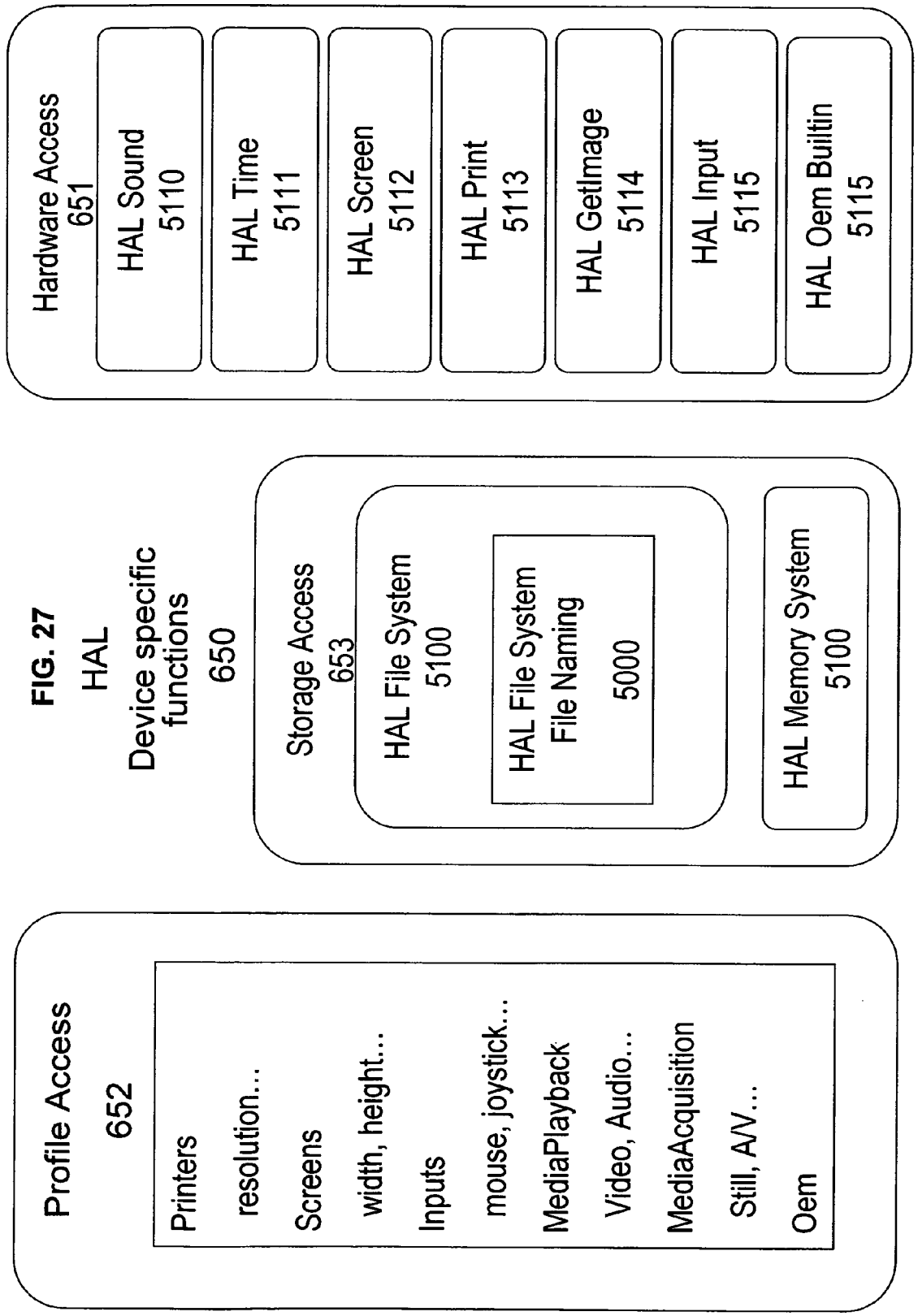
FIG. 27 is an illustration showing a block diagram illustrating the components of the non-portable Hardware Abstraction Layer component of an embodiment of the DartEngine.

Second, the inspection procedure then executes its instructions on each device that responded and was found, to identify needed resources and capabilities and/or interrelated sets of resources and capabilities of the device, or those available to the device for carrying out the application or portion of the intent of the application. In one embodiment, this inspection is performed with the use of an instruction set profile or get profile instruction, such as for example the Dart instruction set profile instruction (e.g. DartInstructionSet PROFILE_INSTRUCTION) which results in an access or call to the Hardware Abstraction Layer (HAL) of the candidate recruitable device to access information about the particular device and its resources and capabilities as stored or computed in the device specific Hardware Abstraction Layer (See for example the Hardware Abstraction Layer HAL 652 of FIG. 27.

Third, the inspection procedures return procedures, data, content or other information to the initiating device over the communication channel and protocol indicating that it received the message (see FIG. 6 10012 and FIG. 7 20012). The responding device may either identify and save an indication of the communication channel and protocol over which is received and optionally the identity of the device from which the recruitment message was received, or may broadcast a response that will likely be received by that initiator device.

In some embodiments, the responding device only answers the initiator's query as to the availability of a particular resource or set of resources (such as a color printing capability), while in other embodiments, the inspection procedure may identify and respond with a complete list of features, capabilities, and resources. Usually, a simple yes I have the needed resource is preferred (response is a single bit or byte or word), so that the size of the communication is minimized. Codes identifying one or more types or class or of resource or resource subclass may alternatively be used. In one embodiment, the inspection procedures return information to the source device as to the resources and capabilities of the device they ran on. This information can for example, take the form of a static data structure, a procedure, a Dart, a free-form tagged language, or any other form of information. See return FIG. 610012 of yes response, as well as processor speed in MIPS and preferred display resolution of the recruited dart device FIG. 6 10200 in the slide show example 10000 of FIG. 6 and return of FIG. 7 20012 of yes response and preferred printer resolution of the recruited dart device FIG. 7 20200 in the slide printing example of FIG. 7.

Fourth, the application code on the initiating device collects all of the returned information possibly including procedures, data, content, or other information from all of the responding reachable devices, and executes any procedures received and inspects them in order to determine how to make use of the reachable devices and their resources to carry-out the intent of the application.

Fifth, the application specific code on the initiating device spreads code, data, content, or any other information to each of the reachable devices as needed according to the determinations in the fourth step (see FIG. 6 10020, 10021 and FIG. 7 20020, 20021). The application code, data, content, or other information may be sent in single common form or may be customized according to embodiments of this invention, such as by using methods described relative to Renditions and Creationism, or according to other methods and techniques.

Sixth, optionally but advantageously recursively have code, data and content now spread across the initiating and initially reachable devices together with the application code, data and content resident on the reachable devices spread farther recursively as necessary using the first through fifth steps on the initial set of reachable devices, now acting as initiating devices (secondary or subsequent initiating devices) as necessary to extend the application as needed to other reachable devices until all desired devices and resources needed or desired to carry-out the original application intent have been reached, effectively forming a complete team of devices and their associated resources. It will be appreciated that the secondary or subsequent rounds of recruitment may not be necessary if devices having needed resources were identified in the first round. On the other hand, the secondary or subsequent round of recursive recruitment may be necessary if required or desired resources cannot initially be found. The recursive recruitment also increases the possibility of a first round recruited device operating as a bridge or translator so that the original initiator acting through a first round recruited device can communicate with a second round recruited device (acting for example, to translate a Bluetooth communication to a hardwired network connection).

Seventh, have the code, data and content now distributed from and among the team of devices according to the needs of the initiating application perform the required operations and resource access, to carry out the intent of the originating application by executing code and exchanging whatever code, data, content, or other information that is necessary or desired to carry out or coordinate the operations that are to performed across the said team of devices to carry out the intent of the initiating application.

This step of distributing executable code, data, and content may be an ongoing operation of the application itself—up to this point the process was primarily focused on were forming the team spreading data, code and content to establish the members of the team with what they need to do their part of the application. The process continues to carry out the intent of the application or task. In the example of a slide show, slides (really digital images or data sets) are being added to a joint slide show, or slides may be flip or sequentially displayed on all the devices for viewing on all devices. Procedures for continuing the interoperation beyond this initial recruitment phase are described elsewhere herein.

This completes the initial recruitment phase and provides an opportunity for the recrutor (initiator) and recrutees (other teamed devices) to interoperate and share resources as described elsewhere herein an as may be appreciated as shown in FIG. 6. 10031, 10032, 10033

The application's operations across devices may then be synchronized by having the Events 800 (see FIG. 17) which drive the application's processing as described herein elsewhere, and advantageously through which all input to the application is obtained, placed in the queue of all recruiting and recruited devices that are marked as being synchronized for its Event type. Events and event queuing are described in greater detail hereinafter, including relative to FIG. 17.

Figure 17:
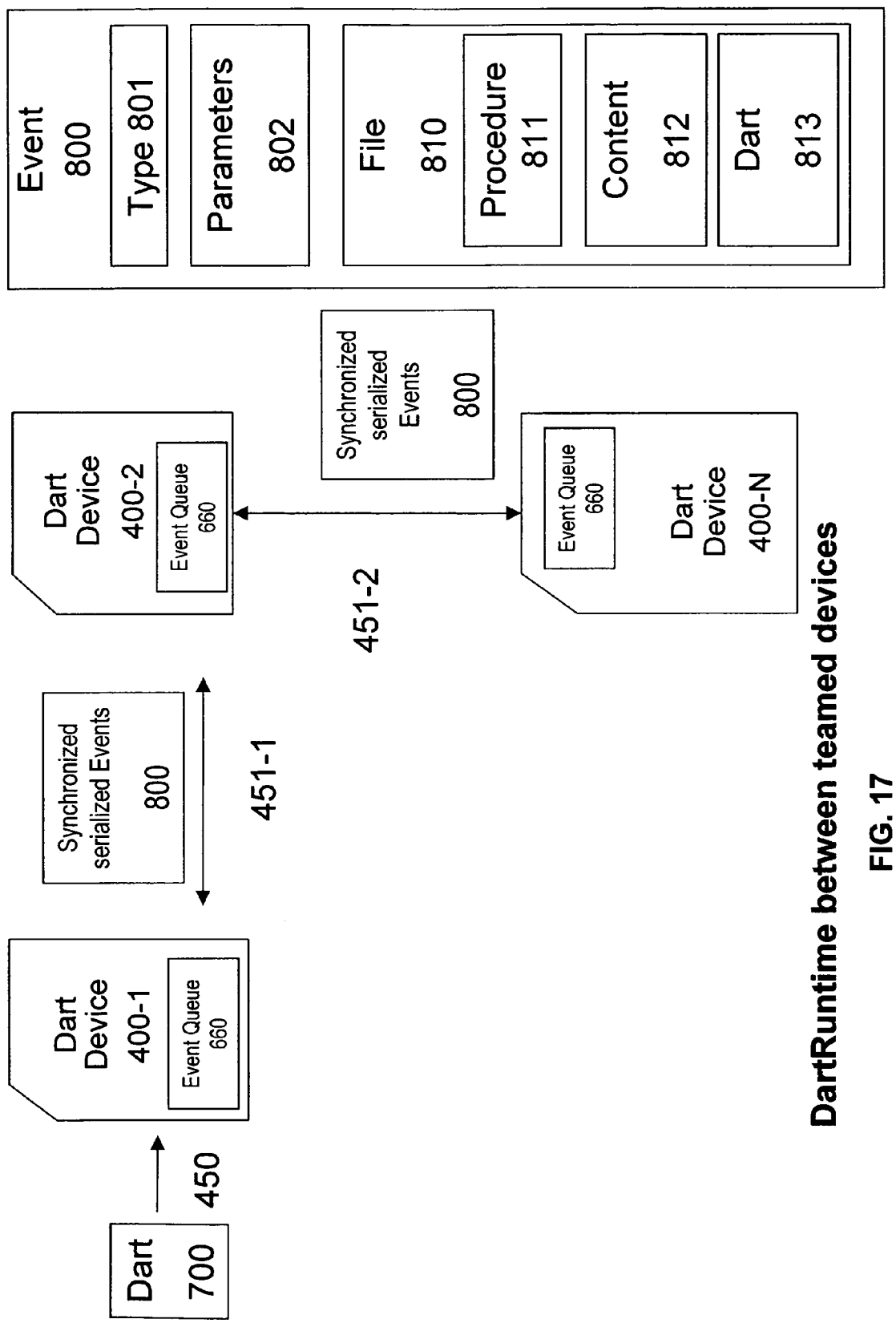
FIG. 17 is an illustration showing a block diagram illustrating the connections between DartDevices used by an embodiment of a Dart application which starts on one DartDevice and then extends itself using Recruitment to run across other DartDevices which then exchange messages in the form of the Event data structure shown to coordinate their activities.

With reference to FIG. 17, Events 800 may be data structure instances with the fields shown in 800 FIG. 17, including in this embodiment, an event type 801, event parameters 802, and an event related file 810 that may include procedure 811, content, 812, and/or Dart 813. These Events 800 may provide input, communicate data and semantics, and carry out synchronization functions as they flow through a runtime, such as through a DartRuntime 8000 (See FIG. 15), Gizmo hierarchy 10000 (See FIG. 18), or between DartDevices 400 along the lines labeled 451-x (See FIG. 17).

Events 800 may carry references to files 810 for any kind, kinds, or amount of data. References may preferably be made to open files. Typically the files contain one or more of Dart-Procedures to be run on another DartDevice, complete Darts to extend the reach of a Dart application across another Dart Device, a Dart containing a control panel to another Device, or general enumeration or input information that does not otherwise fit in the other parameters of the Event as shown in 800 FIG. 17. These and other Dart types and general enumeration or input information are described in greater detail elsewhere herein. Event processing is further illustrated in the DartRuntime flow charts 8000 illustrated in FIG. 15 and Engine Event Processing builtin function flowcharts 5000 FIG. 16.

A file 810 associated with an Event 800 may consider the file associated with the event to be separate from the event or preferably part of the event itself since in one embodiment of the invention the structural and methodological infrastructure that sends events automatically sends the associated file along with the event. Therefore, in at least one embodiment, before an event is placed in the event recipient's event queue, the file referred to on the sending side has been copied by the communication infrastructure to a file on the recipient side which can be read using a file identifier (e.g. fileId) associated with the copied file image on the recipient device. Common or differentiated file names or file identifiers may be used on the sender and recipient sides. In the case of a run Dart (e.g., RUN_DART type event) or run procedure (e.g., RUN_ PROCEDURE) type event, when the event gets to the head or top of the queue so that it is next in the queue, the engine will cause the DartProcedure or Dart that can now be read using the fileId in the event to execute. There may generally be events that are processed by the Dart engine itself, even where no application is currently running. In one embodiment, driving the Event queue is always either a running Dart or an idle procedure (e.g., a Dart IdleProcedure) built into the engine which keeps calling the engine event processing procedure to keep the communications going. This is essentially a loop that keeps running until there is an event to process. When power management (described elsewhere herein) is applied, various techniques for stopping and then waking up or restarting this loop may be implemented.

It will now therefore be appreciated that the Recruitment model, method, and associated structures performs ad-hoc device, service, and resource discovery to identify needed devices, then sends enabling procedures and information to the devices by using an event data structure, such as Events 800, and intelligently and effectively forms a team of devices, and then further coordinates the team of devices, again using an event data structure Events 800, in an effort to accomplish the original goal of the Dart 700 or application originally running on the source device.

Figure 10:
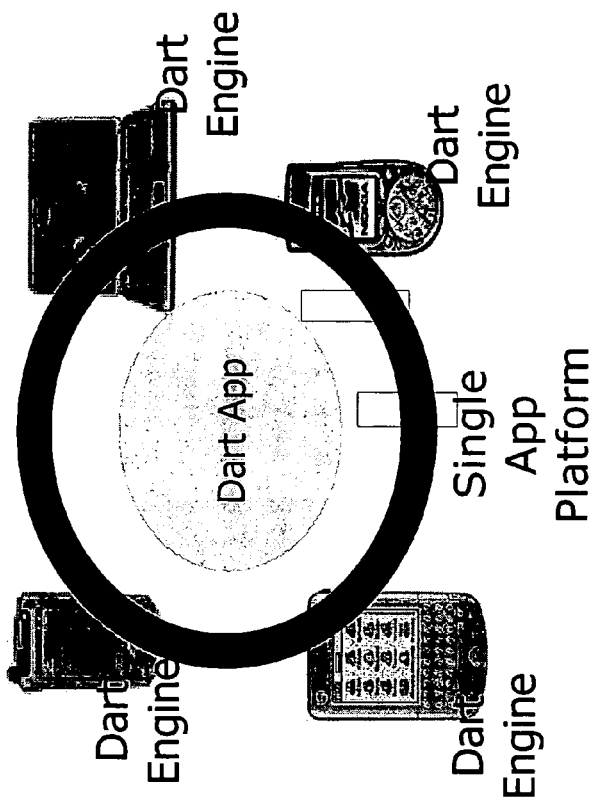
FIG. 10 is an Illustration of how Recruitments makes a group of devices act as one device and limits the effort to achieve interoperability of N devices so that the effort is simply proportional to N.

FIG. 10 Illustrates how recruitment results in making a connected group of devices act as if it were a single device. One of the most profound affects of this is that implementation and testing of new interoperability devices and Dart based applications only requires an effort proportional to the number of devices, N. Conventional static and procedural approaches where there is a need to separately implement and distribute components to all devices which need to interoperate require an effort that grows at a rate proportional to N squared.

Other aspects of recruitment and the recruitment interoperability model, including the serializaiton and synchronization of events between the recruited devices are described elsewhere in this specification including in the examples. Some particular exemplary embodiments of the recruitment interoperability model are also set forth below.

In one embodiment (1), the invention provides a method for a software application running on a source device to recruit a team of devices, the method comprising: sending an inspection procedure operative to find a device having a needed resource or capability to at least one reachable device different from the initiating source device over at least one communication link, the inspection procedure including inspection procedure instructions coded in an executable form common to both the initiating source device and to the device the inspection procedure is intended to reach; receiving on the initiating device the return response from each of the reachable devices directly or indirectly over a communication link; analyzing, by a procedure executing on the initiating device, the received returns from all responding reachable devices to determine a utilization plan identifying the combination of capabilities and resources of the initiating source device and the responding reachable devices to best carry out the intent of the software application; and distributing, by an application program executing on the initiating device, at least one of executable code, data, content, and/or Dart to at least one of each of the reachable devices identified as having a needed resource or capability according to the identified utilization plan.

In another embodiment (2), the invention provides a method for recruiting a team of devices, the method comprising: receiving on a candidate device and executing an inspection procedure operative to determine if a receiving reachable candidate device has a resource or capability needed by another recruiting device over a communication link, the inspection procedure including inspection procedure instructions coded in an executable form known to both the receiving device and the recruiting device; and identifying the source device for the received inspection procedure and sending a return to the source device status and information about whether the receiving reachable device has access to a resource or capability or set of resources and capabilities identified as being needed by the initiating source device; and receiving in the case where the reachable device is determined by the source device to have resources or capabilities needed to form a team to carry out the intent of a software application at least one of executable code, data, content, and/or Dart from the source, device, recruiting device, or another candidate device.

In another embodiment (3), the invention provides a method for recruiting a team of devices, the method comprising: (a) sending, from an initiating source device, an inspection procedure operative to find a device having a needed resource or capability to at least one reachable device different from the initiating source device over at least one communication link, the inspection procedure including inspection procedure instructions coded in an executable form common to both the initiating source device and to device the inspection procedure is intended to reach; (b) receiving and executing the received inspection procedure on each of the reachable devices to identify if there is at least one resource or capability of the reachable device needed by the initiating source device; (c) sending a return to the initiating source device at least when the reachable device has access to a resource or capability identified as being needed by the initiating source device; (d) receiving the return from each of the reachable devices directly or indirectly over the communication link; (e) analyzing, by an application executing on the initiating device, the received returns from all responding reachable devices to determine a utilization plan identifying the combination of capabilities and resources of the initiating source device and the responding reachable devices to best carry out the intent of the application; and (f) distributing, by an application program executing on the initiating device, at least one of executable code, data, content, and/or Dart to at least one of each of the reachable devices identified as having a needed resource or capability according to the identified utilization plan.

In another embodiment (4), the invention provides the method of (3)), further comprising receiving, by the at least one reachable device, the distributed at least one of executable code, data, content, and/or Dart.

In another embodiment (5), the invention provides the method of (3)), wherein the method further comprises: interoperating with the at least one reachable device to which the at least one of executable code, data, content, and Dart was distributed to carry out at least a portion of the initiating device's application's intent.

In another embodiment (6), the invention provides the method of (3)), wherein the method further comprises: with each reachable device acting as secondary initiating source devices, spreading executable code, data, content, and/or Dart, across the initiating and reachable devices optionally together with the application code, data, content, and or Darts resident on the reachable devices farther recursively to other devices reachable by previously reached and teamed devices as necessary to extend the application as needed or as desired to other reachable devices until all or a predetermined criteria of desired devices and resources or capabilities needed or desired to carry out the intent of the original initiating device application have been reached, effectively forming a larger complete team of devices; and distributing executable code, data, content, and/or Dart from and among the team of initiating and reachable devices according to the needs and desires of the initiating device application to perform the required or desired operations and resource access to carry out the intent of the initiating device's application by executing code and exchanging whatever executable code, data, and content and or Darts are necessary to carry out and/or coordinate the operations that are to performed across the team of devices to carry out the intent of the initiating application.

In another embodiment (7), the invention provides the method of (3)), wherein the initiating source device receives the return directly from an initially reached device that the initiating device sent the recruitment message to or indirectly from another reachable device via one or more intermediary reachable devices in a serial or recursive manner.

In another embodiment (8), the invention provides the method of (3), wherein the return to the initiating source device is also sent when the reachable device does not have access to a resource or capability identified as being needed by the initiating source device.

In another embodiment (9), the invention provides the method of (3), wherein the return to the initiating source device is a simple parameter that identifies that the reachable device has itself or access to (e.g., true or logical "1") or does not have itself or access to (e.g., false or logical "0") the resource or capability identified as being needed by the initiating source device.

In another embodiment (10), the invention provides the method of (3), wherein the return to the initiating source device comprises one of a DartEvent, a part of a Dart, data, content, executable procedures, a Dart, a plurality of darts, and any combination of these.

In another embodiment (11), the invention provides the method of (3), wherein the return to the initiating source device comprises returned data or content identifying the resources and/or capabilities of the particular reachable device to the initiating device over the communication protocols.

In another embodiment (12), the invention provides the method of (3), wherein the inspection procedure includes an instruction to inspect for at least one particular identified resource or capability needed by the initiating source device to carry out the intent of the application task being performed at least in part on the initiating source device.

In another embodiment (13), the invention provides the method of (3), wherein the method is implemented at least in part by a software application encoded as a computer program product recruiting and effectively running an application across a team of devices.

In another embodiment (14), the invention provides the method of (3), wherein the method is effective to couple and subsequently permit control of the operations of the recruiting and recruited devices as if they were one device with the combined resources of all the recruiting and recruited devices.

In another embodiment (15), the invention provides the method of (3), wherein the returns comprises any one of: no return, a data or content return, any digitally encoded information, one or more procedures, an indication that the device will be useful, a returned event, a return event containing any amount of data or sets of data via its file payload, a return procedure, a Dart, a return event that includes text names and descriptions of the device so a human can select from a menu on the initiating device which device(s) to use, an identifier of a specific package of at least one instance of a set of executable code, data and content residing on or capable of being generated on the source device, rendition or set of renditions most suitable to run on the device or a combination of any of these.

In another embodiment (16), the invention provides the method of (3), wherein the at least one resource or capability is selected from the set consisting of: (i) available resources or a particular needed resource; (ii) available capabilities or a particular needed capability; (iii) one or more interrelated sets of resources and capabilities of the reachable device, or those resources and/or capabilities available to the reachable device for carrying out the intent of the application; and (iv) any combination of these.

In another embodiment (17), the invention provides the method of (3), wherein the resources or capabilities include at least one of an identified capability selected from the set of resources or capabilities consisting of: an identified data manipulation software, an identified information processing software, an identified computational software, an identified picture processing software, an identified communications software, an identified communications hardware, an identified media, an identified data set(s), an identified content, an identified program or programs, an identified configuration information, an identified graphics acceleration hardware or software, an identified storage medium whether temporary or not temporary (permanent), an identified printing capability, an identified faxing capability, an identified scanning capability, an identified user interface device whether input or output or both input and output, an access to the resources of other devices with which the device can communicate and with which the other devices can communicate in an unending chain, and any combination of two or more of these.

In another embodiment (18), the invention provides a method as in (3), wherein the inspection procedures in a common executable form comprises at least one inspection procedure formed from a Dart compliant instruction set (DartInstructionSet) as embodied in a Dart instruction compatible engine (DartEngine) or any other Interoperability Instruction Set.

In another embodiment (19), the invention provides a method as in (3), wherein the at least one communications link comprises any number of communications links, channels, and/or protocols that comprise any number or set of homogeneous or heterogeneous communications protocols whether wired or wireless, and whether permanently available or intermittent.

In another embodiment (20), the invention provides a method as in (3), wherein the heterogeneous and homogeneous communications links, channels, and protocols are supported by an identified hardware abstraction layer implementations that are parts of players running on any two or more communicating devices.

In another embodiment (21), the invention provides a method as in (20), wherein the identified hardware abstraction layer implementations comprises a Dart Hardware Abstraction Layer implementation that are components of the DartEngine.

In another embodiment (22), the invention provides the method in (3), wherein the at least one communications link and a communications protocol are used to send events of a run procedure type, and an event identifier of the event references a file identifying the procedure to run on the reachable device.

In another embodiment (23), the invention provides the method in (22), wherein the events comprise DartEvents, and the run procedure type event comprises a Dart RUN_PROCEDURE type event.

In another embodiment (24), the invention provides the method in (3), wherein the event identifier that references a file identifying the procedure to run on the reachable device comprises a file identifier of the event referring to a file containing an image of the procedure to run on the reachable device.

In another embodiment (25), the invention provides the method in (24), wherein the file comprises a Dart compliant file (DartFile) conforming to the DartFormat, and the image of the procedure comprises a binary data image of a Dart Procedure (DartProcedure).

In another embodiment (26), the invention provides the method in (3), wherein the inspection procedures comprise either DartProcedures or complete Darts.

In another embodiment (27), the invention provides the method in (3), wherein the inspection procedures are sent as the file associated with an event, and the receipt of the inspection procedure by a reachable device as the file associated with the event causes the inspection procedure to start executing on the reachable devices.

In another embodiment (28), the invention provides the method in (3), wherein the inspection procedure comprises a DartProcedure.

In another embodiment (29), the invention provides the method in (3), wherein resources and capabilities including base resources and capabilities of the reachable device are determined through use of an instruction set profile instruction.

In another embodiment (30), the invention provides the method in (29), wherein the instruction set profile instruction comprises a Dart compliant profile instruction (DartProfileInstruction) of a Dart compliant instruction set (DartInstructionSet).

In another embodiment (31), the invention provides the method in (3), wherein the inspection procedure execution within each reachable device determines a best rendition of the initiating Dart-embodied application according to a rendition determination rule to be sent to the or each particular reachable device and sends back an identifier of the determined best Rendition as part of the returned data.

In another embodiment (32), the invention provides the method in (31), wherein the Rendition determination rule is embodied in as at least one procedures which is adapted to perform any needed computations of any complexity and access any needed profile information through a profile instruction to determine the resources, capability, and/or state of the reachable device.

In another embodiment (33), the invention provides the method in (31), wherein the inspection procedure execution determines the best Rendition from a plurality of renditions by reference to rules that define an order of Rendition, and checking each reachable device to determine if all the requirements of each of the plurality of Renditions are met in a predefined order of Rendition preferences until the first Rendition in the ordered plurality of renditions is found that meets all of the Rendition's requirements.

In another embodiment (34), the invention provides the method in (3), wherein the inspection procedure(s) return Darts, procedures, data, or content to the initiating device over the communication link using an understood communications protocol.

In another embodiment (35), the invention provides the method in (3), wherein the returns include at least one of returned procedures, data, or content and any one or combination of: complete Darts, DartParts, DartProcedures, or DartEvents, and the one or any combination may be returned with or without an associated event file.

In another embodiment (36), the invention provides the method in (3), wherein the return includes at least one of returned procedures, data, content, and/or Dart and further optionally includes a return code indicating an error has occurred, the error code identify either that a specific error has occurred or that a non-specific error has occurred, and the error code optionally including information useful in correcting or communicating the particular error and/or the nature of the error.

In another embodiment (37), the invention provides the method of (3), wherein the application code is at least one of a Dart, a DartProcedure, or any program of any form that can be executed on the initiating device or on devices which the initiating device has access to for initiating transfer or execution of a program and making use of the results of the execution.

In another embodiment (38), the invention provides the method of (3), wherein the application code comprises a Dart, a DartProcedure, or another procedural format that can execute on or otherwise convey information to the reachable device(s) whether or not the procedural format makes use of the DartInstructionSet, to be executed on the reachable device.

In another embodiment (39), the invention provides the method of (3), wherein the recruited team of devices may dynamically extend the team to include other reachable devices or reduce the team of devices to exclude reachable devices as desired during the lifetime or defined period of time for execution of the application.

In another embodiment (40), the invention provides the method of (3), wherein the distributing is accomplished through the sending of at least one of Darts, DartProcedures, data, content, or other information, or any combination of these, that are encapsulated as part of dart events (DartEvents) whether or not the information referenced by a field in the event is sent along or as part of the event.

In another embodiment (41), the invention provides the method of (3), wherein the code, data, and content that have been distributed from and among the team of devices according to the needs of the initiating application, perform the required operations and resource access to carry out the intent of the originating application by executing code and optionally exchanging whatever additional or different code, data, and content that is necessary to carry out or coordinate the operations that are to be performed across the team of devices to further carry out the intent of the initiating application.

In another embodiment (42), the invention provides the method of (3 wherein the application is embodied in a single binary image which contains all the code that is distributed to all the devices as part of the recruitment process.

In another embodiment (43), the invention provides the method of (3), wherein the method further comprises synchronization, serialization, and coordination of activates on the team of devices, and the synchronization, serialization and coordination is accomplished wholly or in part by the passing or exchanging of events or DartEvents alone or optionally with a file associated with DartEvents or events.

In another embodiment (44), the invention provides the method of (43), wherein the events reference at least one file so that they effectively contain and incorporate by that reference a file or files having file images of any complexity by virtue of that reference, and these file images are communicated along with the event structure contents.

In another embodiment (45), the invention provides the method of (3)), further comprises the passing or exchanging of DartEvents events between interoperating and communicating initiating and recruited devices alone or optionally with a file associated with DartEvents or events, and the events effectively contain files or other data or data structures of any complexity, by a file identifier (field) reference in the DartEvent structure, and that file images when referenced are always communicated along with the event structure contents.

In another embodiment (46), the invention provides the method of (43), wherein the DartEvents or events are automatically copied and/or synchronized across event queues of any number of teamed devices by the DartFramework, DartRuntime, and/or DartEngine, or alternatively by a non-DartPlatform specific event driven implementation, so that DartEvents or events which are identified for automatic synchronization and which are placed on an event queue by a Dart appear in the event queues of any number of teamed devices in an automatically serialized and synchronized manner.

In another embodiment (47), the invention provides the method of (46), wherein the automatic serialization and synchronization are accomplished by a procedure for automatic serialization and synchronization of event driven cooperative applications, functions or renditions running across a plurality of cooperating devices including an initiating device, the method comprising: instantiating a connection manager object instance on the originating device by an application for each inter-device cooperative function desired; communicating a list of event types to be synchronized over all cooperating devices procedurally by the application to the connection manager; establishing a team of cooperating devices having one connection manager on each device and sharing the same list of synchronization event types; and maintaining, by the connection manager, a sessions list identifying teamed devices and event types to be synchronized; and examining, by the connection manager, all events to be put in the event queue, and if a particular event examined is an event type the connection manager knows from the sessions list should be synchronized, then marking the event as an event to be synchronized with the other sessions and placing the event in the event queues of the devices listed in the connection manager.

In another embodiment (48), the invention provides the method of (47), wherein all events to be placed on cooperating device event queues by the any one of the event driven cooperative applications functions or renditions are serialized by not allowing an event to be placed on the any one device's event queue until it receives acknowledgement that all cooperating device event queues to which the event has been sent directly by the any one device has successfully been placed on the cooperating devices' event queues.

In another embodiment (49), the invention provides the method of (48), wherein all events to be placed on cooperating device event queues received by any one of the event driven cooperative applications functions or renditions are serialized by not allowing an event to be placed on the receiving any one device's event queue until it receives acknowledgement that all cooperating device event queues to which the event has been sent by the any receiving one device has successfully been placed on the cooperating devices' event queues.

In another embodiment (50), the invention provides the method of (48), wherein any number of cooperating devices' event queues whether the devices are communicating directly or indirectly through a chain of directly communicating devices establishes a single serialized system of queued events across all cooperating devices.

In another embodiment (51), the invention provides the method of (49), wherein any number of cooperating devices' event queues whether the devices are communicating directly or indirectly through a chain of directly communicating devices establishes a single serialized system of queued events across all cooperating devices.

In another embodiment (52), the invention provides the method of (47), wherein events to be placed on the cooperating devices' queues from two or more cooperating devices are synchronized into a single serialization of events in the cooperative devices' queues by a system where only one master device is allowed to place the events of the types in the list of event types to be synchronized so that all such events will be serialized across all cooperating devices.

In another embodiment (53), the invention provides the method of (52), wherein the master device is informed of the events to issue on behalf of other cooperating devices by way of a master request event type event which contains all the information needed for the master device to place the intended event into the queues of all cooperating devices.

In another embodiment (54), the invention provides the method of (52), wherein each device which has been recruited into the team of cooperating devices by another into the set of cooperating devices considers its relative master device to be the device that recruited it.

In another embodiment (55), the invention provides the method of (53), wherein each device which has been recruited into the team of cooperating devices by another into the set of cooperating devices considers its relative master device to be the device that recruited it.

In another embodiment (56), the invention provides the method of (54), wherein the placing of a master request event type event into a relative master device's queue will cause the event to be propagated from device to relative master device until an initiating master device which has no relative master then forms an event using the information needed for the master device to place the intended event into the queues of all cooperating devices.

In another embodiment (57), the invention provides the method of (52), wherein the designated master device can be changed by issuing to the synchronized and/or serialized queues of cooperating devices a change master type event which is itself on the list of serialized events which informs all devices in a synchronized serialized manner that a new master device is to replace the current master device.

In another embodiment (58), the invention provides the method of (54), where the master request event propagates thorough the queues of cooperating devices until the new master device processes the event.

In another embodiment (59), the invention provides the method of (55), where the master request event propagates thorough the queues of cooperating devices until the new master device processes the event.

In another embodiment (60), the invention provides the method of (53), where the optional file identified as part of the event specified to be sent by the master request event type event, if such a file reference is present, is maintained on each propagating device with an identifier that will allow it to be re-associated with the event to be sent by the master as if it had been sent as part of the event sent by the master, this in order to reduce the amount of information that would might otherwise have to be send as part of each event sent as the result of a master request event type processed by the master.

In another embodiment (61), the invention provides an initiating apparatus comprising: a processor coupled with a memory and adapted to execute a procedure that includes instructions for performance of an intended task; means for executing at least partially in the processor and memory for recruiting at least one recruited device different from and external to the apparatus to participate in the performance of the intended task, the recruited device including at least the hardware resources necessary for a version of performance of the intended task; and means stored entirely within the apparatus for supplementing the resources of the recruited device so that the hardware resources plus the enabling supplemented resources make the recruited device fully enabled to perform the intended task.

In another embodiment (62), the invention provides an initiating apparatus as in (61), wherein the apparatus and the recruited device each operate in a common procedural environment, and the means executing at least partially in the processor and memory for recruiting includes means for broadcasting a procedure implemented in the common procedural environment over at least one connection to other devices which also include or operate in the common procedural environment.

In another embodiment (63), the invention provides an initiating apparatus as in (62), wherein the means for recruiting further includes means for initiating the execution of the procedure on the other devices to programmatically inspect the resources and capabilities of each of the other devices in order to determine if each device has a needed resource or capability to participate in a performance of the particular task.

In another embodiment (64), the invention provides an initiating apparatus as in (63), wherein the inspection is performed in each particular other device at least in part by accessing a device specific hardware abstraction layer information stored in or computed about the particular device.

In another embodiment (65), the invention provides an initiating apparatus as in (64), wherein the means for supplementing further includes means for sending and installing enabling procedures, data, and/or content that are required to enable each device to carry out its part of the particular task.

In another embodiment (66), the invention provides an initiating apparatus as in (61)), further including means for temporally or permanently synchronizing operations across the initiating and other devices, the means for synchronizing including a task event queue and means for maintaining the task event queue.

In another embodiment (67), the invention provides a recruited apparatus comprising: a set of hardware resources including a processor and a memory coupled to the processor, and computer program code resources adapted to the performance of a set of tasks, the hardware resources being capable or performing at least a version of a performance of a particular task but the computer program code resources not initially capable of performance of a desired version or method for carrying out of the particular task or aspect of the particular task and means for receiving a communication including at least one of a computer program code communication and a data communication, the computer program code communication including supplemental computer program code resources that render the apparatus capable of performance of the desired version, method or aspect of the particular task.

In another embodiment (68), the invention provides a recruited apparatus as in (67), wherein the recruited apparatus and the initiating device each operate in a common procedural environment.

In another embodiment (69), the invention provides a recruited apparatus as in (68), further including means for execution of the procedure received from the initiating device to programmatically inspect the resources and capabilities of the recruited device in order to determine if the recruited device has a needed resource or capability to participate in a performance of the particular task.

In another embodiment (70), the invention provides a recruited apparatus as in (69), wherein the inspection is performed in the recruited device at least in part by accessing a device specific hardware abstraction layer information stored in or computed about the recruited device.

In another embodiment (71), the invention provides a recruited apparatus as in (70), further comprising means for installing enabling procedures, data, and/or content that are required to enable the recruited device to carry out its part of the particular task.

In another embodiment (72), the invention provides a recruited apparatus as in (61), further including means for temporally synchronizing operations across the initiating device and the recruited device, the means for synchronizing including a task event queue and means for maintaining the task event queue.

In another embodiment (73), the invention provides a method for forming an integrated ad-hoc on-the-fly distributed information processing system among a plurality of heterogeneous devices to participate in the performance of a particular task, the method comprising: initiating formation of the distributed information processing system by an initiating device, the formation including broadcasting a message using at least one communication channel and protocol with the intention to identify and recruit other recruited devices that may possess a resource or capability to participate in the performance of the particular task; and communicating at least one of procedures, data, and content as required to each of the recruited devices so that each of the recruited devices are made capable of carrying-out its part of the particular task.

In another embodiment (74), the invention provides a method as in (73), further comprising: executing at least partially in a processor and memory of the initiating device a procedure for recruiting at least one recruited device different from and external to the initiating device to participate in the performance of the intended task, the recruited device including at least the hardware resources necessary for a version of performance of the intended task; and storing entirely within the initiating apparatus a procedure and optional data for supplementing the resources of the recruited device so that the hardware resources plus the enabling supplemented resources make the recruited device fully enabled to perform the intended task.

In another embodiment (75), the invention provides a method as in (74), wherein the initiating device and the recruited device each operate in a common procedural environment, and the procedure executing at least partially in the processor and memory for recruiting includes broadcasting a procedure implemented in the common procedural environment over at least one connection to other devices which also include or operate in the common procedural environment.

In another embodiment (76), the invention provides a method as in (75), wherein the recruiting further includes initiating the execution of the procedure on the other devices to programmatically inspect the resources and capabilities of each of the other devices in order to determine if each device has a needed resource or capability to participate in a performance of the particular task.

In another embodiment (77), the invention provides a method as in (76), wherein the inspection is performed in each particular other recruited device at least in part by accessing a device specific hardware abstraction layer information stored in or computed about the particular device.

In another embodiment (78), the invention provides a method as in (77), wherein the supplementing further includes sending and installing enabling procedures, data, and/or content that are required to enable each device to carry out its part of the particular task.

In another embodiment (79), the invention provides a method as in (77, further including temporally synchronizing operations across the initiating and other recruited devices, the synchronizing including generating and maintaining a task event queue.

In another embodiment (80), the invention provides a method as in (73), wherein the communication is a communication and interaction that is neither in a client-server communication interaction nor in a peer-to-peer communication interaction.

In another embodiment (81), the invention provides a method as in (73), wherein the recruitment performs ad hoc device, service, and resource discovery to identify needed devices, then sends enabling procedures and information to the devices using events; intelligently and effectively forms a team of devices, and then coordinates the team of devices using events, in order to accomplish the goal of the Dart or application or task originally running on the source initiating device.

In another embodiment (82), the invention provides a method as in (73), wherein the distributed information processing system includes access and coordinated use of some or all of the physical capabilities of the devices.

In another embodiment (83), the invention provides a method as in (82), wherein the physical capabilities of the device are selected from the set that optionally includes an ability to print, fax, display, render music, render video, control other devices, store data whether digital or analog on any media, manufacture goods, provide elimination, take pictures, or any other physical capabilities which can be accessed, monitored or controlled by the processing capabilities of the devices.

In another embodiment (84), the invention provides the method of (1), wherein the software application running on more than one device is at least partially performing the interoperability operations on two or more devices with code and or data and or content that were originally part of a single software package on the initiating device so as to enjoy a reliably of interoperability greater than that where independently developed and or independently distributed applications are used to perform the interoperability operations.

In another embodiment (85), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to recruit a team of recruited devices for interoperation, the program module including instructions for: sending an inspection procedure operative to find a device having a needed resource or capability to at least one reachable device different from the initiating source device over at least one communication link, the inspection procedure including inspection procedure instructions coded in an executable form common to both the initiating source device and to the device the inspection procedure is intended to reach; receiving, on the initiating device, the return response from each of the reachable devices directly or indirectly over a communication link; analyzing, by a procedure executing on the initiating device, the received returns from all responding reachable devices to determine a utilization plan identifying the combination of capabilities and resources of the initiating source device and the responding reachable devices to best carry out the intent of the software application; and distributing, by an application program executing on the initiating device, at least one of executable code, data, content, and/or Dart to at least one of each of the reachable devices identified as having a needed resource or capability according to the identified utilization plan.

In another embodiment (86), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to form an integrated ad-hoc on-the-fly distributed information processing system among a plurality of heterogeneous devices to act as a single virtual device and participate in the performance of a particular task, the program module including instructions for: initiating formation of the distributed information processing system by an initiating device, the formation including broadcasting a message using at least one communication channel and protocol with the intention to identify and recruit other recruited devices that may possess a resource or capability to participate in the performance of the particular task; and communicating at least one of procedures, data, and content as required to each of the recruited devices so that each of the recruited devices are made capable of carrying-out its part of the particular task.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

III. Renditioning Adaptation And Interoperability Segmentation Model

In another aspect of the invention, system, apparatus, method and computer program for Renditioning are provided. Renditioning includes a methodology for segmenting interoperability applications into a set of discrete execution units, exactly one of which is to be selected to run on a given device or player for a given circumstance and point in time.

Figure 11:
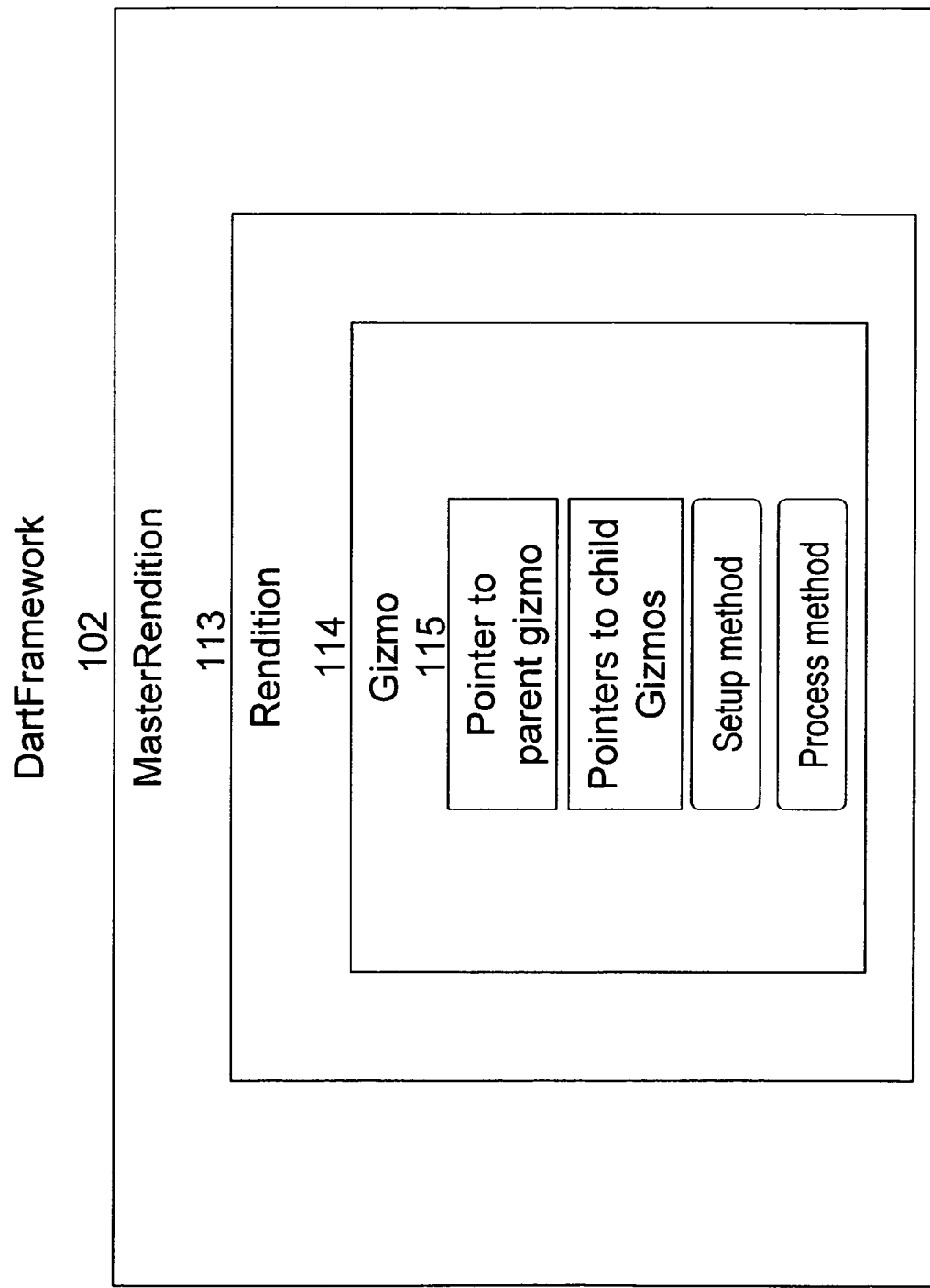
FIG. 11 is an illustration showing a block diagram of an embodiment of the main DartFramework objects and their relative position in the class hierarchy.

In one particularly advantageous embodiment and implementation, the Dart application framework (DartFramework) includes Rendition objects that serve as the top of the hierarchy of processing units called Gizmos (see FIG. 11). For purposes of attempting to understand what a Rendition is, a single Rendition may be thought of as complete conventional program—though it is not the same as a conventional program in that it may be one of a plurality of Renditions generated and packaged together with interrelated functionality and content which is necessary to carry out interoperability operations. Often no one Rendition from the set could effectively or efficiently carry out the intent of the application or package of Renditions on its own. An interoperability application, such as a Dart, is an integrated collection of program parts, possibly including procedures, data, content and/or resources which know how to put together the parts to form and manage dynamically and statically assembled programs, or Renditions, from the parts (see FIG. 3 300, FIG. 13, FIG. 14). Furthermore, an interoperability application or Dart contains the means for intelligently distributing possibly different Renditions or set of Renditions, one set for each device in a team of devices, which can then communicate and cooperate as a team with other Renditions of other devices of the team to effectively and efficiently carry out the intent of the application.

The benefits of Renditioning include among others, the sharing of parts between execution units so as to limit the size of an interoperability application. Using conventional programming techniques it would often be necessary to package a set of applications so that there is one that is suitable for each target device or environment. Without Renditioning, this would often result in the need to store redundant procedures, data content and resources in each of the programs in the package. Another advantage of Renditioning is that there can be selection procedures (see FIG. 14 4000) associated with each Rendition to be used in the Recruitment model to intelligently select the correct Rendition to run on a target device or environment. Still another advantage of Renditioning is that it can limit the number of adaptations possible to a small enough set that thorough testing of the interoperability application is possible, while allowing for a large enough set for there to be at least one Rendition suitable to run well on any one device or environment.

Renditions can also be used to allow the Dart tools (see DartTools FIG. 12 200) to automatically configure the parts into special purpose Darts to be sent to other devices. For example, they may be prepared for printing an image or document. Such Renditions or sets of Renditions may be created statically by the DartTools, or dynamically through the Creationism methodology (FIG. 7 20020) described elsewhere in this document which uses an interoperability instruction set, such as the DartInstructionSet, or by a combination or the two possibly in conjunction with other techniques.

Another use of Renditions is for creating a set of language or cultural versions to be selected according to the users' needs or desires. For example, different Renditions having essentially the same information may be created for the French language, Chinese language or the like; and, different renditions may provide for somewhat different information, such as using photographs of Japanese models for a clothing advertisement to a primarily Japanese audience, and photographs of Italian models for the same advertisement to be presented to an Italian or European audience.

Figure 9:
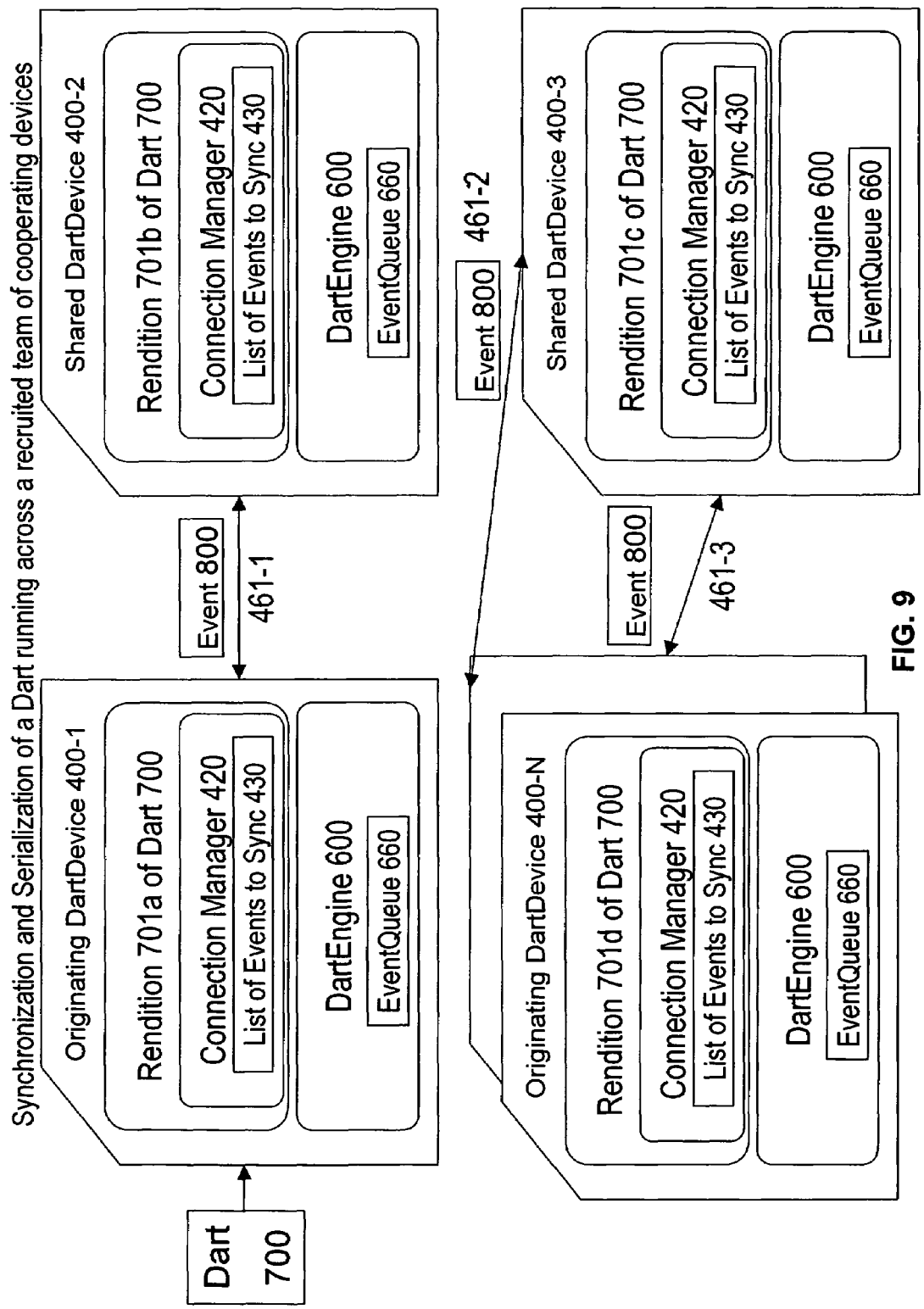
FIG. 9 is an illustration showing embodiments of synchronization and serialization of a Dart application running across a recruited team of cooperating devices.

Still another use of Renditions is to limit the use of content that might be objectionable, or unimportant, or otherwise not appropriate to certain groups, for whatever reason. Yet still another use of Renditions is to target the use of content to certain groups or devices such as children or Texans. Even still another use of Renditions might be to target different localities such as Dart Renditions that contain local weather related information, In one aspect, Renditioning provides a method for intimately packaging parts of a set of software applications and associated data, procedures, content and selection criteria procedures into a single binary image. It also provides a database of parts, their proprieties, their identifiers and their location in the binary image. It further provides a mapping of parts into a plurality of individually executable software applications comprised of procedures, and/or data and/or content. It additionally provides a procedure or set of procedures which when executed determines which one from a set of software applications and associated data, procedures and content in a binary image are to be executed for a given device, user preferences, communications characteristics, and/or environment. It further provides a toolset which allows the automated generation and packaging of parts into a single binary image (or if desired into a plurality of binary or other format images) according to a set of source materials. Aspects of Renditioning also provide a mechanism for finding and accessing the database of parts inside a given binary image. Example use of distributed renditions from within and by a single Dart are illustrated in FIG. 8 and FIG. 9.

Some particular exemplary embodiments of the renditioning adaptation and interoperability segmentation model are also set forth below.

In one embodiment (1), the invention provides a method for segmenting a software application into a set of separately executable images, the method comprising: separating the devices to be encountered into classes according to their possible resources and capabilities for carrying out one or more aspects of the intent of the application; separating the environment or operating requirements likely to be encountered into classes according to the needs for distinct rendering or other runtime requirements for carrying out one or more aspects of the intent of the application; specifying the data, code, content and other digitally representable resources needed for an executable image needed to be able to carry out one or more aspects of the intent of the application on each class of device and each environment or operating requirement; generating a utilization plan for choosing which devices and corresponding individually assigned executable images are to be run on each device to be used to carry out the intent of the application given a list of candidate devices, their resources and capabilities, and the required or desired environment or operating parameters; and specifying the data, code, content and other digitally representable resources needed to implement and carry out the utilization plan on each class of device and each environment or operating requirement.

In another embodiment (2), the invention provides a method as in (1), wherein the software application is intended to run across one or more homogeneous or heterogeneous communicating devices.

In another embodiment (3), the invention provides a method as in (1), wherein exactly one such selected executable image is to be selected to run on a given device with a particular environment.

In another embodiment (4) the invention provides a method as in (3), wherein the exactly one such executable image is to be selected and run on each device in accordance with the needs of the application with respect to the resources and capabilities of each device and the environment and operating requirements.

In another embodiment (5), the invention provides a method as in (3), wherein at least one of the devices is a Dart device.

In another embodiment (6), the invention provides a method as in (1), further comprising executing the generated utilization plan.

In another embodiment (7), the invention provides a method as in (1), wherein the software application expressed as a Dart.

In another embodiment (8), the invention provides a method as in (1), wherein the separately executing images are renditions.

In another embodiment (9) the invention provides a method as in (7), wherein the renditions are expressed in the form of Dart Renditions packaged by the DartTools in conformance with the DartFormat.

In another embodiment (10), the invention provides a method as in (2), wherein the utilization plan of (1) is implemented in whole or part as procedures sent to run on the candidate devices to determine the particular class of device, its resources and/or its operating environment.

In another embodiment (11), the invention provides a method as in (10), wherein the procedures are DartProcedures comprised at least in part as instructions of an Interoperability Instruction Set.

In another embodiment (12), the invention provides a method as in (11), wherein the Interoperability Instruction Set is the DartInstructionSet.

In another embodiment (13), the invention provides a method as in (11), wherein the Interoperability Instruction Set is of a form that is executable on one or more homogeneous or heterogeneous communicating devices which are to run procedures.

In another embodiment (14) the invention provides a method as in (13), wherein the communicating devices run procedures to determine the particular class of device, its resources, and/or its operating environment.

In another embodiment (15), the invention provides a method as in (10), wherein the procedures are expressed as Darts which are part of the application.

In another embodiment (16), the invention provides a method as in (15), wherein the application is expressed as a Dart which contains other Darts used to carry out the intent of the application on heterogeneous communicating devices.

In another embodiment (17), the invention provides a method as in (1), wherein the recruitment method of (1) is used to send and distribute the procedures and separate executable images to form teams of heterogeneous or homogeneous devices.

In another embodiment (18), the invention provides a method as in (1), wherein parts are sharable between different separately executing images in different target devices and processing environments so that the size of an interoperability application may be limited.

In another embodiment (19), the invention provides a method as in (1), wherein parts are sharable between separately executing images so that the amount of data to be stored in the software may be limited.

In another embodiment (20), the invention provides a method as in (1), wherein parts are sharable between separately executing images so that the amount of data to be communicated between devices may be limited.

In another embodiment (21), the invention provides a method as in (18), wherein parts are one of code, data, content, procedures, code sets, data sets, content, content sets, meta information on how to find and combine the parts, descriptive text, pictures, video, images, tables of data, or any other unit of information or set of information capable of being represented in a digital form.

In another embodiment (21), the invention provides a method as in (21), wherein parts are DartParts and or meta information is expressed as Dart RenditionsTable part, and or Dart RenditionTable parts, and or Dart Part Table, and or DartTrailer.

In another embodiment (22), the invention provides a method for segmenting a software application into a set of separately executable images, the method comprising: separating the devices to be encountered into classes according to their possible resources and capabilities; separating the environment or operating requirements likely to be encountered into classes; specifying the data, code, content and/or other digitally representable resources needed for an executable image to be able to carry out one or more aspects of the intent of the application on each class of device and each environment or operating requirement; and generating a utilization plan for choosing which devices and executable images are to be run on each device to be used to carry out the intent of the application.

In another embodiment (23), the invention provides an apparatus for segmenting a software application into a set of separately executable images, the apparatus comprising: means for separating the devices to be encountered into classes according to their possible resources and capabilities for carrying out one or more aspects of the intent of the application; means for separating the environment or operating requirements likely to be encountered into classes according to the needs for distinct rendering or other runtime requirements for carrying out one or more aspects of the intent of the application; means for specifying the data, code, content and other digitally representable resources needed for an executable image needed to be able to carry out one or more aspects of the intent of the application on each class of device and each environment or operating requirement; means for generating a utilization plan for choosing which devices and corresponding individually assigned executable images are to be run on each device to be used to carry out the intent of the application given a list of candidate devices, their resources and capabilities, and the required or desired environment or operating parameters; and means for specifying the data, code, content and other digitally representable resources needed to implement and carry out the utilization plan on each class of device and each environment or operating requirement.

In another embodiment (24), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to segment a computer program software code application into a set of separately executable computer program software code images, the program module including instructions for: separating the devices to be encountered into classes according to their possible resources and capabilities; separating the environment or operating requirements likely to be encountered into classes; specifying the data, code, content, and/or other digitally representable resources needed for an executable image to be able to carry out one or more aspects of the intent of the application on each class of device and each environment or operating requirement; and generating a utilization plan for choosing which devices and executable images are to be run on each device to be used to carry out the intent of the application.

In another embodiment (25), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to segment a computer program software code application into a set of separately executable computer program software code images, the program module including instructions for: separating the devices to be encountered into classes according to their possible resources and capabilities for carrying out one or more aspects of the intent of the application; separating the environment or operating requirements likely to be encountered into classes according to the needs for distinct rendering or other runtime requirements for carrying out one or more aspects of the intent of the application; specifying the data, code, content and other digitally representable resources needed for an executable image needed to be able to carry out one or more aspects of the intent of the application on each class of device and each environment or operating requirement; generating a utilization plan for choosing which devices and corresponding individually assigned executable images are to be run on each device to be used to carry out the intent of the application given a list of candidate devices, their resources and capabilities, and the required or desired environment or operating parameters; and specifying the data, code, content and other digitally representable resources needed to implement and carry out the utilization plan on each class of device and each environment or operating requirement.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

IV. DartSource/Interoperability Source

Recall that the DartSource provides structure and method for specifying all the program renditions and the code content and data needed for a packaged Dart interoperability application. DartSource extends the languages constructs commonly used to specify single executable program targeted to a specific device, into a language which can also specify the procedures necessary for intelligent recruitment of teams of devices and the renditions needed so that there is a suitable rendition to send to run on each recruited device to carry out that device's portion of the intended purpose of the application being specified.

In one embodiment (1), the invention provides a method for specifying a software application package of digitally encoded data, code and content, along with meta information in the form of data, code and content needed to carry out an intended purpose (intent) on one or more connected or intermittently connected devices; the method comprising expressing in an interoperability software programming language one or more or any combination of the following: (a) an object oriented framework and or library; (b) source code for expressing the main code and data used to carry out the logic of the application, whether to be expressed as one executable image or an integrated set of executable images; (c) digitally expressible resources; and (d) system calls or instruction invocations necessary for connecting the logic of the application to the native underlying hardware and software of the device(s).

In another embodiment (2), the invention provides the method of (1), where the system calls or instructions are used to connect the logic of the application to one or more of the following native underlying hardware and software of the device: (a) software engine; (b) software operating system; (c) communications subsystem; (d) graphics subsystem; (e) cryptographic subsystem; (f) security subsystem; (g) storage, audio rendering, and or input/output subsystems; (h) native code expressed algorithms or procedures; (i) media compression and or decompression subsystems; (j) data processing or database processing; (j) device specific unique functions and capabilities exposed through application program interfaces; (k) device specific profile information for retrieving information about the resources, content and capabilities of the device; (l) an event queue and associated event queue management subsystem to drive the synchronous and asynchronous operations of the application across devices; (m) user interface, text, audio, video or other transcoding or rendering operations, and or general computation operations, and or general database operations; (n) power management, suspend/resume, and or application level error recovery from intermittent connections through the use of events to drive the sharing and cooperative operations of software, data, content and state within and or between one or more cooperating devices; (o) subsystems to dynamically save, configure, optimize and or send parts, packages of parts, procedures, executable images, or packages of executable images to or from physical storage, or to and from other connected devices; and (p) any combination of these.

In another embodiment (3), the invention provides the method of (1), wherein the framework or library and/or source code includes class definitions and object implementations to carry out, encapsulate, order access to, and/or organize one or more of the native underlying software or hardware accessible which are listed in (a)-(p).

In another embodiment (4), the invention provides the method of (1), wherein the framework or library and/or source code includes class definitions and object implementations to provide a basis for conforming to specific runtime conventions used for event driven execution on or amongst one or more cooperating devices.

In another embodiment (5), the invention provides the method of (1), wherein the framework or library and/or source code includes class definitions and object implementations to ensure synchronous processing of events within an executable, and synchronized operation between devices by serializing the processing of events between parts of the software application distributed and then run on a set of cooperating devices.

In another embodiment (6), the invention provides the method of (1), wherein the framework comprises the DartFramework.

In another embodiment (7), the invention provides the method of (1), wherein source code is expressed at least in part in any one or more of: a version or extension of the C programming language, a version or extension of the C++ programming language, a processor assembly language, an interoperability instruction set, the DartInstructionSet, or any other suitable high-level, mid-level, low-level or machine language.

In another embodiment (8), the invention provides the method of (1), wherein the interoperability software programming language is an extension of an existing program language for expressing a single application executable image with one or more of the following extensions: (i) semantics for specifying resources to be made into parts of the output package; (ii) semantics for specifying independently executable procedures to be made into parts of the output package that is the result of processing the source; (iii) semantics for referencing parts or ids of the parts; (iv) semantics for specifying separately executable image starting points; (v) semantics for referencing the separately executable images to be encapsulated into the output package or packages that is the result of processing of the source; and (vi) any combination of these In another embodiment (9), the invention provides the method of (8), wherein the existing application program language comprises the C or C++ programming language.

In another embodiment (10), the invention provides the method of (9), wherein one or more of the extensions are expressed as #pragma statements.

In another embodiment (11), the invention provides the method of (9), wherein one or more of the extensions are expressed as builtin functions with reserved names known to the software tools that parse and processes the source code expressed in the application program language.

In another embodiment (12), the invention provides the method of (9, wherein the extensions are parsed and processed by the DartTools.

In another embodiment (13), the invention provides the method of (11), wherein the extensions are parsed and processed by the DartTools.

In another embodiment (14), the invention provides the method of (1), wherein the digitally expressible resources are selected from the set of resources consisting of one or more of: (i) a JPEG, PNG, GIF, TIFF, MPEG, or any other picture, video, audio or other media formats resource; (ii) a Darts or any other executable package format resource, whether intended to run on one or a plurality of devices; (iii) a Content resource; (iv) a Code resource; (v) a Dataset resource; (vi) a Database resource; (vii) an Index resource; (viii) any other digitally representable unit or package of information resource; and (ix) any combination of theses resources.

In another embodiment (15), the invention provides the method of (1), wherein the interoperability software application is expressed as a Dart.

In another embodiment (16), the invention provides the method of (2), wherein the software engine is the DartEngine.

In another embodiment (17), the invention provides the method of (2), wherein the system calls or instructions used to connect the logic of the application are from an Interoperability Instruction Set.

In another embodiment (18), the invention provides the method of (17), wherein the Interoperability Instruction Set is the DartInstructionSet.

In another embodiment (19), the invention provides the method of (2), wherein the device specific unique functions and capabilities exposed through application program interfaces are implemented in the hardware abstraction layer of the DartEngine through the use of the OEM_BUILTIN_INSTRUCTION In another embodiment (20), the invention provides the method of (2), wherein the device specific profile information for retrieving information about the resources, content and capabilities of the device are accessed from the hardware abstraction layer of the DartEngine through the use of the PROFILE_INSTRUCTION.

In another embodiment (21), the invention provides the method of (2), wherein the subsystems to dynamically save, configure, optimize and or send parts, packages of parts, procedures, executable images, or packages of executable images to or from physical storage, or to and from other connected devices carry out these operations according to a creationism procedure.

In another embodiment (22), the invention provides the method of (2), wherein the event queue management are carried out according to a Recruitment method.

In another embodiment (23), the invention provides the method of (2), wherein the power management, suspend/resume, and or application level error recovery are carried out using a LinearTasking method and/or a VerticalLayering method.

In another embodiment (24), the invention provides the method of (3), wherein the framework or library and or source code are the DartFramework.

In another embodiment (25), the invention provides the method of (4), wherein specific runtime conventions are the conventions of the DartRuntime method. In another embodiment (26), the invention provides an apparatus for specifying a software application package of digitally encoded data, code and content, along with meta information in the form of data, code and content needed to carry out an intended purpose (intent) on one or more connected or intermittently connected devices; the apparatus comprising: a processor and a memory coupled with the processor; and means accessible to the processor for expressing in an interoperability software programming language one or more or any combination of the following: (a) an object oriented framework and or library; (b) source code for expressing the main code and data used to carry out the logic of the application, whether to be expressed as one executable image or an integrated set of executable images; (c) digitally expressible resources; and (d) system calls or instruction invocations necessary for connecting the logic of the application to the native underlying hardware and software of the device(s).

In another embodiment (27), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to specify an application package of digitally encoded data, code and/or content, optionally along with meta information in the form of data, code and/or content needed or desirable to carry out an intended purpose on one or more connected or intermittently connected devices, the program module including instructions for expressing in an interoperability software programming language one or more or any combination of the following: (a) an object oriented framework and/or library; (b) source code or executable code for expressing the main code and data used to carry out the logic of the application, whether to be expressed as one executable image or an integrated set of executable images; (c) digitally expressible resources; and (d) system calls or instruction invocations necessary for connecting the logic of the application to the native underlying hardware and software of the device(s).

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

V. DartFramework/Interoperability Framework

Recall that the DartFramework is the portion of the DartSource provided for use by programmers in building interoperability applications which encapsulate access to many of the advantageous features of the DartPlatform eliminating the need for the programmer to have to understand and implement many of the desired interoperability features of the DartPlatform. Additional aspects of the Interoperability Framework including aspects of the more particular DartFramework are also described relative to the linear tasking section of this description.

In one embodiment (1), the invention provides a method for specifying an object oriented interoperability framework having a set of object oriented class definitions, and implementation code thereof to be used as part of the source specifications of an event driven software application package, the method comprising: (i) specifying using an object oriented language as a base event processing class that contains at least the following data and code members: (a) a process member that takes as a parameter a reference or copy of an instance of an event data structure; and (b) an ordered list member of references to or instances of other event processing objects which have the same base class; and (ii) implementing the members and methods of the class specification in source code.

In another embodiment (2), the invention provides the method of (1), wherein the software application package is designed and implemented to carry out an intended purpose (intent) on one or more connected or intermittently connected devices.

In another embodiment (3), the invention provides the method of (2), wherein the software application package conforms to the DartFormat.

In another embodiment (4), the invention provides the method of (1), wherein the base class is the Dart Gizmo class.

In another embodiment (5), the invention provides the method of (1), where there is also a rendition class that inherits from the base class which serves as the root of a tree of inheriting instances of the base class where the parameter of the process member is optionally an empty or NULL reference.

In another embodiment (6), the invention provides the method of (5), where the rendition class is used to signify the beginning entry point for execution of a separately executable image that is to be embodied in the output package or packages to be generated from the source code that makes use of the object oriented interoperability framework.

In another embodiment (7), the invention provides the method of (5), where a master rendition class is specified as part of the framework wherein the base class is the Dart Gizmo class which inherits from the rendition class that contains a list of references to or instances of rendition objects.

In another embodiment (8), the invention provides the method of (7), where the execution of a specified method of the master rendition class results in the filling in of its list of renditions that serve as the starting point for independently executable images that are to be included in the output package or output packages that result from the processing of the source code with makes use of the framework.

In another embodiment (9), the invention provides the method of (5), wherein the rendition class is a Dart Rendition class which inherits from the Gizmo base class.

In another embodiment (10), the invention provides the method of (7), wherein the master rendition class is a Dart MasterRendition class which inherits from the Dart Rendition class.

In another embodiment (11), the invention provides the method of (2), wherein there are object oriented class definitions and/or implementation code are for performing one or more of the following functions or operations: (i) rendering, and/or managing and/or editing of any one or more of video, audio, pictures, images, animations, text, symbols, graphics or any other media type, code, content or data representable as a sequence of digital numbers; (ii) intelligently limiting or ordering access to data, resources, and/or code, to one or more of database records, fields of records, sound, video, audio, text from different processing units; (iii) container classes for collecting, ordering, editing, managing and controlling access to object instances or structures; and (iv) user interface elements and the processing thereof including any one or more of the following: menus, buttons, selection boxes, text boxes, radio buttons, checkboxes, dropdown selection boxes, tables, windows or any other user input or device output used to interact with a user or software running on an external processor.

In another embodiment (12), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to specify an object oriented interoperability framework having a set of object oriented class definitions and implementation code thereof to be used as part of the source specifications of an event driven software application package, the program module including instructions for: (i) specifying using an object oriented language as a base event processing class that contains at least the following data and code members: (a) a process member that takes as a parameter a reference or copy of an instance of an event data structure; and (b) an ordered list member of references to or instances of other event processing objects which have the same base class; and (ii) implementing the members and methods of the class specification in source code.

In another embodiment (13), the invention provides a computer program product as in (12, wherein the application package is designed and implemented to carry out an intended purpose (intent) on one or more connected or intermittently connected devices.

In another embodiment (14), the invention provides a computer program product as in (12), wherein there are object oriented class definitions and/or implementation code for performing one or more of the following functions or operations: (i) rendering, and/or managing and/or editing of any one or more of video, audio, pictures, images, animations, text, symbols, graphics or any other media type, code, content or data representable as a sequence of digital numbers; (ii) intelligently limiting or ordering access to data, resources, and/or code, to one or more of database records, fields of records, sound, video, audio, text from different processing units; (ii) container classes for collecting, ordering, editing, managing and controlling access to object instances or structures; and (iv) user interface elements and the processing thereof including any one or more of the following: menus, buttons, selection boxes, text boxes, radio buttons, checkboxes, dropdown selection boxes, tables, windows or any other user input or device output used to interact with a user or software running on an external processor.

In another embodiment (15), the invention provides an apparatus for specifying an object oriented interoperability framework having a set of object oriented class definitions, and implementation code thereof to be used as part of the source specifications of an event driven software application package, the apparatus comprising: a processor logic and a memory coupled with the processor logic; means, accessible by the processor, specifying using an object oriented language as a base event processing class that contains at least the following data and code members: (a) a process member that takes as a parameter a reference or copy of an instance of an event data structure; and (b) an ordered list member of references to or instances of other event processing objects which have the same base class; and means for implementing the members and methods of the class specification in source code.

In another embodiment (16), the invention provides an apparatus as in (15), wherein the means specifying using an object oriented language as a base event processing class comprises a computer program or a computer program product.

In another embodiment (17), the invention provides an apparatus as in (15), wherein the means for implementing the members and methods of the class specification in source code comprises a computer program or a computer program product.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

VI. DartTools/Interoperability Tools

Recall that the DartTools process the DartSource application specification into the Dart application packages.

In one embodiment (1), the invention provides a method for generating an interoperability software application package of digitally encoded information, along with meta information needed to carry out an intended purpose (intent) on one or more connected or intermittently connected devices; the method comprising: processing of source materials through an interoperability compiler process [software product] to create object files; and processing the object files and optional libraries through an interoperability linker process to create libraries or an interoperability software application package.

In another embodiment (2), the invention provides the method of (1), wherein the digitally encoded information comprises digitally encoded data, code and/or content and the meta information comprises meta information in the form of data, code and/or content.

In another embodiment (3), the invention provides the method of (1), wherein the interoperability compiler process is implemented as a compiler computer program software product and the linker process is implemented as a linker computer program software product.

In another embodiment (4), the invention provides the method of (1), wherein the source materials are assembled according to an Interoperability Source method.

In another embodiment (5), the invention provides the method of (4), wherein the Interoperability source method includes a procedure for specifying a software application package of digitally encoded data, code and content, along with meta information in the form of data, code and content needed to carry out an intended purpose (intent) on one or more connected or intermittently connected devices; and the method comprising expressing in an interoperability software programming language one or more or any combination of the following: (a) an object oriented framework and or library; (b) source code for expressing the main code and data used to carry out the logic of the application, whether to be expressed as one executable image or an integrated set of executable images; (c) digitally expressible resources; and (d) system calls or instruction invocations necessary for connecting the logic of the application to the native underlying hardware and software of the device(s).

In another embodiment (6), the invention provides the method of (1), wherein the compiler and linker are combined into a single compiler/linker software tool product.

In another embodiment (7), the invention provides the method of (1), wherein an optional master software application package is optionally further processed into one or more other interoperability software packages.

In another embodiment (8), the invention provides the method of (7), wherein the optional master software application package is optionally processed into other interoperability software packages by the use of an interoperability master player software product.

In another embodiment (9), the invention provides the method of (1), wherein the source materials comprise DartSource source materials.

In another embodiment (10), the invention provides the method of (1), wherein the interoperability software application comprises a Dart conforming to the DartFormat.

In another embodiment (11), the invention provides the method of (10), wherein the Dart conforming to the DartFormat is operable within an object oriented interoperability framework having a set of object oriented class definitions, and implementation code thereof to be used as part of the source specifications of an event driven software application package, the object oriented interoperability framework formed according to a procedure comprising: (i) specifying using an object oriented language as a base event processing class that contains at least the following data and code members: (a) a process member that takes as a parameter a reference or copy of an instance of an event data structure; and (b) an ordered list member of references to or instances of other event processing objects which have the same base class; and (ii) implementing the members and methods of the class specification in source code.

In another embodiment (12), the invention provides the method of (1), wherein the interoperability compiler comprises the DartCompiler.

In another embodiment (13), the invention provides the method of (1), wherein the interoperability linker comprises the DartLinker.

In another embodiment (14), the invention provides the method of (7), wherein the optional master software application comprises a DartMaster.

In another embodiment (15), the invention provides the method of (8), wherein the interoperability master player comprises a Dart MasterPlayer.

In another embodiment (16), the invention provides the method of (1), wherein the source materials include code and data references in a software programming language which has been extended to include one or more or any combination of the following semantics: (1) first semantics for specifying resources to be made into parts of the output package; (2) second semantics for specifying independently executable procedures to be made into parts of the output package that is the result of processing the source; (3) third semantics for referencing parts or ids of the parts of the output packages; (4) fourth semantics for generating the parts or ids of the parts of the output packages for use at runtime by code or data structure instances in the source code; (5) fifth semantics for specifying separately executable image starting points; (6) sixth semantics for referencing the separately executable images to be encapsulated into the output package or packages that is the result of processing of the source; and (7) seventh semantics for specifying the processing needed to direct the compiler and/or the linker and/or the master player software products to include at least one of parts, corresponding part table entries, and other data in the package for identifying pointer variables which are to effectively point to a private memory address space independent from all other such pointers, procedures, main program data, main and program code.

In another embodiment (17), the invention provides the method of (16), wherein the application program language is a version of the C or C++ programming language.

In another embodiment (18), the invention provides the method of (16), wherein one or more of the extensions are expressed as C or C++#pragma statements.

In another embodiment (19), the invention provides the method of (16), wherein one or more of the extensions are expressed as builtin functions with reserved names known to the interoperability compiler that parses and processes the source code expressed in the application program language.

In another embodiment (20), the invention provides the method of (16), wherein the software programming language is the DartInstructionSet or any other programming language which is known to be Turing Complete.

In another embodiment (21), the invention provides the method of (16), where the interoperability compiler and interoperability linker include parsing and processing of program statements conforming to the semantics of one or more of the listed semantics.

In another embodiment (22), the invention provides the method of (16), wherein the resources are selected from the set consisting of one or more or any combination of the following: (i) an external file or any other binary data image accessible by the compiler, linker and/or master player procedures or software products; (ii) a data structure instance specified in the source code; (iii) a procedure or function whether or not the procedure is a DartProcedure specified in the source code; (iv) an executable program, an executable package, or a Dart; and (v) any combination of any number of the above whether stored separately, packaged together, and/or compressed and/or encrypted.

In another embodiment (23), the invention provides the method of (16), wherein the resources are included by reference in a #pragma statement which causes the compiler, linker and/or optional master player procedure or software products to include the resources as parts of the output package.

In another embodiment (24), the invention provides the method of (16), wherein the parts are linear contiguous binary images to be placed into packages or Dart parts assigned and referenced as part of a package by a scalar identifier partId with a value which is unique in the package.

In another embodiment (25), the invention provides the method of (16), wherein a part table is also generated by the compiler, linker, and/or master player as part of the output packages with information used to find the part image inside the package, and to provide parameters or descriptive information relevant to the part.

In another embodiment (26), the invention provides the method of (25), wherein the parameters or descriptive information are one or more or any combination of the following: (i) a scaler or text describing the content type of the part; (ii) an offset into the package where the part starts; (iii) an offset into the package where the part ends, or a length of the part so that the part end can be computed; (iv) a flags or plurality of flags to indicate special processing options for the part according to the content type for the loading, usage and or saving of the package or part; and (v) optionally other content type specific parameters which are specific to the content type.

In another embodiment (27), the invention provides the method of (25), wherein the part table is the Dart Part Table conforming to the DartFormat.

In another embodiment (28), the invention provides the method of (16), wherein the pointer variables are to function as virtual pointers.

In another embodiment (29), the invention provides the method of (16), wherein the pointer variables are Dart VirtualPointers.

In another embodiment (30), the invention provides a method as in (16), wherein the second semantic executable procedures include DartProcedures.

In another embodiment (31), the invention provides a method as in (16), wherein the second semantics take the form conforming generally to the following: #pragma Procedure(<name of function>).

In another embodiment (32), the invention provides a method as in (16), wherein the first semantics take the form conforming generally to one or more of the following: (1) #pragma FileToPart(<file path and name><parameters such as content type, picture size destined for parameters of Part TableRecord>); or (2) #pragma partvariable(<variable or structure name>).

In another embodiment (33), the invention provides a method as in (16), wherein the fourth semantic ids are PartIds used in the Part TableRecords and other sections of the DartFormat.

In another embodiment (34), the invention provides a method as in (16), wherein the third semantics take the form conforming generally to the following: partnumberof(<identifier name>).

In another embodiment (35), the invention provides a method as in (16), wherein the seventh semantics take the form conforming generally to the following: #pragma virtualpointer (<pointer variable identifier><values to control optional automatic saving of values when a Dart SAVE_INSTRUCTION is executed and to control the number of real memory pages to be used>).

In another embodiment (36), the invention provides the method of (1), wherein the interoperability compiler, interoperability linker and interoperability master player are the DartTools.

In another embodiment (37), the invention provides the method of (1), wherein the interoperability software application package comprises a Dart conforming to the DartFormat.

In another embodiment (38), the invention provides the method of (8), where as an option, the source code specifies a single master independently executable image that is output in the package generated by the compiler and/or the linker along with extra parts containing object class, instance, and linkage information used when the package is executed on an optional software tool product or the master player, to intelligently generate one or more packages.

In another embodiment (39), the invention provides the method of (38), wherein a single master independently executable image execution entry point is an entry point to a method of a special derived class from the base event processing class, with the following added features: (i) data elements and/or methods to form, hold and manage a list of special object base class or derived class object instances and/or references to such instances that are to be output in a particular package; and (ii) one or more setup methods which are called when the master is executed.

In another embodiment (40), the invention provides the method of (38), wherein a single master independently executable image execution entry point is an entry point to a method of a special derived class from the base event processing class, the method being for specifying an object oriented interoperability framework having a set of object oriented class definitions, and implementation code thereof to be used as part of the source specifications of an event driven software application package, and the method comprising: (i) specifying using an object oriented language as a base event processing class that contains at least the following data and code members: (a) a process member that takes as a parameter a reference or copy of an instance of an event data structure; and (b) an ordered list member of references to or instances of other event processing objects which have the same base class; and (ii) implementing the members and methods of the class specification in source code; the method further including: (i) providing data elements and/or methods to form, hold and manage a list of special object base class or derived class object instances and/or references to such instances that are to be output in a particular package; and (ii) providing one or more setup methods which are called when the master is executed.

In another embodiment (41) the invention provides the method of (39), wherein the execution of the master results according to the specifications of the source in the forming of the list.

In another embodiment (42), the invention provides the method of (38), wherein the special derived class is a Dart Rendition class.

In another embodiment (43), the invention provides the method of (39), wherein the single master independently executable image is a Dart Rendition inside a Dart.

In another embodiment (44), the invention provides the method of (41), wherein as an option the execution which results in the forming of the list also include configuring, creating, optimizing, adding parts to or otherwise affecting the independently executable images that are referenced by the list.

In another embodiment (45), the invention provides the method of (44), wherein the list is formed and the configuring, creating, optimizing and/or adding parts to or otherwise affecting the generation or makeup of independently executable images is performed using input from or more of the following sources: (i) a human input solicited during the master's execution; (ii) an automated procedure that was specified by the source code; (iii) an information collected from the computing device on which the master is executing by the executing code of the master package; (iv) an information collected from any number of computing devices over any number of communications mediums by the executing code of the master package; and (v) combinations of these.

In another embodiment (46), the invention provides the method of (39), wherein as a step for each package to be produced by executing the master on a master player, the generated list is used to find the starting points for all the independently executable images and the assembly of the package is performed according to a procedure comprising the steps: (i) identifying the execution entry point of one of the derived class object instances and or references on the list; (ii) recursively or interactively tracing all the possible execution paths starting at the execution entry point while keeping track of all the reachable elements; (iii) generating all the code, data, resources, and other digitally representable parts necessary to form a single executable image for placement in a package which includes all the reachable elements that have been tracked; (iv) performing steps (i), (ii) and (iii) for each of the derived class object instances and or references on the list; and (v) generating a package of individually executable images.

In another embodiment (47), the invention provides the method of (39), wherein the generating of a package of individually executable images comprises at least one of the following: a) meta information necessary for locating, loading, and extracting each individual executable image; and b) parts which together contain all the reachable elements that have been tracked for all the separately executable images.

In another embodiment (48), the invention provides the method of (39), wherein the recursively or interactively tracing all the possible execution paths starting at the execution entry point while keeping track of all the reachable elements, includes keeping track of all reachable variables, data structure instances, functions and all the objects that are pointed to or otherwise referenced by the data in or by the methods, variables, data structure instances, functions and objects, and further iteratively or recursively all such elements to which these point to or reference.

In another embodiment (49), the invention provides the method of (46), wherein elements not tracked as being reachable are not generated as meta information or parts or any other representation of the package to reduce the size and or complexity of the package, or the handling or execution of the package or parts of the package.

In another embodiment (50), the invention provides the method of (38), wherein processing of the master by a master player is used for one or more or any combination of the following purposes: (i) as a program generator for dynamic customization of one or a plurality of packages; (ii) to collect real-time information that is to be part of the generated package or packages that was not collected or was not obtainable at the time of compiling and or linking of the master; (iii) as a graphical user interface for interactively selecting, laying out, and/or providing new information needed to generate particular packages; (iv) for creating, and/or viewing, and/or testing, and/or correcting, and/or building various aspects of various independently executable images or sets of independently executable images to be output in one or more packages in an optionally interactive manner with optional visual feedback of the changing characteristics of the package or packages to be output; and (v) for dynamically generating tables, code, content, or other resources, or collections thereof to be used as parts of the generated package or packages.

In another embodiment (51), the invention provides the method of (49), wherein the processing of the master beneficially avoids the need to recompile and or relink or otherwise re-process the source code.

In another embodiment (52), the invention provides the method of (49), wherein the user interface is presented as part of the execution of the master for customizing the package generation.

In another embodiment (53), the invention provides the method of (52), wherein the user interface is presented according to the code, data and/or resources of the master.

In another embodiment (54), the invention provides the method of (48), wherein some subset of the code, data and or resources that are elements of the master for carrying out the purposes are referenced only as the result of execution starting at execution entry points of derived class object instances that are not on the list.

In another embodiment (55), the invention provides the method of (49), wherein some subset of the code, data and or resources that are elements of the master for carrying out the purposes are referenced only as the result of execution starting at execution entry points of derived class object instances that are not on the list.

In another embodiment (56), the invention provides the method of (54), wherein the subset is left out of the generated package.

In another embodiment (57), the invention provides the method of (56), wherein the subset is left out to decrease the size of the package or reduce the complexity of the package.

In another embodiment (58), the invention provides the method of (46), wherein tracking information about reachable elements or sets of elements also includes further information for each such element or set of elements an access list containing on this access list all the entries from which the particular element or set of elements is reachable.

In another embodiment (59), the invention provides a method as in (46), wherein the individual part binary images are sharable between the independently executable images so that the size of an interoperability application may be limited.

In another embodiment (60), the invention provides the method of (59), wherein the further information is used by the master player product to produce a package or packages where parts image instances inside the generated package are shared amongst the separately executable images rather than having to duplicate such part images for each separately executable image in the package which logically contains the part image.

In another embodiment (61), the invention provides the method of (58), wherein one or more procedural elements of the package are compiled/linked and optionally processed by the master player into a form conforming to a Interoperability Instructions Set.

In another embodiment (62), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to generate an interoperability software application package of digitally encoded information, optionally along with meta information needed to carry out an intended purpose on one or more connected or intermittently connected devices, the program module including instructions for: processing of source materials through an interoperability compiler process [software product] to create object files; and processing the object files and optional libraries through an interoperability linker process to create libraries or an interoperability software application package.

In another embodiment (63), the invention provides a computer program product as in (62), wherein the digitally encoded information comprises digitally encoded data, code and/or content and the meta information comprises meta information in the form of data, code and/or content.

In another embodiment (64), the invention provides a computer program product as in (62), wherein the interoperability compiler process is implemented as a compiler computer program software product and the linker process is implemented as a linker computer program software product.

In another embodiment (65), the invention provides a computer program product as in (62), wherein the source materials are assembled according to an Interoperability Source method.

In another embodiment (66), the invention provides a computer program product as in (65), wherein the Interoperability source method includes a procedure for specifying a software application package of digitally encoded data, code and content, along with meta information in the form of data, code and content needed to carry out an intended purpose (intent) on one or more connected or intermittently connected devices; and the method comprising expressing in an interoperability software programming language one or more or any combination of the following: (a) an object oriented framework and or library; (b) source code for expressing the main code and data used to carry out the logic of the application, whether to be expressed as one executable image or an integrated set of executable images; (c) digitally expressible resources; and (d) system calls or instruction invocations necessary for connecting the logic of the application to the native underlying hardware and software of the device(s).

In another embodiment (67), the invention provides an interoperability software products tool set whether packaged separately, dynamically linked together, or packaged into a single executable in any combination comprising: a) an interoperability compiler; b) an interoperability linker; and c) an interoperability master player.

In another embodiment (68), the invention provides the interoperability software products tool set of (67), wherein the interoperability compiler and linker in combination execute a method for generating an interoperability software application package of digitally encoded information, along with meta information needed to carry out an intended purpose (intent) on one or more connected or intermittently connected devices; the method comprising: processing of source materials through an interoperability compiler process to create object files; and processing the object files and optional libraries through an interoperability linker software product to create libraries or an interoperability software application package.

In another embodiment (69), the invention provides the interoperability software products tool set of (67), wherein the master software application package is optionally processed into other interoperability software packages by the use of an interoperability master player software product.

In another embodiment (70), the invention provides the interoperability software products tool set of (67), wherein the software product or products are implemented and or designated and or used as DartTools.

In another embodiment (71), the invention provides the interoperability software products tool set of (67), wherein there is a single selection procedure or set of selection procedures associated with each rendition to be used in a recruitment procedure to intelligently select the most suitable independently executable image, from the available images, to run on a target device and or target device environment.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

VII. DartFormat/Interoperability Format

Recall that the DartFormat comprise the structure and the rules for putting together a Dart format package which encapsulates all the code, data, and content needed for an interoperability applications which can then be loaded and run on DartDevices, which contain a running DartPlayer.

In one embodiment (1), the invention provides a method for storing a software application package conforming to an interoperability format of digitally encoded data, code and content, along with meta information in the form of data, code and content needed to carry out an intended purpose (intent) on one or more connected or intermittently connected devices, the method comprising: forming at least one linearly contiguous binary encoded part image; forming any necessary linearly contiguous part images comprised of combinations of binary encoded resources or program elements that are to be used to identify, load, select, identify, execute or be processed as part of the application package; forming meta information; and packaging the parts and meta information together in a form where part images can be deterministically located and independently executable images identified, loaded, and executed.

In another embodiment (2), the invention provides a method as in (1), wherein the at least one linearly continuous binary encoded part image contains at least one of a main code, a main data, a table of records for each of the independently executable images, and a table of records for each of the parts belonging to a particular independently executable image.

In another embodiment (3), the invention provides a method as in (1), wherein the at least one linearly continuous binary encoded part image contains each of a main code, a main data, a table of records for each of the independently executable images, and a table of records for each of the parts belonging to a particular independently executable image.

In another embodiment (4), the invention provides a method as in (1), wherein the necessary linearly contiguous part images optionally including any number or combination selected from the set consisting of: (a) programs, Darts, DartProcedures, or procedures; (b) pictures, video, image, audio, sound or any other media capable of being rendered; (c) data structure instances, lists, and or parameters; (d) lists of data or tables of data; and (e) any combination of these.

In another embodiment (5), the invention provides a method as in (1), wherein the forming meta information includes forming meta information of at least one of: (a) a table for finding parts given its identifier; (b) a first information used to find the table of parts; (c) a second information needed to load and execute the linearly contiguous part images; and (d) a third information used to find the list of independently executable images.

In another embodiment (6), the invention provides the method of (1), wherein one or more of the following linearly contiguous binary encoded part images are also formed: (i) procedures, Darts, DartProcedures; (ii) content including content selected from the set of content items consisting of pictures, audio, video, or other multimedia content or animations; (iii) databases; (iv) indexes; (v) parameters for list items or table items; (vi) virtual pointer data; (vii) application heap data; and (viii) anything else expressible as a contiguous binary data image.

In another embodiment (7), the invention provides the method of (1), wherein one or more of the following meta information are also formed: (i) signature information; (ii) keywords or other information to be accessed to identify the names, types, content and or uses of the software application package; (iii) parameters for list items or table items; (iv) virtual pointer parameters; (v) security checksums, and or signatures, and or certificates and or hashes; and (vi) unique identifiers.

In another embodiment (8), the invention provides the method of (1), wherein the steps are performed by tools embodied in the interoperability compiler, interoperability linker and or interoperability master player.

In another embodiment (9), the invention provides the method of (1), wherein any one, any combination, or all of the following are true: (i) the format for the storing a software application package is the DartFormat; (ii) the software application package is a Dart; (iii) the parts are DartParts; (iv) the table of independently executable images is a Dart RenditionsTable; (v) the table of records for each of the parts is a Dart RenditionTable; (vi) the table for finding parts given its identifier is a Dart Part Table; and (vii) the Information used to find the table of parts is the DartTrailer and its known size, fields, and location in the DartFormat image.

In another embodiment (10), the invention provides the method of (1), wherein the main code is comprised of instructions from an interoperability instruction set.

In another embodiment (11), the invention provides the method of (1), wherein interoperability instruction set is the Dart Interoperability Instruction set.

In another embodiment (12), the invention provides the method of (2), wherein the main code contains all the code not otherwise explicitly designated in the originating source to go into an independent part.

In another embodiment (13), the invention provides the method of (12), wherein the main code instruction data address fields reference data assigned to one linear data address space in the main data part.

In another embodiment (14), the invention provides the method of (12), wherein the main code instruction branching fields reference other code assigned to one linear address space in the main code part.

In another embodiment (15), the invention provides the method of (2), wherein the main data contains all the data instances not otherwise explicitly designated in the originating source to go into an independent part.

In another embodiment (16), the invention provides the method of (2), wherein the table of independently executable images contains table records with at least the part identifier of a table for finding parts given its identifier In another embodiment (17), the invention provides the method of (2), wherein the records of the table of independently executable images contains one or more of the following optional fields in any combination: (i) the smallest linear address range of the main code part that contains all the code needed for the independently executable image; (ii) the smallest linear address range of the main data part that contains all the data needed for the independently executable image; and (iii) the requested or required amount of memory or other resources that is to be reserved to be used during execution of the independently executable image.

In another embodiment (18), the invention provides the method of (6), wherein the Virtual pointer data includes any number of address ranges followed by the data instance values of the address range so as to efficiently represent a possibly sparse list of ranges of data values.

In another embodiment (19), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for storing a software application package conforming to an interoperability format of digitally encoded data, code and content, along with meta information in the form of data, code and content needed to carry out an intended purpose (intent) on one or more connected or intermittently connected devices, the program module including instructions for: forming at least one linearly contiguous binary encoded part image; forming any necessary linearly contiguous part images comprised of combinations of binary encoded resources or program elements that are to be used to identify, load, select, identify, execute or be processed as part of the application package; forming meta information; and packaging the parts and meta information together in a form where part images can be deterministically located and independently executable images identified, loaded, and executed.

In another embodiment (20), the invention provides a data structure for storing a software application package conforming to an interoperability format of digitally encoded data, code and content, along with meta information in the form of data, code and content needed to carry out an intended purpose (intent) on one or more connected or intermittently connected devices, the data structure comprising: at least one linearly contiguous binary encoded part image; any necessary linearly contiguous part images comprised of combinations of binary encoded resources or program elements that are to be used to identify, load, select, identify, execute or be processed as part of the application package; meta information; and the data structure packaging the parts and meta information together in a form where part images can be deterministically located and independently executable images identified, loaded, and executed.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

VIII. DartRuntime/Interoperability Runtime

In another aspect, the invention provides a software runtime model (such as the DartRuntime model) which is largely event driven, and in some embodiments entirely event driven, for all software operations whether Dart or device control related. A set of event semantics, types, structures and operations on events common to both the applications and the low-level device control software is provided by one event queue running on each interoperating device in a team of interoperating devices (FIG. 17 660) which drives the sequencing of synchronous application event processing and asynchronous application, device, communications and interoperability operations. Also provided are an instruction set or system calls which are used to manage the queuing, dequeuing and processing of events. It also provides an optional robust device interoperability communications runtime model where communications between devices is maintained, error corrected, and when necessary reestablished with cooperation, but with only a small amount of or no disruption to Darts running effectively across a team of interoperating devices (see FIG. 19). These features may optionally be extended to separately generated Darts and/or other devices.

Other aspects of the DartRuntime are described elsewhere in this specification including in the examples and in the exemplary embodiments below.

In one embodiment (1), the invention provides a method for an interoperability runtime system to carry out the execution of an event driven software application package of digitally encoded data, code and content, along with meta information in the form of data, code and content needed to carry out an intended purpose (intent) on one or more connected or intermittently connected devices, the method comprising: (a) selecting and loading a separately executable image from a given package of independently executable images; (b) recruiting devices into a team by the executing image; (c) distributing at least one of code, renditions, data, and/or content amongst the team of recruited devices; (d) processing in an orderly manner of synchronous and asynchronous events to carry out the intent; (e) synchronization and serializing event processing within and between devices of the recruited team of devices; and (f) saving of running packages of individually executable images including saving data and state in a storage.

In another embodiment (2), the invention provides the method of (1), wherein the (a) selecting and loading of a separately executable image from a given package of independently executable images is the selecting and loading of exactly one separately executable image from a given package of independently executable images.

In another embodiment (3), the invention provides the method of (1), wherein the runtime is the DartRuntime.

In another embodiment (4), the invention provides the method of (1), wherein the selecting and loading, recruiting, distributing, processing, and synchronizing and reserializing are carried out according to the a recruitment procedure.

In another embodiment (5), the invention provides the method of (1), wherein the saving of running packages including data and state is carried out by the SAVE_INSTRUCTION of the DartInstructionSet.

In another embodiment (6), the invention provides the method of (1), wherein the saving of running packages including data and state comprises: getting a pointer to a table which contains a plurality of records and where each record provides information about a single separately executable image; processing each record of the table in turn; and creating an interoperability software package of one or more individually executable images based on the processed records.

In another embodiment (7), the invention provides the method of (6), wherein the table is a renditions table.

In another embodiment (8), the invention provides the method of (6), further comprising optionally forming a header with one or more header fields.

In another embodiment (9), the invention provides the method of (6), further comprising optionally forming a trailer with one or more trailer fields.

In another embodiment (10), the invention provides the method of (7), wherein the processing of each record of the renditions table in turn comprises: (a) getting a pointer to a rendition table which contains records, each renditions table record comprising: (i) a part ID (partid) which identifies or references a part image that is to be included in the saved package; (ii) a linear contiguous address range for the code from the running package's main code needed to be included for the separately executable image corresponding to the information of the record of the renditions table being processed; and (iii) a linear contiguous address range for the data from the running package's main data needed to be included for the separately executable image corresponding to the information of the record of the renditions table being processed; (b) accumulating all the partids; (c) accumulating the outside bounds for the main code linear address ranges of all previously processed records; and (d) accumulating the outside bounds for the data code linear address ranges of all previously processed records.

In another embodiment (11), the invention provides the method of (7), wherein at least one of the created individually executable images includes: (i) the renditions table; (ii) the rendition tables; (iii) a main code part with at least the range of data accumulated during the processing of each record; (iv) a main data part with at least the range of data accumulated during the processing of each record; (v) all the accumulated parts; and (vi) a part table with a record for each part in the package.

In another embodiment (12), the invention provides the method of (7), wherein the part table with a record for each part in the package includes at least the following: (i) a partid that this record refers to; (ii) a starting offset within the image of the part image; and (iii) an ending offset and or length of the image of the part image.

In another embodiment (13), the invention provides the method of (7), wherein the individually executable images further includes an optional header if one was formed.

In another embodiment (14), the invention provides the method of (7), wherein the individually executable images further includes an optional trailer if one was formed.

In another embodiment (15), the invention provides the method of (6), wherein a header and or trailer or any other data structure with a known same fixed offset is required in all instances of software application packages.

In another embodiment (16), the invention provides the method of (15), wherein the header and/or trailer and or other data structure once located using the fixed offset, provides the offset of the part table or part database data.

In another embodiment (17), the invention provides the method of (15), wherein where the header and/or trailer or other data structure includes the part table or part database data.

In another embodiment (18), the invention provides the method of (1), wherein the saving of running packages including data and state is carried out by the SAVE_INSTRUCTION of the DartInstructionSet.

In another embodiment (19), the invention provides the method of (1), wherein the runtime is embodied and carried out through an interoperability platform comprising at least the following: (1) an object oriented framework for specifying code, data, content and resources for use in interoperability application packages; (2) a source for specifying the code, data, content and resources, including that of the object oriented framework, for an interoperability application package; (3) a known process for storing the interoperability application package as a set of parts and meta information for finding, accessing, and loading the package or portions of the package on a device to carry out the execution of the package and therefore carry out the intent embodied in the application package; (4) an Interoperability Instruction set for providing a binary code compatibility between two or more devices; (5) a first software product or product(s) tool(s) which take the source and generate one or more interoperability application package), where some or all of the code elements are represented by sequences of instructions from the interoperability instruction set; (6) a second software product which loads and executes interoperability application packages; (7) a procedure for ordering the execution of the various processing units embodied in the framework; (8) a procedure for intelligently spreading code, data, and content to one or more other devices as needed to carry out a software application; and (9) a procedure for serializing and synchronizing the activities of the code and data once distributed across one or more devices.

In another embodiment (20), the invention provides the method of (19), further comprising providing at least one of: (i) a procedure for application level error recovery; (ii) a procedure for application level power management; (iii) a procedure for tightly coupling execution units by having a single semantic entity generated and used by all the execution units whether performing high level application tasks or low level communications or hardware access tasks; and (iv) a procedure for ordering and managing event driven execution and runtime environments of a plurality of event processing units of a software application.

In another embodiment (21), the invention provides the method of (19), wherein one or more or any combination of the following are true: (1) the interoperability platform is as described herein elsewhere in the description; (2) the framework is as described herein elsewhere in the description; (3) the interoperability application packages are as described herein elsewhere in the description; (4) the source is as described herein elsewhere in the description; (5) the framework is as described herein elsewhere in the description; (6) the known process for storing the interoperability application package is as described herein elsewhere in the description; (7) the Interoperability Instruction Set is as described herein elsewhere in the description; (8) the software product or product(s) tools are as described herein elsewhere in the description; (9) the software product which loads and executes interoperability application packages is as described herein elsewhere in the description; (10) the procedure for ordering the execution of the various processing units embodied in the framework is as described in the Linear Tasking section of this description; and (11) the procedure for ordering the execution of the various processing units embodied in the framework is as described in the Linear Tasking section of this description.

In another embodiment (22), the invention provides the method of (19), wherein one or more or any combination of the following are true: (1) the interoperability platform is a DartPlatform; (2) the framework is a DartFramework; (3) the interoperability application packages are Darts; (4) the source is a DartSource; (5) the framework is a DartFramework; (6) the known process for storing the interoperability application package is any method for creating a package conforming to a DartFormat; (7) the Interoperability Instruction Set is a DartInstructionSet; (8) the software product or product(s) tools are a DartTools; (9) the software product which loads and executes interoperability application packages is a DartEngine; (10) the procedure for ordering the execution of the various processing units embodied in the framework is a Dart Linear Tasking; and (11) the procedure for ordering the execution of the various processing units embodied in the framework is a Dart Linear Tasking.

In another embodiment (23), the invention provides the method of (19), wherein the intelligently spreading code, data and content to one or more other devices as needed comprises recruitment and/or renditioning.

In another embodiment (24), the invention provides the method of (23), wherein the recruitment comprises DartRecruitment and the renditioning comprises DartRenditioning.

In another embodiment (25), the invention provides the method of (19), wherein the serializing and synchronizing the activities of the code and data once distributed across one or more devices is performed by recruitment.

In another embodiment (26), the invention provides the method of (25), wherein the recruitment comprises DartRecruitment.

In another embodiment (27), the invention provides the method of (20), wherein the method for application level error recovery is as described elsewhere in this specification.

In another embodiment (28), the invention provides the method of (20), wherein the method for application level power management is as described elsewhere in this specification.

In another embodiment (29), the invention provides the method of (20), wherein the method for tightly coupling execution units is as described in the Vertical Layering description elsewhere in this specification.

In another embodiment (30), the invention provides the method of (20), wherein the method for ordering and managing event driven execution is as described in the recruitment runtime description elsewhere in this specification or is DartRecruitment.

In another embodiment (31), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner to provide an interoperability runtime system to carry out the execution of an event driven application package of digitally encoded data, code and/or content, along with meta information in the form of data, code and/or content needed to carry out an intended purpose on one or more connected or intermittently connected devices, the program module including instructions for: (a) selecting and loading a separately executable image from a given package of independently executable images; (b) recruiting devices into a team by the executing image; (c) distributing at least one of code, renditions, data, and/or content amongst the team of recruited devices; (d) processing in an orderly manner of synchronous and asynchronous events to carry out the intent; (e) synchronization and serializing event processing within and between devices of the recruited team of devices; and (f) saving of running packages of individually executable images including saving data and state in a storage.

In another embodiment (32), the invention provides an interoperability runtime system for carrying out the execution of an event driven software application package of digitally encoded data, code and/or content, optionally along with meta information in the form of data, code and/or content needed to carry out an intended purpose (intent) on one or more connected or intermittently connected devices, the system comprising: (a) a processor and a memory coupled with the processor; (b) means, accessible by the processor, for selecting and loading a separately executable image from a given package of independently executable images; (c) means, accessible by the processor, for recruiting devices into a team by the executing image; (d) means, accessible by the processor, for distributing at least one of code, renditions, data, and/or content amongst the team of recruited devices; (e) means, accessible by the processor, for processing in an orderly manner of synchronous and asynchronous events to carry out the intent; (f) means, accessible by the processor, for synchronization and serializing event processing within and between devices of the recruited team of devices; and (g) means, accessible by the processor, for saving of running packages of individually executable images including saving data and state in a storage.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

IX. Linear Tasking

In another aspect of the invention, system, apparatus, method and computer program for linear tasking are provided. Linear Tasking includes a methodology that enables a simple deterministic flow of processor control and device resources between processing units. Processing units can easily be reconfigured into a single hierarchy which includes processing units compiled into an application, separately compiled applications, and even applications running on other devices.

Conventional software eco-systems, especially conventional operating systems, are built using either a cooperative tasking model or a pre-emptive tasking model. While there are advantages to these conventional tasking models for some devices which run applications which require computer response times in the milliseconds or even microseconds, these advantages are outweighed by the benefits of a Linear Tasking model for the most common types of interoperability applications where most often response time requirements are often under 30 milliseconds. Many of the applications and tasks will only require response times of tenths of seconds, and even to response times on the order of a second to several seconds.

The advantages of a Linear Tasking model are especially well suited to interoperability applications because most such applications are intended for individual users. Here the run-time penalty for having to pass control to each processing unit is not important, as human response time needs are generally limited to a thirtieth of a second or longer.

Although there are many advantages of the inventive linear tasking model and method, only a few are set forth here while others will be apparent from the further description in this specification.

A first advantage is a deterministic or near-deterministic path for the order of processing of all the processing units of all the teamed devices leads to a simpler programming model and greatly reduced bugs due to limiting the order in which operations are performed to a well controlled pattern.

Second, all processing units are able to complete complex sequences of operations without the possibility of being interrupted in time or being effected by the actions of interrupting processes.

Third, there is easy support for controlled shutdowns, controlled hibernation and recovery and advantageous Vertical Layering mechanisms, that may for example be used for such applications as power management.

Fourth, arranging and rearranging the hierarchy is at least one easy way for enabling and disabling groups of processing units as the modes of operation or interaction with the user changes Fifth, environments can be inherited, changed or distorted by parent processing units in a manner where the children do not need to contain code which knows how their parents are using their outputs, such as bitmaps, or controlling their environment, such as their sense of time.

Sixth, separately produced executables can be easily assimilated into the processing hierarchy of a running executable. In the DartPlatform, this feature allows Darts to assimilate other Darts into its runtime during use. For example, a slide show (SlideShow) Dart application described earlier can readily be built which can collect and contain separately produced Darts as slides, just as easily as it can collect still JPEG pictures as slides. The JPEG picture would be contained by a still picture display Gizmo (Gizmo is the base calls for event processing units) while a Dart would be contained by a Dart container Gizmo.

Figure 20:
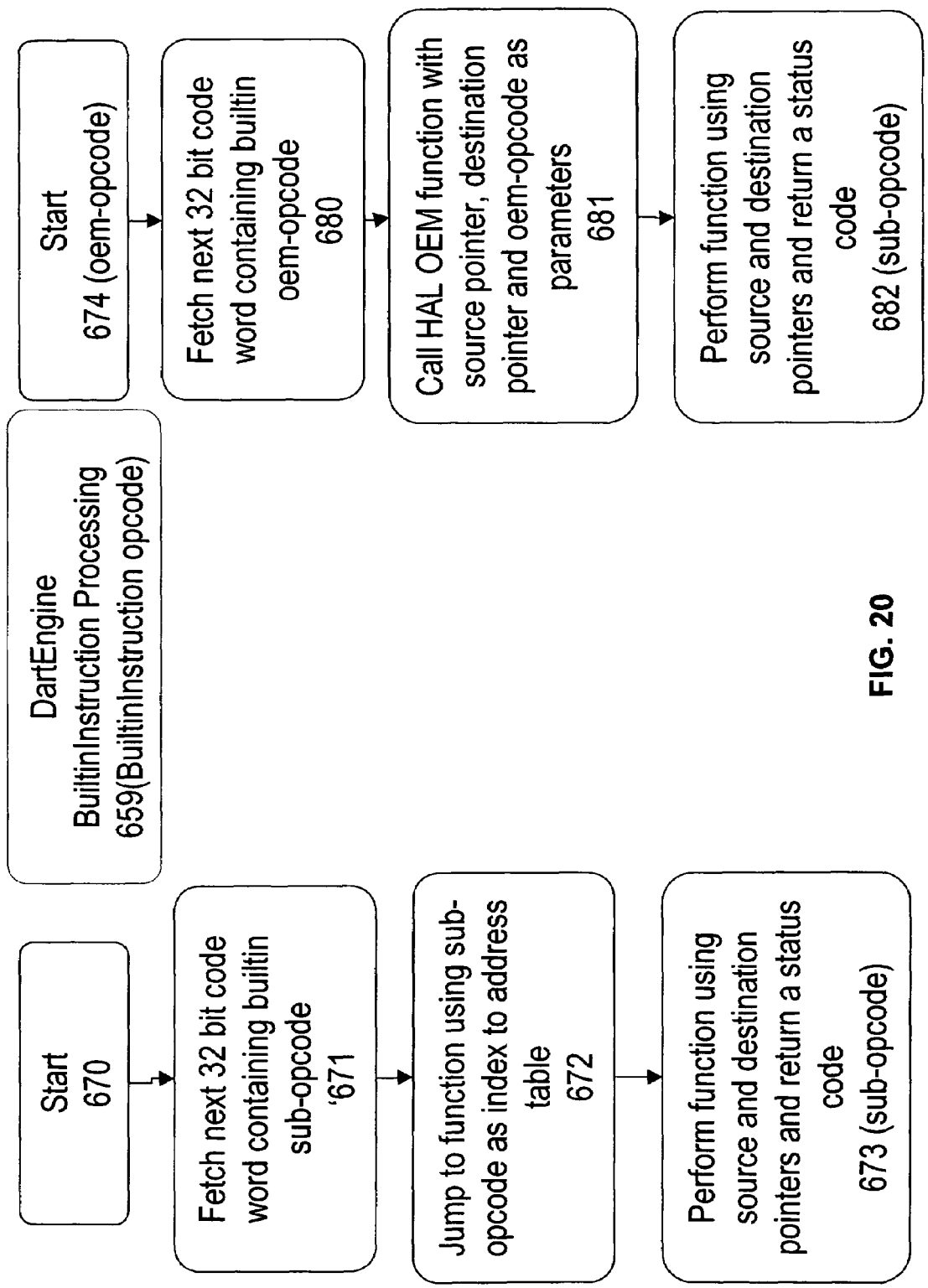
FIG. 20 is an illustration showing a flow chart diagram illustrating the BuiltinInstruction and OEM_BuiltinInstruction processing carried out by the DartEngine.
Figure 25:
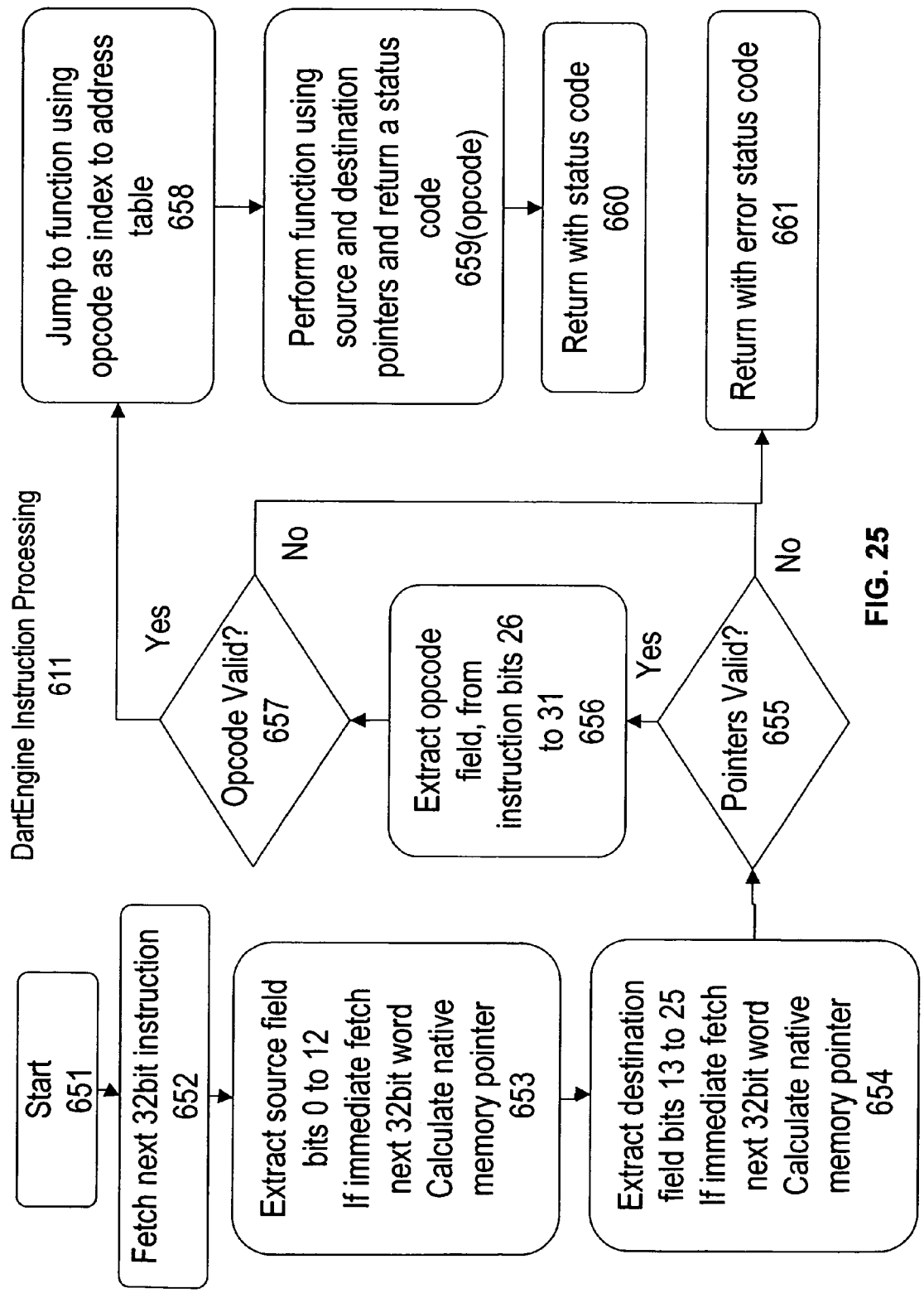
FIG. 25 is an illustration showing a flow chart diagram illustrating the DartRuntime instruction processing implemented in the DartPlayer.

In one embodiment, Linear Tasking is advantageously embodied throughout the implementation of the Dart platform (DartPlatform FIG. 3) from the Dart framework (DartFramework, FIG. 11, to the Dart runtime (DartRuntime FIG. 9, FIG. 16, FIG. 17), to the Dart engine (DartEngine FIG. 22 600) and instructions in the Dart instruction set (DartInstructionSet FIG. 20, FIG. 25). Other embodiments may use Linear Tasking in conjunction with alternative implementations with the benefit of complete Dart infrastructure.

In one embodiment, the inventive linear tasking provides a method for deterministically ordering the execution and runtime environments of a plurality of processing units of software application programs. A software or firmware program event driven run-time model provides or creates an environment where all processing units are executed in a predefined order based on the linkage between the processing units. A software object oriented framework, the DartFramework (FIG. 11), is provided wherein there is a base processing unit class (Gizmo in FIG. 11 115) containing at least one of and possibly all of the following object members (FIG. 11 115) in any combination:

(a) a possibly null reference to a parent processing unit;
(b) a possibly empty ordered linear list of references to a child processing units;
(c) optional binary flags corresponding to classes of event types that are to be acted upon by this processing unit;
(c) optional binary flags corresponding to the classes of event types that are to be acted upon by any of the child processing units descending down the chain of parent and child processing until there are no more children;
(d) procedural methods for adding, deleting, or reordering the references to the parent and child processing units; and
(e) a procedural method for ordering the processing of events.

Figure 15:
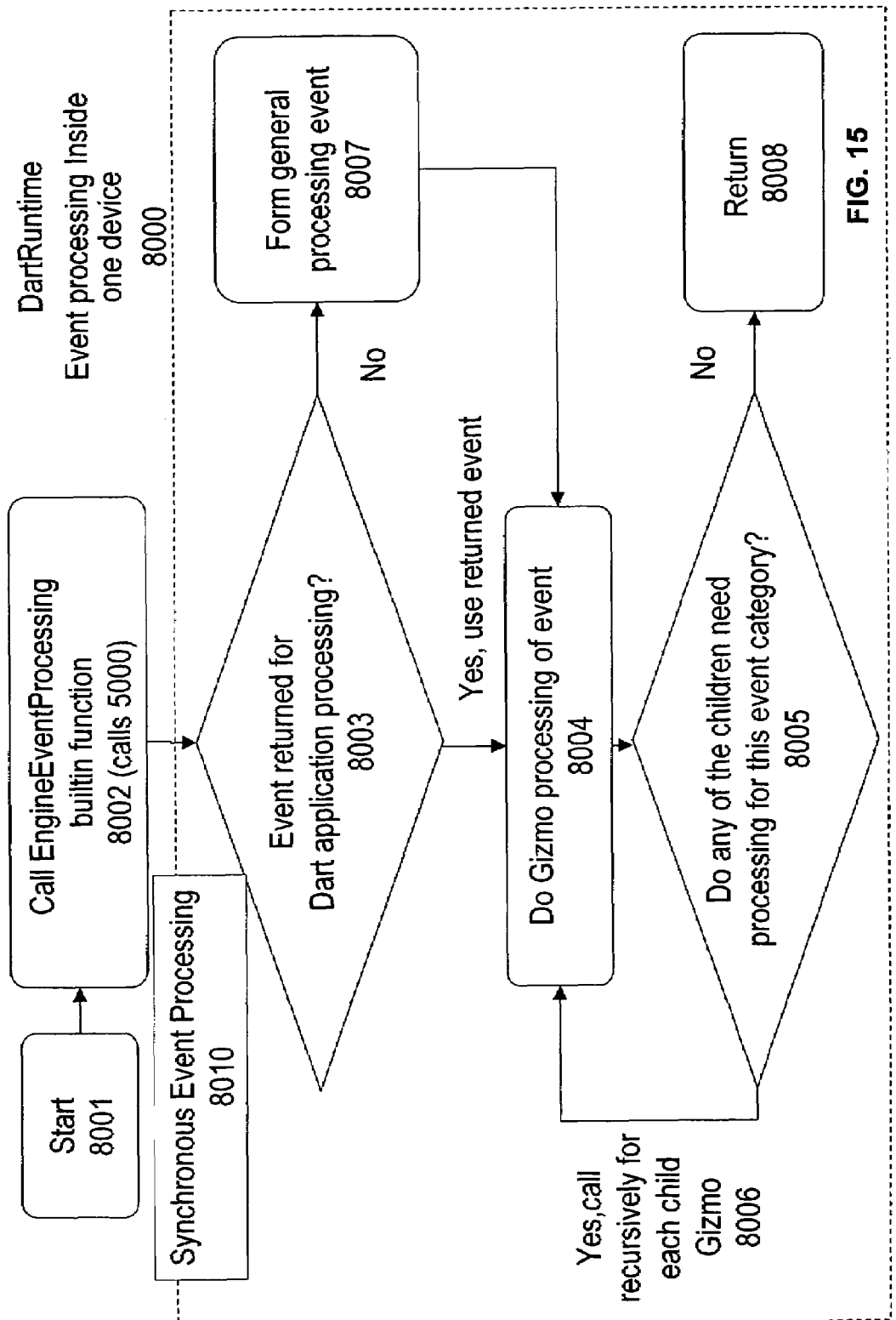
FIG. 15 is an illustration showing a flow chart diagram of the DartRuntime processing for a pass through the hierarchy of Gizmo derived objects in a Dart application.

In at least one embodiment, the procedural method for ordering the processing of events includes the following steps (see FIG. 15):

(1) Perform any pre-children processing of the event needed based on the event type, its values and references the tasks of the processing unit and the current run-time environment as specified by the event, the parent and the state of the device (see FIG. 15 8004);

(2) Set the optional flags corresponding to the classes of event types that are to be acted upon by the child processing unit chain to indicate that no event types are to be acted upon;

(3) Set up any environment changes needed for each child's processing, and call each child in the order of the list of references to child processing units (see FIG. 15 8005);

(4) As each call returns logically OR the binary flags of processing types needed to be processed by each of the just called child to collect the combined event processing type based needs of all the children and their decedents;

(5) Perform any post-children processing of the event based on the event type its values and references the tasks of the processing unit and the current run-time environment as specified by the event, the parent and the state of the device (see FIG. 15 8004);

(6) Set the flags of event types that are now to be handled by this processing unit in the future;

(7) Return control to the parent processing unit if the reference is non-null (see FIG. 15 8006); and (8) Return control to the main processing loop if the parent is null FIG. 15 8008.

The collected binary flags can optionally be used for pruning of the graph of calls since the flags can be used to indicate which event types are not needed for processing by each child and their all its descendents. If the child's or'ed flag value corresponding to the event type classification the flag is associated with is not 1 then the child and its descendents have no need to process the event.

Other exemplary embodiments of linear tasking are now described. In one embodiment (1), the invention provides a method of linear tasking for ordering and managing event driven execution and runtime environments of a plurality of event processing units of a software application package, the method comprising: providing a software object oriented framework which includes a base event processing unit class, and zero or more event processing unit classes which inherit either directly or indirectly from the base event processing unit class; creating, maintaining, adding, deleting or reordering links that form a graph or topology of event processing units in a manner that ensures that there is always a single linear deterministic ordering for passing events through the graph of processing units formed by the links; and dynamically changing the graph or topology of processing units according to the needs of the running application.

In another embodiment (2), the invention provides the method of linear tasking (1), wherein the graph is logically extended to include the graphs of separately generated application packages statically by reference within one or more application packages or applications packages that are themselves part of one or more other application packages.

In another embodiment (3), the invention provides the method of (1), wherein the graph is logically extended to include the graphs of separately generated application packages dynamically during the running of the application package.

In another embodiment (4), the invention provides the method of (2), wherein the event processing unit at a topmost node of the separately generated application package's graph determines by way of the parameters passed into a event processing method if it is logically a part of an extended graph or actually the start of a topmost application package that is not extended by any other application package.

In another embodiment (5), the invention provides the method of (3), wherein the event processing unit at a topmost node of the separately generated application package's graph determines by way of the parameters passed into a event processing method if it is logically a part of an extended graph or actually the start of a topmost application package that is not extended by any other application package.

In another embodiment (6), the invention provides the method of (4), wherein if and only if the parameters do not specify an event to process, the topmost node will explicitly attempt to retrieve an event from a queue of events for processing by itself and any other event processing units in the linear order of the graph.

In another embodiment (7), the invention provides the method of (5), wherein if and only if the parameters do not specify an event to process, the topmost node will explicitly attempt to retrieve an event from a queue of events for processing by itself and any other event processing units in the linear order of the graph.

In another embodiment (8), the invention provides the method of (3), wherein a container event processing unit class is used to instantiate objects to load, link, unload, and manage the environment of separately generated application packages so that their event processing units become a logical extension of the graph.

In another embodiment (9), the invention provides a method as in (1), wherein the event processing unit base class comprises at least one of the following class object members: (1) a possibly null reference to a parent processing unit; (2) a possibly empty ordered linear list of references to child processing units; (3) one or more optional binary flag(s) corresponding to classifications of event types that are to be acted upon by the processing unit itself, wherein the flags are used to eliminate unnecessary passing of events' down to children or their descendants that will not process any events of a particular class; (4) one or more child optional binary flag(s) corresponding to the classes of event types that are to be acted upon by any of the child processing units descending down a chain of parent processing and child processing until there are no more children or child processing units; (5) a procedure for adding, deleting, modifying, and/or reordering a reference to at least one of the parent and child processing units; and (6) a procedure for ordering the processing of events.

In another embodiment (10), the invention provides a method as in (9), wherein the event processing unit class comprises at least one processing unit class object member for ordering the processing of events.

In another embodiment (11) the invention provides the method in (10), wherein the procedure for ordering the processing of events is performed according to the following steps: (1) optionally perform any pre-children processing of the event needed; (2) initially set (or reset) optional child binary flags maintained to track the combined event processing needs of all the children event processing units needs along with the needs of all their dependents (children)), where each optional child flag is a single bit corresponding to exactly one classification of event types, to initially indicate that no events of any of the classifications are to be acted upon by children or their decedents; (3) set up any environment changes needed for each child processing and call each child event processing unit in the order of the list of children; (4) as each call to a child returns, logically OR the optional child binary flags of processing types needed to be processed by each of the just called child to collect the combined event processing type based needs of all the children and their decedents; (5) optionally perform any post-children processing of the event; (6) set the binary flags of event type classifications that are now to be handled by this event processing unit in the future; (7) return control to a parent processing unit if the parent reference is a first state (non-null state); and (8) return control to a main processing loop which logically called this processing unit if the parent reference is a second state (null state).

In another embodiment (12), the invention provides a method as in (11), wherein the optional pre-children and or post-children processing of the event is based on at least one of: (i) the event type; (ii) the events fields, parameters and/or associated file contents values, and/or those on any list of referenced child processing units to the tasks of the processing unit; and (iii) the current run-time environment as specified by the event, the parent, and or the state of the device.

In another embodiment (13), the invention provides a method as in (11), wherein the set up of any environmental changes needed may optionally include at least one of providing a bitmap as a virtual screen, distorting the child's sense of time, distorting the coordinates of a mouse click to conform to the different size, translation or angle of orientation the parent is displaying of the image or bitmap the child gizmo is rendering into.

In another embodiment (14), the invention provides a method as in (11), wherein managing the links is used to flexibly and dynamically mix and match event processing units in a manner where changes in functionality are easily made by creating and maintaining the ordered graph.

In another embodiment (15), the invention provides a method as in (11), wherein where the environment for linked processing units can be controlled by a parent processing unit to provide advanced functionality without the need for the child processing units to understand how their environments are being virtualized by parent processing units.

In another embodiment (16), the invention provides a method as in (11), wherein the deterministic flow of processing makes for a robust system because the order of event processing is more tightly controlled and more easily tested than they would be in non-deterministic asynchronous event processing runtimes.

In another embodiment (17), the invention provides a method as in (11), wherein processing units compiled into one Dart can proxy for separately compiled and generated Darts that can dynamically be added to the Linear Tasking graph and then function as if they were part of the originally generated Dart.

In another embodiment (18), the invention provides a method as in (17), wherein separately generated Darts can be saved automatically as parts of parent Darts as the result of a SAVE_INSTRUCTION or SAVE_BUILTIN_INSTRUCTION.

In another embodiment (19), the invention provides a method as in (1), wherein one or more or any combination of the following are true: (i) the runtime is the DartRuntime; (ii) the software object oriented framework is the DartFramework; (iii) the base event processing units are Dart Gizmos; (iv) the event processing unit classes which inherit either directly or indirectly from the base event processing unit class includes either the Dart Rendition class and/or the Dart MasterRendition class.

In another embodiment (20), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for ordering and managing event driven execution and runtime environments of a plurality of event processing units of a software application package, the program module including instructions for: generating or providing a software object oriented framework which includes a base event processing unit class, and zero or more event processing unit classes which inherit either directly or indirectly from the base event processing unit class; creating, maintaining, adding, deleting or reordering links that form a graph or topology of event processing units in a manner that ensures that there is always a single linear deterministic ordering for passing events through the graph of processing units formed by the links; and dynamically changing the graph or topology of processing units according to the needs of the running application.

In another embodiment (21), the invention provides a computer program product as in (20), wherein the event processing unit base class comprises at least one of the following class object members: a possibly null reference to a parent processing unit; a possibly empty ordered linear list of references to child processing units; one or more optional binary flag(s) corresponding to classifications of event types that are to be acted upon by the processing unit itself), wherein the flags are used to eliminate unnecessary passing of events down to children or their descendants that will not process any events of a particular class; one or more child optional binary flag(s) corresponding to the classes of event types that are to be acted upon by any of the child processing units descending down a chain of parent processing and child processing until there are no more children or child processing units; a procedure for adding, deleting, modifying, and/or reordering a reference to at least one of the parent and child processing units; and a procedure for ordering the processing of events.

In another embodiment (22), the invention provides an apparatus providing ordering and managing of event driven execution and runtime environments of a plurality of event processing units, the apparatus comprising: a processing logic or processor and a memory coupled with the processing logic or processor; means, accessible to the processing logic or processor, for generating or providing a software object oriented framework which includes a base event processing unit class, and zero or more event processing unit classes which inherit either directly or indirectly from the base event processing unit class; means, accessible to the processing logic or processor, for creating, maintaining, adding, deleting or reordering links that form a graph or topology of event processing units in a manner that ensures that there is always a single linear deterministic ordering for passing events through the graph of processing units formed by the links; and means, accessible to the processing logic or processor, dynamically changing the graph or topology of processing units according to the needs of the running application.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

X. Vertical Layering

In another aspect of the invention, system, apparatus, method and computer program for vertical layering are provided. Vertical Layering includes enabling efficient and effective implementation of features which by their nature involve close cooperation amongst the tool, application, framework, engine, Rendition and instruction-set implementation, and operations.

In conventional software eco-systems or environments, the native instruction set of the processor is abstracted in a number of horizontal layers which often include a Basic Input-Output System (BIOS), an operating system, a graphics subsystem, an application framework, and finally an application. In each case there is a nearly complete abstraction of what the layer is to do, implemented in the abstraction of the layer below. This mapping from abstraction layer to abstraction layer conventionally requires a great deal of computer program code and obscures much of the information in one layer from those layers above and below them. A widely known and used example is the seven layers of the OSI model which are Physical, Data Link, Network, Transport, Session, Presentation, and finally Application.

While building devices and operating software in standardized abstraction layers can be very useful in allowing code to be developed independently from different entities, and still work together on general purpose computers; there are problems which render the use of many abstractions levels especially undesirable when dealing with device interoperability.

One problem of conventional horizontal layering of abstraction layers as in the OSI model, is that the complexity of the specifications leads almost inevitably to imperfect implementations which can interact with other perfect or imperfect implementation to produce a wide array of errors when operating in cooperation with other layers or implementations of the same layer. While the interactions of the layers residing on a single computer are easily tested together and incompatibilities removed before distribution, the testing of layers and corrections of incompatibilities found on devices which must work with a large number of permutations of layers on other devices found in the field is very difficult. Still more difficult is the task where differing horizontal layer implementations must cooperate across ad-hoc teams of devices where the functions, resources, operating systems, CPUs or other processors or processing logic are all potentially different.

It would be rare for independently implemented layers to work the first time they were tested together on a single device, but through repeated testing and fixing of incompatibilities the layers of originally independently developed modules can be made to work reliably together on a single computer. The same repeated testing and fixing of incompatibilities is not easily realizable for the potentially large number of permutations of devices and layer implementations which may need to interoperate. The result is that many incompatibilities are not found until the devices using the separate implementations are in widespread use.

Another problem with the traditional horizontal layering of abstraction levels is that all interactions of all abstraction layers must be known and understood by the time the standard is to be implemented in products to ensure that all necessary interactions of layers can be passed through all intervening layers. An example, as will be explained further below, is the optional but very advantageous need for an application to interact with the hardware to carry out efficient power management. Current horizontally layered protocol specification standards lack any support for the application to communicate its response time requirements through all the intervening layers to the hardware. While there are many power management implementations on devices, these implementations are most often highly device specific implementations that bypass or corrupt the standard implementation of the layers, and use heuristics based on patterns of hardware access at the lower levels in place of the actual response time needs knowable only to the software running at the higher application levels.

Alternatively to the conventional horizontal layering in the current state of the art, is the inventive Vertical Layering, which can be advantageously employed if the programming tools, applications, players, runtime, operating system, and/or low-level functions, can share data structures and communications semantics throughout.

Figure 3:
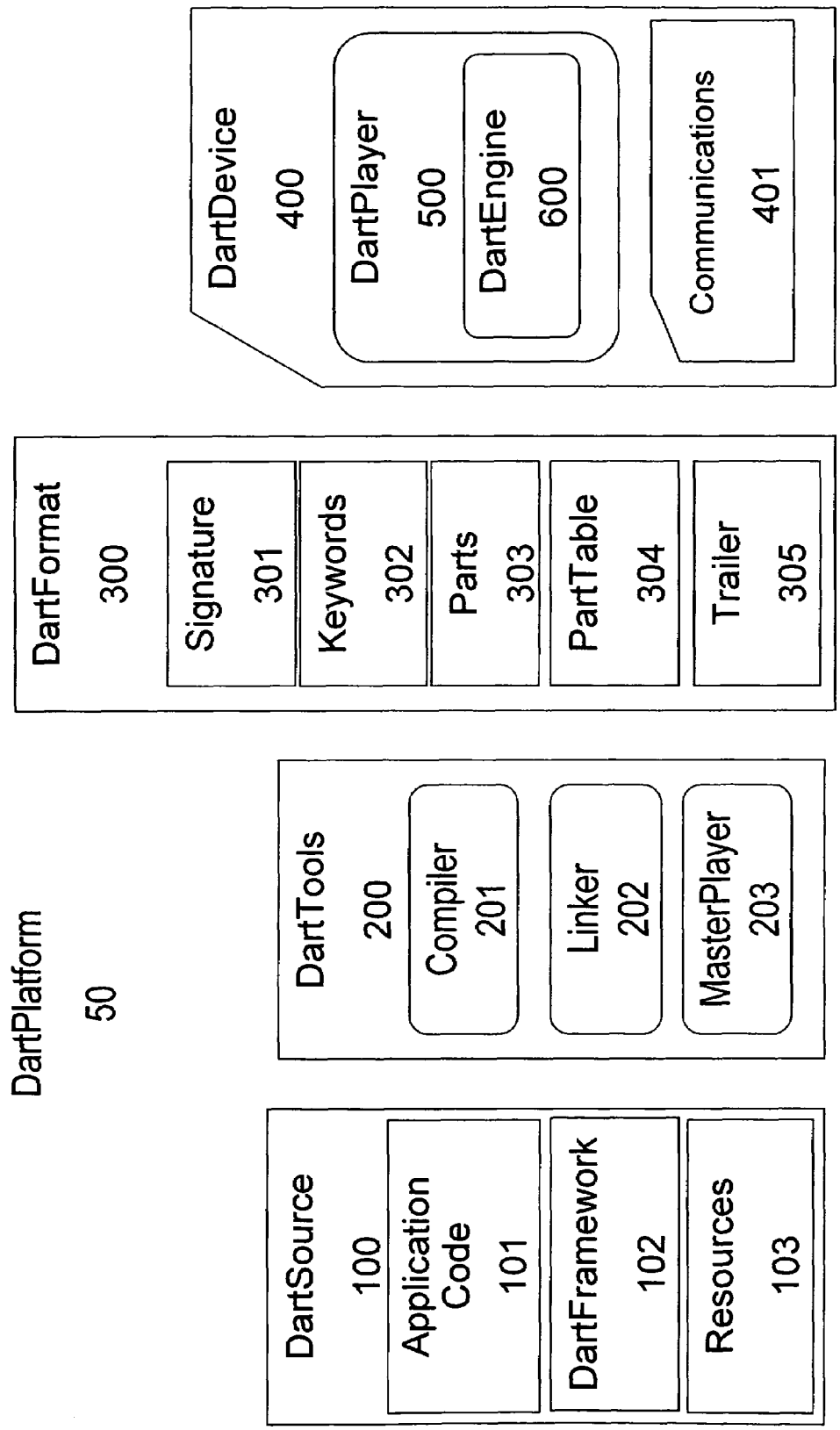
FIG. 3 is an illustration showing a block diagram of the main components and sub-components of an embodiment of the invention.

In one implementation embodiment, Vertical Layering in optionally but advantageously embodied throughout the implementation of the DartPlatform (FIG. 3). Two examples of where Vertical Layering is advantageously employed in the DartPlatform, are power management and application level error recovery (FIG. 19).

For example, power management functions are most often implemented in conventional devices using heuristics based on input or output activities detected at the lowest levels; yet, only the application itself really knows if it requires control to return to its processing to decode the next frame of a video in 1/30 second, or there will be no requirement for further processing until the user does something.

In one advantageous embodiment of the invention, the dart platform (DartPlatform) collects the processor response requirements as the Dart runtime (DartRuntime) makes each pass though a single hierarchy Linear Tasking of event processing units called Gizmos (FIG. 11, FIG. 15). After each pass through the intra-device parts of the DartRuntime (FIG. 15), whenever a Dart is built using the Dart framework (DartFramework) hierarchy of Gizmo based processing units (FIG. 11), the DartPlatform combines the minimum synchronous Gizmo tree response time requirements (FIG. 15 8010) with the asynchronous event time requirements in the event queue (EventQueue FIG. 22 660) of the device engine (DartEngine FIG. 22 600) to determine an accurate and reliable amount of time that the device can power down or reduce power levels or consumption for before returning control to the DartPlayer. Methods of power management, such as reduction in a processor logic clock, reducing logic or power supply voltage levels, or powering down portions of a larger circuit, are known in the art. Consider for example, an interoperability slide show Dart application described herein before. This application running on an originating device can form a team of say five devices through Recruitment where each device in the team displays the same slide as the originating application, albeit optionally scaled or otherwise adapted for efficient transmission and display on each connection and each device. What happens if a device with a wireless connection goes out of range, or a portable device shuts down automatically to save battery life. In a conventional implementation only the slide show (SlideShow) application knows how to recover should this device suddenly move back in range or get turned back on (see example of FIG. 19). It would require a great deal of programming at all levels of a conventional horizontally layered device to be able to seamlessly recover, especially where a non-originating device has powered off and lost the entire slide show data and state. This is because conventional software eco-systems do not built into the horizontal abstractions the semantics necessary for all levels from the low-level routines that detect the lost connections to the application. Without a direct mechanism for information to flow from the application to the low-level communications system and back it is difficult for an application to be written to automatically resend the data and state information to the connection recovered device.

With the Vertical Layering employed in the DartPlatform, resending application data and procedures to recover an application over a team of devices when connections are lost is built into the application through the DartFramework, the DartRuntime, and the DartEngine. So any application built using the DartFramework and run on a DartPlayer does not need any special programming for robust multi-device application and data synchronization recovery.

In one embodiment of the Dart Platform, the traditionally low-level operations (such as for example, communications) interoperate directly with the traditionally high-level operations (such as for example, the application) directly by passing DartEvents directly between the Dart application that is running on the DartInstructionSet and the native code that is handing communications.

The DartTools (FIG. 3 200, FIG. 12 200), DartInstructionSet, DartRuntime (FIG. 9, FIG. 15, FIG. 16, FIG. 17) and Linear Tasking (FIG. 18) are all designed to provide an environment largely devoid of layers of abstraction where the applications form and process DartEvents with the exact same (or substantially the same) structure and semantics as the communications functions inside the DartEngine. Thus, applications can easily and effectively collect, synchronize and communicate all its needs and status with all other software operations that are part of the DartPlatform through the passing and processing of Events understood by most all components of an interoperating system at every level, whether these components are part of an application, the engine executing the application, or interoperating parts of an application distributed throughout a team of devices.

In one embodiment, the vertical layers provides for a system, method, and computer program for closely coupling the operations of software applications and the device control software to foster a high-level of cooperative functionality between the application and the device control software with low-complexity, low-processing requirements, few application program interfaces, and few protocol interfaces. It also provides a software run-time model which is largely event driven for all software operations whether application or device control related; as well as a set of event semantics, types, structures and operations on events common to the applications and the low-level device control software. An event queue which drives the sequencing of synchronous application event processing and asynchronous application, device, communications and interoperability operations, are also provided. The vertical layering approach also provides an instruction set or system calls which are used to manage the queuing, dequeuing and processing of events. An optional robust device interoperability communications runtime model may also be provided, where communications between devices is maintained, error corrected, and when necessary reestablished with cooperation, but a with a small amount of disruption to applications running effectively across a team of interoperating devices. A system for Serialization and Synchronization of Events passing through a cooperative team of devices is beneficially applied to keep all components of an interoperable system of asynchronous operations tightly coupled, and therefore reliable, simple to implement, efficient and simple to use.

In another embodiment, the invention provides a method, computer program software, device and system for directly coupling the operations of software applications and the device control software operations on a device or set of communicating devices to foster a highly efficient and flexible degree of cooperative functionality between software operations, whether on one device or across one or more cooperating devices. This may include source code and resources, software tools, a prepackaged or pre-specified software framework or library, an event driven runtime, and an instruction set or set of system calls to manage a queue of events on each device. In at least one embodiment exactly one queue of events is managed on each device for this purpose.

The application may be a Dart, and the device control software may be a DartEngine or DartPlayer. In some embodiments the set of devices is or includes a team set up using Recruitment as described herein or via a different method for recruiting a team of devices. In one embodiment, the software framework is the DartFramework. In one embodiment the event driven runtime is the DartRuntime. In one embodiment the source code and resources are the Dart-Source source code and the software tools are the DartTools. In one embodiment, the instruction set and system calls are provided by the DartInstructionSet and/or the functions that can be invoked as part of built-in instruction type instructions, such as for example the Dart BUILTIN_INSTRUCTION (FIG. 20 670, 671, 672, 673) and/or the OEM_BUILTIN_INSTRUCTION. (FIG. 20, 674, 680, 681, 682).

In at least one embodiment, the efficiency is achieved at least in part by having a single data structure with commonly understood semantics used to communicate information and/or content and/or status amongst the system of devices (FIG. 17 800), applications, and communications code.

In at least one embodiment, events such as for example, DartEvents (FIG. 17 800), are used as the single data structure.

In at least one embodiment, the device control software operations includes communications, device configuration management, device discovery, managing allocation, de-allocation and access to memory, physical storage, physical displays physical input/output devices or any other physical or software virtualized physical aspect of a device.

In one embodiment, software tools take the software source code and resources written to use the pre-specified software framework which will ensure conformance to the event driven execution model of the runtime supported by access to the instruction set or set of system calls which are used to manage the enqueuing, processing and dequeuing of events.

In at least one embodiment, the event processing of the application is as expressed and described for FIG. 15, FIG. 9, FIG. 16, FIG. 17. In at least one embodiment, the events put onto the queues of devices are serialized and synchronized. The serialization and synchronization are performed according to the serialization and synchronization method shown in FIG. 9.

Particular exemplary embodiments involving an aspect of vertical layering are now described. In one embodiment (1), the invention provides an event driven vertical layering system for coordinating the operations of and data movement between procedural (software) components which perform application level operations, device hardware control level operations, communications level operations, or any other level or subset of operations within or between one or more teamed devices to establish an efficient and/or robust cooperative functionality between the procedural (software) components, the system comprising: (a) a static event data structure whose fields and field semantics are generally known and understood between all the event generating and processing units across one or more devices and the procedural (software) components running in the one or more devices; (b) a queue on each teamed device which stores, removes, manages, and controls access to the event data structure instances; (c) means for managing the placing, modification, and removing of events on the queue accessible from all the cooperating procedural (software) components; (d) means for specifying and maintaining a common list of event types which are to be serialized and synchronized between the queues of the cooperating devices; and (e) means for ensuring that all the events of any of the types on the common list are processed by the procedural (software) components in the exact same order on all devices regardless of what procedural (software) components initiated the events, or which of the teamed devices the procedural (software) components that initiated the events are running on.

In another embodiment (2), the invention provides the system of (1), wherein the queue on each teamed device which stores, removes, manages, and controls access to the event data structure instances consists of exactly one queue on each teamed device.

In another embodiment (3), the invention provides the system of (1), wherein the means for managing the placing, modification, and removing of events on the queue accessible from all the cooperating procedural (software) components comprises a procedure implemented as a computer program including a plurality of program instructions executing in a processor logic of the interoperating devices.

In another embodiment (4), the invention provides the system of (1), wherein the means for specifying and maintaining a common list of event types which are to be serialized and synchronized between the queues of the cooperating devices comprises a procedure implemented as a computer program including a plurality of program instructions executing in a processor logic of the interoperating devices.

In another embodiment (5), the invention provides the system of (1), wherein the means for ensuring that all the events of any of the types on the common list are processed by the procedural (software) components in the exact same order on all devices regardless of what procedural (software) components initiated the events, or which of the teamed devices the procedural (software) components that initiated the events are running on comprises a procedure implemented as a computer program including a plurality of program instructions executing in a processor logic of the interoperating devices.

In another embodiment (6), the invention provides the system of (1), wherein one or more or any combination of the following are true: (1) the static event data structure is the DartEvent; (2) the teamed devices where assembled for cooperation through the used of device recruitment; (3) the methods for managing the placing, modification and removing of events are accessed through the use of an Interoperability Instruction Set or the DartInstructionSet; (4) the system carries out its event driven functionality at least in part through the Interoperability Runtime or the DartRuntime; (5) the methods for specifying the common list and ensuring that all events of any of the types on the common list are processed in the same order are as described for serialization and synchronization of events on Recruitment; and (6) the Interoperability Tools or the DartTools are used to generate the software application operations code of the system.

In another embodiment (7), the invention provides the system of (1), wherein coordinating the operations is a means for directly coupling the operations of the procedural (software) components without the need for any intermediating layers of software, application program interface (API), or other semantics translating means or mechanism.

In another embodiment (8), the invention provides the system of (7), wherein the intermediating layers of software, API, or other semantics translating means or mechanism which are not needed as intermediating layers includes any of the seven horizontal layers of the conventional OSI Protocol model, or combinations thereof.

In another embodiment (9), the invention provides a system as in (1), wherein at least a component of the efficiency is achieved by having a single data structure with commonly understood semantics used to communicate and transport information and/or content and/or status amongst the devices and procedural (software) components.

In another embodiment (10), the invention provides a system as in (7), wherein at least a component of the efficiency is achieved by having no intermediating layers of software which needs to process the communication or transport.

In another embodiment (11), the invention provides a system as in (7), wherein at least a component of the robustness is achieved by having no intermediating layers of software where problems or incompatibilities or misunderstandings of implementation may otherwise occur.

In another embodiment (12), the invention provides a system as in (1), wherein application level operations optionally include one or more or any combination of the following: (1) application directed power management; (2) application directed error recovery; (3) application directed Interfacing and or any interactively with a human or automated user; (4) application directed media rendering or editing; and (5) application directed data processing.

In another embodiment (13), the invention provides a system as in (12), wherein application directed means that the initiation and or carrying out of operations is performed at least in part by the processing instructions generated by traditional compilers and linkers.

In another embodiment (14), the invention provides a system as in (12), wherein application directed means that the initiation and or carrying out of operations is performed at least in part by the processing instructions of an interoperability instruction set generated by one or more Interoperability Tools or by one or more DartTools.

In another embodiment (15), the invention provides a system as in (12), wherein the application conforms to the Interoperability Format or the DartFormat.

In another embodiment (16), the invention provides a system as in (1), wherein device hardware control level operations optionally includes or is selected as one or more of the following operations: (1) accessing one or more in any combination of memory, hard disk drive storage, displays, power regulation, device power-up, and device shutdown; (2) compression/decompression circuits or processors, or input and output circuits of any type; (3) setting or reading hardware operating modes or any other information physically stored digitally or in an analog fashion; (4) accessing random numbers or other forms of entropy for use in simulations or cryptographic and or security operations; (5) managing device configuration; (6) discovering devices and/or services; and (7) managing allocation and/or deallocation and or access to memory, physical storage, physical displays physical input/output devices, or any other physical or software virtualized physical aspect of a device, and any combinations of these.

In another embodiment (17), the invention provides a system as in (1), wherein communications level operations optionally includes or is selected as any one or more of the following in any combination: (1) sending and or receiving of data, and or code and or content; (2) sending and or receiving of meta data about data, and/or code and/or content to be sent or received; (3) device and/or service discovery; (4) broadcasting of data and/or code and/or content; (5) transmission error detection and or correction; (6) establishing and or maintaining channels between devices; (7) establishing and or maintaining separate logical sessions on a single and or multiple channels; (8) managing any of the following: (a) bridging protocols; (b) extending the reach of communications mechanisms; (c) acting as a proxy for a device; and (d) providing a gateway for passing information through or from different physical media or protocols.

In another embodiment (18), the invention provides a system as in (1), wherein an Interoperability Engine or a DartEngine or a DartPlayer or any combination of these is used at least in part to embody the system.

In another embodiment (19), the invention provides a system as in (1), further comprising software tools adapted for operating on software source code and resources written to use a particular software framework which will ensure conformance to the event driven execution model of the runtime supported by access to an instruction set or to a set of system calls which are used to manage the enqueuing, processing, and dequeuing of events.

In another embodiment (20), the invention provides a system as in (19), wherein one or more of the following in any combination are true: (1) the software tools comprise the Interoperability Tools or the DartTools; (2) the software framework comprises the Interoperability Framework or the DartFramework; (3) the event driven execution model comprises the Interoperability Runtime or the DartRuntime; and (4) the instruction set or set of system calls comprises the Interoperability Instruction Set or the DartInstructionSet.

In another embodiment (21), the invention provides an event driven vertical layering method for coordinating the operations of and data movement between procedural components within or between one or more teamed devices, the method comprising: (a) defining or generating a static event data structure whose fields and field semantics are generally known and understood between all the event generating and processing units across one or more devices and the procedural (software) components running in the one or more devices; (b) defining or generating a queue on each teamed device which stores, removes, manages, and controls access to the event data structure instances; (c) managing the placing, modification, and removing of events on the queue accessible from all the cooperating procedural (software) components; (d) specifying and maintaining a common list of event types which are to be serialized and synchronized between the queues of the cooperating devices; and (e) ensuring that all the events of any of the types on the common list are processed by the procedural components in the exact same order on all devices regardless of what procedural components initiated the events, or which of the teamed devices the procedural components that initiated the events are running on.

In another embodiment (22), the invention provides an event driven vertical layering method as in (21), wherein the procedural components perform application level operations, device hardware control level operations, communications level operations, or any other level or subset of operations within or between one or more teamed devices to establish an efficient and/or robust cooperative functionality between the procedural components.

In another embodiment (23), the invention provides an event driven vertical layering method as in (21), wherein the procedural components are implemented as computer program code software.

In another embodiment (24), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for coordinating the operations of and data movement between procedural components within or between one or more teamed devices, the program module including instructions for: (a) defining or generating a static event data structure whose fields and field semantics are generally known and understood between all the event generating and processing units across one or more devices and the procedural (software) components running in the one or more devices; (b) defining or generating a queue on each teamed device which stores, removes, manages, and controls access to the event data structure instances; (c) managing the placing, modification, and removing of events on the queue accessible from all the cooperating procedural (software)

components; (d) specifying and maintaining a common list of event types which are to be serialized and synchronized between the queues of the cooperating devices; and (e) ensuring that all the events of any of the types on the common list are processed by the procedural components in the exact same order on all devices regardless of what procedural components initiated the events, or which of the teamed devices the procedural components that initiated the events are running on.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XI. Application Event Driven Power Management

Recall that Dart applications built using LinearTasking and or VerticalLayering as embodied at least partially in the DartFramework, always keep track of their exact response time needs so that efficient power management techniques such as slowing down the processor can extend the lifetime of batteries, limit the amount of energy consumed or limit the amount of heat generated on devices. In the current state of the art most applications do not keep track of their response time needs, and if they did would not be able to communicate these needs through existing layers of protocols which conform to specifications that do not include interfaces for communicating response time needs to the hardware of the device from the application.

Particular embodiments of application event driven power management are now described. Additional embodiments are set forth in the examples. In one embodiment (1), the invention provides a method for device energy and power management and energy and power consumption reduction comprising: establishing an event driven runtime environment within at least one device for which the energy and power management and consumption reduction is to be achieved; generating and maintaining at least one event queue identifying all synchronous and asynchronous processing events and associated minimum expected processing times for the processing events in the queue; and selecting a final minimum estimated response time based on the expected minimum synchronous and asynchronous event processing times in the queue.

In another embodiment (2), the invention provides a method as in (1), further comprising: searching through all the events on a first asynchronous event queue that drive all the asynchronous processing and collect the minimum time needed before any of the asynchronous events need to be processed; searching through all the events on a second synchronous event queue that drive all the synchronous processing and collect the minimum time needed before any of the synchronous events need to be processed; and determining the final minimum response time needed by selecting the lesser of the minimum time needed for the asynchronous events and the minimum time needed for the synchronous events.

In another embodiment (3), the invention provides a method as in (2), further comprising: performing power management or power consumption reduction tasks using the final minimum response time value before further processing any events.

In another embodiment (4), the invention provides a method as in (2), wherein the first asynchronous event queue and the second asynchronous event queue are the same single unified event queue.

In another embodiment (5), the invention provides a method as in (2), wherein the first asynchronous event queue and the second asynchronous event queue are different event queues.

In another embodiment (6), the invention provides a method as in (3), wherein the events are DartEvents.

In another embodiment (7), the invention provides a method as in (3), wherein both synchronous and asynchronous events are maintained on a single unified queue.

In another embodiment (8), the invention provides a method as in (7), wherein the unified queue is managed by an Interoperability Engine as described elsewhere in this specification or by the DartEngine.

In another embodiment (9), the invention provides a method as in (3), wherein the event driven runtime is an Interoperability Runtime or is a DartRuntime.

In another embodiment (10), the invention provides a method as in (3), wherein the synchronous events are queueable events which drive the synchronous processing needed to carry out the intent of the application by getting processed by the event processing units of an application that is compiled and linked.

In another embodiment (11), the invention provides a method as in (3), wherein asynchronous events are queuable events which drive the asynchronous processing needed to carry out the intent of an application, drive state machine driven hardware functions, or create, maintain, or make use of the communications of one device with another by getting processed by an Interoperability Engine or a DartEngine.

In another embodiment (12), the invention provides a method as in (3), wherein the power management and/or power consumption reduction tasks are carried out by one or more of the following in any combination: (a) making a native threaded operating system call to initiating the blocking of the current thread of execution until such time as an external stimulus or an explicit timeout based on the final minimum response time needs, or an implied or device specific timeout period has expired. (b) returning control to a calling cooperative processes which is given the time period for which no processing by the events on the queue or queues in needed. (c) directly or indirectly instructing the hardware and or processor to slow down, speed up, or shut down its clock(s) or various hardware units. (d) directly or indirectly instructing device hardware and/or processor and/or logic to control the amount of voltage and or current in one or more circuits or electrical units; and (e) any other method wherein power use is regulated based on the final minimum response time.

In another embodiment (13), the invention provides a method for device power management and/or power consumption reduction carried out at least in part by an event driven runtime, the method comprising: (1) at the start of each processing pass through an event driven application, setting a minimum response time variable to its expected highest-value, which expected highest-value is interpreted by the system as a value indicating an infinite response time need of the application event processing and any asynchronous event processing driven by events already in the runtime event queue; (2) when the first synchronous event processing unit of an application is called, the first synchronous event processing unit checking to determine if the event reference passed into the processing unit as a parameter reference points to an actual event instance to be processed; (3) if there is no event referenced, the processing unit makes a system call directly or indirectly by way of executing an instruction to request the next synchronous application event that needs processing, the system call causing the run-time to look through all the asynchronous operations that are being driven by events on the queue, and if there is an event to be processed, then processing continues at step 8. (4) asynchronous events on the queue which are ready for processing cause an operation corresponding to each asynchronous event to be executed; (5) as each asynchronous event on the queue is inspected to see if it is ready to be processed, the minimum time until the next asynchronous event will be ready to be processed is gathered in the minimum response time variable, replacing the highest wait time value with any gathered minimum time value which is less than the highest value; (6) when the system call returns, a return value is tested to determine whether there is a synchronous application event now at the head of the queue which needs to be processed by the application; (7) if there is no synchronous application event at the head of the queue which needs to be processed, then a synchronous application processing event of a type to indicate general processing is generated for application processing; (8) the synchronous application event is inspected by all application event processing units in a predefined order according to the software run-time model; (9) any synchronous application event processing unit that needs to continue processing after it processes the current synchronous event will change the minimum response time variable value to the minimum of the minimum response time variable value and that of its own continued processing unit needs; (10) when the first synchronous event processing procedure regains control, a device specific power management function is called with the minimum response time variable value as a parameter; and (11) the device specific power management function uses the value to stop, slow down, modify an operating voltage or other parameter of the power consuming components of the device until an externally generated stimulus occurs or the time specified it the parameter occurs.

In another embodiment (14), the invention further including: searching through all the events on a first asynchronous event queue that drive all the asynchronous processing and collect the minimum time needed before any of the asynchronous events need to be processed; searching through all the events on a second synchronous event queue that drive all the synchronous processing and collect the minimum time needed before any of the synchronous events need to be processed; and determining the final minimum response time needed by selecting the lesser of the minimum time needed for the asynchronous events and the minimum time needed for the synchronous events.

In another embodiment (15), the invention provides the method of (2), further comprising: (1) at the start of each processing pass through an event driven application, setting a minimum response time variable to its expected highest-value, which expected highest-value is interpreted by the system as a value indicating an infinite response time need of the application event processing and any asynchronous event processing driven by events already in the runtime event queue; (2) when the first synchronous event processing unit of an application is called, the first synchronous event processing unit checking to determine if the event reference passed into the processing unit as a parameter reference points to an actual event instance to be processed; (3) if there is no event referenced, the processing unit makes a system call directly or indirectly by way of executing an instruction to request the next synchronous application event that needs processing, the system call causing the run-time to look through all the asynchronous operations that are being driven by events on the queue, and if there is an event to be processed, then processing continues at step 8 of the procedure; (4) asynchronous events on the queue which are ready for processing cause an operation corresponding to each asynchronous event to be executed; (5) as each asynchronous event on the queue is inspected to see if it is ready to be processed, the minimum time until the next asynchronous event will be ready to be processed is gathered in the minimum response time variable, replacing the highest wait time value with any gathered minimum time value which is less than the highest value; (6) when the system call returns, a return value is tested to determine whether there is a synchronous application event now at the head of the queue which needs to be processed by the application; (7) if there is no synchronous application event at the head of the queue which needs to be processed, then a synchronous application processing event of a type to indicate general processing is generated for application processing; (8) the synchronous application event is inspected by all application event processing units in a predefined order according to the software run-time model; (9) any synchronous application event processing unit that needs to continue processing after it processes the current synchronous event will change the minimum response time variable value to the minimum of the minimum response time variable value and that of its own continued processing unit needs; (10) when the first synchronous event processing procedure regains control, a device specific power management function is called with the minimum response time variable value as a parameter; and (11) the device specific power management function uses the value to stop, slow down, modify an operating voltage or other parameter of the power consuming components of the device until an externally generated stimulus occurs or the time specified it the parameter occurs.

In another embodiment (16), the invention provides the method of (13), wherein the synchronous events are processed by Dart Gizmo class instances or instances of classes that inherit directly or indirectly from the Dart Gizmo class.

In another embodiment (17), the invention provides the method of (15), wherein the synchronous events are processed by Dart Gizmo class instances or instances of classes that inherit directly or indirectly from the Dart Gizmo class.

In another embodiment (18), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for device energy and power management and energy and power consumption reduction of the computer system or information appliance, the program module including instructions for: establishing an event driven runtime environment within at least one device for which the energy and power management and consumption reduction is to be achieved; generating and maintaining at least one event queue identifying all synchronous and asynchronous processing events and associated minimum expected processing times for the processing events in the queue; and selecting a final minimum estimated response time based on the expected minimum synchronous and asynchronous event processing times in the queue.

In another embodiment (19), the invention provides a computer program product as in (18), further comprising instructions for: searching through all the events on a first asynchronous event queue that drive all the asynchronous processing and collect the minimum time needed before any of the asynchronous events need to be processed; searching through all the events on a second synchronous event queue that drive all the synchronous processing and collect the minimum time needed before any of the synchronous events need to be processed; and determining the final minimum response time needed by selecting the lesser of the minimum time needed for the asynchronous events and the minimum time needed for the synchronous events.

In another embodiment (20), the invention provides a computer program product as in (19), further comprising instructions for: performing power management or power consumption reduction tasks using the final minimum response time value before further processing any events.

In another embodiment (21), the invention provides an apparatus for energy and power management and energy and power consumption reduction within at least one device, the apparatus comprising: a logic circuit within the at least one device utilizing energy and power to perform a logic processing operation; means for establishing an event driven runtime environment within at the least one device for which the energy and power management and consumption reduction is to be achieved; means for generating and maintaining at least one event queue identifying all synchronous and asynchronous processing events and associated minimum expected processing times for the processing events in the queue; means for selecting a final minimum estimated response time based on the expected minimum synchronous and asynchronous event processing times in the queue; and means for searching through all the events on a first asynchronous event queue that drive all the asynchronous processing and collect the minimum time needed before any of the asynchronous events need to be processed; means for searching through all the events on a second synchronous event queue that drive all the synchronous processing and collect the minimum time needed before any of the synchronous events need to be processed; means for determining the final minimum response time needed by selecting the lesser of the minimum time needed for the asynchronous events and the minimum time needed for the synchronous events; and means for performing power management or power consumption reduction tasks for the logic circuit using the final minimum response time value before further processing any events.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XII. Interoperability Application Event Driven Error Recovery

Recall that device to device wireless communications connections are often unreliable due to interference, distance limitations, and abrupt shutdowns due to low battery power. In conventional horizontally layered protocol software implementations on devices a fatal error in any one layer will result in unrecoverable errors which will be difficult for an application to recover from, both because the application does not have standard interfaces to easily reestablish the connections and contexts of the connections, and because conventional application programs do not have much infrastructure for tracking and reestablishing shared state between applications running on different devices. The DartFramework keeps track of shared state, renditioning can be used to easily reestablish lost state between devices and VerticalLayering makes it simple for communications errors to be relayed to the Dart and for the Dart to relay recovery information directly to the communications processing units. Thus Darts running across devices can seamlessly recover from intermittent complete losses of communications between cooperating devices and the recovery of the shared state of the devices when the connection is restored even where the previously lost device has itself lost all its application state.

Additional embodiments of Interoperability application event driven error recovery are now described. In one embodiment (1), the invention provides a method for gracefully continuing an operation in an environment of lost or intermittent communications), wherein an event driven interoperability application package running cooperatively across multiple teamed devices gracefully continues its operations and/or partially recovers from temporarily loosing communications with devices that are part of the team, the method comprising: (1) generating a communications session lost type event instance on a team member device when communication from the team member device to a teamed device is lost or interrupted and cannot be reestablished within a predetermined or dynamically determined time period and wherein each team member and teamed device is carrying out part of the intent of an application package; (2) sending the communications session lost type event is directly or via a queue of events which drives synchronous operations of the application package to the application event processing unit which handles communications session lost events; (3) the event processing unit of the application package modifying the behavior of the application package where possible to continue its operations without the teamed device with which communications has been lost or interrupted; (4) generating a communications session recovered type event instance on the team member device when the communication is restored between the team member and teamed devices; (5) the communications session recovered type event being sent directly or via a queue of events which drives the synchronous operations of the application to the application event processing unit which handles recovered communications sessions; (6) the event processing unit of the application then causing the team member device to send whatever code, data, and/or content is needed to bring the teamed device into synchronization with the rest of the event driven interoperability application; and (7) the event processing unit of the application then modifying the behavior of the application package to include the now recovered teamed device in the process of carrying out the intent of the application.

In another embodiment (2), the invention provides the method of (1), wherein one or more of the following are true in any combination: (1) the event driven interoperability application package conforms to the interoperability format or is the DartFormat; (2) the interoperability application is as described elsewhere in this detailed description or the interoperability package is a Dart; (3) the recruitment method is used to establish the running cooperatively across multiple teamed devices; (4) the events are or include DARTEvents; (5) the event processing unit is a Dart Gizmo class instance, or an instance of any class which inherits directly or indirectly from the Dart Gizmo class; (6) the coordination and synchronization of events is carried out on each device by an interoperability engine or is carried out by the DartEngine; and (7) the coordination and synchronization of events on and between devices is carried out according to an interoperability runtime or the DartRuntime.

In another embodiment (3), the invention provides the method of (1), wherein the modified behavior of the application to continue its operations without the teamed device is optionally selected from the set of modifications consisting of one or more of the following in any combination: (1) the device which is lost is simply displaying status allowing the application to continue without the display; (2) the functions being done by the lost device are redundant and are therefore not required to carry out the intent of the application; (3) the functions being done by the lost device can be performed instead by any remaining member or members of the team; (4) the functions being done by the lost device can be performed instead by another device reachable by the team, and which can then be recruited into the team; (5) the functionality of the remaining teamed devices can proceed in a reduced mode of operation; and (6) any combination of the above.

In another embodiment (4), the invention provides the method of (1), wherein the connection is lost due to any one or more of these factors alone or in any combination: (1) battery power gets low or runs out and the device shuts down its communications, or the entire device is shut down, and or the device stops functioning; (2) a user or other automated or non-automated process causes the device to stop functioning as part of the team without smoothly shutting down the application; (3) the device or communications protocol stops functioning correctly for any reason other than an orderly shutdown of the part of the application running on the device; (4) the device is reset; (5) the device goes out of range of the wireless protocol being used; (6) the device looses line of sight needed to maintain communication over a directional protocol; (7) interference by signals or objects which block the communications; and (8) any combination of the above.

In another embodiment (5), the invention provides the method of (1), wherein a hierarchy of event processing units comprise a hierarchy of processing units that include at least one Dart Gizmo processing unit or many Dart GizmQ processing units arranged in a graph with processing sequenced and coordinated using linear tasking.

In another embodiment (6), the invention provides the method of (1), wherein continuing or recovering is performed over a team of cooperating devices when connections are lost is carried out through the use of the DartFramework, the DartRuntime, and/or the DartEngine.

In another embodiment (7), the invention provides the method of (6), wherein Darts built using the DartFramework and run on a Dart Player do not need any application specific special programming to support robust multi-device application, data, and communications session recovery.

In another embodiment (8), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for gracefully continuing an operation in a processing environment of lost or intermittent communications), wherein an event driven interoperability application package running cooperatively across multiple teamed devices gracefully continues its operations and/or partially recovers from temporarily loosing communications with devices that are part of the team, the program module including instructions for: (1) generating a communications session lost type event instance on a team member device when communication from the team member device to a teamed device is lost or interrupted and cannot be reestablished within a predetermined or dynamically determined time period and wherein each team member and teamed device is carrying out part of the intent of an application package; (2) sending the communications session lost type event is directly or via a queue of events which drives synchronous operations of the application package to the application event processing unit which handles communications session lost events; (3) the event processing unit of the application package modifying the behavior of the application package where possible to continue its operations without the teamed device with which communications has been lost or interrupted; (4) generating a communications session recovered type event instance on the team member device when the communication is restored between the team member and teamed devices; (5) the communications session recovered type event being sent directly or via a queue of events which drives the synchronous operations of the application to the application event processing unit which handles recovered communications sessions; (6) the event processing unit of the application then causing the team member device to send whatever code, data, and/or content is needed to bring the teamed device into synchronization with the rest of the event driven interoperability application; and (7) the event processing unit of the application then modifying the behavior of the application package to include the now recovered teamed device in the process of carrying out the intent of the application.

In another embodiment (9), the invention provides an apparatus capable of gracefully continuing an operation in an environment of lost or intermittent communications with another teamed device), wherein an event driven interoperability application package running cooperatively across multiple teamed devices gracefully continues its operations and/or partially recovers from temporarily loosing communications with other teamed devices that are part of the team, the apparatus comprising: a processor or processing logic and a memory coupled with the processor or processing logic; logic means generating a communications session lost type event instance on a team member device when communication from the team member device to a teamed device is lost or interrupted and cannot be reestablished within a predetermined or dynamically determined time period and wherein each team member and teamed device is carrying out part of the intent of an application package; first communications means sending the communications session lost type event is directly or via a queue of events which drives synchronous operations of the application package to the application event processing unit which handles communications session lost events; an event processing unit of the application package for modifying the behavior of the application package where possible to continue its operations without the teamed device with which communications has been lost or interrupted; second communications means generating a communications session recovered type event instance on the team member device when the communication is restored between the team member and teamed devices; the communications session recovered type event being sent directly or via a queue of events which drives the synchronous operations of the application to the application event processing unit which handles recovered communications sessions; the event processing unit of the application causing the team member device to send whatever code, data, and/or content is needed to bring the teamed device into synchronization with the rest of the event driven interoperability application; and the event processing unit of the application then modifying the behavior of the application package to include the now recovered teamed device in the process of carrying out the intent of the application.

In another embodiment (10), the invention provides the apparatus as in (9), wherein the apparatus comprises at least one of a computer, a music player, a media player, a personal data appliance (PDA), an information appliance, a printer, a recorder, a mobile or cellular telephone, a camera, an electrical appliance, or any combination of these.

In another embodiment (11), the invention provides the apparatus of (9), wherein one or more of the following are true in any combination: (1) the event driven interoperability application package conforms to the interoperability format or is the DartFormat; (2) the interoperability application is a Dart; (3) the recruitment method is used to establish the running cooperatively across multiple teamed devices; (4) the events are or include DARTEvents; (5) the event processing unit is a-Dart Gizmo class instance, or an instance of any class which inherits directly or indirectly from the Dart Gizmo class; (6) the coordination and synchronization of events is carried out on each device by an interoperability engine or is carried out by the DartEngine; and (7) the coordination and synchronization of events on and between devices is carried out according to an interoperability runtime or the DartRuntime.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XIII. Interoperability Instruction Set

In another aspect, the invention provides an interoperability method, software, and instruction set. Software or hardware that implement an Interoperability Instruction Set (IIS) is an efficient methodology for implementing a common procedural environment as benefited to the: (i) Recruitment model for teaming and spreading or distributing an application; (ii) for allowing unmodified applications to run on otherwise dissimilar devices; and (iii) for exposing the unique resources, unique capabilities and/or unique content to other applications and devices.

Figure 22:
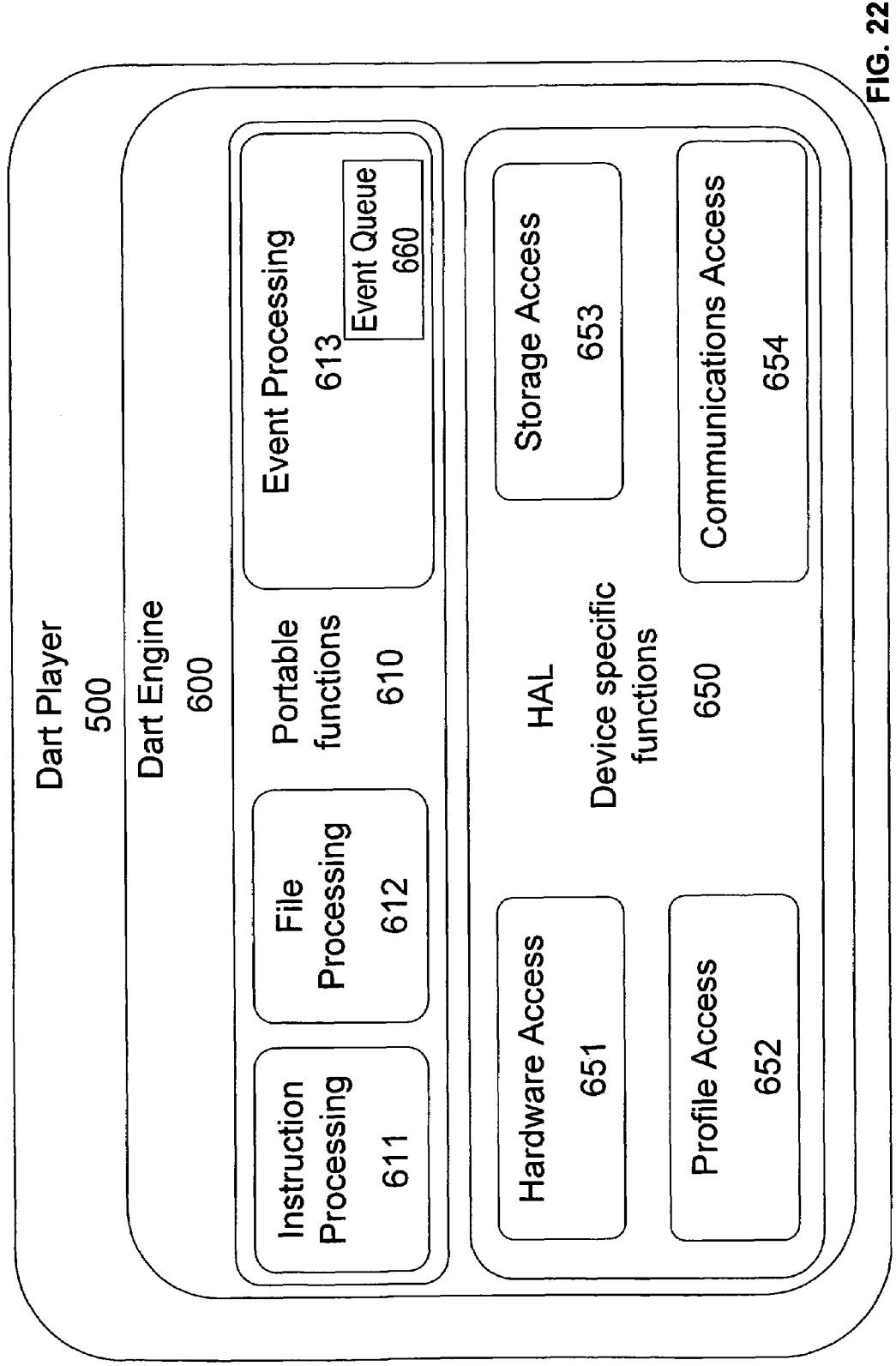
FIG. 22 is an illustration showing a block diagram illustrating an exemplary embodiment of a DartPlayer and the two main components of a particular implementation of an embodiment of a DartEngine, namely a portable component, and the non-portable Hardware Abstraction Layer component.

In one advantageous embodiment and implementation of the invention, the interoperability instruction-set is the Dart instruction set (DartInstructionSet) as embodied in or compatible with the Dart engine (DartEngine FIG. 22 600).

It will be appreciated that components of computer and information systems and devices may be implemented in hardware, firmware, and/or software, and that there is often a design and implementation choice as to which of hardware, firmware, or software to use for a particular component of a particular implementation. So it is with the Dart engine and the interoperability instruction set. Therefore it may be appreciated that although certain components of certain embodiments may be described in terms of one of hardware, firmware, or software; alternative embodiments may use different combinations of hardware, firmware, or software to provide the means for accomplishing the desired function or result.

Figure 4:
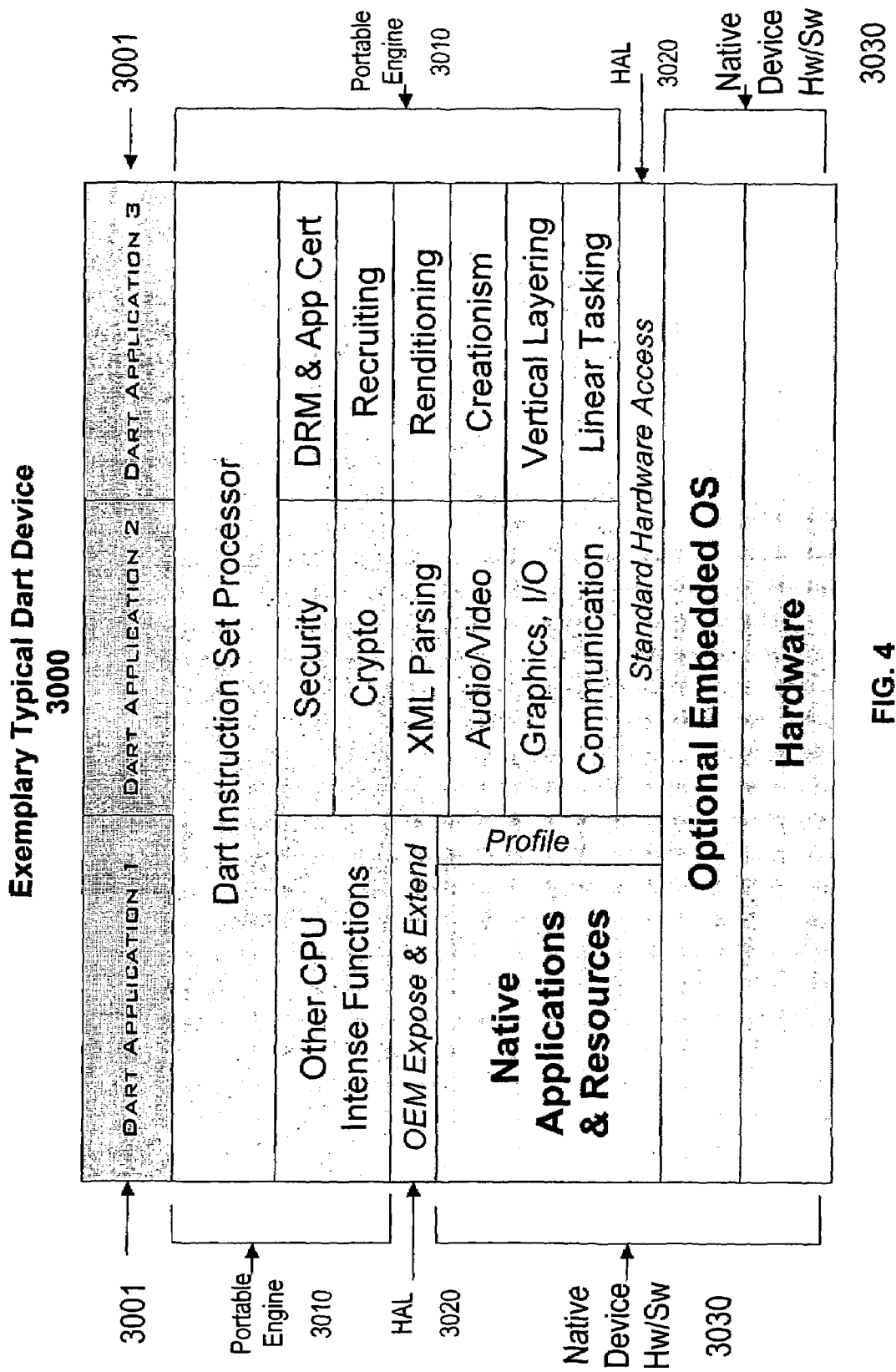
FIG. 4 is an illustration showing an exemplary typical DartDevice overview according to an embodiment of the invention.

In one exemplary embodiment, the hardware and/or software for carrying out an Interoperability Instruction-set is comprised of eleven components, though the components and functions may be grouped differently so that the number is not determinative of the structure or operation of the engine or instruction set (see FIG. 4 3010).

First, a processor or central processing unit (CPU), memory, and input output (I/O) capabilities for programs to run or execute on, and to support communications to and from systems, devices, networks and the like outside or external to the device.

Second, there should be memory access, computation, test and branch, input/output instructions to carry out at least conventional general purpose computing tasks.

Third, there are advantageously provided interoperability performance enhancing instructions used to extend the practical reach of common binary applications and Renditions to lower performance devices.

Fourth, there are advantageously provided interoperability instructions to carry out the Dart methodologies of Recruitment, Renditioning, Creationism, Vertical Layering, Linear Tasking, Social Synchronization, Social Security, and VirtualPointers although as described elsewhere herein not all of these Dart components are required for all embodiments of implementations.

Fifth, there are also advantageously provided certain unique capability instructions that are operative to expose any characteristics, resources, capabilities, and/or functions possessed by or accessible from of a particular device to software applications and other devices.

Sixth, security maintenance instructions are advantageously provided to control and otherwise access the setting of security features, the grouping of devices with a particular set of cross device access rights, and/or setting the access rights for applications to devices and/or resources.

Seventh, containment instructions, such as Dart containment (DartContainment) instructions, are also advantageously provided to allow Darts or Dart compatible instructions to effectively extend the execution of an originating Dart across other separately generated Darts that are collected, maintained, and run as part of the operation of the originating Dart.

Eighth, common user-interface (UI) instructions are advantageously provided for one or more of decoding, encoding, compressing and decompressing and manipulating and rendering pictures, bitmaps, sounds, input events, text rendering, and other such operations.

Ninth, communications instructions are advantageously provided for example, for opening, closing, and maintaining sessions and the data that goes across the sessions.

Tenth, storage instructions are advantageously provided to control and maintain access to storage, storage devices, storage resources, and the like.

Eleventh, compatibility instructions are advantageously provided to convert or transcode between differing formats or parameters of data, content and/or code.

The advantages of an Interoperability Instruction-set over other common methodologies, such as for example the use of virtual machines, is that the interoperability instruction set (and particularly the Dart Interoperability Instruction Set) is designed and optimized to perform all necessary interoperability operations as instructions that are dispatched to functions which are compiled or assembled into the native code of the device processor. In one embodiment that includes some optional features and capabilities, the Interoperability Instruction-set should have most if not all of the following: (ii) Recruitment instructions, (ii) Profile instructions, (iii) Synchronizing instructions, (iv) user-interface or UI and graphics instructions, (v) power management instructions, (vi) Connection and Session management instructions, (vii) Storage instructions, (viii) Rendition instructions, (ix) Creationism instructions, (x) application parts management instructions, (xi) cryptographic large number math instructions, (xii) Text and/or symbol parsing instructions, (xiii) Virtual Pointer management instructions, and (xiv) instructions that are capable of exposing unique capabilities of the device to DARTs and thereby to any other DartDevices or Dart compatible devices.

Additional particular embodiments of the interoperability instruction set are now described. In one embodiment (1), the invention provides an apparatus for effecting an interoperability instruction set (IIS), the apparatus comprising: a processor, a memory coupled to the processor, and an input/output (I/O) interface to support communications with the processor by an entity external to the apparatus; execution supportive interoperability means for carrying-out methodologies involving at least one of recruitment, renditioning, creationism, vertical layering, linear-tasking, social synchronization, and social security; and communications interoperability instructions for opening and maintaining a communication session and the procedures, data, content or other information that goes between communicating devices during the communication session.

In another embodiment (2), the invention provides an apparatus as in (2), wherein: the execution supportive interoperability means comprises interoperability instructions for carrying-out the methodologies.

In another embodiment (3), the invention provides an apparatus as in (1), wherein one or more of the following are true: recruitment is as described elsewhere in this detailed description; renditioning is as described elsewhere in this detailed description; creationism is as described elsewhere in this detailed description; vertical layering is as described elsewhere in this detailed description; liner tasking is as described elsewhere in this detailed description; social synchronization is as described in elsewhere in this detailed description; and social security is as described elsewhere in this detailed description.

In another embodiment (4), the invention provides the apparatus of (1), wherein the instruction set includes one or more of the Dart instructions selected from the set consisting of BUILTIN_INSTRUCTION, OEM_BUILTIN_INSTRUCTION, PROFILE_INSTRUCTION, and SAVE_INSTRUCTION.

In another embodiment (5), the invention provides the apparatus of (1), wherein the Interoperability Instruction Set is the DartInstructionSet and is carried out by an Interoperability Engine.

In another embodiment (6), the invention provides the apparatus of (5), wherein the Interoperability Engine is a DartEngine.

In another embodiment (7), the invention provides the apparatus of (1), wherein the instruction set is embodied in one or more of: (1) a software product running on a processor with a different native instruction set, whether the native instruction set is embodied in hardware, software, firmware, microcode, hardware logic or any combination thereof; (2) firmware, or microcode coordinating and directing the activities of hardware logic units; (3) hardware logic; or (4) any combination of these.

In another embodiment (8), the invention provides the apparatus in (1), further comprising: common user interface (UI) interoperability means for manipulating text, symbolic information, and images.

In another embodiment (9), the invention provides the apparatus in (8), wherein: the common user interface interoperability means comprise common user interface interoperability instructions; and the user interface interoperability instructions include instructions for at least one of decoding, encoding, compressing and decompressing and manipulating and rendering pictures, bitmaps, sounds, input events, text, symbols, audio/video, or other digitally encoded entity, and any combination of one or more of these.

In another embodiment (10), the invention provides the apparatus in (1), further comprising: a processor or CPU, memory coupled to the processor or CPU, and an input/output (I/O) interface being operable to support communications with the processor by an entity external to the apparatus.

In another embodiment (11), the invention provides the apparatus in (1), further comprising: an operating environment associated with the processor, memory, and input/output interface for performing memory access, computation, test and branch, and input/output instructions at least for carrying out general purpose computing tasks.

In another embodiment (12), the invention provides the apparatus in (1), further comprising: device performance enhancing interoperability means used to extend the practical reach of common binary applications and renditions to lower performance devices because the instructions are implemented and executed in the native code format of a physical processor or CPU of the device as part of the engine, rather then by a sequence of slower executing emulated instructions of the application program used for binary compatibility.

In another embodiment (13), the invention provides the apparatus of (12), wherein the performance enhancing interoperability means (instructions) include instructions for one or more of the following: CPU intensive cryptographic operations on large numbers including one or more of multiplication, division, addition, subtraction, exponentiation, modular exponentiation, hashing, random number generation, digital signature generation and verification, key pair generation, the encoding and decoding of data to be secured or read, and any instruction or set of instructions performing a combination of any two or more of these.

In another embodiment (14), the invention provides the apparatus of (13), wherein the processor or CPU intensive cryptographic operations on large numbers include operations involving individual numbers that must be stored in multiple memory words to assure that the values can be accurately and precisely represented and or to ensure a proper degree of security.

In another embodiment (15), the invention provides the apparatus of (12), wherein the performance enhancing interoperability means are for performing one or more of the following CPU intensive graphics operations: bitmap copying, bitmap scaling, bitmap stretching, bitmap transposing, bitmap blending, bitmap filling, curve generation, line generation, circle generation, polygon rendering, piecewise linear curve generation or rendering, hit detection, font character generation and placement, and any combination of these.

In another embodiment (16), the invention provides the apparatus of (12), wherein the performance enhancing interoperability means (instructions) are for performing one or more of the following CPU intensive text or symbol processing operations: XML parsing, text searching, text insertion, text deletion, text database operations, text-to-text representation conversions, text manipulation, text-to-symbol manipulation, symbol-to-symbol manipulation, and any combination of these.

In another embodiment (17), the invention provides the apparatus of (12), wherein the performance enhancing interoperability means are for performing one or more of the following CPU intensive media processing operations: audio decompression, video decompression, picture decompression, dataset decompression, audio compression, video compression, picture compression, dataset compression, digital image processing, digital audio processing, dataset processing, database operations and any combination of these.

In another embodiment (18), the invention provides the apparatus in (1), further comprising: capabilities exposing interoperability means for exposing any characteristics and functions, including any unique capabilities and functions, of a particular device to software and/or firmware applications and other devices that are being teamed or have been teamed through the use of the recruitment procedure or methodology.

In another embodiment (19), the invention provides the apparatus in (1), further comprising: security maintenance interoperability instructions for accessing and setting or resetting of: security features, grouping of devices with a particular set of cross device access rights, and access rights for applications to devices and resources.

In another embodiment (20), the invention provides the apparatus in (1), further comprising: containment interoperability means allow separately generated Darts or executable procedures, to dynamically become part of the linear tasking based runtime environment of other Darts or executable procedures, whether as a child that inherits its environment from its parent or as a parent which provides its runtime environment to any child, or where the generated Dart or executable procedure serve as both parent and child of other executable procedures.

In another embodiment (21), the invention provides the apparatus in (1), further comprising: containment (DartContainment) interoperability instructions to allow separately generated Darts, whether generated by one or more DartTools or by Dart Creationism, to dynamically become part of the Linear Tasking based DartRuntime of other Darts, whether as a child Dart that inherits its environment from its parent Dart or as a parent Dart which provides its runtime environment to any child Darts, or where the generated Darts serve as both parent and child of other Darts.

In another embodiment (22), the invention provides the apparatus in (1), wherein: Darts effectively extend the execution of an originating Dart across other separately generated Darts that are collected, maintained and/or run as part of the operation of the originating Dart.

In another embodiment (23), the invention provides the apparatus in (1), further comprising: storage interoperability instruction means for accessing digital data storage devices and optionally including any one or more of hard disk drives, battery backed up memory, flash storage devices, or other devices which can preserve data while the main power is removed or turned off on the device.

In another embodiment (24), the invention provides the apparatus in (1), further comprising: compatibility interoperability means (instructions) for signaling, retiring and otherwise managing DartEvents or events and an event queue (EventQueue) or DartEventQueue which drives asynchronous and or synchronous processing of a Dart executing across one or more devices.

In another embodiment (25), the invention provides the apparatus in (1), further comprising: unique capabilities instructions to expose any characteristics and functions of a particular device to software applications and other devices.

In another embodiment (26), the invention provides the apparatus in (25), wherein the unique capabilities instructions may include an instruction selected from the set of instructions consisting of: a Dart PROFILE_INSTRUCTION that takes one or more IDs for a resource or capability and returns a value, structured values, or a list of structured values.

In another embodiment (27), the invention provides the apparatus in (26), wherein the ID may be just a scalar value pre-assigned to indicate a particular resource or capability, or a major scalar value indicating the general category plus a scalar minor value, or the ID may contain a plurality of scalar values containing any combination of a manufacturer id, major category and minor category.

In another embodiment (28), the invention provides the apparatus in (27), wherein one of the major scalar values is a manufacturer ID scalar value that is assigned with a single unique value for every different manufacturer and used to separate the ID values so those specific to a manufacturer can not conflict with those specific to a different other manufacturers' IDs for resources or capabilities.

In another embodiment (29), the invention provides the apparatus in (25), wherein the unique capabilities instructions include an original equipment manufacturer OEM instruction which takes as a parameter a manufacturer ID scalar value, a parameter block specifying the operation to be performed and all the parameters needed to carry out a particular unique application program interface to the unique capabilities.

In another embodiment (30), the invention provides the apparatus in (25), wherein the original equipment manufacturer (OEM) instruction comprises a Dart OEM_BUILTIN_INSTRUCTION instruction.

In another embodiment (31), the invention provides the apparatus in (27), wherein any other instructions that are part of any non-Dart interoperability instruction set is used to expose unique resources and capabilities of a device through a manufacturer specified application program interface.

In another embodiment (32), the invention provides the apparatus in (31), further comprising other instructions that are part of any non-Dart interoperability instruction set performs and or is used to expose unique resources and capabilities of a device, that operate analogously to the Dart PROFILE_INSTRUCTION and the Dart OEM_BUILTIN_INSTRUCTION instruction.

In another embodiment (33), the invention provides the apparatus in (31), further comprising an instruction set creating a common procedural environment across homogeneous and heterogeneous devices, the instruction set comprising: a plurality of instructions designed and optimized to perform all necessary interoperability operations between and among any of a plurality of homogeneous and heterogeneous devices; and the instructions being dispatched to functions which are compiled or assembled into the native code of the processor of the destination device.

In another embodiment (34), the invention provides an interoperability instruction set creating a common procedural environment across homogeneous and heterogeneous devices, the instruction set comprising: a plurality of instructions designed and optimized to perform all necessary interoperability operations between and among any of a plurality of homogeneous and heterogeneous devices; and the instructions being dispatched to functions which are compiled or assembled into the native code of the processor of the destination device.

In another embodiment (35), the invention provides an interoperability instruction set as in (34), wherein the interoperability instruction set comprises the Dart instruction set as implemented in the DartEngine of a DartPlayer running on one or more DartDevices.

In another embodiment (36), the invention provides an interoperability instruction set as in (34), wherein the interoperability instruction set executes in a portable engine creating a common procedural environment in the devices for executing at least one of a device resource and capability recruitment application and another application unmodified to execute on the dissimilar heterogeneous device.

In another embodiment (37), the invention provides an interoperability instruction set as in (34), wherein the interoperability instruction set includes at least one and any combination of the following instructions: recruitment instructions, profile instructions, synchronizing instructions, user interface (ui) and graphics instructions, power management instructions, connection and session management instructions, storage instructions, rendition instructions, creationism instructions, and application parts management instructions.

In another embodiment (38), the invention provides an interoperability instruction set as in (34), wherein the addressing field or fields of the instruction can reference at least: (1) a registers address space, whether or not disjoint from the other address spaces; (2) a main data address space, whether or not disjoint from the other address spaces; (3) a stack address space, whether or not disjoint from the other address spaces; and (4) an application heap address space, whether or not disjoint from the other address spaces.

In another embodiment (39), the invention provides an interoperability instruction set as in (38), wherein the addressing field or fields of the instruction can further reference: (5) one or more of the following additional address spaces in any combination: (i) one or more disjoint virtual pointer address spaces; (ii) a separate application heap element address space; (iii) a virtualized local address space to the current function data space which is a contiguous subset of another address space; and (iv) one or more virtualized object instance address spaces which are contiguous subsets of other address spaces.

In another embodiment (40), the invention provides an interoperability instruction set as in (38), wherein all address spaces are addressed by an N bit number, and a number of bits, M, of the N bits specify which of different possible 2 to the M power of address spaces the N-M remaining bits is actually referencing.

In another embodiment (41), the invention provides an interoperability instruction set as in (39), wherein all address spaces are addressed by an N bit number, and a number of bits, M, of the N bits specify which of different possible 2 to the M power of address spaces the N-M remaining bits is actually referencing.

In another embodiment (42), the invention provides ah interoperability instruction set as in (40), where the address space is actually in units of 2 to the power of M of the native processor's smallest directly accessible words so that using the N-M address space can still specify the entire direct address space of the native processor, only without the ability to directly address units of memory smaller then 2 to the power of M.

In another embodiment (43), the invention provides an interoperability instruction set as in (38), wherein virtual address pointer address spaces are used.

In another embodiment (44), the invention provides an interoperability instruction set as in (38), where the decoding of the address fields of instructions for data or code in any or all of the address spaces is checked by the processor decoding the instructions to ensure that no access will take place outside of the currently restricted bounds of the underlying memory, or other hardware accessible through the use of the decoded address fields.

In another embodiment (45), the invention provides the apparatus of (1), wherein the instruction set includes instructions used to access to a file system that supports traditional hard files and one or more of the following types of files in any combination: (i) a memory file; (ii) a subfile file; (iii) a part subfile file; (iv) a part descriptor overriding file; and (v) any combination or sequential or non-sequential layering of these types of files.

In another embodiment (46), the invention provides the apparatus of (45), wherein the memory file is a virtualized a traditional hardfile accessible through the same methods for accessing a hardfile but where the data is kept in changeable main memory of a processor rather than on traditional hard storage such as a hard disk drive or other physical device other than the type commonly used for main memory access of processors.

In another embodiment (47), the invention provides the apparatus of (45), wherein the subfile file is a virtualized file representing a linear contiguous range of data inside another file, and where the linear contiguous range is virtualized as beginning at a logical offset of zero, before which there is no data, and the end of the range is bounded by the offset representing the length of the range of data, at and beyond which there is no data.

In another embodiment (48), the invention provides the apparatus of (45), wherein the part subfile file is a subfile which represents a logical individually addressable part inside a file holding an application package of one or more independently executable images.

In another embodiment (49), the invention provides the apparatus of (45), wherein the part descriptor overriding file), where it exists with the same identifier value as does a specific part, will serve to override any or existing data which once represented the part, whether the existing data is inside a file holding an application package of one or more independently executable images or it is inside any other separate file.

In another embodiment (50), the invention provides the apparatus of (49), wherein the part descriptor overriding file is used to logically replace old data for a part without the need to change the existing data inside other files.

In another embodiment (51), the invention provides the apparatus of (49), wherein the part descriptor overriding file can represent the data for a part as being one of: logically deleted or non-existent; physically stored elsewhere or in another file as identified in the descriptor overriding file; representative of the access rights or allowed usage of the part data; and represented inside the descriptor file itself.

In another embodiment (52), the invention provides a method for effecting an interoperability instruction set (IIS) in an apparatus, the method comprising: providing a processor and memory coupled to the processor, and an input/output (I/O) interface to support communications with the processor by an entity external to the apparatus; supporting execution interoperability methodologies involving at least one of a recruitment procedure, a renditioning procedure, a creationism procedure, a vertical layering procedure, a linear-tasking procedure, a social synchronization procedure, and a social security procedure; and providing communications interoperability instructions for opening and maintaining a communication session and the procedures, data, content and/or other information that may be exchanged between communicating devices during a communication session.

In another embodiment (53), the invention provides a method as in (52), wherein: the execution interoperability methodology comprises at least one interoperability instruction for carrying-out the interoperability methodology.

In another embodiment (55), the invention provides a computer program product for use in conjunction with a computer system or information appliance, the computer program product comprising a computer readable storage medium and a computer program mechanism embedded therein, the computer program mechanism comprising: a program module that directs the computer system or information appliance having a processor and memory coupled to the processor and an input/output (I/O) interface to support communications with the processor by an entity external to the apparatus, to function in a specified manner for effecting an interoperability instruction set (IIS) in an apparatus, the program module including instructions for: supporting execution interoperability methodologies involving at least one of a recruitment procedure, a rendititioning procedure, a creationism procedure, a vertical layering procedure, a linear-tasking procedure, a social synchronization procedure, and a social security procedure; and providing communications interoperability instructions for opening and maintaining a communication session and the procedures, data, content and/or other information that may be exchanged between communicating devices during a communication session.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XIV. Creationism

In another aspect of the invention, system, apparatus, method and computer program for Creationism are provided. Creationism includes a methodology which enables an interoperability application to create other interoperability applications, which in turn can create still more interoperability applications. This allows for the efficient dynamic generation and distribution of application, data and content in differing forms across a world of connected and intermittently connected devices.

In the one advantageous embodiment and implementation, this is the ability for Darts to create other Darts (FIG. 12 700) or Dart procedures (DartProcedures FIG. 14 4000) which can then create still other Darts or DartProcedures. Creationism is embodied throughout the Dart Platform (DartPlatform FIG. 3). For example, the Dart tools (DartTools FIG. 3 200) allow for the specification of Parts in the source code, and compile the source code into a DartMaster (FIG. 12 230) containing these Parts. The DartMaster when played on a MasterPlayer (FIG. 12 203) can collect more resources if necessary and provide the user interface for requesting any needed information on which Renditions and parts to include in the output Dart or DartProcedure.

Any Dart running on any Dart Player can include instructions from the DartInstructionSet supported in the DartEngine to dynamically form Renditions from Parts and package them together efficiently into DartFormat files. This process of Dart creation of customized Darts can go on indefinitely so long as the created Darts and Procedures are formed with the data, content and procedures necessary to do so.

Creationism provides a method, associated procedures and computer program code and product for enabling an interoperability application to create other interoperability applications, which in turn can create still more interoperability applications in a recursive and or serial and or fanout manner. Tools are provided for compiling source code (FIG. 3 100) and optionally source data and/or source resources into a binary image containing at least one Rendition. It also uses and may provide executable instructions and/or application programming interface(s) for dynamically assembling digital parts into a binary image containing a set of Renditions (e.g. Dart Renditions) and parts that control how the Renditions are to be assembled based on the communications capabilities, device characteristics and environment of a target device.

Figure 12:
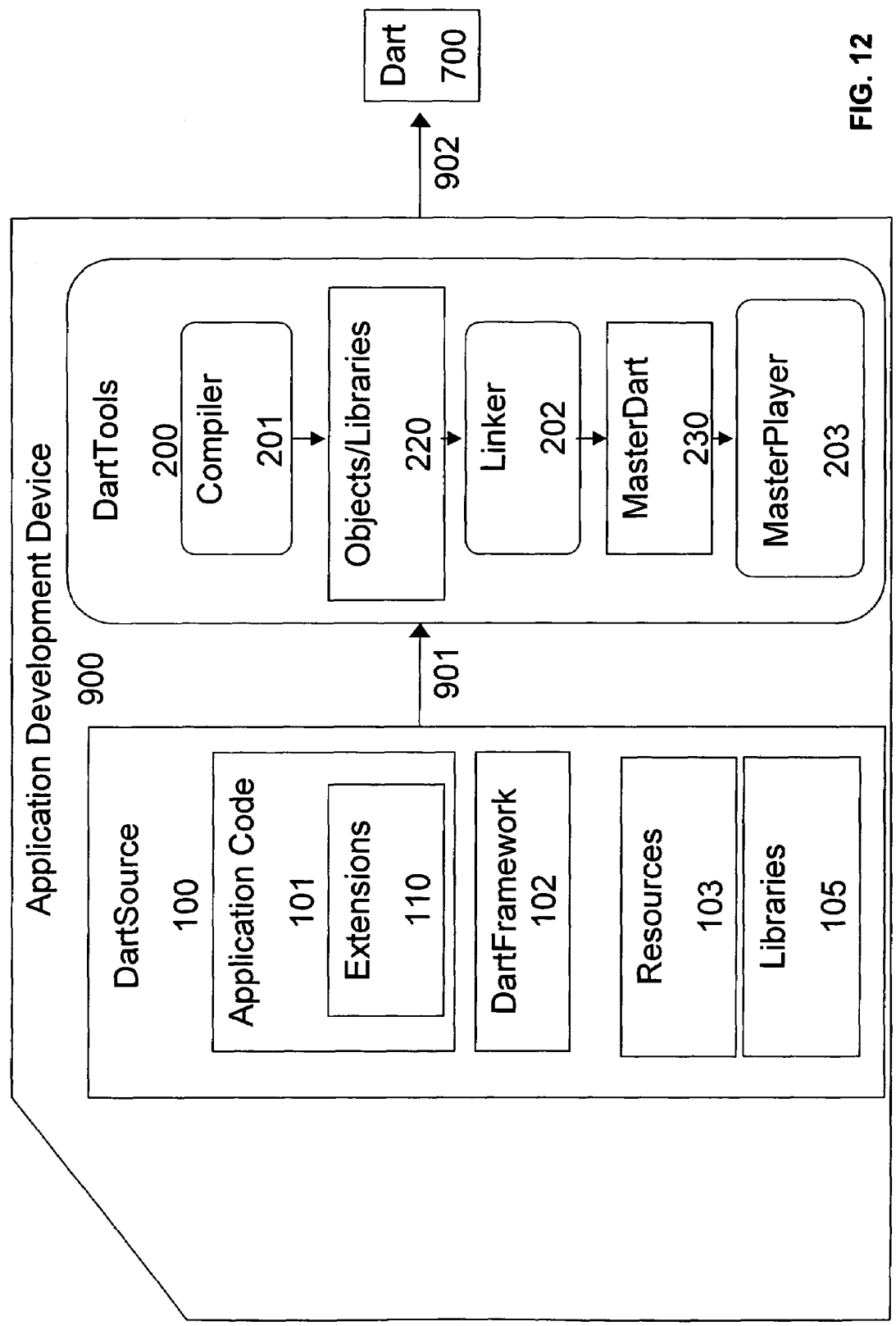
FIG. 12 is an illustration showing a block diagram illustrating an application development device and its static and procedural components used to produce a Dart application.

The tools may include Dart Tools (FIG. 12 200). The binary image may include or consist of a Dart in the Dart format (FIG. 3 300, FIG. 13, FIG. 14), or may be a differently formatted binary image or an image encoded in a non-binary form. The digital parts may be procedures, data sets, and/or content of any type or form expressed as a structured sequence of numbers.

Additional particular embodiments of creationism are now set forth. In one embodiment (1), the invention provides a method for enabling an initial individually executable image or package of individually executable images to dynamically generate at least one other target individually executable data image or package of individually executable data images to carry out the intent of the initial executable image or package of individually executable images, the method comprising: (1) collecting first information about at least one of the characteristics, content, resources, or capabilities of devices and or other environments for execution of generated executable images or packages of images which might be of use in carrying out the intent or part of the intent of the generating executable image or package; (2) determining how to assemble at least one of: (i) parts of its own image, (ii) collected information, or (iii) programmatically generated information, to make efficient use of the resources, capabilities and content of the target devices or environments for which information was collected; and (3) gathering second information necessary to generate one or more other independently generated executable data images or image packages as needed to carry out the intent of the generated target executable image or image package in an unlimited sequence.

In another embodiment (2), the invention provides a method as in (1), further comprising: (4) using the gathered information to generate the one or more independently generated executable data images or image package.

In another embodiment (3), the invention provides a method as in (1), wherein one or more of the following are true in any combination: (1) the individually executable image is a rendition or a Dart Rendition; (2) the package of individually executable data images conforms to an interoperability format or to the DartFormat; (3) the generation is carried out as part of a device teaming recruitment method; (4) the gathering information necessary is collected or formed into a single Dart RenditionsTable which references one or more collected or formed Dart RenditionTables which in turn reference one or more collected or formed DartParts, to be located using a single collected or formed Dart Part Table, which is in turn located using a Dart Trailer or any other of the methods described in an interoperability format; (5) the collecting information is carried out at least in part by use of procedures sent to execute on the target device or devices; (6) the collecting information is carried out at least in part by use of DartProcedures sent to execute on the target device or devices; (7) the collecting information is carried out at least in part by executing the PROFILE_INSTRUCTION of the DartInstructionSet on the target device or devices; and (8) the using the gathered information to generate the one or more independently generated executable data images or image packages is carried out at least in part by the DartInteroperablityInstructionSet SAVE_INSTRUCTION instruction and or the BUILTIN_INSTRUCTION instruction being executed on the target device or devices by an interoperability engine or the DartEngine.

In another embodiment (4), the invention provides a method as in (1), further comprising by forming and storing the generated executable images or packages on physical media.

In another embodiment (5), the invention provides a method as in (1), wherein the creationism method is used for one or more of the following or any combination thereof: (1) distributing an application and or application package of individually executable images and or dataset or datasets of any kind to one or more devices; (2) customizing an application and or application package of individually executable images and or dataset or datasets; (3) creating a one time use executable image or package of executable images to carry out the intent of the initiating executable image on one or more target devices; and (4) creating an executable image or package of executable images which contains a selected subset of content and or resources and or data and or code that is part of or is collected by the initiating image.

In another embodiment (6), the invention provides a method as in (5), wherein the customizing an application and or application package of individually executable images and or dataset or datasets according to one or more of the following list: (a) the needs of the target device or devices; (b) the environment of the target device or devices; (c) limitations of the target device or devices; (d) capabilities of the target device or devices; and (e) access by the target device or devices, whether current or future, to any other devices according to any of the items in this list.

In another embodiment (7), the invention provides a method as in (5), wherein the creating an executable image or package of executable images which contains a selected subset of content and or resources and or data and or code that is part of or is collected by the initiating image so that the image or package is any one or more of or any combination of: (a) small enough for efficient storage on the target device or devices; (b) small enough to be transported more quickly; and (c) optimized to only hold the subset of interest or a subset which conforms to a given criteria for inclusion and or collection of related items and or an intended purpose or purposes.

In another embodiment (8), the invention provides a method as in (1), further including generating an executable image or image package that carries out a distribution of the generated executables or packages to other environments, storage devices, and/or devices for which the particular generated executables or packages where generated and intended to be distributed.

In another embodiment (9), the invention provides a method as in (1), further including initiating the execution of the generated executable images or image packages on other devices as needed to carry out the intent of the generating executable images or package.

In another embodiment (10), the invention provides a method as in (9), wherein the initiation of execution is one of a command-based initiation, a time-based initiation, a schedule-based initiation, a statistically-based initiation, an event-based initiation, or any other criteria based initiation of execution.

In another embodiment (11), the invention provides a method as in (10), wherein the initiation is controlled or influenced by the DartRuntime.

In another embodiment (12), the invention provides a method as in (1), wherein the intent or part of the intent of the executable image or package that is generating other executable data images or packages is to spread the executable image or image package, or parts of the executable image or image package to one or more devices and/or storage mediums.

In another embodiment (13), the invention provides a method as in (4), wherein the executable images or packages are spread using a device Recruitment procedure and using an interoperability instruction set.

In another embodiment (15), the invention provides a method as in (13), wherein the recruitment method comprises the Dart recruitment procedure and using the DartInstruction-Set.

In another embodiment (16), the invention provides a method as in (1), wherein the package of individually executable images is a tightly integrated package of interrelated individually executable images.

In another embodiment (17), the invention provides a method as in (1), wherein the package of executable images comprise a package of tightly integrated individually executable data images.

In another embodiment (18), the invention provides a method as in (1), wherein the method further includes this process of generation repeats a plurality of times.

In another embodiment (19), the invention provides a method as in (18), wherein the plurality of times may be any number of times), wherein such any number of times may be an indefinite number or times or indefinitely.

In another embodiment (20), the invention provides a method as in (1), wherein the method further includes repeating the process of generation a plurality of times recursively in a chain of executable images and packages of executable images.

In another embodiment (21), the invention provides a method as in (1), wherein the intent is determined at least in part by the application designer's and/or implementers' intended purpose and functions as embodied in the application.

In another embodiment (22), the invention provides a method as in (1), wherein the intent is determined at least in part by a separate application generation program or set of such programs intended purpose or functions embodied in the application.

In another embodiment (23), the invention provides a method as in (1), wherein collection is accomplished using Recruitment carried out by the sending of procedures which may or may not be DartProcedures and/or Darts.

In another embodiment (24), the invention provides a method as in (1), wherein the information is collected from storage or other programs running on the device on which the generating executable image or package is running.

In another embodiment (25), the invention provides a method as in (1), wherein the information is collected from storage or other programs running on devices other than the device on which the generating executable image or package is running.

In another embodiment (26), the invention provides a method as in (1), wherein the information is collected over any communication medium and/or protocol whether wired or wireless or through the physical transport of storage or computing devices between the generating device and any other devices.

In another embodiment (27), the invention provides a method as in (1), wherein the determining is a determining accomplished by procedures that are part of the generating executable image.

In another embodiment (28), the invention provides a method as in (1), wherein efficient use of resources is determined by the execution of procedures that are part of the originating application designed by the applications designers and/or implementers to carry out the intent.

In another embodiment (28), the invention provides a method as in (28), wherein the collection is accomplished at least in part through the use of at least one of Recruitment as described elsewhere in this detailed description and DartProcedures.

In another embodiment (30), the invention provides a method as in (1), wherein the gathering uses at least any one of an external executable tool, an internal procedure, an instruction, and/or a system call by the generating individually executable image or image package.

In another embodiment (31), the invention provides a method as in (1), wherein the generating of an executable image or image package is accomplished at least in part through the use of DartEvents to carry the information and do the distribution to DartPlayers.

In another embodiment (32), the invention provides a method as in (1), wherein the intent or a part of the intent of the executable image or package that is generating other executable data images or packages of images in a possibly unending chain is to perform synchronization of data or cooperative programs across any number of devices in a manner where the data, content, and/or procedures associated or collected by any of the set of generated executable images or packages is to cooperatively synchronize, merge, manage, transcode, and/or collect programs, content, executable images, packages of executable images, pictures, or any other program, database, or content expressible as an ordered collection of digital data.

In another embodiment (33), the invention provides a method as in (1), wherein the intent or part of the intent of the executable image or package that is generating other executable data images or packages is to include only those parts of the data, content, procedures of the generating individually executable images or packages, collected data content and procedures, and/or programmatically generated content, procedures or collected data, that are needed to carry out a particular part of the intent of the originating executable images or packages that are to be carried out using the generated images or packages on a computational device or set of devices other than the one that the originating executing image or package is running on at the time the generation occurs.

In another embodiment (34), the invention provides a method as in (33), wherein each image or image package generated for execution on each device is intelligently custom built in a form conforming to or optimized for the characteristics, capabilities and/or content of each device or set of devices that each generated image is intended for.

In another embodiment (35), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for enabling an initial individually executable image or package of individually executable images to dynamically generate at least one other target individually executable data image or package of individually executable data images to carry out the intent of the initial executable image or package of individually executable images, the program module including instructions for: (1) collecting first information about at least one of the characteristics, content, resources, or capabilities of devices and or other environments for execution of generated executable images or packages of images which might be of use in carrying out the intent or part of the intent of the generating executable image or package; (2) determining how to assemble at least one of: (i) parts of its own image, (ii) collected information, or (iii) programmatically generated information, to make efficient use of the resources, capabilities and content of the target devices or environments for which information was collected; (3) gathering second information necessary to generate one or more other independently generated executable data images or image packages as needed to carry out the intent of the generated target executable image or image package in an unlimited sequence; and (4) using the gathered information to generate the one or more independently generated executable data images or image package.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XV. Interoperability Engine/DartEngine

Recall that the DartEngine is or includes software and or hardware used to execute the instructions of Darts on a device and carry out their intended purpose. The DartEngine and the device specific DartPlayer, in which it is encapsulated, provides the common execution and DartRuntime environment which allows Recruitment and Renditioning to establish efficient teams of devices and spread their code, data and content as best to carry out the intended purpose of Darts.

Additional particular embodiments of Interoperability Engine and a more specific embodiment of an Interoperability Engine, the DartEngine, are now set forth. In one embodiment (1), the invention provides an interoperability engine which enables or assists devices to interoperate with each other, the engine comprising: (1) means for loading, running, and carrying-out at least part of the intent of an interoperability software package having code and wherein at least part of the code is embedded in a sequence of instructions conforming to an interoperability instruction set; (2) means for discovering other interoperability devices; and (3) means for direct or indirect two-way communications with other interoperability devices.

In another embodiment (2), the invention provides an interoperability engine as in (1), wherein one or more of the following are true in any combination: (1) the engine comprises a DartEngine; (2) the interoperability software package comprises an interoperability software package or comprises a Dart conforming to the DartFormat; and (3) the means to discover other interoperability devices is at least partially carried out using a recruitment procedure or a Dart recruitment procedure.

In another embodiment (3), the invention provides an interoperability engine as in (1), wherein the engine includes an event queue and carries out instructions to support the use of the event queue by interoperability application packages.

In another embodiment (4), the invention provides an interoperability engine as in (1), wherein the engine includes a computer program product for execution in a processor or logic circuit of the a device containing the engine.

In another embodiment (5), the invention provides an interoperability engine as in (1), wherein the engine includes a hardware processor implementing the engine within a device containing the engine.

In another embodiment (6), the invention provides an interoperability engine as in (1), wherein the engine includes a hardware processor implementing a portion of the engine within a device containing the engine and a computer program product for execution in the hardware processor of the a device containing the engine.

In another embodiment (7), the invention provides an interoperability engine as in (6), wherein a source code for the computer program and computer program product portion of the engine are segmented into a portable section which can be used without modification on all interoperable devices and a hardware abstraction layer which may need to differ for each different type of device.

In another embodiment (8), the invention provides an interoperability engine as in (7), wherein the hardware abstraction layer includes code providing access to one or more of the following device functions in any combination: (a) memory allocation functions; (b) sound rendering functions; (c) power management functions; (d) printing functions; (e) display functions; (f) media rendering and or playback and or transcoding functions; (g) computation functions; (h) storage functions; (i) communications functions; (j) device and or service discovery functions; (k) profile information gathering functions about the capabilities, resources, content and or environment of the device; (l) device configuration functions; (m) device status functions; and (n) any other functions or operations that can be performed by the native device hardware and software that can be exposed.

In another embodiment (9), the invention provides a method for operating an interoperability engine which enables or assists a plurality of devices to interoperate with each other, the method comprising: loading, running, and carrying-out at least part of the intent of an interoperability software package having code and wherein at least part of the code is embedded in a sequence of instructions conforming to an interoperability instruction set; discovering other interoperability devices; and directly or indirectly communicating with other interoperability devices.

In another embodiment (10), the invention provides a method as in (9), wherein one or more of the following are true in any combination: (1) the engine comprises a DartEngine; (2) the interoperability software package comprises an interoperability software package or comprises a Dart conforming to the DartFormat; and (3) discovering of other interoperability devices is at least partially carried out using a recruitment procedure or a Dart recruitment procedure.

In another embodiment (11), the invention provides a method as in (9), wherein the method further comprises: generating an event queue within the engine and executing computer code instructions to support the use of the event queue by the interoperability application package.

In another embodiment (12), the invention provides a method as in (9), wherein the method further comprises: segmenting a source code into a portable section which can be used without modification on all interoperable devices and a hardware abstraction layer which may need to differ for each different type of device.

In another embodiment (13), the invention provides a method as in (12), wherein the hardware abstraction layer includes code providing access to and optionally executing one or more of the following device functions and/or procedures alone or in any combination: (a) memory allocation functions and procedures; (b) sound rendering functions and procedures; (c) power management functions and procedures; (d) printing functions and procedures; (e) display functions and procedures; (f) media rendering and or playback and or transcoding functions and procedures; (g) computation functions and procedures; (h) storage functions and procedures; (i) communications functions and procedures; (j) device and or service discovery functions and procedures; (k) profile information gathering functions and procedures about the capabilities, resources, content and or environment of the device; (l) device configuration functions and procedures; (m) device status functions and procedures; and (n) any other functions and procedures or operations that can be performed by a native device hardware and software that can be exposed.

In another embodiment (14), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for operating an interoperability engine which enables or assists a plurality of devices to interoperate with each other, the program module including instructions for: loading, running, and carrying-out at least part of the intent of an interoperability software package having code and wherein at least part of the code is embedded in a sequence of instructions conforming to an interoperability instruction set; discovering other interoperability devices; and directly or indirectly communicating with other interoperability devices.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XVI. Interoperability Device Enabling

Recall that Interoperability Device Enabling is the process of turning a conventional device into a highly interoperable DartDevice through the porting of a DartEngine as part of a DartPlayer. In addition, implementation of the Hardware Abstraction Layer needed to access the device specific information, capabilities and content of the device is also required. At least one communications protocol must be implemented before a device with a DartPlayer becomes a DartDevice.

Additional particular embodiments of Interoperability Device Enabling, are now set forth. In another embodiment (1), the invention provides a method for using common software source code for an interoperability engine to create interoperability software needed to make a device an interoperability device, the method comprising: (1) creating an interoperability engine object or instance; (2) creating a device Hardware Abstraction Layer (HAL) object or instance; (3) identifying and filling in the functionality of all the predefined required halBase member functions of the halBase class or specification; and (4) creating a device specific Player object that substantially continually runs the engine on a thread of execution.

In another embodiment (2), the invention provides a method as in (1), wherein the creating a device specific Player object that substantially continually runs the engine on a thread of execution runs the engine as follows: (a) call the engine's initialization function; (b) call the engine's process function in a loop that ends if a returned value indicates an unrecoverable error occurred or that the engine is to be closed down; (c) call the engine's un-initialize function; and (d) stop the thread of execution.

In another embodiment (3), the invention provides a method as in (2), wherein the creating includes creating by inheriting from a halBase object.

In another embodiment (4), the invention provides a method as in (2), wherein the returned value returned comprises a non-zero value returned.

In another embodiment (5), the invention provides a method as in (2), wherein the loop that calls a player base process member function comprises a loop that calls a playerBase::Process( ) member function in a loop until a non-zero value is returned.

In another embodiment (6), the invention provides a method as in (1), wherein the creating of a device specific playback object includes creating by inheriting from a playerBase object.

In another embodiment (7), the invention provides a method as in (1), wherein the processing engine comprises a software processing engine.

In another embodiment (8), the invention provides a method as in (1), wherein the processing engine comprises a firmware processing engine.

In another embodiment (9), the invention provides a method as in (1), wherein the processing engine comprises a Dart software processing engine.

In another embodiment (10), the invention provides a method as in (1), wherein the software includes C++ programming code instructions.

In another embodiment (11), the invention provides a method as in (1), wherein the functions of the HAL object that are identified include at least one function from the set of functions consisting of: allocating a single consecutive block of memory of a given size, returning the time in milliseconds, moving a bitmap in one of an identified standard format, compile time variants to the screen at a given location, a virtual function for getting profile characteristics of another physical device on which the processing engine will execute.

In another embodiment (12), the invention provides a method as in (1), further comprising communicating the device specific playback object to the device.

In another embodiment (13), the invention provides a method as in (12), wherein the device comprises at least one of: a computer, a personal data assistant (PDA), a cellular or wireless telephone, a radio, a printer, an electronic device, a music player, a media player, a camera, or any one combination of thereof.

In another embodiment (14), the invention provides a method as in (2), wherein the hal functions include interface functions for interacting with the device specific hardware, software, firmware, or content for one or more of the following purposes: (1) getting device specific capabilities and/or settings and/or status for a given id value or set of values that identify specific profile words, profile structures, or the enumeration of profile structures that are to be gotten; and (2) executing predefined asynchronous operations so that the execution of other activities of the interoperability device running on the engine's tread of execution can continue to run while the asynchronous operations continue.

In another embodiment (15), the invention provides a method as in (14), wherein one of the parameters to the interface function is a value uniquely assigned to each different manufacturer and another parameter is a pointer to a parameter block so that each manufacturer can optionally define whatever sub-interface functions and/or parameters required to expose any unique capabilities, status, content, or operations not otherwise accessible through the other interface functions.

In another embodiment (16), the invention provides the method as in (15), wherein the uniquely assigned values are used to ensure there will be no conflicts with other manufacturer generated sub interfaces.

In another embodiment (17), the invention provides the method as in (16), wherein the manufacturer can control access to their own developed sub-interfaces in one or more of the following manners: (1) publish their manufacturer id, parameter block specification and/or sub-interface function specifications so that any other manufacturer can make use of the developed sub interface functions to develop compatible devices and applications; (2) keep their manufacturer id and or parameter block specification and or sub-interface specifications as trade secrets; and (3) protect the parameters or functions using the cryptographic instruction implementations in the engine, a shared secret based algorithm, or any other cryptographic means so that it will be difficult or impossible for other manufactures to understand or make use of the manufacturer developed sub interface functions.

In another embodiment (18), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for using software source code common among potentially interoperable devices for an interoperability engine to create interoperability software needed to make a device an interoperability device, the program module including instructions for: (1) creating an interoperability engine object or instance; (2) creating a device Hardware Abstraction Layer (HAL) object or instance; (3) identifying and filling in the functionality of all the predefined required halBase member functions of the halBase class or specification; and (4) creating a device specific Player object that substantially continually runs the engine on a thread of execution.

In another embodiment (19), the invention provides a computer program product as in (18), wherein the instruction for creating a device specific Player object that substantially continually runs the engine on a thread of execution runs the engine according to the steps of: (a) calling the engine's initialization function; (b) calling the engine's process function in a loop that ends if a returned value indicates an unrecoverable error occurred or that the engine is to be closed down; (c) calling the engine's un-initialize function; and (d) stopping the thread of execution.

In another embodiment (20), the invention provides a computer program product as in (18), wherein the functions of the HAL object that are identified include at least one function from the set of functions consisting of: allocating a single consecutive block of memory of a given size, returning the time in milliseconds, moving a bitmap in one of an identified standard format, compile time variants to the screen at a given location, a virtual function for getting profile characteristics of another physical device on which the processing engine will execute.

In another embodiment (21), the invention provides a computer program product as in (18), wherein the hal functions include interface functions for interacting with the device specific hardware, software, firmware, and/or content for one or more of the following purposes: (1) getting device specific capabilities and/or settings and/or status for a given id value or set of values that identify specific profile words, profile structures, or the enumeration of profile structures that are to be gotten; and (2) executing predefined asynchronous operations so that the execution of other activities of the interoperability device running on the engine's tread of execution can continue to run while the asynchronous operations continue.

In another embodiment (22), the invention provides a computer program product as in (19), wherein one of the parameters to the interface function is a value uniquely assigned to each different manufacturer and another parameter is a pointer to a parameter block so that each manufacturer can optionally define whatever sub-interface functions and/or parameters required to expose any unique capabilities, status, content, or operations not otherwise accessible through the other interface functions.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XVII. Interoperability Security Model/DartSecurity

Recall that DartSecurity is a system and method for providing the infrastructure needed for protecting the integrity of a device and its content from malicious or accidental damage.

Figure 29:
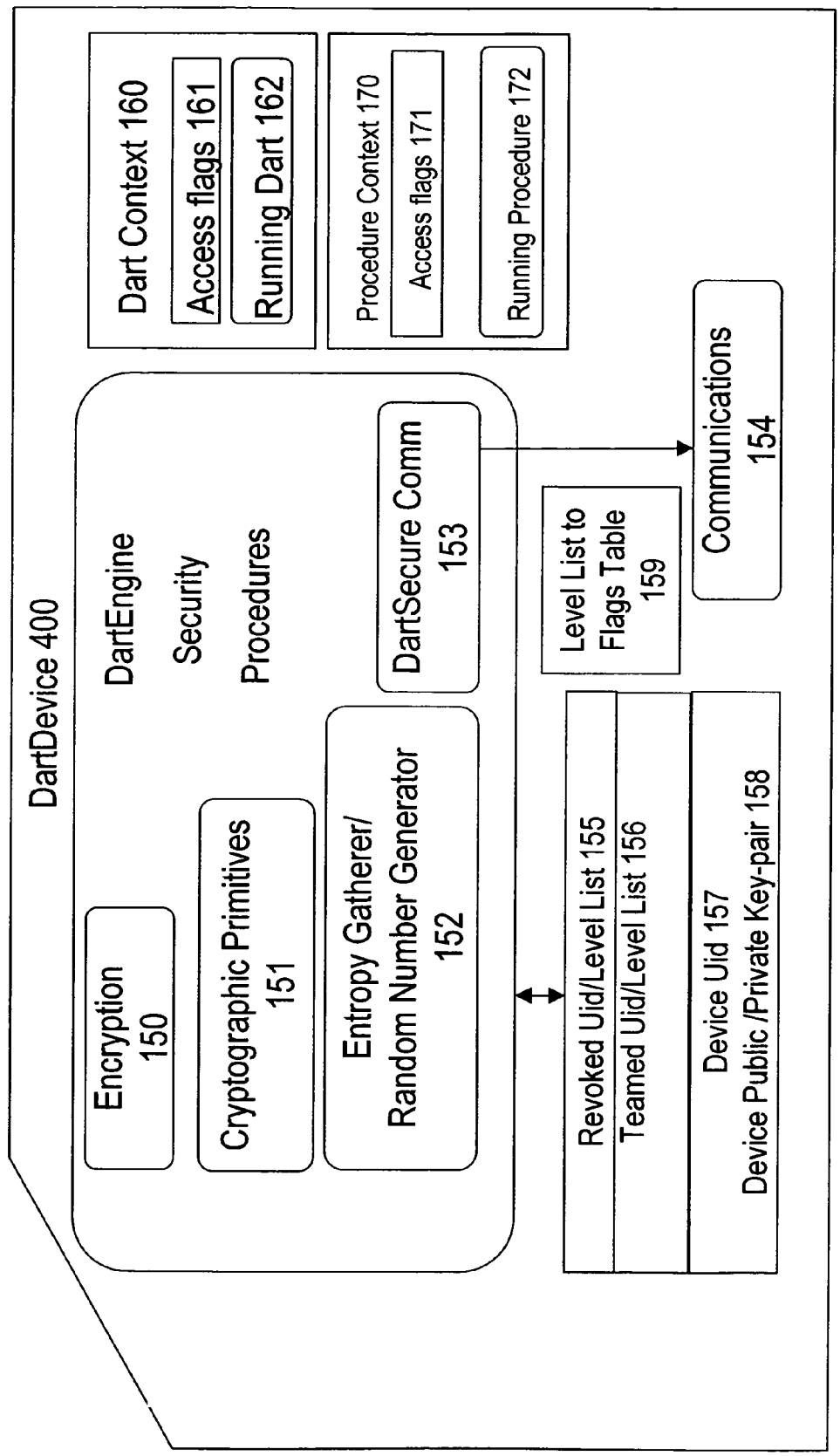
FIG. 29 is an illustration showing a block diagram of an embodiment of a DartDevice's DartSecurity components.

A robust security infrastructure is desirable to serve as a basis for protecting a device, its content or facilities from being abused, corrupted or otherwise compromised or used in any undesired manner. Such an infrastructure is the inventive DartSecurity system embodied in the preferred manner by elements of the DartPlatform as shown in FIG. 29.

In the preferred embodiment, when a DartDevice executes the DartPlayer for the first time, part of the initialization process of the DartEngine is to perform the following:

1. Gathering enough entropy suitable for generating public and private cryptographic key pairs and unique ids (uids) to statistically guarantee that the generated key pair and unique ids are truly unique from those generated in a similar manner, but using different gathered entropy.

Entropy can be reliably gathered by DartDevices by digitally sampling aspects of the world outside of the device which are not synchronized in any way to the clock running the sampling hardware. Communications mechanisms used to talk to other devices are often good sources of entropy because the exact timing of packets, timeouts and variations of data are affected by electromagnetic interference and quantum noise uncorrelated to the clock of the processor controlling the sampling. Another easy source of entropy is for the device to ask for inputs from a human user and sample a fine grained clock whenever the user provides any input. The entropy containing timing and data samples can be hashed into a set of data values used to seed a random number generator. Although it is difficult in practice to know when enough entropy has been gathered, estimates can be made and over-sampling used to ensure that enough has been gathered and maintained in the hashed data values.

2. Using a conventional random number generation algorithm and conventional cryptographic operations to generate a universally unique public/private key pair and a universally unique DartDevice uid used to uniquely identify the device for all time. In a preferred implementation all uids are 128-bits long.

3. The private key and entropy hashed set of data values are stored on the device in any conventional manner known in the state of the art for obscuring and or hiding data on a device, yet still having the use of the data by the engine practical.

4. Limiting access to resources of data, content or facilities of the device based on a set of binary flags. In a preferred implementation, these flags are 1 if access to the corresponding data for facility of the device is to be blocked. As examples, individual flags may exist for the following resources:

a. Blocking access to data or content that is marked as private, b. Blocking access to opening communications sessions to another device, c. Blocking access to the native storage devices, and d. Blocking access to user interface elements such as the screen and keyboard and mouse and sound generation.

5. Every Dart or DartProcedure that is to be loaded to run on the DartEngine has explicit or implicit sets of flag values controlling its access to resources of the DartDevice. Every DartDevice has explicit or implicit sets of access flags mapped to levels of security. If the application or the device sending the application does not have all the flags for the resources it needs to access set to zero on the target device the Dart application or DartProcedure will not be loaded unless the device first gets the proper authorization from a user or other device with acceptable credentials or flags authorizing the Dart or DartProcedure to run on the specific device. Access flags tied to the uids of Darts, DartProcedures, or DartDevices can be maintained permanently on a target DartDevice, or for a specific period of time, or for the duration of the execution of the Dart or DartProcedure or the duration of the communications session between the devices.

6. If a Dart application attempts to cause the DartEngine to access any of the resources on its behalf to which the application's context flags are set to 1, the DartEngine will immediately stop executing the instructions of the application and close the application down.

In one preferred implementation Darts must be digitally signed along with the flags sets for access. Encryption/Decryption of parts or content or of communications sessions between devices is also part of the DartSecurity system.

FIG. 29 shows a DartDevice 400 with some of the Security System elements. The DartEngine has instruction based and methods for supporting encryption 150, entropy gathering 153, random number generation 152, and securing all communications between devices using the DartSecure protocol to ensure that any communications between any two DartDevices can be automatically encrypted so that DartEngine base communications does not need to rely on any outside protocols to protect the communication of data. The DartSecure protocol 153 can be implemented using the Secure Sockets Layer (SSL) protocol or any other protocol which establishes a secure communications link between devices. In a preferred implementation a subset of the functionality in the SSL protocol standard is implemented to reduce the size and complexity as many of the options in SSL are not needed. All the necessary large number math cryptographic primitives 150 and 151 are shown as part of the DartEngine. For performance reasons it is high desirable to have the cryptographic math primitives implemented in the native code of the engine instead of inside the Dart.

FIG. 29 Also shows that the DartEngine maintains lists of uids 155 and 156 corresponding to levels of security. The figure also shows that there is a table that maps level numbers to sets of access rights flags 159. The list of device and application ids that are part of a particular level of rights is maintained by the DartEngine and in a preferred mode of operation is allowed to propagate transitively when permission is allowed to do so from device to device so that any device in the list can gain access to the new device without the need for farther collection of credentials. This inventive transitive teaming of devices and applications at specific levels of security, SocialSecurity, is further described elsewhere in this document.

To ensure that even after presenting its flags, passing muster, and getting loaded, the Dart application or DartProcedure cannot purposely or accidentally access resources that are off limits; all such attempted accesses are checked by the engine using a context data structure 160 and 170 which carries with it all the permission flags originally presented by the Dart or DartProcedure.

Note that a revocation list 155 can be transitively maintained as described further elsewhere in this document as, SocialSynchronization, so that any device previously teamed with other devices at a particular security level can have its access rights logically revoked for interoperability with any device which transitively learns of the revocation from any other device of the team. In one preferred implementation if a revoked device comes in contact with a teamed device with knowledge of the revocation, the DartEngines will render the revoked device inoperable or partially inoperable. Revocation of access rights across a team of interoperable devices with common access rights is not perfect but in many situations it is a practical system for carrying out the revocation of the access rights of a lost, misbehaving or malevolent device across a team of possible intermittently connected devices.

The method of spreading of access rights or the revocation thereof is much like humans who tell their friends about an abusive person, and the information spreads like gossip from person to person so that most people know about and can stay away from the abusive person even if they have never talked directly to the person with the first knowledge of the abusiveness of the person.

The DartEngine context in addition to access flags also contains information that the engine uses to limit access by the running Dart or DartProcedure to any memory or storage or code that is not a part of the running Dart. This limiting of access is known in the state of the art as a "sandbox." The DartEngine enforces such a sandbox on all Darts and DartProcedures so that Darts cannot be used to access the device outside of the functions, memory and storage portions explicitly provided for use by Darts and DartProcedures running in the sandbox.

Darts

In one preferred implementation of the invention there is little specialization between what is conventionally though of as code, data, operating system, graphics or user input subsystems, and threading, or for that matter between content, programs, or even devices. The DartPlatform (FIG. 3) can intelligently mix and match software procedures, code, data, content, and device electronics into an integrated virtual system which carries out the intent of an application as designed by the Dart designer and then specified in the DartSource (FIG. 3 100).

Darts built by the DartTools can self-optimize, reorganize, send and synchronize versions or extensions of itself for the efficient sharing of programs, controls, hardware resources and content between and among various devices.

Darts are built with all the data, content and procedures needed to establish an integrated working application capable of running well in any number of dissimilar devices, but also across numerous similar or dissimilar devices simultaneously.

In addition, the runtime environment of a single Dart can also dynamically or statically include other Darts as parent Dart or child Dart extensions of any Dart. Thus the DartRuntime environment is unique in its reach across unknown devices and unknown separately produced Darts.

Unlike interoperability technologies employed currently, Dart technology though not limited to such tasks, is optimized around human sized data and tasks such as picture slide shows, appointment calendars, contacts, control panels and messages. The response time of the system is fast enough to do motion video and respond to button presses or requests to find a particular contact in a personal contact list within a fifth of a second. For humans, such response times are nearly indistinguishable from being instantaneous. Dart response times requirements are much more lenient compared to most real-time operating systems at the base of most application environments, because real-time operating systems are generally expected to run applications such as data servers which must handle hundreds of operations per second. Because Darts only need to be responsive in human time, an advantageously simple and highly robust and flexible hierarchal event processing mechanisms are employed in place of the standard pre-emptive or cooperative threaded systems employed in the current state of the art interoperability operating systems and their associated runtime environments.

Consider as an example a slide show Dart application. Although any programming language may be used, in one implementation, the slide show Dart is written in C++ program code language, using the DartFramework (FIG. 11 102), also written in C++, and compiled and linked using the DartTools (FIG. 12 200). The C++ source code also contains Dart specific C++ pragma statements that extend the applications that can be created to include all the DartProcedures, Renditions, and other interoperability extensions necessary for the Dart applications to find and inspect other devices, send optimized copies or parts of themselves based on the said inspection, cause the optimized copies or parts to execute on selected discovered devices, and then interoperate by way of event queues on all involved devices. Such devices may be event driven with the events automatically serialized and/or synchronized so that all components of the application are operating in a highly cooperative and robust manner in order to express the intent of the interoperable application as encapsulated in a Dart (FIG. 9). In the preferred implementation, a DartMaster (FIG. 12 230) generated directly from the DartTools (FIG. 12 200) that will consist of a single MasterRendition (FIG. 11 113) derived object, which provides a main method as the starting point for execution which proceeds to build a list maintained by the MasterRendition object which contains references to other Rendition derived objects (FIG. 11 114).

DartMasters are typically built by programmers in C++, or other high level languages using tools and a framework that target the DartInstructionSet. To cover the full range of devices that a Dart may find itself running on, the MasterDart will typically contain content and procedures used by the MasterPlayer to generate between one and five different Renditions.

Logically, Renditions can be thought of as separate programs, or executable images, where in the preferred implementation, only one of which will be chosen to run at any one time on any one device.

Physically, the Renditions often advantageously share most of their data, code and content components so that there is advantageously a greatly minimized amount of duplication in the actual DartFormat binary image or file.

A Dart's DartSource (FIG. 3 100) should also include procedures that run on a device to determine which Rendition is best to run on that device.

For example, a slide show Dart containing a collection of pictures might have the following three Renditions: (i) a simple text Rendition for devices that only have a single line or a few lines of text display and this Rendition scrolls through the name of the slide show and a list of the names of the slides included since it cannot possibly show the images themselves; (ii) a small screen Rendition such as may be suitable for cell phones and PDA's with small screen dimensions and limited CPU power; and, (iii) a high-end large screen Rendition that shows large pictures with multiple display options, indexes and transition effects, as may be suitable for running on lager screen personal computers (PCs) or home entertainment systems.

In one particularly advantageous operating mode, when a Dart containing multiple Renditions first starts running on a device, a Dart procedure uses the Profile Instruction of the DartInstructionSet to inspect the device profile built into the DartEngine on that device to determine if the device has all the features necessary to run the most advanced Rendition. If it does, then the most advanced Rendition will be run. If it does not, then the device profile is procedurally checked against each less advanced Rendition until one is found that can run effectively on the device.

Note that target devices that do not have a DartEngine built-in can be accessed by or through any device with a DartEngine that is built with intimate knowledge of the target device and the ability to proxy for and virtualize the operations of the DartEngine for the device over a connection to the target devices. An example is the use of a printer without a DartEngine which is never-the-less reachable by a device that wants to print on it through a personal computer which is itself running a DartEngine which exposes its printing resources through the PROFILE_INSTRUCTION. Any other initiating device with a DartEngine will have access to the printers available to the personal computer so long as the DartEngine running on the PC exposes the printing capability and access through the profile and print methods of the hardware abstraction layer (HAL) object of the DartEngine on the personal computer.

When a Dart is asked to send itself to another device, one of the user options in most Darts will be to have the set of Renditions sent limited to those that can run on the target device. In this way the user can limit the transmission time to, and the memory requirements on, the target device. Of course the new device will not then have higher level Renditions to resend to more capable devices.

Since a great deal of content, and the application programs that create and edit the content is PC or Internet based, it is important that Dart content be able to import and export content in a form native to existent software systems.

Darts may advantageously contain standard format data for JPEG pictures, any other forms of data or content that are likely to be encountered, and the like, and menu options can be built into the Dart content that will import and export pictures, video, audio, text, and XML documents that tie various components together.

The DartInstructionSet optionally but advantageously contains JPEG and other standard media format decompression and playback instructions so that the CPU intensive decompressing tasks are implemented in efficient functions compiled as part of the DartEngine into the native instruction set of the DartDevice's CPU. These instructions also limit the amount of code that must be included in Darts since the DartEngine does much of the decompression and display as part of executing the DartInstructionSet. Similarly there are XML and other text parsing instructions to limit the amount of application code and provide native code speed advantages when parsing text, RTF, XML and other text based documents.

In addition, PC applications can easily be adapted by their manufacturers to import and export Dart content directly. Darts can contain content access APIs and control API's that allow other applications and Darts to programmatically enumerate and extract content Parts such as JPEG pictures, and audio clips along with the text names and descriptions of the Parts.

Dart control APIs, along with text descriptions of the API functions can also be enumerated and accessed to control the operations of the Darts themselves from other Darts or devices allowing remote control of Darts and the devices they operate.

Embodiment of a Procedure for Porting a Dart Engine to a Device

A procedure for porting a DartEngine to a new device is now described. The example assumes that the Dart Engine is a C++ code Dart Engine, but that does not distract from the generality of the procedure.

First, create your own Hardware Abstraction Layer (FIG. 4 3020, FIG. 22 650, FIG. 27 650) object by inheriting from the halBase object or in any other way such as by direct creation.

Second, fill in the functionality of the halBase member functions which include such functions as allocating a single consecutive block of memory of a given size, returning the time in milliseconds, moving a bitmap in one of the three standard internal formats, or compile time variants to the screen at a given location. The halBase class also includes a virtual function for getting profile information words that must be provided to allow Darts running on the DartEngine to determine the CPU, memory, screen, communications, sound, printing, and other characteristics of the actual device. Of particular benefit is to design and build a programmatic interface through the use of the OEM_Function method of the halBase object to expose any unique capabilities, content or functionality of the device not otherwise exposed by the pure virtual methods of the base halBase class.

Third, create a device specific DartEngine object (FIG. 22 600) by inheriting from the playerBase object, or create it directly without benefit of inheritance.

Fourth, build the device's DartPlayer executable (FIG. 22 600) which employs the DartEngine object, which includes a loop that calls the DartEngine's Process( ) member function (such as for example, a playerBase::Process( ) member function (FIG. 23 4003, FIG. 25 611)) in a loop until a predetermined condition, such as a non-zero value, is returned. All synchronous (FIG. 15 8010) and asynchronous operations (FIG. 16 Asynchronous Event Processing show inside the dotted box) of the DartPlayer including communications are driven by the execution thread of this simple loop so that a multithreaded OS is not needed.

Figure 2:
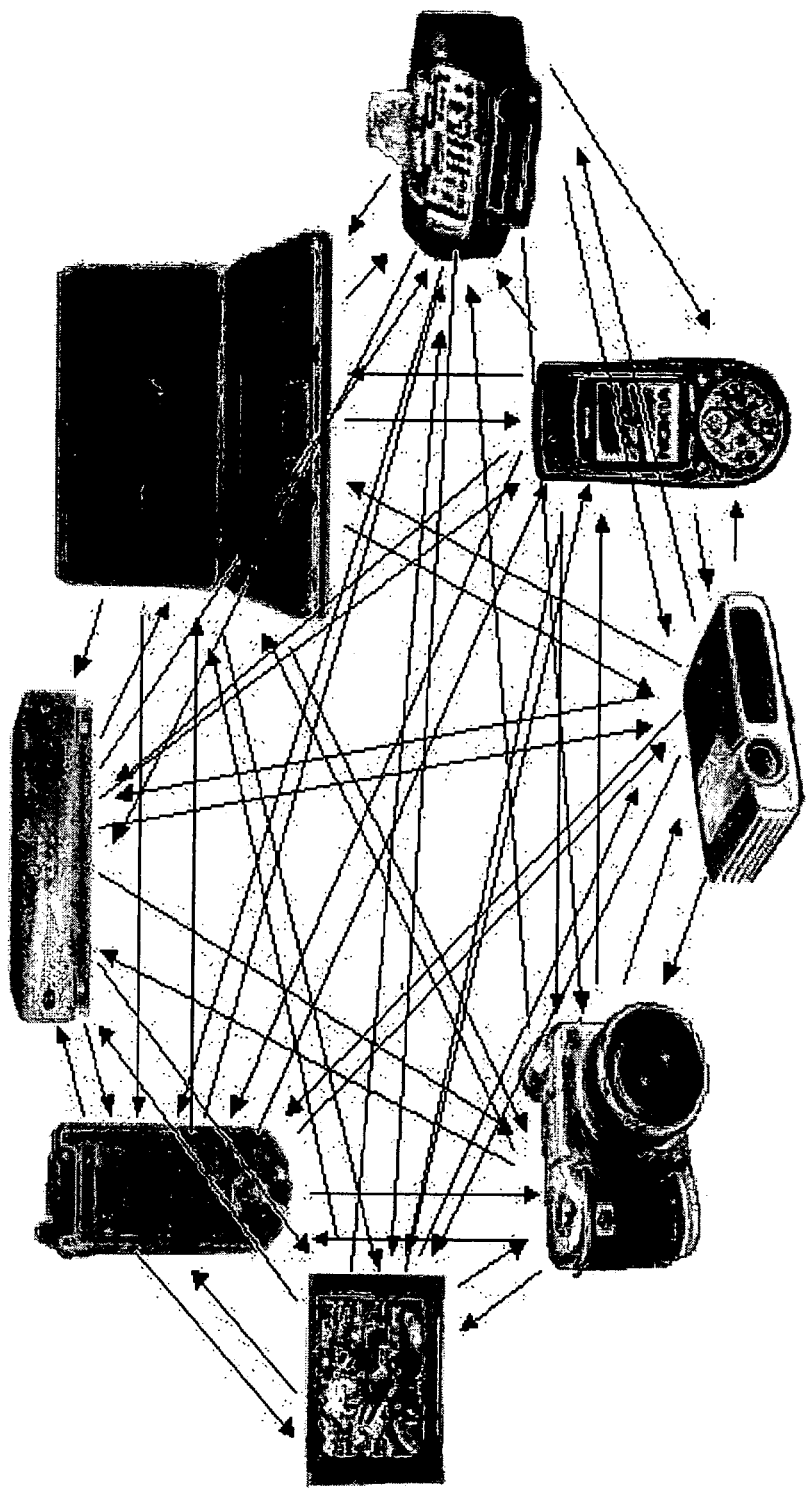
FIG. 2 is an illustration showing the complexity of getting eight devices to work directly together and that it takes on the order of fifty-six adaptations and requires fifty-six different test configurations to test and verify operation.

The Dart solution to device interoperability advantageously changes the adaptation and testing complexity equation from an N-squared (FIG. 1, and FIG. 2) to an N-ordered one. Instead of having to consider how a new device will share content and control with every other kind of dissimilar device and implement individual solutions, with Darts one only needs to port the DartEngine into a DartPlayer specific to the device (FIG. 10).

One will need to implement functions that understand all the communications channels that the device has, and build routines to report the CPU speed, screen size and the like, but one never has to consider how a device will share content and control. The Dart content does that instead of the device's built in software.

It will be appreciated that this porting provides a Dart that is a manageable N-order solution rather than an N-squared solution, and that the porting of the DartPlayer is done only once for each new device and further that it is only necessary to develop a Dart once for each new application so that each new device or application requires only one additional unit of work.

Embodiment of a DartPlayer

A description of one embodiment of a DartPlayer (FIG. 22 500), implemented for example in C++ language and compiled using conventional programming tools to the native instruction set of the DartDevice's processor or in some embodiments central processing unit (CPU) follows.

The playerBase class from which the DartPlayer class inherits, executes Dart programs which are a series of opcodes with parameters. Basically, the DartPlayer may be analogized to a microprocessor, and the DartInstructionSet analogized with a set of machine instructions; however, in the case of Darts most of the instructions are much more high level than in the typical microprocessor. The instructions native to the DartPlayer may for example, include single instructions that decompress JPEG pictures into a buffer, move pictures in buffers to a particular place on the physical screen in the correct format, and save the entire state of the running DART and all its code and data. In addition a full set of 2D graphics primitives, advanced user input processing, and audio decompression processing instructions may advantageously be built into the DartInstructionSet.

When a Dart wants to: (i) send itself, (ii) send an optimized version of itself, (iii) request a control panel, (iv) request a DART procedures, or (v) request data from another device, it uses an EnumerationInstruction or puts an EnumerationEvent on an EventQueue using a BuiltinInstruction. The Enumeration instruction or Enumeration Event causes the player to call a halBase enumeration member function that gets the name and description of each Dart device it can make a connection to. Optionally, a DartProcedure can be sent to each such device, which runs the procedure, and itself returns a procedure that runs on the originating device. Thus EnumerationInstructions in concert with the general processing, mathematics, and test and control instructions can be used to effectively inspect any connected device to see if it is capable of carrying out most any desired set of functions, or contains code, data or content of use or interest.

Since the function of the DartProcedures or Darts sent to other devices and received back can contain code to do most anything, this functionality advantageously is all that is needed for a wide range of inter-device cooperative tasks. In most instances, it is up to the person or programmer porting the player to a device to decide what types of physical connections, protocols, security measures, and the like design choices to take when making a connection to other devices. In one particularly advantageous implementation, the DartPlayer assumes that any communication block received is error corrected and has already passed whatever security requirements the porting programmer built into the halBase virtual functions. Advantageously, aside from the low level sending and receiving of such blocks in the device specific functions of the HAL, the functionality for setting up secure communications sessions, sending events with associated data, code and content, and the automatic requesting and processing of blocks that have been lost in transit, the automatic recovery of sessions temporarily lost between devices is all performed in the portable code portions of the DartEngine. This greatly reduces the amount of work needed to support various communications protocols on a DartDevice and greatly improves the reliability of implementations between devices because the same source code base is used to port the portable parts of the DartEngine.

Embodiment of the Use of a Dart Instruction Set for Physical Discovery

Embodiments of the DartInstructionSet advantageously primarily deals with device, service, and resource discovery and inter-device communication at a very high level of functionality. In some embodiments, the DartInstructionSet deals exclusively with device, service, and resource discovery and inter-device communication at a very high level of functionality. While a running Dart can inspect a device profile to determine actual communication characteristics such as communication speed and latency, advantageously generally a running Dart does not care or need to know whether the actual communication between devices is HTTP, TCP IP, USB, 802.11b, or some other protocol, or a shared memory card, a physically transported memory card or any other physical medium or protocol.

Similarly, physical discovery of other devices, services, or resources or authentication and security can to be built into the halBase override functions by the people specifying and implementing the port.

One advantageous way to build such a port is to create as part of the playerBase based DartPlayer, a user editable "friendly" device list. This way the user can specify the Internet Protocol (IP) addresses and/or network names and/or passwords needed to access all the devices she wishes to allow the device to have access to which are otherwise undiscoverable, difficult to discover or difficult to pinpoint among other numerous networked devices, through other means.

Embodiments of the invention may advantageously be made so that all DartPlatform characters are 32-bit words to advantageously accommodate any character representation system such as Unicode or multi-byte, without any need for special handling inside by Dart procedures. It is up to the halBase derived HAL implementing object to translate to and from these 32 bit characters to match the native capabilities of the particular device. However, the invention is not limited to any particular bit word size and larger or smaller bit word sizes may be used.

Devices which wish to do device, resource, and/or service discovery should comply with standards that are in place. The Dart Enumeration instruction interface or SignalEvent BuiltinInstruction (FIG. 20 670) processing advantageously hides the differences between the various device discovery standards for Dart applications, while helper functions can be provided for use in the hardware abstraction layer, to aid in building compatible support for IP, Infrared (IR), Bluetooth, 802.11x, and other connected or connectable devices or systems.

On at least one exemplary DartPlatform, most all adaptation of content, data and procedures are advantageously performed by the Dart instead of being built into the engine. It is the Dart itself that decides what Rendition will run best on the target device. And it is the procedures in the Dart that adapt the content playback for connected DartDevices.

Advantageously, with the DartPlatform, there is no need to plan for every application and other device that a new device will need to work with because the protocol between devices is very simple, yet powerful. One DartDevice can send a DartProcedure over to any other DartDevice which automatically run in the target DartDevice and then returns an Event or procedure that is automatically run or processed on the originating device. The DartDevices do not need to know whether the procedures or Darts they are running are delivering data, an application, a control panel or just inspecting capabilities.

In at least one particularly advantageous embodiment, the DartPlatform does not use either the Client/Server or Peer-to-Peer modes of inter-device interoperability. Instead it advantageously uses the Recruitment model.

Recruitment and the recruitment model and method allows Dart applications to automatically extend their reach or connectivity across a multitude of differing connections and devices. Recruitment is a radical departure from Client/Server or Peer-to-Peer connectivity or communication and bestows unique and highly desirable properties to the DartPlatform.

Embodiments of the Recruitment model allows Dart applications to form teams of devices around the application in the same manner that people form teams to get a job done. If one is a construction contractor who wants to build a house, one locates carpenters and lumber suppliers with the skills and resources needed for the construction job. Then one works as a team with the suppliers and carpenters thus recruited to get the lumber to the carpenters and then to coordinate the building of the house according to the intent of the contractor who initiated the building of the house. Similarly, a Dart application can reach out and inspect the resources of all DartDevices it can communicate with over any existent communications medium by sending procedures that automatically get run on target devices. A running Dart itself finds, qualifies, and forms a team of DartDevices, sending any content and code as needed to each DartDevice in the team to effect the application for the user. Device user involvement is not required.

Darts extend their operation across the Recruited DartDevices and effectively run inside all DartDevices simultaneously. The result is a system that advantageously does not require any central control device as in Client/Server configuration or operation. Advantageously, the Dart system does not require programs related to the mission of the originating Dart to reside on any but the originating device, as opposed to Peer-to-Peer configuration and operation. And the device user never has to think about media formats, communications protocols, nor loading drivers. The Recruitment model also allows Dart applications and data to spread themselves from Dart device to Dart device whenever another DartDevice is Recruited into a team. Thus advantageously, distribution of Darts and their encapsulated content, programs, and data can occur through usage or without any explicit loading or saving of applications or their associated data. Security may often be a necessary part of the DartPlatform to prevent the spread of malicious or malfunctioning Darts or other code and data. This security partially comes in the form of requiring a potential recruited device to accept or reject recruitment by not allowing communications, or simply declining to run procedures or Darts from other devices.

In one particularly advantageous implementation, the Recruitment model and method is based on the DartInstructionSet. The procedures are expressed using the DartInstructionSet which is optimized for device interoperability, multimedia user interfaces, and the use of the Recruitment model and method.

Advantageously, most any high level language can be compiled to target the DartInstructionSet. In one particularly advantageous embodiment at this time, the high level language used is C++ with extensions added through the C++ pragma facility. These advantages derive from the wide spread current use of the C++ programming language, but the invention is not limited to any particular language, and may be equally or better implemented with other languages either now existent or to be developed in the future, including for example improvements, enhancements, and/or extensions to the C++ programming language.

Additional particular embodiments for Interoperability Security Model or a more specific embodiment, DartSecurity Model are now described. In one embodiment (1), the invention provides a method for limiting access to and or the understanding of resources or capabilities of an interoperability application package and or resources or capabilities of interoperability devices, the method comprising: (1) forming a basis for security using at least a plurality of the following steps: (a) automatically collecting an entropy state measure associated with the device; (b) generating a key pair; (c) generating a device Id; and (d) storing the key pairs, device id, and the entropy state measure on the device for continued use whenever the device is active; (2) forming rules for allowing or preventing the limiting access; and (3) using the formed basis and formed rules to provide a security task at least for the device.

In another embodiment (2), the invention provides a method for limiting access to and or the understanding of resources or capabilities of an interoperability application package and or resources or capabilities of interoperability devices, the method comprising: (1) forming a basis for security in at least one of the following steps when a device first starts operation: (a) automatically collecting of entropy; (b) generating a public/private key pair; (c) generation of a unique device Id; and (d) storing the public and private key pairs, device unique id, and the entropy state for a random number generator on the device for continued use whenever the device is active; (2) forming rules for allowing or preventing the limiting access; (3) use of the formed basis for one or more of the following security tasks: (a) enforcing the rules for access to devices, applications and resources; (b) securing the rules themselves so that they cannot be modified by an unauthorized user or agent; (c) securing the storage of the public and private key pairs, device unique id, and the entropy state for a random number generator; (d) securing operating parameters or data to be shared between applications and devices; (e) securing communication channels; (f) encrypting resources so that they can only be understood or used by a particular device or set of devices, and/or a particular application or set of applications, and/or when accessed using a shared secret; and (g) generating universally unique ids and using them for identifying devices, applications, data formats, collections, records, individual media files, or even individual data items valid across all devices and or applications and or datasets or items for all times.

In another embodiment (3), the invention provides the method of (2), further comprising: revoking or modifying the rules used to limit access.

In another embodiment (4), the invention provides the method of (2), wherein the limiting access to and or the understanding of resources of comprise one or more of the following in any combination: (1) enforcing rules for which devices are allowed to communicate with each other and or for what purposes devices are allowed to communicate; (2) encrypting data that flows between devices so that other devices which might have access to the data will not be able to understand or make use of the data; (3) signing packages of data, content, code or other resources to ensure that the packages have not been modified since the signing took place; and (4) managing digital rights to enforce a set of rules for the handling of data, code content, or any other digitally representable resources with regard to one or more of the following actions: sharing, copying, printing, displaying, performing, distributing, playback, rendering, executing, modifying, or any combination of these.

In another embodiment (5), the invention provides the method of (2), wherein one or more of the following are true: (a) the application package conforms to an interoperability format or the Dart Format and or is a Dart; and (b) the limiting access is performed at least in part by an Interoperability Engine or is performed at least in part by a DartEngine or by a DartPlayer.

In another embodiment (6), the invention provides the method of (2), wherein the forming the basis for security is performed only once for any particular device.

In another embodiment (7), the invention provides the method of (2), wherein the forming the basis for security is comprised of the following steps when a device first starts operation: (a) the automatic collection of entropy state; (b) the generation of public/private key pairs; (c) the generation of a unique device Id; AND (d) the storage of the public and private key pairs, device unique id, and the entropy state for a random number generator on the device for continued use whenever the device is active.

In another embodiment (8), the invention provides the method of (2), wherein the forming rules for limiting access further comprise: (i) collecting the unique ids of devices and/or applications which wish to interoperate (ii) collecting the set of access rights needed or requested for the interoperation; (iii) obtaining permission to allow or the directive to disallow the range of access rights; (iv) creating a unique id for the set of access rights; and (v) storing the unique id and set of access rights on all devices and or in all the application packages which are to interoperate.

In another embodiment (9), the invention provides the method of (7), wherein the basis of is used for the generation and storage of unique ids.

In another embodiment (10), the invention provides the method of (2), wherein use of the basis is used for one or more of the following security procedures alone or in any combination: (a) enforcing rules for access to devices and resources; (b) securing the rules themselves; (c) securing communication channels; (d) encrypting resources so that they can only be understood by a particular device or set of devices, and or a particular application or set of applications, and or when accessed using a shared secret; (e) generating universally unique ids and using them for identifying devices, applications, data formats, collections, records, individual media files, or even individual data items valid across all devices and or applications and or datasets or items for all times; and (f) revoking or modifying the rules used to limit access.

In another embodiment (11), the invention provides the method of (2), wherein the resources or capabilities are one or more of the resources or capabilities in the set consisting of: (a) a data or data sets of any form; (b) a code of any form; (c) a content of any form; (d) a capability to communicate in any form and to any other device; (e) a capability to control any aspect of the device or any other device; (f) a capability to control any aspect of the device's operation and or of any other devices' operations; (g) a capability to render and/or print and/or display and/or modify and/or copy and/or distribute data or any other element which can be represented by a binary sequence or set of binary sequences; (h) a capability to collect information in any digital form by any means; (i) a capability to physically change the position, disposition, properties and or location of physical objects; ( ) a capability to run code and process data; and (k) any combination of the above.

In another embodiment (12), the invention provides the method of (2), wherein the method applies to the applications whether they are stored as an application image and or running on one or more devices.

In another embodiment (13), the invention provides the method of (2), wherein the basis is implemented in a manner where entropy gathering and the random number generation is seeded and then used to generate a unique id is automatically initiated when the device is first turned on or is made use of so that the manufacturer does not need to assign or install different software or hardware to assure that each device has a universally unique id.

In another embodiment (14), the invention provides the method of (2), wherein the entropy is gathered by collecting via the execution of software running on a processor timing or data or counter or hardware state values which are at least partially generated by any one or more of: quantum electrical effects, communications or other electrical circuits running on a clock unsynchronized to the processor clock, air currents, or any other physical phenomena.

In another embodiment (15), the invention provides the method of (7), wherein the basis is used for the generation and storage of unique ids.

In another embodiment (16), the invention provides the method of (15), wherein the if a device loses its unique id or private or public key and cannot be recovered, it will be necessary for a new unique id and private and public key to be generated for the device before the device can again be used.

In another embodiment (17), the invention provides the method of (16), wherein after a new unique id and private and public key is generated for the device, the device is considered for all purposes of security to be a new device.

In another embodiment (18), the invention provides the method of (2), wherein a device or application unique id is revoked, the unique id is placed on a list of revoked unique ids that is maintained and distributed on teamed devices and or other devices so that the device or application will no longer function as part of a team or teams when it tries to interoperate with any of the devices with the revoked unique id which is on such a list.

In another embodiment (19), the invention provides the method of (18), wherein when a revoked device forms a communication link with another device which has the revoked device's unique id on its revocation list, the software driving the communication link will initiate the destruction of the unique id and public and private keys of the revoked device.

In another embodiment (20), the invention provides the method of (18), wherein the revoked id list is maintained and distributed using the social synchronization procedure.

In another embodiment (21), the invention provides the method of (18), wherein only devices with certain permissions, unique id, or shared secret is allowed to place a device or application id on any revocation list.

In another embodiment (22), the invention provides the method of (19), wherein one or more master devices with certain permission, unique id or shared secret or has the capability to communicate of a special secure channel can initiate the destruction of the unique id and public and private keys on the revoked device over the special secured channel.

In another embodiment (23), the invention provides the method of (22), wherein the master device is at the headend of a mobile phone network can initiate the destruction of the unique id and public and private keys on the revoked device over the mobile data network or a side channel thereof.

In another embodiment (24), the invention provides the method of (2), wherein the rules are stored as lists of the unique ids of devices and applications associated with a certain level of security.

In another embodiment (25), the invention provides the method of (24), wherein the rules are stored as lists of the unique ids of devices and applications associated with a certain level of security, and each level of security is associated with certain access rights binary flags, with each binary flag associated with permission to access a particular category of data, resource, code or capability.

In another embodiment (26), the invention provides the method of (25), wherein a device or the runtime context in which an executable image is running maintains the access rights flags values which determine which types of access or elements are to be allowed for the executable images running on that device or the executable image running a particular runtime context.

In another embodiment (27), the invention provides the method of (26), wherein an interoperability engine running an interoperability instruction set checks any or all of the flag values whenever an application attempts to access the elements or capabilities which correspond to the flags, and does not allow such access if the flag values indicate that such access is not to be allowed.

In another embodiment (28), the invention provides the method of (27), wherein one or more of the following are true: (1) the interoperability engine is as described elsewhere in the detailed description or is the DartEngine; and (2) the interoperability instruction set is as described elsewhere in the detailed description or is the DartInstructionSet.

In another embodiment (29), the invention provides the method of (25), wherein the rules embodied by the stored lists are generated using one or more of the following method: (1) default mappings for flags to security level numbers are supplied by the manufacturer and optionally modifiable by possibly secured interfaces on the manufactured device; (2) the security level and or flag values that are needed for a particular executable image to carry out one or more operations of an interoperability application software package is embedded in the image, which is optionally signed to ensure that the security level and or flag values have not been tampered with; (3) when an executable image is to be loaded by an interoperability engine, the embedded level and or flag values are compared to the stored rules to see if permissions to access all the needed access is allowed; (4) if all permissions are allowed the executable image is loaded to run in a context that contains the access flag values embedded in the executable image; (5) if during execution, assess to any resource or capability for which the flags in the context do not allow access causes the interoperability engine to immediately stop execution without allowing the access; and (6) if any of the permissions are not allowed the interoperability engine will not load or run the executable image.

In another embodiment (30), the invention provides the method of (2), wherein the method is used for one or more of the following purposes or operations: (1) assurance that the content, code, and or data hasn't changed since some predetermined date or event; (2) assurance that the content, code, and or data has been inspected or otherwise certified by a particular party as one or more of the following in any combination: (a) robust; (b) devoid of viruses, malicious code, of other undesirable features or operations; (c) devoid of a predetermined or dynamically determined particular kind of objectionable materials; (d) to have been created by or received from a particular third party; and (e) being or not being any one or combination of the above; (3) protection from the spread of software viruses or malicious computer code; (4) protecting intellectual property rights including but not limited to copyrights and trademarks; (5) enforcing intellectual property rights and agreements; (6) obfuscation of the rules, unique ids, code or data on a device so that it is difficult for someone to find and or understand the meaning of the obfuscated items; and (7) the generation of universally unique ids to assign to data sets, data items, categories of items or any other element or grouping of elements or ideas which needs to be uniquely identified.

In another embodiment (31), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for limiting access to and or the understanding of resources or capabilities of an interoperability application package and or resources or capabilities of interoperability devices, the program module including instructions for: (1) forming a basis for security using at least a plurality of the following steps: (a) automatically collecting an entropy state measure associated with the device; (b) generating a key pair; (c) generating a device Id; and (d) storing the key pairs, device id, and the entropy state measure on the device for continued use whenever the device is active; (2) forming rules for allowing or preventing the limiting access; and (3) using the formed basis and formed rules to provide a security task at least for the device.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XVIII. Social Synchronization Interoperability Method/Dart Social Synchronization Synchronization of data sets or operations across a plurality of devices is most often done with traditional methods where there is assumed to be a single master device to which all other devices directly synchronize their data sets. These methods provide a highly robust synchronization system in the corporate and government networks of general purpose computers that are always connected to each other with reliable high speed networks administered and maintained by trained professionals. Most current synchronization of individuals' devices such as mobile phones, PDAs, and digital cameras is now conventionally performed using these same direct to single master device methodologies where the master device is a personal computer or an internet connected server; however, having to require synchronization to single master is very limiting for the world of intermittently connected, often mobile devices for many reasons including, 1. All devices must share at least one communication protocol with the master device.

2. Some mobile devices can only synchronize when they are in close proximity to the master device because they only have limited range wired or wireless direct connections suitable for synching data sets with the master.

3. The master device provides a single source of failure for all devices.

4. The individual users without training must concern themselves with loading device specific synchronization software on the master device and configuring and maintaining this software.

5. There is no easy way for mobile devices to synchronize directly to each other, even when they are in close proximity of each other and share a common communications protocol.

The inventive SocialSynchronization is a particular subset of the methods that can be used to synchronize DartDevices that provides many benefits over the conventional mastered synchronization methods commonly used in the current state of the art. Recall that SocialSynchronization is an efficient and easy to administer method for synchronizing specific sets of data and or operations across any number of devices and protocols without the need for every device to contact a master device, or for any device to act as a master. SocialSynchronization of devices and content is similar to the way humans share information and tasks and is an advantageous alternative to mastered synchronization techniques most often used in the current state of the art.

Some of the benefits and advantages of the inventive system and method over the conventional mastered synchronization methods commonly used in the current state of the art include:

1. Synchronization can be performed for teams of devices where there is no need for all the devices to be able to communicate directly to a single master; rather, synchronization can be carried out so long as there is any path of communication through any number of devices' between each other, and where such paths do not need to be established simultaneously.

2. Mobile devices do not need to be able to direct connect to a master; rather, they just need to be able to direct connect to any one of the mobile devices in a team of devices established for the synchronization.

3. There is no master device and so no single source of failure. Teamed devices which fail can be replaced by new devices which can then easily synchronize to any other devices in the team.

4. There is no need to install device specific software on any of the devices or to actively maintain or configure such software; rather any device in a synchronization team can directly add any other device to the team.

5. Devices can synchronize directly with any other devices in the team to which there is any path of connectivity through any sequence of connects between devices, even where such connections are not available simultaneously.

SocialSynchronization works somewhat like teams of humans who share information with other humans who they encounter, who in turn often then share that same information with still other humans. A human analogy can also be used to illustrate the limitations of mastered synchronization. Imagine a company with a large number of employees who have no way of sharing information about all the activities and initiatives of their coworkers except by talking to a single boss. There are just too many interactions necessary to distribute all the needed information for it to be practical for all knowledge that needs to be shared to go through a single boss, or even through a fixed hierarchy of bosses. Individual employees need to share information of common interest directly to each other as they encounter each other and expect that information will get distributed to others with a need to know through intermediaries. In effect, these methods of social synchronization, while not perfect, are very effective methods of distributing information among a group or team of people or devices where there are a number of ongoing intermittent and possibly irregular connections taking place between humans or between devices.

Figure 30:
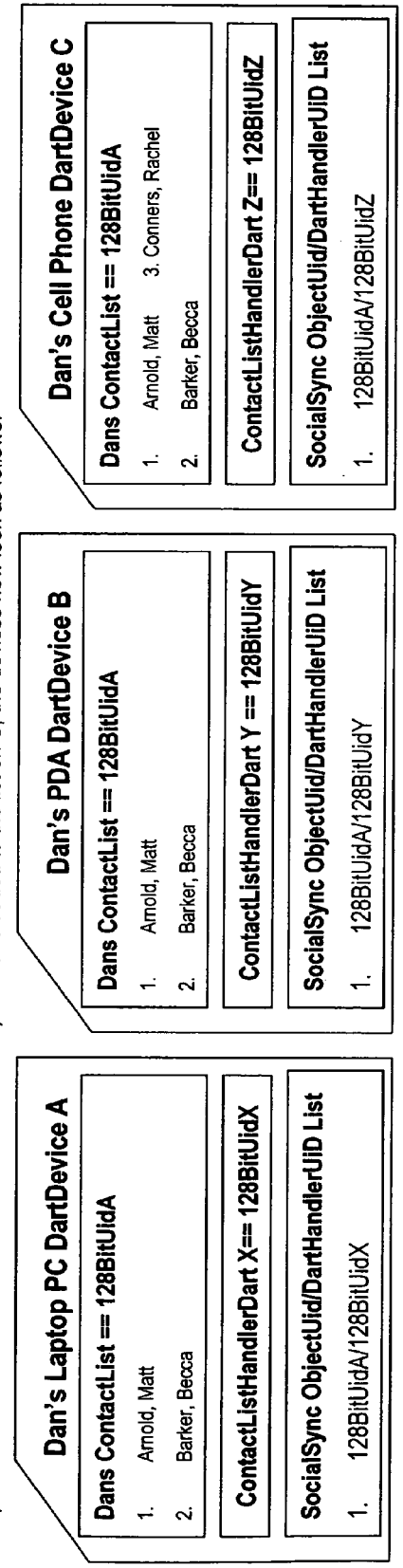
FIG. 30 is an illustration showing an embodiment of a Social Synchronization contact list example.

FIG. 30 shows an example of how SocialSynchronization is performed in one preferred embodiment. The example shows the synchronization of simple changes to a simple contact list, but it should be appreciated that the synchronization can be performed for complex databases and or the synchronization of not just data but also of the operations of and results of operations of a team of DartDevices and or Darts.

In the example of FIG. 30, there is an initiating device, A, with a ContactList Dart application which initially contains two entered names. The two other devices, B and C initially have no knowledge about the existence or characteristics of the ContactList Dart running on A. In one preferred embodiment, the ContactList Dart running on Device A enumerates all the devices with which it can share the ContactList Dart that contains and controls the list of contacts. The ContactList Dart, uses the method of Dart Recruitment and optionally the method of renditioning. The Recruitment by the ContactList Dart on Device A of Device B is initiated by the user by selecting a "Team to Other Devices" menu item. The user is then presented with a list of devices currently reachable and suitable for the teaming of the ContactList as determined by one or more DartProcedures or Darts sent to run on the reachable devices, and return information about their suitability for becoming recruited. The user selects device B from the list which results in the ContactList Dart saving a Dart containing one or more or all of its renditions and the data that constitutes the content list elements. This saved Dart is sent to B as part of a RunDart type event. When the Dart runs on device B it saves itself so that it will be available on B even after the device is disconnected from device A or powered off. The Dart now running across both devices makes an entry, if none yet exists, in each device's SocialSync uid list. The entry contains the uid of the ContactList with the two names to be shared that was generated by the Dart when it first created this particular list of contact names. Uids are generated using the DartSecurity infrastructure described elsewhere in this document. The entry also contains the uid of the ContactList Dart. The DartTools automatically place a uid into every Dart instance generated.

Similarly at some time after device A finishes its permanent teaming operation with B, device B is used to permanently team to SocialSync ObjectUid/DartHandlerUid lists with an entry for the 128 BitUidA that identifies the particular teamed logical instance of the contact list. The entry also contains the uid of the Dart stored on the same device which can be used to carry out the synchronization of the contacts for that list. Note that in general, the handler Dart can perform any synchronization decisions or operations or rules expressible as a Dart and is not limited to simple data synchronization operations as in this example.

The three devices now all contain the SocialSync entries containing the uids and two names of the original contact list even though device C has never communicated directly with Device A.

In the example, after the devices are teamed the connections are closed and a new name is added to the list on Device C by the user who runs ContactHandlerDart Z. The three block diagrams show the state of the three devices immediately after the third name is added on Device C.

Next the ContactHandlerDart Z or any other Dart running on C initiates a connection to Device A. While setting up the connection, the DartEngine on C automatically compares the SocialSync uids on the two devices and determines that they share the 128 BitUidA uid. The DartEngine on C will automatically start up ContactHandlerDart Z and it will coordinate the synchronization of the data whether stored in Darts or stored separately. Now devices A and C contain all three names in their contact lists.

After Device B connects to either A or C it will similarly run ContactHandlerDart Y which will carry out the synchronization of names between device B and the device it connects to. Note that event though A had never communicated with C before syncing, they knew that they needed to sync and how to sync because of the Dart and data passed by the intermediating device B during the individual Teamings.

It logically follows that any number of devices can be easily added to the team transitively by any device already teamed even if the new devices knows nothing about the Contactlist/ContactHandler Dart or originating Dart until Teamed. So long as the ad-hoc connections between the teams of devices are sufficient, all the devices automatically maintain a high degree of synchronization of the shared list of contacts even in the absence of any master device.

The inventive system, method, and computer programs and computer program products also provide a platform having Serialization and Synchronization. The intra-device DartRuntime shown in FIG. 15, FIG. 16 and FIG. 18 along with the inter-device DartRuntime shown in FIG. 17 together create a single event driven DartRuntime where all operations are advantageously carefully serialized and synchronized across all processing units of all teamed devices. FIG. 9 Illustrates how this serialization and synchronization infrastructure embodied throughout the DartPlatform including in Dart Recruitment, Dart Renditioning, the DartSource, the DartTools, the DartFramework the DartRuntime and the DartEngine. Together these systems and methods and means provide an infrastructure for ensuring the robust interoperability for Dart interoperability applications with little effort on the part of the Dart programmer needed to set up or administrate the complex interactions and ordering of operations across processing units cooperating on and between multiple devices, even in the face of communications and other errors.

Writing Dart applications using the DartPlatform and particularly the DartFramework automatically gives applications binary portability across all DartDevices, robust power management, robust application level error recovery, the simple and efficient teaming of devices, the intelligent discovery and use of resources across devices, and many of the other benefits of the DartPlatform, all with relatively little effort on the part of the Dart programmer. A key element for delivering these benefits is embodied in the DartRuntime through the largely automatic serialization and synchronization of events as shown in the example of FIG. 9.

The DartRuntime coordinates the passing or exchanging of Dart Events and associated files between interoperating and communicating initiating and recruited devices. Dart Events are automatically copied and/or synchronized across event queues of any number of teamed devices. Events designated as synchronized events are robustly distributed across all the event queues of all devices which share a list of synchronized event types. This is carried out in the example shown in FIG. 9 as follows:

1. The initiating application, rendition 701a of Dart 700 instantiates a connection manager object instance on the originating device 400-1 for a specific unspecified inter-device cooperative function. The Connection Manager is an instance of a ConnectionManager class that is provided in the DartPlatform (FIG. 3) as part of the DartFramework (FIG. 3 102).

2. The initiating rendition, 701a, recruits a team of devices using Recruitment and Renditioning to create a team of devices with a shared duplicative list of event types to be serialized and synchronized over all cooperating devices. This list is maintained by instances of the Connection Manager 420 on each of the teamed devices (400-1, 400-2, 400-3, 400-N).

3. Whenever any events are to be placed into a queue on any of the teamed devices that is on the shared list, then the event will be placed in all the queues (660) of all directly connected teamed devices first and then delay the placement of the event in the initiating device's queue until acknowledgement is received that the event has successfully been placed onto all directly teamed devices' queues. Since all the other devices will do the same, the original event is not placed into the initiating device's queue until all other teamed devices have the event in their queues, even those devices which are not directly connected to the initiating device. This ensures that events are not processed by any of the teamed devices if there are any errors which prevent the placement of the event on any of the queues of the teamed devices. Errors are reported by the serially propagated return of the original event to the senders with an error flag indicating that the event is returning status, and with an error code in the returnedValue word of the Event structure instance.

4. In order to prevent events generated by one device from arriving out of order on any directly connected devices, all events to be placed on directly connected teamed devices' event queues are serialized by not allowing any new events to be placed on a teamed device's queue until acknowledgement is received that the previously sent event has been successfully placed on the queue. An example of where this is necessarily is where the first event is an ADD_SLIDE type event used to add a new slide to the shared slide show, and a second event is a show slide (SHOW_SLIDE) type event indicating that the new slide is to be shown. Due to its much smaller size, it is quite likely that the second event would arrive on the device before the first and the application might try to show the slide before it was finished arriving. This is why it is necessary to serialize the events between all directly connected devices.

Serialization of events sent to all directly connected devices ensures that all events sent from an individual device will be processed in the exact order sent on all teamed devices; however, it is also necessary to synchronize the exact order of events when two or more different devices independently signal events marked for synchronization by virtue of being on the shared synchronized event lists 430 present on all teamed devices.

One preferred method for ensuring that all synchronized events are processed in the same order on all devices even when synchronized events need to be signaled independently by two or more devices is through the use of a MasterSendEvent event type reserved for use by the connection managers. Each connection manager considers the device that recruited it through a direct connection as its logical master. In FIG. 9 device 400-N's logical master is device 400-3, device 400-3's logical master is device 400-2, device 400-2's logical master is device 400-1. Device 400-1 has no logical master because it performed the initiating recruitment of the team. This makes device 400-1 the team master. Any device with a logical master's connection manager will not place events to be placed onto its queue into its queue unless it is being placed there by its logical master, rather the connection manager will encapsulate all the information needed to signal the event into a MasterSendEvent event type event and place that in all its direct connected teamed devices. All such MasterSendEvent events will eventually propagate to the team Master. When the event is to be placed on its queue, the connection manager, knowing that it is the team master will attempt to place the reconstituted original contained event onto its queue. If the contained event type is on the synchronization list of the connection managers it will now be propagated to all the teamed devices in a serialized manner just as if it had been generated and signaled by the team master.

In effect the team master is the only device allowed to send synchronized events to be placed onto the queues of other teamed devices. All other devices need to request that the master send any synchronized events for them. Since all synchronized events are sent by the team master over a serialized channel, all devices in the team will receive all events on their queue in the exact same order, preserving the integrity of the synchronized operations across all teamed devices as desired.

Note that in one preferred embodiment, that the serialization of synchronized events can itself be used to ensure that the connection managers on all devices maintain the exact same list of event types to synchronize. Also the serialization system can be used to send serialized and synchronized events of a type that indicates that a new device is to be considered the team master. Since the event declaring a new master is serialized and synchronized all devices will receive such events in the exact same order ensuring that even multiple devices sending events declaring different new masters will eventually resolve itself with all devices getting the same last event declaring a new master so that the last such event processed will win out.

Selected particular embodiments of the invention involving a Social Synchronization Interoperability Method or the more particular Dart SocialSynchronization, are now set forth. In one embodiment (1), the invention provides a method for maintaining synchronization of resources across one or more dynamically created teams of homogeneous and/or heterogeneous devices which can be intermittently directly connected and/or can be indirectly connected through a sequence of direct connections which themselves can be independently intermittently made between other teamed devices, the method comprising: (1) running on an interoperability device an initiating interoperability application program package of one or more independently executable images which logically or physically encapsulates the resource or resources to be synchronized and/or includes all the capabilities needed to collect and manage the resources to be synchronized; and (2) teaming of other devices by the initiating interoperability application program wherein a possibly intermittent connection is made to other devices and the initiating application spreads interoperability information to the newly teamed devices.

In another embodiment (2), the invention provides the method in (1), wherein the method further optionally includes: (3) the repetition of the teaming of other devices where the interoperability application packages running on any one or more of the teamed devices acts as the initiating interoperability application program package so that the team of devices can continue to grow in a limited or possibly unlimited manner.

In another embodiment (3), the invention provides the method in (1), wherein the method further optionally includes: (4) synchronizing resources among and between the devices.

In another embodiment (4), the invention provides the method in (1), wherein the method further optionally includes: (3) the repetition of the teaming of other devices where the interoperability application packages running on any one or more of the teamed devices acts as the initiating interoperability application program package so that the team of devices can continue to grow in a limited or possibly unlimited manner; and (4) synchronizing resources among and between the devices.

In another embodiment (5), the invention provides the method in (3), wherein the synchronization method further optionally includes: (a) initiating a communication session between any two teamed devices; (b) comparing the synchronization unique ids on one device with the synchronization unique ids on the other device; (c) running the interoperability application program associated with every matching unique id; (d) spreading the execution of the interoperability application program across both devices; and (e) performing, by the interoperability application program which has its operations spread across the two devices, whatever synchronization methods are needed to carry out the interoperability synchronization purpose.

In another embodiment (6), the invention provides the method in (4), wherein the synchronization method further optionally includes: (a) initiating a communication session between any two teamed devices; (b) comparing the synchronization unique ids on one device with the synchronization unique ids on the other device; (c) running the interoperability application program associated with every matching unique id; (d) spreading the execution of the interoperability application program across both devices; and (e) performing by the interoperability application program which has its operations spread across the two devices whatever synchronization methods are needed to carry out the interoperability synchronization purpose.

In another embodiment (7), the invention provides the method in (1), wherein the interoperability information includes: (i) one or more interoperability universally unique ids to be used to signify that devices are teamed for a particular synchronization purpose; and (ii) one or more interoperability application packages associated with the universally unique ids which can be executed to carry out the synchronization purpose.

In another embodiment (8), the invention provides the method in (6), wherein the interoperability information includes: (i) one or more interoperability universally unique ids to be used to signify that devices are teamed for a particular synchronization purpose; and (ii) one or more interoperability application packages associated with the universally unique ids which can be executed to carry out the synchronization purpose.

In another embodiment (9), the invention provides the method of (1), wherein one or more of the following are true in any combination: (1) the teams are formed at least in part using a device recruitment procedure or Dart Recruitment; (2) one or more of the interoperability devices is a DartDevice; (3) the interoperability application program package conforms to the Interoperability Format or conforms to the Dart-Format and or is a Dart; (4) the independently executable images are renditions or are Dart Renditions; (5) the resources are one or more of the types described as resources by the description of Interoperability Source; (6) the interoperability universally unique ids are created using the social security procedural basis; and (7) the one or more interoperability application program packages are generated using one or both of the recruitment method or the creationism method.

In another embodiment (10), the invention provides the method of (1), wherein synchronization comprises one or more of the following in any combination: (1) maintaining independent instances and/or semantics of commonly identified database instances and/or anything that can be held by a database or element contained in a database in such a manner that changes made independently to the separate instances are resolved in whatever ways are needed to maintain one or more of: (a) the integrity of the database as encapsulating the intended data and purpose associated with the common identification; (b) the elements of the database; (c) the semantics of the database and/or interrelationships of elements of the database; and (d) the common identity of the instances of the databases; (2) tracking the adding, deleting or modification of elements on a lists of items independently stored and or modified on independent devices; (3) the collecting and or processing and or collating of information by a team of devices; (4) maintaining lists of unique ids, shared secrets and security settings needed to control and limit access to resources or capabilities of devices; (5) inter-device management of settings effecting the operation of devices or the set of devices; (6) configuration management across multiple devices; (7) installation of software or content across multiple devices; (8) taking inventory of devices and or the resources of the devices or reachable by the devices or for which information is stored and or maintained by one or more of the devices; (9) software or content distribution or updating across multiple devices; and (10) any combinations of the above.

In another embodiment (11), the invention provides the method of (10), wherein the synchronization is done in an intelligent manner at least in part by the execution of software procedures so that synchronization is done in a way specific to each device and/or subsets of devices and/or the environment thereof.

In another embodiment (12), the invention provides the method of (1), wherein the grow in a limited or possibly unlimited manner is optionally carried out using one or more of the following: (1) limiting by a set fanout value so that each device or application is only allowed to bring a predetermined limited number of other devices or applications into the team equal to or within some predetermined magnitude relationship to the fanout value; (2) limiting by a set generation limit procedure comprising the following: (a) incrementing a generation tracking value carried by each application package that sends application packages to teamed devices so that each application package sent to newly teamed devices has a tracking value one greater than the sending application package; and (b) limiting by a set generation stop value so that application packages with a generation tracking value equal to the set generation stop value are not allowed to bring new devices or applications into the team; (3) limiting according the capabilities or resources of the devices; (4) limiting according to the rules as embodied in the code, data and content of the independently executing images; (5) limiting according to the level of security of potentially teamed devices or applications and/or any other required credentials; and (6) any combinations of the above.

In another embodiment (13), the invention provides the method of (1), wherein the purposes are one or more of the purposes selected from the list of purposes consisting of: (1) maintaining independent instances and/or semantics of commonly identified database instances and/or anything that can be held by a database or element contained in a database in such a manner that changes made independently to the separate instances are resolved in whatever ways are needed to maintain one or more of: (a) the integrity of the database as encapsulating the intended data and purpose associated with the common identification; (b) the elements of the database; (c) the semantics of the database and/or interrelationships of elements of the database; and (d) the common identity of the instances of the databases; (2) tracking the adding, deleting, or modifying elements on a lists of items independently stored and or modified on independent devices; (3) collecting and or processing and or collating of information by a team of devices; (4) maintaining lists of unique ids, shared secrets and security settings needed to control and limit access to resources or capabilities of devices; (5) inter-device managing of settings effecting the operation of devices or the set of devices; (6) configuration managing across multiple devices; (7) installation of software or content across any one or multiple devices; (8) inventorying of devices and/or the resources of the devices and/or resources reachable by the devices and/ or for which information is stored and or maintained by one or more of the devices; (9) distributing software or content and/ or updating software or content across multiple devices; and (10) any combination of the above.

In another embodiment (14), the invention provides the method of (1), wherein the method is used as an alternative to other synchronization methods because less human administration is necessary and/or the sophistication of the humans who do the administration does not need to be as high as conventional approaches.

In another embodiment (15), the invention provides the method of (1), wherein one or more of the teamed devices are reachable on the Internet as servers running an interoperability engine.

In another embodiment (16), the invention provides the method of (1), wherein one or more of the teamed devices are reachable on a network as servers running an interoperability engine.

In another embodiment (17), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for maintaining synchronization of resources across one or more dynamically created teams of homogeneous and/or heterogeneous devices which can be intermittently directly connected and/or can be indirectly connected through a sequence of direct connections which themselves can be independently intermittently made between other teamed devices, the program module including instructions for: (1) running on an interoperability device, an initiating interoperability application program package of one or more independently executable images which logically or physically encapsulates the resource or resources to be synchronized and/or includes all the capabilities needed to collect and manage the resources to be synchronized; and (2) teaming of other devices by the initiating interoperability application program wherein a possibly intermittent connection is made to other devices and the initiating application spreads interoperability information to the newly teamed devices.

In another embodiment (18), the invention provides a computer program product as in (17), further optionally including instructions for: (3) the repetition of the teaming of other devices where the interoperability application packages running on any one or more of the teamed devices acts as the initiating interoperability application program package so that the team of devices can continue to grow in a limited or possibly unlimited manner.

In another embodiment (19), the invention provides a computer program product as in (18), further optionally including instructions for: (4) synchronizing resources among and between the devices.

In another embodiment (20), the invention provides an interoperability device maintaining synchronization of resources across one or more dynamically created teams of homogeneous and/or heterogeneous devices which can be intermittently directly connected and/or can be indirectly connected through a sequence of direct connections which themselves can be independently intermittently made between other teamed devices, the device comprising: an initiating interoperability application program package of one or more independently executable images which logically or physically encapsulates the resource or resources to be synchronized and/or includes all the capabilities needed to collect and manage the resources to be synchronized; means for running, on the interoperability device, the initiating interoperability application program package; and means for teaming of other interoperable devices by the initiating interoperability application program wherein a possibly intermittent connection is made to other devices and the initiating application spreads interoperability information to the newly teamed devices.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XIX. Social Security Interoperability Model/Dart SocialSecurity

Recall that SocialSecurity is a particularly simple to administrate method for forming webs of security between teams of possible intermittently connected devices. SocialSecurity works in a similar way to how humans often come to trust one another. The foundation for SocialSecurity is the use of SocialSynchronization to spread unique ids generated using the DartSecurity system along with the allowed access rights which travel transitively from device to device. Devices which have never directly communicated will often find that they are part of a team of devices which are allowed to interoperate with certain access rights without any need for further gathering permissions.

One of the biggest problems in the current state of the art in security is that it is so difficult for end users to understand and administer security methods that they end up not using them at all. There is a direct relationship between the strength of security methods used and the complexity of administration. In traditional corporate and government computer networks a high degree of strength was deemed necessary and was necessarily administered by highly trained full-time professionals. The fact that such networks were rarely reconfigured made the amount of administration reasonable for the professionals. These same conventional security methods are often applied to the evolving and growing world of mobile devices used by individuals with no training and no time or patience for full time administration of securing networks of devices that would need constant administration as mobile devices come and go. The inventive SocialSecurity method, while perhaps not as strong as the traditional methods employed in corporate and government networks, does deliver a good level of security, while being so easy to administrate for devices, that most people will actually use it where they often would not use or turn off the traditional methods. Thus SocialSecurity advantageously delivers a good level of security in situations where no security would otherwise be used.

Email is a good example. Traditional secure email protocols have been available and built into the majority of existing email users' client software since they began using email; yet, few email end users make use of these secure email protocols. One reason is that the administration needed to get, secure and use certificates and ensure that everyone they want to email to securely has also performed the administration necessary to get, secure and use certificates is too complex and tedious. Another example is that it is so difficult to set up security on wireless access ports that many home wireless networks are left unsecured.

SocialSecurity is similar to human models for securing interactions. One learns to trust a new employee of a company with company proprietary information because the new employee was introduced by others in the organization. It is likely that old employees will began trusting the new employee without ever talking directly to anyone with original knowledge that the new employee is a bona fide employee of the company. This web of trust is established without any need for central coordination or tracking. Devices such as cell phones, printers, PDAs, laptops, digital cameras and portable music players often have media, information or control to share, but they are never all connected together at once or to any one same central source. Yet it is desirable to use security methods to protect the integrity of the information on devices from improper use or corruption by other devices or software. The SocialSecurity method is a particular subset of the inventive Interoperability Security or inventive DartSecurity methodologies of the DartPlatform where access rights are passed from device to device automatically establishing webs of trusted devices and software applications or Darts with a specific set of access rights with a minimum of administration or training required for the users of the devices.

The SocialSecurity methodology builds upon the DartSecurity methodology described elsewhere in this document. DartSecurity (FIG. 29) ensures that every DartDevice and Dart application has a universally unique identifier, uid. Each DartDevice also maintains lists of uids of other DartDevices which are allowed access rights as indicated by sets of binary flags. Each set of binary access rights flags is assigned to a level.

Figure 31:
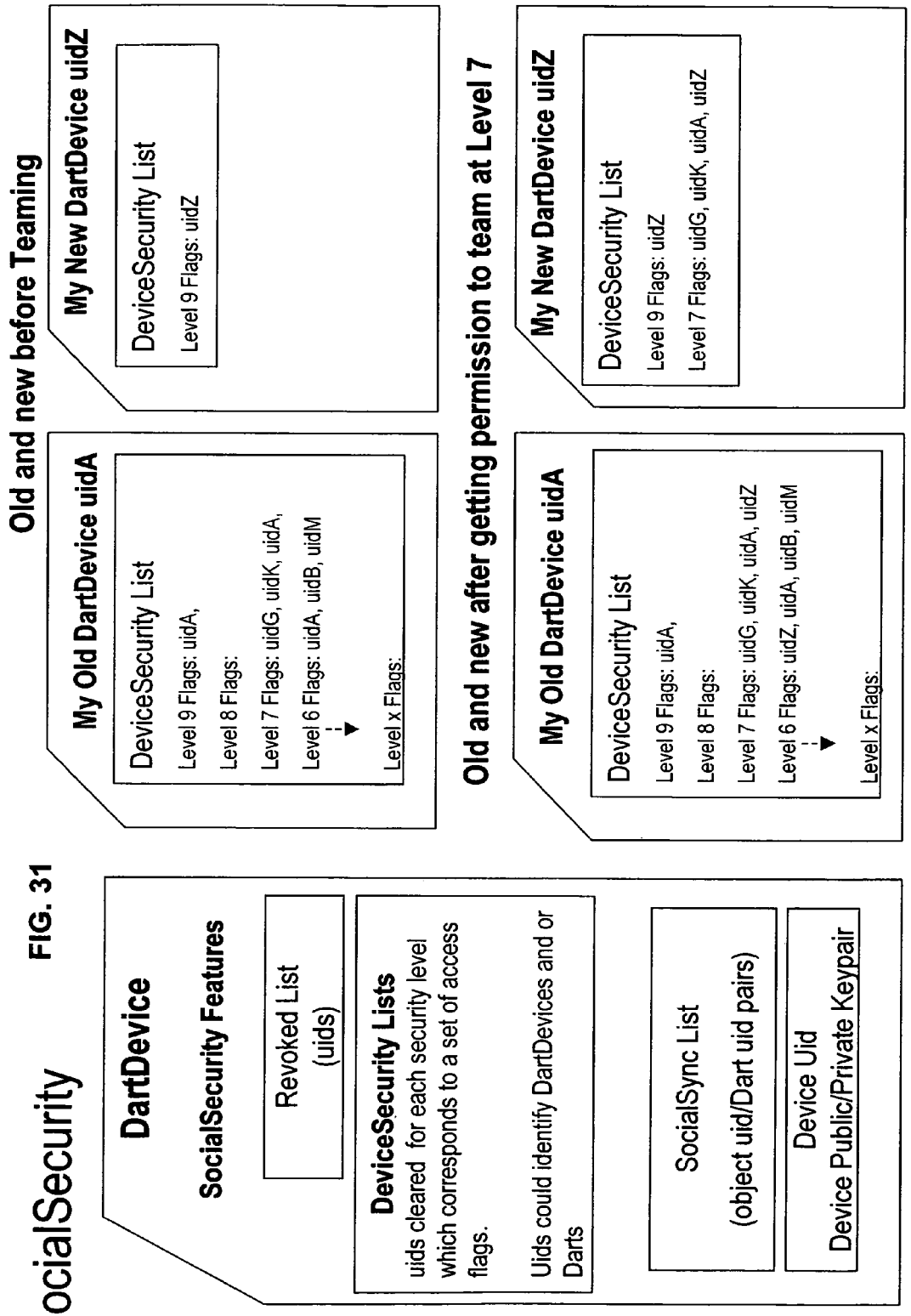
FIG. 31 is an illustration showing a block diagram of an exemplary DartDevice and its SocialSecurity components, and also block diagrams showing the before and after teaming SocialSecurity contents of an old and a new DartDevice.

SocialSecurity is a transitive method for forming and maintaining teams of devices, and distributing and maintaining the lists of devices with common access rights across all teamed devices. FIG. 31 shows a DartDevice on the left side with the DeviceSecurity Lists, a Revoked List, and Device Uid elements of SocialSecurity. The SocialSync List shown is part of the SocialSynchronization methodology described elsewhere in this document which is used in a preferred implementation at least in part to spread and synchronize the DartLists transitively across devices.

The right side of FIG. 31 shows an example of the state of old and new DartDevices before and after teaming to help in illustrating the SocialSecurity methodology. In this example before teaming, the Old DartDevice uidA has lists of uids of applications and devices which will be allowed to interoperate within the access rights of the flags corresponding to the level of the list. Before teaming the New DartDevice uidZ's only DeviceSecurity List allows the device itself to interoperate with itself at Level 9. Ordinarily some of the Dart applications that are shipped with the Device from the manufacturer need a high level of access to configure the device and or the security aspects of the device, so the device will grant the applications on the Device itself a high level of access as indicated by having the device's own uid in the Level 9 list.

When a Dart on the new device initiates the device's first contact with the old device and attempts to send and run a Dart generate from renditions of itself to run on the old device, the access rights in the Dart and of the new device are checked. Of course the old device knows nothing about the new device and in this example case it also has no security information about the access rights of the Dart application attempting to spread its execution to the old device. In this example, the user will be asked via a user interface on each device for permission for these devices to interoperate according to the access needs communicated by the flags in the Dart. FIG. 31 shows, on the bottom right, the state of the devices after permission is granted for the devices to interoperate at level 7, corresponding to the access flags set which grants all the access rights specified in the Dart passed to the old device. After getting permission from the user via the user interface, both the old and new DartDevices now contain the same level 7 list of uids of devices and Darts that are allowed to interoperate without asking permission. Note that should the New DartDevice next attempt to send a Dart to any of the other devices on its new level 7 list with the same security access flags requirements, it will be allowed to run without any need to ask the user. In effect the devices are vouching for all the other devices it knows about. A trusted team of devices will trust each other, even those that it has never directly made contact with before if the team's lists of uids has been distributed across the devices through connections even where intermittent with other devices of the team. In a preferred implementation, the lists of uids are synchronized using parts of the SocialSynchronization methodology described elsewhere in this document.

Note that the only administration requiring user involvement or understanding to form and maintain the team was the ability to answer questions directly relating to what kinds of access must be granted before the devices can start interoperating in the needed manner. The simple tasks of using the devices and Darts drives the collecting and distributing of access rights with a small number of easily understood requests for permissions from the user.

Revocation of access rights for a device can also be accomplished using SocialSecurity to spread a list of revoked uids of devices and Darts. In a preferred implementation, any attempts to interoperate between devices which are one of the devices' revoked lists with the needed rights will not be permitted and the uids in the lists of teams of the revoked devices for the appropriate levels of security will be removed.

Additional particular embodiments of the inventive social security interoperability model and of the more specific version of that model, the Dart Social Security model, are now set forth. In one embodiment (1), the invention provides a method for automatically and transitively spreading the access rights and credentials between interoperability devices, the method comprising: (1) assigning to each interoperability device a unique id; (2) assigning to each interoperability device an initial set of access rights; (3) assigning to each interoperability software package one or more unique ids and embedding in the package the sets of unique ids and associated access rights needed by all and or each of the independently executable images that are part of the application package; and (4) when two interoperability devices open a communication channel any existing access rights for device teams or applications associated with unique ids that are no more restrictive than those existing for the interoperability of the two devices on either device are synchronized with those on the other device.

In another embodiment (2), the invention provides the method of (1), wherein one or more of the following are true: (1) the interoperability device comprises a Dart device; (2) the basis for the unique ids are an interoperability security procedure; (3) the access rights are as described in interoperability security procedure; (4) the package is an interoperability software package and/or a Dart; (5) the opening of a communication channel is initiated as part of a device recruitment procedure; and (6) the access rights are synchronized using a Social Synchronization procedure.

In another embodiment (3), the invention provides the method of (1), wherein the method is carried out in the following steps: (1) initiating a communication session from an interoperability software package running on an initiating interoperability device to a target interoperability device in order to carry out a particular interoperability purpose; (2) determining if proper access rights exist between and among the devices for the intended purpose; and (3) if the proper access rights exist, the application software package is allowed to extend its execution to the target device by sending an independently executable image to the target device and running the image in a context with the needed access rights.

In another embodiment (4), the invention provides the method of (3), further comprising: (4) if during execution the independently executable image attempts an access not allowed by the needed access rights of the context in which it is running, the execution will be terminated by the interoperability engine on the target device.

In another embodiment (5), the invention provides the method of (4), further comprising: (5) if the proper required access rights do not exist, the user or users are presented as necessary on one or both devices on a user interface requesting that the proper access rights be granted and or the proper credentials be provided.

In another embodiment (6), the invention provides the method of (5), further comprising: (6) if the proper access rights are granted and/or the proper credentials are provided, the user may optionally be requested specify if the access rights and credentials are to be stored on the devices for a period of time.

In another embodiment (7), the invention provides the method of (6), wherein the period of time may optionally be selected from the periods of time consisting of: (i) the lifetime of the current communication session, (ii) a specified period of time or target date and time when the access rights and or credentials storage and or use are to expire; (iii) for an open period of time without defined expiration, or (iv) forever or forever until revoked.

In another embodiment (8), the invention provides the method of (6), further comprising: (7) independently of whether or not the proper access rights exist or are granted and/or the proper credentials are gathered for the specific purpose and then stored the following procedure is optionally preformed: all the now stored access rights and credentials that are valid forever for all devices and interoperability applications ever stored which are no more restrictive than those for the same devices or applications as indicated by the unique ids of the devices and applications associated with the stored access rights and credentials are then synchronized across both devices.

In another embodiment (9), the invention provides the method of (5), wherein the determining if proper access rights exist between and among the devices for the intended purpose), further comprises: (2a) communicating the access rights needs and credentials the software package will need to carry out the interoperability purpose by the executing software package; (2b) inspecting lists of unique ids and associated access rights and credentials stored on either one of or both devices by the interoperability engines of one or both devices to determine if the devices already have the needed access rights; and (2c) checking to determine if the access rights and/or credentials already exist on the target device and/or on the initiating device that will allow the access needed for the intended purpose.

In another embodiment (10), the invention provides the method of (8), wherein the effect is that the access rights already gathered for devices and applications at the level or below that is now common to both devices will now be allowed without user prompting even in cases where the unique ids, access rights, and/or credentials where never directly exchanged between two interoperability devices.

In another embodiment (11), the invention provides the method of (8), wherein the step of synchronizing across both devices access rights and credentials may be reversed such that access rights and/or credentials can be subsequently revoked by a device with the proper access rights and/or credentials and/or physical access required by the security mechanisms of the interoperability players that contain the interoperability engines running on the devices.

In another embodiment (12), the invention provides the method of (1), wherein the number of user involvements in granting access rights between all combinations of N devices which frequently communicate to be roughly linearly proportional to the number of devices N, rather than other methods wherein the number of user involvements grows faster as N increases.

In another embodiment (13), the invention provides the method of (8), wherein the number of user involvements in granting access rights between all combinations of N devices which frequently communicate to be roughly linearly proportional to the number of devices N, rather than other methods wherein the number of user involvements grows faster as N increases.

In another embodiment (14), the invention provides the method of (12), wherein the growth of interactions is substantially proportional to N while conventional other methodologies provide for interactions that are proportional to the (N Choose 2) gamma function because conventional methodologies do not have transitivity.

In another embodiment (15), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for automatically and transitively spreading the access rights and credentials between interoperability devices, the program module including instructions for: (1) assigning to each interoperability device a unique id; (2) assigning to each interoperability device an initial set of access rights; (3) assigning to each interoperability software package one or more unique ids and embedding in the package the sets of unique ids and associated access rights needed by all and or each of the independently executable images that are part of the application package; and (4) when two interoperability devices open a communication channel, any existing access rights for device teams or applications associated with unique ids that are no more restrictive than those existing for the interoperability of the two devices on either device are synchronized with those on the other device.

In another embodiment (16), the invention provides an apparatus that automatically and transitively spreads access rights and credentials between interoperability devices, the apparatus comprising: (1) means for assigning to each interoperability device a unique id; (2) means for assigning to each interoperability device an initial set of access rights; (3) means for assigning to each interoperability software package one or more unique ids and embedding in the package the sets of unique ids and associated access rights needed by all and or each of the independently executable images that are part of the application package; and (4) means for synchronizing access rights with those on the other devices when two interoperability devices open a communication channel so that any existing access rights for device teams or applications associated with unique ids that are no more restrictive than those existing for the interoperability of the two devices on either device are synchronized with those on the other device.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XX. Interoperability Device/DartDevice

Recall that a DartDevice is a highly interoperable device by virtue of its running a DartPlayer containing a DartEngine and at least one communications protocol for connecting to other DartDevices. Aspects of the interoperability device and the more particularized DartDevice are illustrated in FIG. 3 (300) and FIG. 4 (3000).

In one embodiment (1), the invention provides an interoperability device comprising: (1) a physical Turing complete instruction set based processor coupled with a physical memory capable of performing general computation and input/output operations; (2) at least one means for two way communication with other devices; and (3) an interoperability engine running on the processor and encapsulated in an interoperability player embodied in an executable format loadable and executable on the device.

In another embodiment (2), the invention provides an interoperability device as in (1), further comprising the interoperability player.

In another embodiment (3), the invention provides an interoperability device as in (1), wherein one or more of the following are true either alone or in any combination: (1) the interoperability device is a DartDevice; (2) the Interoperability Engine comprises a DartEngine; and (3) the interoperability player comprises a DartPlayer.

In another embodiment (4), the invention provides a method for operating a device in an interoperability mode with other similar or dissimilar devices, the method comprising: (1) providing a physical Turing complete instruction set executable within a processor coupled with a physical memory and in combination capable of performing general computation and input/output operations; (2) sending and receiving two-way communications between at least the device and another device; and (3) operating an interoperability engine on the processor and encapsulated in an interoperability player embodied in an executable format loadable and executable on the device.

In another embodiment (5), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for operating a device in an interoperability mode with other similar or dissimilar devices, the program module including instructions for: (1) providing a physical Turing complete instruction set executable within a processor coupled with a physical memory and in combination capable of performing general computation and input/output operations; (2) sending and receiving two-way communications between at least the device and another device; and (3) operating an interoperability engine on the processor and encapsulated in an interoperability player embodied in an executable format loadable and executable on the device.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XXI. Interoperability Platform/DartPlatform

Recall that the DartPlatform may be any set of Dart methodologies which can carry out the specification, generation, intelligent teaming of DartDevices and facilitate the spreading and running of Dart interoperability applications across one or more DartDevices. Aspects of the Interoperability Platform, and the more particular DartPlatform of the generic interoperability platform, are illustrated in FIG. 3 as well as in other portions of the detailed description.

Additional embodiments of the interoperability platform, of which the Dart Platform is a specific example, are now described. In one embodiment (1), the invention provides a system for specifying, building, distributing, and carrying out the intent of an interoperability software package of independently executable images across a plurality of possibly heterogeneous devices in a secure, reliable, efficient and robust manner, the system comprising: (1) an interoperability source for specifying an interoperability computer program software package; (2) interoperability tools for building procedural instructions; (3) an interoperability format for packaging at least the procedural instructions; (4) an interoperability instruction set for representing the procedural instructions generated by the interoperability tools; (5) an interoperability engine for running the interoperability software package and providing a common interoperability infrastructure on all interoperability devices; and (6) device recruitment means for forming, distributing, and maintaining a team of interoperability devices.

In another embodiment (2), the invention provides the system of (1), wherein the device recruitment means further includes: means for sending an inspection procedure operative to find a device having a needed resource or capability to at least one reachable device different from the initiating source device over at least one communication link, the inspection procedure including inspection procedure instructions coded in an executable form common to both the initiating source device and to the device the inspection procedure is intended to reach; means for receiving oh the initiating device the return response from each of the reachable devices directly or indirectly over a communication link; means for analyzing, by a procedure executing on the initiating device, the received returns from all responding reachable devices to determine a utilization plan identifying the combination of capabilities and resources of the initiating source device and the responding reachable devices to best carry out the intent of the software application; and means for distributing, by an application program executing on the initiating device, at least one of executable code, data, content, and/or Dart to at least one of each of the reachable devices identified as having a needed resource or capability according to the identified utilization plan.

In another embodiment (3), the invention provides the system of (1), wherein one or more of the following optional components are included or used in the system in any combination: (1) an interoperability framework; (2) linear tasking means; (3) vertical layering means; (4) application driven power management means; (5) application driven error recovery means; (6) an interoperability runtime; (7) an interoperability application driven runtime; (8) creationism means; (9) virtual pointers; (10) an interoperability security model means; (11) social synchronization means; (12) social security means; and (13) interoperability device enabling means.

In another embodiment (4), the invention provides the system of (1), wherein one or more of the following are true in any combination: (1) the system includes a DartPlatform; (2) the interoperability software package conforms to the interoperability format or is a Dart conforming to the DartFormat; (3) the independently executable images are renditions; (4) the Interoperability Source is a DartSource; (5) the Interoperability Tools are DartTools; (6) the Interoperability Format is a DartFormat; (7) the Interoperability Instruction Set is a DartInstructionSet; and (8) the recruitment method is a Dart Recruitment method.

In another embodiment (5), the invention provides the system of (3), wherein one or more of the following are true in any combination: (1) the Interoperability Framework is a DartFramework; (2) the Linear Tasking is a Dart Linear Tasking; (3) the Vertical Layering is a Dart Vertical Layering; (4) the Application driven power management is a Dart Application driven power management; (5) the Application driven error recovery is as described elsewhere in the detailed description; (6) the Interoperability Runtime is a DartRuntime; (7) the creationism is Dart Creationism; (8) the virtual pointers are Dart Virtual Pointers; (9) the Interoperability Security Model is as described elsewhere in the detailed description; (10) the Social Synchronization is as described elsewhere in the detailed description; (11) the Social Security is as described elsewhere in the detailed description; and (12) the Interoperability Device Enabling is as described elsewhere in the detailed description.

In another embodiment (6), the invention provides the system of (1), wherein the system is simple because of one or more of the following features: a programmer or creator of the application writes and or tests just one interoperability application that targets an interoperability engine and it will provide the following features alone or in any combination: (1) run well on all suitable interoperability devices running that engine; (2) automatically allow any user interface input and output to be performed on nearby or remote Personal Computer or intelligently across many devices with superior interface hardware or software resources eliminating the need to separately write and separately distribute special Personal Computer synchronization applications; (3) perform tasks which can only be performed or are better performed with two or more cooperating devices; (4) serve as internet server software without the need to write any more code by placing the application on an interoperability device running the interoperability engine that is connected to the internet; (5) distribute itself from device to device in a limited or unlimited manner; (6) the use of virtual pointers eliminates the need to write more tedious code using file operations; (7) make use of virtual pointers to eliminate the need for considering or writing algorithms used to improve the speed of access to various storage mediums; (8) make use of virtual pointers to eliminate the need for thinking about or partitioning and maintaining the partitioning of a single address space where different memory allocations must be kept from growing into each other, or be resized dynamically, or copied to larger partitions so they could grow in size; (9) make use of the hardware abstraction layer code with makes all communications mechanisms look the same to the application regardless of the protocol being used; (10) make additional coding unnecessary to support the automatic bridging of protocols so that devices can be serially teamed even if different protocols are used between different devices; (11) allow the programmer to use the code in the Interoperability Framework and its use of the rest of the Interoperability Platform to perform much of the most difficult aspects of interoperability applications without the need to write the code; (12) provide a program development effort that grows linearly with the number of devices to support, N, instead of order development methodologies where the effort grows as the square of N or any other methodology where the growth rate is greater than being linear with N; (13) provide a program testing effort that grows linearly with the number of devices to support, N, instead of order development methodologies where the effort grows as the square of N or any other methodology where the growth rate is greater than being linear with N; and (14) limit the necessary testing is simplified because adaptation is limited to small number of well defined classifications of devices by a renditioning method.

In another embodiment (7), the invention provides the system of (6), wherein the (11) allow the programmer to use the code in the Interoperability Framework and its use of the rest of the Interoperability Platform to perform much of the most difficult aspects of interoperability applications without the need to write the code, the aspects including one or more of the following in any combination: (a) recruitment's device discovery; (b) recruitment's device teaming; (c) recruitment's spreading of parts of the application intelligently across devices; (d) application level power management; (e) application level error recovery; (f) the mixing and matching of event processing units wherein the functionality is rearranged just by changing the graph of event processing units; (g) the dynamic extension of the runtime to include separately generated interoperability applications into the runtime of other applications; and (h) maintaining harmonious operation among the teams of devices using event processing which is automatically serialized and synchronized across teams of devices.

In another embodiment (8), the invention provides the system of (1), wherein the system is simple because of one or more of the following features: the end user of the application has to consider and or understand and or administrate any of the following less often, if ever, than the user would have to were conventional static interoperability methods and or conventional procedural interoperability methods used alone or in any combination: (1) needing to know about, finding, getting or loading drivers; (2) choices presented wherein a list of devices that cannot perform the intended functionality are presented along with those that can because the underlying system does not yet know what the limitations of the devices are when the list is created; (3) what protocols are to be used, so that the end user does not have to pre-select the protocol or communications technology before initiating interoperability or knowing what the end user's choices are; (4) the rules for securing devices and or data and or code and or content because of the transitivity of rules as carried out by the Interoperability Security Model and or the Social Security Method; (5) the forming of teams of devices to carry out an intended purpose can be automated by the application; (6) the application components of code and data and content and meta data are all packaged together according to the interoperability format and travel together so that the user does not have to deal with the preponderance of compatibility errors that would otherwise when interdentally generated and or independently distributed components that come into contact are incompatible due to one or more of: (a) versioning incompatibilities; (b) specification misunderstandings; (c) errors in implementation; (d) shortcuts in implementation made by the programmers or manufacturers; and (e) necessary components that are found to be missing or otherwise unreachable; and (7) explicitly installing separately generated applications on devices for synchronizing and or backing up data and or content across one or more devices.

In another embodiment (9), the invention provides the system of (1), wherein the system is simple because of one or more of the following features: the manufacturer of the device is simple as compared with conventional static and or procedural methodologies for one or more of the following reasons alone or in any combination: (1) much less development effort since ohly the functions and protocols of the actual device need to be considered in porting an interoperability engine, and not all the permutations of possible protocols and characteristics of other devices because all the adaptation for different devices is carried out by the applications not by each and every device; (2) no or less need to coordinate, participate or wait for application standards to be created before designing and or building and or bringing to market interoperability devices; (3) lesser support needs because interoperability of devices and applications are easier to configure and use by the end user; (4) can expose unique capabilities to other devices without writing or distributing components to other types of devices; (5) devices can work with other manufacturers' devices without any or reduced coordination of efforts and or negotiating of contracts; and (6) can advance or cost reduce hardware without the need to rewrite software applications and or distribute new software applications and or software updates to other devices.

In another embodiment (10), the invention provides the system of (1), wherein the system is simple because of one or more of the following features: the publishing of the interoperability software applications is simple as compared with conventional static and conventional procedural methods because of one or more of the following alone or in any combination: (1) there is only one package instead of many packages and parts needed to address the market of heterogeneous devices and combinations of devices and protocols so that there is a bigger market addressable with one product which results in one or more of the following simplifications: (a) lower development efforts; (b) simpler inventory; (c) simpler distribution; and (d) simpler marketing since market is not as segmented by device types and/or communications protocols and or processor types, and/or screen sizes; (2) simpler pricing and promotion models; (3) more sales with less effort; (4) easier use means simpler support; (5) distribution of digital code and or data and/or content and/or packages thereof can be performed directly from device to device; and (6) applications or teasers about the applications can be distributed directly from device to device without the need to find other ways to communicate the benefits, existence or actual software directly to the potential users of a service accessible through the applications or directly to potential purchasers of software.

In another embodiment (11), the invention provides the system of (1), wherein the system is secure for one or more of the following reasons: (a) the engine provides a protective sandbox by way of the checking of all application memory accesses for violations, and limiting direct application access to storage and other aspects of the device's resources so that interoperability applications code cannot be used to damage the device, its data, or content or run native code to get around the sandbox; therefore, only the limited code of the engine needs to secured against virus or other malicious attacks, and not all of the almost unlimited application code which can be written to run on the devices; (b) viruses cannot propagate easily from devices with one native device processor type to devices with other native processors; since having the same processor is no longer necessary to ensure interoperability, more types of processors are likely to be deployed, making the world of interoperability devices more secure from the spread of viruses and other malicious software; (c) the Social Security Model is so simple to administrate and use that people will actually leave security on, rather than turn it off to avoid the administration otherwise necessary with conventional security methods; and (d) the Interoperability Security Model is implemented entirely or mostly in portable source code that can be thoroughly implemented and debugged once, greatly decreasing the likelihood of errors.

In another embodiment (12), the invention provides the system of (1), wherein the system is reliable and or robust for one or more of the following reasons in any combination: (a) applications running on one or more devices are often or always communicating with parts of an initial package spread via the recruitment and renditioning methodologies so as to enjoy a reliably of interoperability greater than that where independently developed and or independently distributed applications used to perform the interoperability; (b) the same portable source code of the Interoperability Engine is used on all devices largely eliminating the problems of implementation and or misunderstandings of the specification or other problems associated with independently developed and distributed source or code used to enable interoperability between or across devices; (c) the Interoperability Framework provides much of the common interoperability functionality across applications and devices so that there is more testing of the Framework code and fewer separate designs and implementations, leading to fewer bugs or interoperability issues; (d) Linear Tasking and or Vertical Layering and or the serialization and synchronization methods of Recruitment ensures a largely deterministic order of processing of events driving the application and device operations, leading to fewer possible permutations of operating order that might otherwise cause errors; (e) application level error recovery is built into the Interoperability Platform, from the Interoperability Source, Interoperability Tools, the Interoperability Runtime and the Interoperability engine to ensure that intermittent interruptions in communications can often be elegantly handled without the need for the application to stop all operations or terminate, or be explicitly reset; and (f) the Interoperability Security System and or the sandbox and or the access rights enforcement implemented in the Interoperability Engine can blocks viruses or other applications from harming the device or its data whether the potential harm is intentional or unintentional.

In another embodiment (13), the invention provides the system of (1), wherein the system is efficient for one or more of the following reasons alone or in any combination: (a) only the code, data and content needed for a particular target device and or particular task needs to be sent over a communications channel and processed by a target device by the virtues of the Recruitment and or Renditioning and or Creationism methods for spreading code, data and content; (b) only one application package is needed to effect even complex multiple device interoperability; (c) the Part images of an interoperability application that conforms to an interoperability format are often shared between separately executable images of the application so that it is not necessary to duplicate much of the data shared by the separately executable images; (d) Virtual Pointers automatically make advantageous tradeoffs between the use of main memory and physical storage to make applications able to run with less physical memory than would otherwise be necessary; (e) Virtual Pointers automatically make advantageous tradeoffs between the use of main memory and physical storage to make applications able to run faster than if conventional memory and/or storage methods were employed; and (f) Virtual Pointers make intelligent advantageously efficient tradeoffs of memory requirements and speed of operation based on the access patterns expected in applications and the physical characteristics of the main memory and storage of each particular device.

In another embodiment (14), the invention provides the system of (1), wherein the software application running on more than one device is at least partially performing the interoperability operations on two or more devices with code and/or data and/or content that were originally part of a single software package on the initiating device so as to enjoy a reliably of interoperability greater than that where independently developed and/or independently distributed applications are used to perform the interoperability operations.

In another embodiment (15), the invention provides the system of (3), wherein the (1) interoperability framework further comprises a computer program or computer program product for executing within a processor logic and associated memory and including a plurality of computer program code instructions implementing a procedure to establish an interoperability framework.

In another embodiment (16), the invention provides the system of (3), wherein the (2) linear tasking means further comprises a computer program or computer program product for executing within a processor logic and associated memory and including a plurality of computer program code instructions implementing a procedure performing linear tasking.

In another embodiment (17), the invention provides the system of (3), wherein the (3) vertical layering means further comprises a computer program or computer program product for executing within a processor logic and associated memory and including a plurality of computer program code instructions implementing a procedure performing vertical layering.

In another embodiment (18), the invention provides the system of (3), wherein the (4) application driven power management means further comprises a computer program or computer program product for executing within a processor logic and associated memory and including a plurality of computer program code instructions implementing a procedure performing application driven power management.

In another embodiment (19), the invention provides the system of (3), wherein the (5) application driven error recovery means further comprises a computer program or computer program product for executing within a processor logic and associated memory and including a plurality of computer program code instructions implementing a procedure performing application driven error recovery.

In another embodiment (20), the invention provides the system of (3), wherein the (6) interoperability runtime further comprises a computer program or computer program product for executing within a processor logic and associated memory and including a plurality of computer program code instructions implementing a procedure establishing a interoperability runtime.

In another embodiment (21), the invention provides the system of (3), wherein the (7) interoperability application driven runtime further comprises a computer program or computer program product for executing within a processor logic and associated memory and including a plurality of computer program code instructions implementing a procedure establishing and performing an interoperability runtime.

In another embodiment (22), the invention provides the system of (3), wherein the (8) creationism means further comprises a computer program or computer program product for executing within a processor logic and associated memory and including a plurality of computer program code instructions implementing a procedure performing creationism.

In another embodiment (23), the invention provides the system of (3), wherein the (9) virtual pointers further comprises a computer program or computer program product for executing within a processor logic and associated memory and including a plurality of computer program code instructions implementing a procedure performing creationism.

In another embodiment (24), the invention provides the system of (3), wherein the (10) interoperability security model means further comprises a computer program or computer program product for executing within a processor logic and associated memory and including a plurality of computer program code instructions implementing a procedure establishing an interoperability security model.

In another embodiment (25), the invention provides the system of (3), wherein the (11) social synchronization means further comprises a computer program or computer program product for executing within a processor logic and associated memory and including a plurality of computer program code instructions implementing a procedure performing an interoperability security model.

In another embodiment (26), the invention provides the system of (3), wherein the (12) social security means further comprises a computer program or computer program product for executing within a processor logic and associated memory and including a plurality of computer program code instructions implementing a procedure establishing social security.

In another embodiment (27), the invention provides the system of (3), wherein the (13) interoperability device enabling means further comprises a computer program or computer program product for executing within a processor logic and associated memory and including a plurality of computer program code instructions implementing a procedure performing social security.

In another embodiment (28), the invention provides a method for specifying, building, distributing, and carrying out the intent of an interoperability software package of independently executable images across a plurality of possibly heterogeneous devices in a secure, reliable, efficient and robust manner, the method comprising: (1) generating or providing an interoperability source for specifying; (2) generating or providing interoperability tools for building procedural instructions; (3) generating or providing an interoperability format for packaging at least the procedural instructions; (4) generating or providing an interoperability instruction set for representing the procedural instructions generated by the interoperability tools; (5) generating or providing an interoperability engine for running the interoperability software package and providing a common interoperability infrastructure on all interoperability devices; and (6) performing device recruitment for forming, distributing, and maintaining a team of interoperability devices.

In another embodiment (29), the invention provides a method as in (28), further comprising: sending an inspection procedure operative to find a device having a needed resource or capability to at least one reachable device different from the initiating source device over at least one communication link, the inspection procedure including inspection procedure instructions coded in an executable form common to both the initiating source device and to the device the inspection procedure is intended to reach; receiving on the initiating device the return response from each of the reachable devices directly or indirectly over a communication link; analyzing, by a procedure executing on the initiating device, the received returns from all responding reachable devices to determine a utilization plan identifying the combination of capabilities and resources of the initiating source device and the responding reachable devices to best carry out the intent of the software application; and distributing, by an application program executing on the initiating device, at least one of executable code, data, content, and/or Dart to at least one of each of the reachable devices identified as having a needed resource or capability according to the identified utilization plan.

In another embodiment (30), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for specifying, building, distributing, and carrying out the intent of an interoperability software package of independently executable images across a plurality of possibly heterogeneous devices in a secure, reliable, efficient and robust manner, the program module including instructions for: (1) generating or providing an interoperability source for specifying; (2) generating or providing interoperability tools for building procedural instructions; (3) generating or providing an interoperability format for packaging at least the procedural instructions; (4) generating or providing an interoperability instruction set for representing the procedural instructions generated by the interoperability tools; (5) generating or providing an interoperability engine for running the interoperability software package and providing a common interoperability infrastructure on all interoperability devices; and (6) performing device recruitment for forming, distributing, and maintaining a team of interoperability devices.

In another embodiment (31), the invention provides the computer program product of (30), wherein the instructions for performing device recruitment further includes instructions for: sending an inspection procedure operative to find a device having a needed resource or capability to at least one reachable device different from the initiating source device over at least one communication link, the inspection procedure including inspection procedure instructions coded in an executable form common to both the initiating source device and to the device the inspection procedure is intended to reach; receiving on the initiating device the return response from each of the reachable devices directly or indirectly over a communication link; analyzing, by a procedure executing on the initiating device, the received returns from all responding reachable devices to determine a utilization plan identifying the combination of capabilities and resources of the initiating source device and the responding reachable devices to best carry out the intent of the software application; and distributing, by an application program executing on the initiating device, at least one of executable code, data, content, and/or Dart to at least one of each of the reachable devices identified as having a needed resource or capability according to the identified utilization plan.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

XXII. Virtual Pointers

Conventional programs are most often compiled and linked targeting a conventional processor which can directly address just one linear data address space. Often processors implement virtual memory to allow programs and operating systems to directly address main memory larger than the physical memory by implementing a system of virtual memory where a limited number of real memory blocks, or pages, are automatically swapped in and out of a larger but slower storage device. This advantageously frees the programmer from having to concern herself with logic otherwise needed to directly manage the swapping between the directly addressable fast main memory and slower but larger storage devices.

Still programmers must often concern themselves with memory management logic to keep separate data structures from addressing conflicts with each other as they dynamically change size during execution of programs. Dynamically dividing up and managing the shared use of a single address space is often complex and prone to bugs, even where virtual memory techniques are used to create a larger effective data address space.

Another limitation of conventional virtual memory techniques is that the processor only supports real memory pages of a fixed size regardless of the characteristics of the program that is running, or in a way that requires one size of real memory changes to be used for multiple programs where the size does optimally match the needs of all the simultaneously loaded programs or sections of programs.

In one implementation of the invention, more complex addressing logic is used either in a hardware processor or a software instruction set execution engine to provide multiple independent address spaces for use by each program, and to allow the number of real memory pages and their size to advantageously vary depending on the physical size of available real main memory, speed and performance characteristics of the main memory, and the expected access patterns of specific programs to specific data sets. Inventive programming language extensions are supported in the source code, compiler and linker to provide for the use of the inventive VirtualPointers. Using VirtualPointers has the following benefits:

1. Multiple large independent address spaces. Each dynamically resized data structure can be kept in its own different VirtualPointer address spaces so that no conflicts with data structures in other address spaces can occur.
2. Application specific control over the number of real memory pages for each individual independent address space. The optimal number of real memory pages can be set according to the expected access patterns to limit the amount of real memory required, an or to limit the number of slow block reads and writes that are needed to swap data between real memory and storage. For example, if a large amount of data is always accessed starting at zero and continuing in linear order, more than one memory page would be superfluous. The page size could be set to the optimal access block size of the actual storage to ensure good performance speed, or limit the number of accesses to the storage blocks so as not to wear out the device.
3. Device specific control over real memory page sizes to match storage device performance characteristics or improve the lifetime of the storage device. Often devices use flash memory for storage which have a known limited number of guaranteed block accesses before they start malfunctioning. Hard disks often store or cache data in blocks of a specific size.
4. No need for the programmer to predict or administrate the amount of memory needed for data structures or lists because the virtual pointer automatically logically includes values for an address space larger than the expected largest such data structure or list used to access it;
5. Automatic saving of data in a form independent of page sizes or number of pages.

DartSource can be used to set a parameter of each VirtualPointer variable which indicates whether the saving of Dart using the DartInstructionSet SAVE_INSTRUCTION will automatically save the entire data state of the address space. In one preferred implementation, the values of each VirtualPointer that are to be saved are kept as a DartPart with a sparse list of ranges of values without regard to the page size or number of pages currently in use by the running Dart. This makes it possible for the running of the saved Dart on other devices where there are needs for differing page size and or number of pages.

6. Efficient caching of data from a larger and possibly slower data store with a minimal amount of precious main memory RAM allowing applications to run as if they have much larger RAM memories than they physically have.
7. Simple and efficient base infrastructure for indexed database operations where the data and indexes are kept in different virtual address spaces.

In a preferred implementation VirtualPointers are supported by the DartSource, DartTools, and DartEngine to provide the listed benefits.

In the DartSource each virtual pointer is specified using a #pragma VirtualPointer(parameters) extension of the C or C++ language with parameters which include:

1. The name of a pointer variable that will hold the starting address of a virtual address space when the program starts execution.
2. The number of real memory pages suggested for use.
3. A binary flag indicating if the values in the address space are to be automatically saved along with the application.
4. The suggested size of the real memory pages.

The DartTools process the DartSource #pragma statements to create a Dart which will load the pointer address value which effectively serves as the starting offset of the separate address space. This starting offset is really part of a multi-field address that will be interpreted by the DartEngine to identify a specific virtual pointer.

A Dart Virtual Pointer example is shown in FIG. 32. In a preferred implementation the address space of a Dart is in units of 32-bit words, rather than the more common 8 bit bytes of most conventional processors where the maximum directly addressable space is $2^{32}$ 8-bit bytes. The DartPlatform uses the two most significant bits of a 32-bit address as a field indicating the type of address space to be used. Since the addressable units of the DartInstructionSet carried out by the DartEngine are 32-bit words, there is no loss in the size of memory addressable, which is $2^{30}$ 32 bit words. The example in FIG. 32 shows an address where the address space type field indicates that this is a VirtualPointer address space. The next five-bit field indicates that VirtualPointer 1 is being used, meaning that in this implementation, there can be up to $2^5=32$ different VirtualPointer address spaces. The remaining 25-bits are the offset or address of the data item in VirtualPointer 1's address space.

The example in FIG. 32 shows a specific instance of how VirtualPointer 1's access is being managed by the DartEngine on a specific device for a specific address, 0x50001. Since the block (page) size is 64K=$2^{16}$ words, the upper 9-bits of the 25-bit offset indicate which 64K block contains the data value being accessed. In the example shown, neither of the two real memory pages currently holds that block. Also neither of the flash storage block files for VirtualPointer1 hold the data block needed. These files are the result of past accesses which required the real memory pages for block 100 and 101 to be replaced in the past by other pages. The DartEngine automatically saved the data values of these blocks in the two Flash memory files before replacing the real memory pages. The actual current data value for this access is still in a VirtualPointer1 Part in the running Dart file. This Part was created when the running Dart was last saved using data values then current in its VirtualPointer1's address space. The access in the example will be competed when the data values for block 101 are read from the third range in the Part into one of the two real memory pages. If the real memory page to be replaced has data market as changed or dirty, then a new Flash storage file will be written out to save the current values in the real memory page before it's values are replaced. The access is complete when a pointer to the value for 0×50001 now in real memory, is returned for processing by the accessing Dart instruction.

Additional aspects and embodiments of virtual pointers and their use relative to other aspects of the invention are now set forth. In one embodiment (1), the invention provides a method of providing a plurality of large independent data access address spaces accessible within a software application program which efficiently make use of physical memory and or physical storage devices, the method comprising: (1) specifying the properties of one or more independent address spaces; (2) processing computer program code source statements into an executable image suitable to run on a particular software engine and or hardware processor which supports virtual pointer functionality; and (3) running the executable image on the particular software engine or hardware processor which executes an instruction set that resolves accesses to data referenced by the address space by using a fast access limited size main memory and slower access but larger size secondary storage in an efficient manner.

In another embodiment (2), the invention provides the method in (1), wherein the specifying the properties of one or more independent address spaces is performed using a computer programming language that supports statements conforming to a syntax and semantics for doing so.

In another embodiment (3), the invention provides the method in (1), wherein the processing comprises running software tools which process the source statements into an executable image suitable to run on a particular software engine and or hardware processor.

In another embodiment (4), the invention provides the method of (1), wherein the efficiently making use of and the in an efficient manner are carried out at least in part by: (1) for each independent address space, creating, and maintaining a number of real memory pages all of a single specific size; (2) when accesses to data logically in the independent address space are made, resolving the access and returning a value or pointer to main memory containing the value to the instruction or program making the access, using the following procedure: (a) determining if the data is in one of the main memory pages; (b) if the data is not in one of the main memory pages performing the following procedure: (i) determining if the data is in the secondary storage; (ii) if it is not in the secondary storage, perform one or more of the following procedures: (1) return a default value; (2) return with a pointer to a pointer to a main memory data element that contains a default value; and (3) return with an access to unknown data code or other indicator that there is no known value for the data; (c) if the data is in the secondary storage, perform the following procedure: (i) selecting a real memory page and starting address that will hold the block of data that contains the data value needed; (ii) if the selected real memory page is marked as dirty then writing out or otherwise cause the values in the selected real memory page to be written to secondary storage; (iii) reading or otherwise loading the contiguous range of addressable data into the real memory page that is the size and has the same new starting address as the real memory page; (iv) mark the data in the real memory page as being not dirty; and (v) return the value of the data now in the selected main memory page or a pointer to the data now in the selected main memory page. (d) if the data is in one of the main memory pages perform the following procedure: (i) if the access is known to be one that indicates that the consumer of the value may change the value of the data, mark the main memory page as dirty; and (ii) return the value of the data main memory page or a pointer to the data in the main memory page that is found to include the data.

In another embodiment (5), the invention provides the method of (4), wherein if the data is not in a real memory page and the data is not on the secondary storage, proceed as if the data was in secondary storage, except that instead of loading the selected real memory page with data from the secondary storage, fill the selected real memory page with a default value.

In another embodiment (6), the invention provides the method of (5), wherein the method is only used if any of the accesses to data in the read memory page is known to be one that indicates that the consumer of the value may change the value of the data.

In another embodiment (7), the invention provides the method of (4), wherein the default value is optionally selected to be one of the following values: zero ("0"), one ("1"), all bits set to one, all bits set to zero, negative one, the most significant bit set to 1 and all others set to zero, a particular value reserved to indicate an uninitialized value or an unknown value.

In another embodiment (8), the invention provides the method of (1), wherein one or more of the following are true in any combination: (a) the software application program is a DartRendition or a Dart; (b) specifying the properties of one or more independent address space is done using extensions to the language for interoperability source; (c) the software tools are the interoperability tools or are the DartTools; (d) the particular software engine and or hardware processor is the interoperability engine or the DartEngine; and (e) the instruction set is an interoperability instruction set or is the DartinstructionSet.

In another embodiment (9), the invention provides the method of (4), wherein the values kept in secondary storage are logically overwritten by the presence of data stored in a superseding file.

In another embodiment (10), the invention provides the method of (8), wherein the values are initially kept inside a saved DartFormat Image and when a value is changed by the execution of a Dart, instead of having to rewrite or copy and replace the data values in the DartFormat image the data is logically overwritten by a descriptor file with the same starting address as the block of data corresponding to a block which might be loaded into real memory pages.

In another embodiment (11), the invention provides the method of (1), wherein the properties are optionally selected to be one or more of the following in any combination: (a) number of real memory pages; (b) a binary flag indicating if the values in the address space are to be automatically saved along with the application; (c) the size of the real memory pages; and (d) the method for determining the above properties when not explicitly provided in the statement.

In another embodiment (12), the invention provides the method of (11), wherein the real memory page size is determined by one or more of the following factors or any combination thereof: (i) amount of available real memory; (ii) block size of flash media or other media type; (iii) random access memory (RAM) buffer size of the physical storage; and (iv) speed of reading or writing of data to main memory and or physical storage.

In another embodiment (13), the invention provides the method of (12), wherein the main memory page size matches the size of the physical unit of access of a secondary storage device, or is an integer fractional size of the physical unit of access of a secondary storage device.

In another embodiment (14), the invention provides the method of (1), wherein the specification is done via a #pragma statement of a C language or C++ language or extended language for processing by the interoperability tools or by the DartTools.

In another embodiment (15), the invention provides the method (of 1), wherein the method advantageously provides one or more of the following properties in any combination: (a) multiple large independent address spaces; (b) application specific control over the number of real memory pages for each individual independent address space; (c) device specific control over real memory page sizes to match storage device performance characteristics; (d) no need for the programmer to predict or administrate the amount of memory needed for data structures or lists because the virtual pointer automatically logically includes values for an address space larger than the expected largest such data structure or list used to access it; (e) automatic saving of data in a form independent of page sizes or number of pages; (f) effective caching of data from a larger and possibly slower data store with a minimal amount of precious RAM allowing applications to run as if they have much larger RAM memories than they physically do; and (g) simple and efficient base infrastructure for indexed database operations where the data and indexes are kept in different virtual pointer address spaces.

In another embodiment (16), the invention provides the method of (1), wherein access to data values in the address space is through the use of one or more of in any combination: (a) reserved pointer types; (b) reserved pointer values; (c) the values used as pointer values; and (d) reserved instruction addressing modes.

In another embodiment (17), the invention provides the method of (1), wherein physical memory and storage resources are one or more of in any combination: (a) flash memory; (b) hard disk; (c) optical storage media; (d) solid state storage media; and (e) any other physical medium which is slower than the main memory attached to a processor.

In another embodiment (18), the invention provides the method of (1), wherein efficiency is achieved for one or more of in any combination of factors: (a) a programmer does not need to write explicit code to do one or more of the following: (i) allocate and reallocate memory in ways that would otherwise be necessary; (ii) perform or specify explicit file operations; and (iii) storing and restoring of data in the independent address spaces where such storing is done automatically as part of saving the application; (b) a programmer does not need to specify or consider the amount of main memory needed; (c) a programmer does not need to specify or consider the speed of the application's operations; (d) a programmer does not need to specify or consider the application or user interface response times as experienced by a human user; (e) a programmer does not need to specify or consider the speed of access to data and or of the process for locating and or collating data; (f) improving the lifetime of secondary storage devices by reducing the number of block accesses; and (g) the amount of code needed in an application based on the reduced need as in item a) of this list.

In another embodiment (19), the invention provides the method of (8), wherein a SAVE_INSTRUCTION and or BUILTIN_INSTRUCTION is used to automatically save the data.

In another embodiment (20), the invention provides the method of (8), wherein the data values are saved in a Dart Part which contains possibly sparse sets of contiguous ranges of values.

In another embodiment (21), the invention provides the method of (20), wherein the data values are selectively restored or not restored based on the value of an autoload flag bit in the flags word of the Part Table record for each VirtualPointer independent address space during loading of the Dart by a DartEngine.

In another embodiment (22), the invention provides a computer program product for use in conjunction with a computer system or information appliance, the computer program product comprising a computer readable storage medium and a computer program mechanism embedded therein, the computer program mechanism comprising: a program module that directs the computer system or information appliance to function in a specified manner for providing a plurality of large independent data access address spaces accessible within a software application program which efficiently make use of physical memory and or physical storage devices, the program module including instructions for: (1) specifying the properties of one or more independent address spaces; (2) processing computer program code source statements into an executable image suitable to run on a particular software engine and or hardware processor which supports virtual pointer functionality; and (3) running the executable image on the particular software engine or hardware processor which executes an instruction set that resolves accesses to data referenced by the address space by using a fast access limited size main memory and slower access but larger size secondary storage in an efficient manner.

In another embodiment (23), the invention provides a virtual pointer data structure, comprising: a memory storage; a plurality of pointers stored in the memory storage; the pointers permitting specification and access to a plurality of large independent data access address spaces accessible within a software application program which efficiently make use of physical memory and/or physical storage devices; the pointers specifying the properties of one or more independent address spaces; and the pointers permitting resolution of access to data referenced by the address space by using a fast access limited size main memory and slower access but larger size secondary storage in an efficient manner.

The features and/or elements recited in these exemplary embodiments as well as of exemplary embodiments described elsewhere in this detailed description or in the drawings may be combined in many different ways so that embodiments recited above are not limitations of the invention and additional or alternative embodiments having any different combinations or permutations of the features and elements are also embodiments of the invention.

Having described many different aspects, features, advantages, and embodiments of the invention, attention is now directed to a couple of illustrative examples of the inventive technology so that its structure, procedures, and operation may be more readily understood. The examples also describe additional features of the invention that may not otherwise be described in the sections above.

XXIII. Example Applications and Application Scenarios

A. Neutrino Detector Application Example

Figure 21:
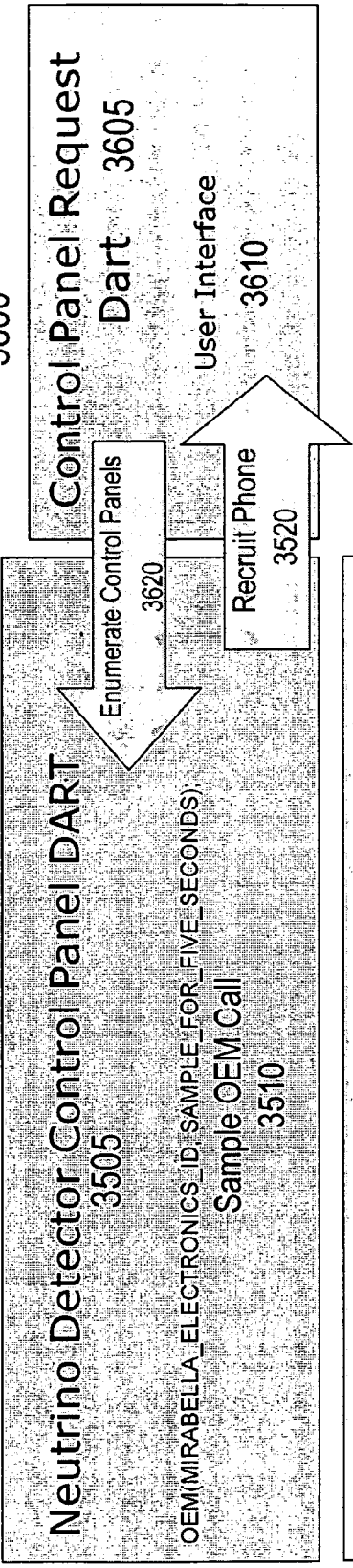
FIG. 21 is an illustration showing a hypothetical Neutrino Detector/Mobile Phone example embodiment showing how one device can expose its unique capabilities to devices with no prior knowledge of these unique capabilities.

With reference to FIG. 21, there is illustrated an example of an embodiment of the invention showing how the DartPlatform, through the use of the DartInstructionSet's OEM_BUILTIN_INSTRUCTION, can be used to make the native functionality of a new type of DartDevice, a home Neutrino Detector 3500, discoverable and useable by a mobile phone DartDevice 3600 even when the mobile phone initially has no knowledge of the existence or characteristics of the Neutrino Detector 3500.

The home Neutrino Detector 3500 is a device which only exists theoretically today, but should one exist, it will be appreciated that there would be no existing standards for interoperating with such a device. Yet the DartPlatform provides methods for enabling the Neutrino Detector (ND) to be interoperable with other DartDevices, in this case a mobile phone 3600, even though no existing standards or knowledge of the functionality of such devices was known to the manufacturer of the mobile phone DartDevice 3600.

The manufacturer of the ND is Mirabella Electronics which has been assigned the unique id assigned to the symbol, MIRABELLA_ELECTRONICS_ID so as to differentiate any unique OEM functions created and used by Mirabella Electronics from those created and used by all other manufacturers. Mirabella, desiring to have its device interoperable with DartDevices, ported the DartEngine as part of a DartPlayer running on the ND. To expose the device's unique capability of sampling the number of Neutrinos which passes through its detector in a five second period, the native embedded function, CollectSamples, that causes the collection and returns the number of Neutrinos which passed through the detector is called from the HAL's OEM(<oemld>, <subfunction>) method. Mirabella electronics then used the DartSource and DartTools to create a control panel Dart which contains a rendition, R1, that displays a user interface for the control panel, and a rendition, R0, which processes Dart specific events of a type reserved for signaling that sampling is to take place.

Every DartDevice with user interface capabilities will normally be shipped with a GetControlPanels Dart resident on it to be used to find all the control panels implemented as Darts reside on reachable DartDevices which are willing to share its control panel Darts with other DartDevices. When the GetControlPanels Dart is started on the mobile phone 3600, it sends a GetControlPanelList DartProcedure to run on all devices reachable by any of its communications protocols. In this case the Mobile Phone finds and establishes a communications session using the Bluetooth protocol common to both devices, then sends the DartProcedure as part of a RunProcedure type event to the Neutrino Detector which runs the DartProcedure. The DartProcedure gathers a list of names and descriptions and the unique id of the ControlPanel Dart when it is executed on the ND through the use of builtin instructions that are part of every DartDevice's DartinstructionSet. The name and description of the available control panel Dart resident on the ND are sent back to the Mobile Phone and displayed by the GetControlPanels Dart for selection by the user. After selecting the control panel from the list on the Mobile Phone, an event is sent requesting that the Control Panel Dart identified by its unique id start execution on the ND and then recruit the Mobile Phone over the established communications session, which automatically replaces the GetControlPanel Dart on the phone with a running Rendition R1 sent by the recruiting ND ControlPanel Dart's running R0 rendition.

Rendition R1 then displays a big green sample button on the Mobile Phone's screen. When the user selects the button, R1 generates an event marked for synchronization that request that a sample be taken. The event is automatically sent by the DartRuntime to the teamed ND's event queue which results in the processing of the event by using the OEM_BUILTIN_INSTRUCTION to carry out the sampling by causing the DartEngine to call the halOEM( ) method with the parameters assigned by Mirabella Electronics to cause the CollectSamples( ) native device function and return the number of samples back to the caller of halOEM( ) which is then returned by the engine to the executing R0 rendition. R0 then calls to place a DisplayNumberOfSamples type event which is marked for synchronization on its queue which results in the placing of the DisplayNumberOfSamples type event on the queue of the teamed Mobile Phone. The R1 rendition running on the Mobile Phone then processes the event and displays the number of detected Neurtrinos carried in a parameter of the DisplayNumberOfSamples type event on the screen.

Thus the example of FIG. 21 demonstrates that the DartPlatform can be advantageously used to expose and extend capabilities and control of even very unique devices to DartDevices with no prior knowledge of the existence, characteristics or capabilities of the unique devices.

Some of the significant points from the above example and descriptions, include the following:

First, a device whose sole purpose could not be considered by a standards committee was able to become a DartDevice 400, requiring about the same amount of development effort as making any other device a DartDevice 400.

Second, this new device is able to easily expose its unique hardware capability to other devices that existed prior to the existence of any devices of this type. Preexisting DartDevices 400 can interoperate with the new device, controlling its behaviors, which are new and unique and previously unknown to any devices.

Third, the development effort required to make the Neutrino Detector 3500 a DartDevice 400, is similar to making any device a DartDevice 400, without any additional work for any other devices, even though those devices existed prior to the technology being exposed. That is, the development effort which rises in an N-squared manner when using conventional interoperability methodologies is just an N order effort when implemented using the methodologies embodied in the DartPlatform. Because the DartApplications' renditions are communicating with other renditions from the same original Darts, a high degree of reliability is attained as compared to conventional interoperabilities where there would be a need to separately implement and distribute interoperability components which are much more likely to encounter incompatibilities.

B. Slide Show Application Example—Stages of Development Through Usage

Now we describe in still greater detail an exemplary system, method, computer program and components thereof in the context of an example that describes development through usage using a slide show Dart application as the principle example application. This slide show example is only for purposes of explanation and it will be appreciated that the same technology can be advantageously employed for virtually any software application including software applications that interact with or utilize or control hardware which needs to run on virtually any device or set of devices whether on one device at a time, sequentially, on many devices simultaneously or in parallel, or otherwise.

In this example, DartSouce (FIG. 3 100) files (C++) and the DartFramework (FIG. 3 102) of class definitions and source code (FIG. 3 101) designed to be used as an optional basis for expressing the algorithms and code necessary to build interoperability applications With reference to FIG. 3, the exemplary slide show Dart application begins as DartSource files, 100 on FIG. 3. Application Code 101 generally conforms to the standard C++ language. The SlideShow DartSource 100 also includes standard C++ source files which express the DartFramework 102. The DartFramework 102 is a set of class definitions and code designed to be used as an optional basis for expressing the algorithms and code necessary to build interoperability applications to be rendered into the DartFormat 300 and which conforms to the DartRuntime 8000 (See FIG. 15.)

Calls from DartSource 100 to Dart Engine functions are made through the BUILTIN_INSTRUCTION (FIG. 20 670) which is part of the DartInstructionSet. Calls from the C++ source code to the engine functions are made though the Compiler 201 generated BUILTIN_INSTRUCTION 670 (See FIG. 20), which is part of the DartInstructionSet executed by the device independent DartEngine 600 that is part of a device specific DartPlayer 500 running on a DartDevice 400 (See FIG. 4).

Extensions have advantageously been made to the C++ language so that many types of Resources 103, may be referenced from within the Application Code 101 and DartFramework 102. This is done by specially named built-in functions, specifically named data structures, and #pragma extensions with keywords that are recognized by the Dart Compiler 201.

Resources may include any type of data or code or references to data or code anywhere in a file or dynamically generated and reachable by the DartTools 200 via a file system (see FIG. 22 612, FIG. 27 5100, FIG. 28 5000, and FIG. 26) or any form of network access, wireless access, or via any form of communication. For the example slide show application, Resources 103 may for example include background image files in JPEG format, sound effect files in PCM format, and/or any pictures slides or images, video, text, symbols, or even complete Dart files (700) to be included as default demonstration slides. Pragma extensions to the C++ language may also be used to identify to the DartTools 200 which functions are to be automatically made into DartProcedures 4000 (See FIG. 14), or Parts 303 (See FIG. 13) rather than included in the MainCode 2103 and MainData 2102 (See FIG. 13) Parts (FIG. 3 303). A partnumber( ) built-in function extension to the C++ language may be used in the source code to get the Compiler 201 generated partId 32-bit value used to reference the part when used as parameters to functions, or buildin instructions which are part of the DartInstructionSet.

The DartFramework 102, (See FIG. 3 and FIG. 11), advantageously includes a hierarchy of class specifications and implementations. One of the key base classes is the Gizmo 115 class. Gizmos 115 may be used to encapsulate a single functional unit of processing. Gizmo 115 derived classes contain Setup( ) and Process( ) methods, and references to a parent Gizmo and a list of child Gizmos. These references may optionally be null references.

Rendition 114 classes are inherited from the Gizmo class, and are designed to serve as the starting point for a part of an application that can be loaded and run independently of other Renditions 114 in the application.

A MasterRendition 113 class inherits from the Rendition 114 class. This is the only active Rendition in a MasterDart 230 (See FIG. 12). The MasterDart 230 is a binary DartFormat 300 file or image output from the DartTools 200 (See FIG. 3 and FIG. 12) which preferentially contains a single MasterRendition instance. The MasterDart 230 may advantageously include all the code, data, content, procedures, and resources referenced in the source code, and is automatically loaded when it is played on the MasterPlayer 203. After loading the MasterDart 230, the MasterPlayer 203 executes the C++ constructor methods which should be run before the start of the main( ) entry point. The Master Rendition's 113 Main( ) method serves as the logical starting point for the MasterDart 230.

FIG. 12 shows an embodiment wherein the DartSource 100 is input to the DartTools 200. The Compiler 201 converts the DartSource into the DartInstructionSet one file at a time into Objects 220, and collections of these Objects into Libraries. Alternatively, these Libraries can be created by a librarian tool. The Objects and/or Libraries 220 can also serve as Resources 103 of the DartSource 100 for other DartMasters and Dart applications. The operations of the Compiler 201, the optional Librarian tool, and the Linker 202 are generically similar to those of conventional C++ compilers, librarians and linkers now in use, except for certain significant differences. Some of these differences include the following:

First, the target instruction set is from the DartInstructionSet. Second, the output executable is a MasterDart 230 intended for execution on a MasterPlayer 203, rather than targeting the actual end target devices; and, the MasterDart and the MasterPlayer represent components unique to the invention. Third, much of the class definition and linkage structures that are generated during the operations of conventional compilers, librarians and linkers that is usually thrown away after use is maintained in the MasterDart for use by the MasterPlayer. The class definitions and linkage structures that are retained are also different from those that may transiently exist in conventional compilers, librarians, and linkers. Fourth, the DartTools 200, process extensions to the source language for: (i) specifying or automatically collecting the run-time resource requirements that will be needed during execution; (ii) the inclusion in the MasterDart of Resources 103 as Parts 303 (FIG. 3, FIG. 13); and a partnumber( ) source code function which provides the part numbers that serve as identifiers of resources assigned by the DartTools 200 for use by the application procedures. Additionally inventive is that the resulting MasterDarts and Darts output by the DartTools may contain any number of Renditions and the information needed to put together possibly shared Parts in the Dart or MasterDart image to construct these Renditions as needed. Still farther inventive is that the Darts and MasterDarts output by the DartTools contain procedures, data, code and content needed to carry out Recruitment to intelligently establish ad-hoc teams of devices, and then carry out the intent of the application according to the DartRuntime.

The Linker 202 FIG. 12 combines and packages the Object/Libraries 220 into a single binary image conforming to the DartFormat 300 (FIG. 3). This image is a DartMaster 230. The DartMaster 230 is intended to run on a MasterPlayer 203, which contains a DartEngine 500 (See FIG. 22). This DartEngine 500 contains some BuiltInInstruction (See FIG. 25 and FIG. 20) support for calling DartEngine system functions that make use of the symbol table Parts 2100 (See FIG. 13 and FIG. 14), and other meta-data parts generated by the Compiler 201 and Linker 202. These functions can be used by the code in the MasterDart to aid in the collection, for example, of Resources 103, initialization of data, and assemblage of Parts 2100 and parts of Parts 2200 into a Dart 700 or set of Darts 700. These functions can also aid in reducing the size of the code, or increasing the processing efficiency of the code by, Parts 2100, and data needed in the Dart or Darts to be generated.

A MasterDart conforms to the DartFormat 300 (See FIG. 3), but may be limited to having just one RenditionTable 2104 referenced by its PartId in the RenditionsTable 2101. PartIds are integer valued identifiers used as references to Parts FIG. 12 303 inside a Dart 700. In one embodiment the PartIds are 32-bit, but identifiers with different bit counts, such as 16-bit, 24-bit, 40-bit, 48-bit, 64-bit or any other number of bits may be used. In one embodiment, only one MasterRendition object instance is allowed in the DartSource. The DartTools 200 use the information in the source code for the initialization of the MasterRendition 113 object instance and data structures it references to initialize the parameters inside the RenditionsTable 2101 record. Some parameters in the RenditionsTable 2101 record that corresponds to the MasterRendition 113 instance may be filled in automatically by the DartTools 200. These RenditionsTable parameters include the number of events and files, and the amount of heap memory that should be initially allocated when the Rendition 114 object instance is first loaded and prepared for running by a DartPlayer 500. Before any Dart 700 can run on any DartPlayer 500, the DartEngine 600 of the DartPlayer 500 running on the DartDevice 400 should advantageously first choose and load a Rendition.

The DartPlayer 500, which provides a device specific application executable shell around the DartEngine 600, can specify a Rendition PartId to run, or it can specify zero ("0"), which in one embodiment is an indication that it is an illegal PartId. If zero is specified, the DartEngine will load the Rendition 114 which has the PartId of the first record of the RenditionsTable 2101.

To find the RenditionsTable, the DartEngine 600 should first load the Trailer 305 (See FIG. 3), which in one embodiment should be the last four 32-bit words in the Dart 700 file. The Trailer 305 contains the offset of the Part Table 304 from the beginning of the Dart 700 file. Each record in the Part TableRecord 314 (See FIG. 14), in the Part Table 304 contains a PartId, such as a 32-bit PartId, along with the startOffset and endOffset from the beginning of the Dart 700 file where the contiguous image of the Part 303, is found in the Dart 700 file.

Figure 13:
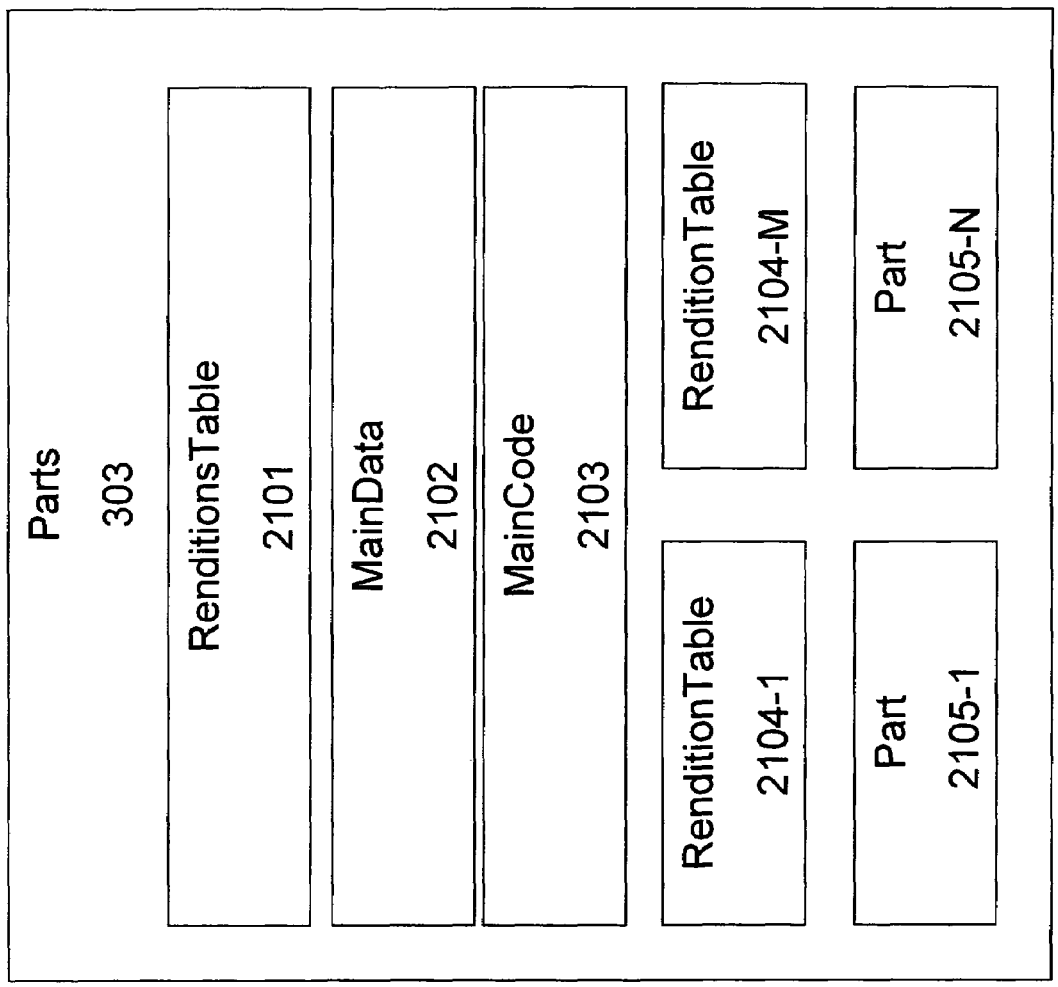
FIG. 13 is an illustration showing a block diagram illustrating the structure of an embodiment of the structure of the Parts component of an embodiment of the DartFormat.
Figure 14:
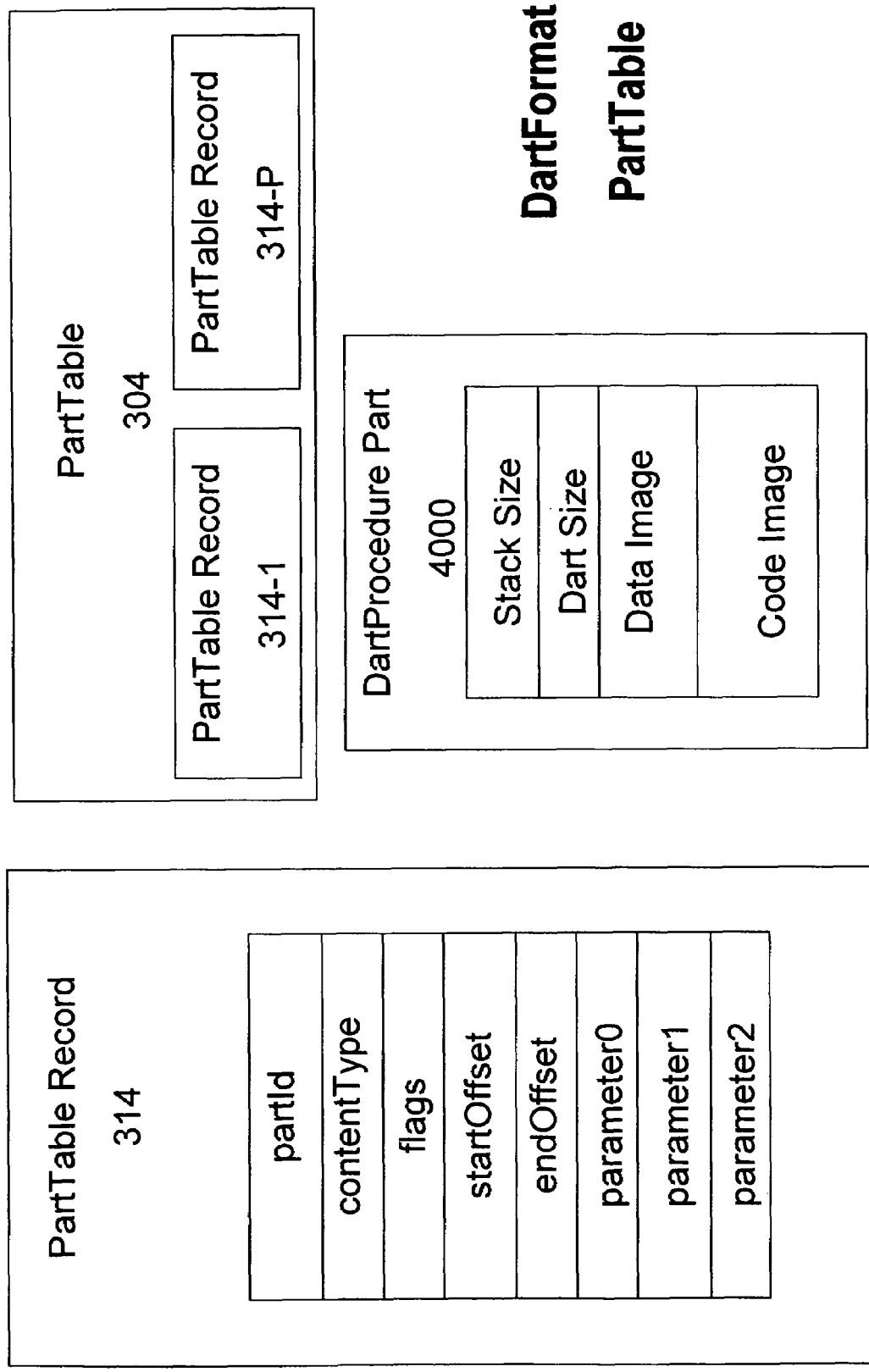
FIG. 14 is an illustration showing a block diagram of the structure of an embodiment of the Part Table component of the DartFormat and the format of the Part Table Record components of the Part Table, while separately depicting the structure of an embodiment of a DartProcedure.

Only one RenditionsTable 2101 FIG. 13 may usually be allowed in a DartFormat 300 file, and it has a permanently assigned PartId value which is used by the engine to find the Part TableRecord 314 corresponding to the RenditionsTable 2101 part. The offsets in this Part TableRecord 314 are used to find the RenditionsTable 2101, and the RenditionsTable records include information about linear segments within in the MainData 2102 and MainCode 2103 parts needed by the Rendition that is referenced by the PartId in that record. The RenditionsTable 2101 record also contains the starting code image address to begin execution for that Rendition 114 instance. The RenditionTable 2104 records are preferentially all just one 32-bit word that holds the PartId of a part that belongs to the Rendition 114 instance.

In one embodiment of the invention, several steps are associated with loading a Dart 230, on a DartPlayer 203. The same steps are used to load a MasterDart on a MasterPlayer as these are just specific instances of a Dart and DartPlayer respectively. These steps may include the following steps, including steps that are optional but advantageously performed:

Step 1. The DartPlayer 203 on the Application Development Device 900 (See FIG. 12), calls the Dart Engine's 600 Init( ) method (FIG. 24 6000, FIG. 23 4002) with a parameter specifying a Rendition PartId to start with the value zero.

Step 2. The DartEngine 600 then reads the Trailer from the end of the Dart 230 file, and extracts the offset of the Part Table 304.

Step 3. Each record of the Part Table 304 is read until a record is found with the pre-assigned fixed value for the PartId of all RenditionsTables. Only one RenditionsTable with this fixed value PartId is allowed in any DartFormat image.

Step 4. The DartEngine 600 then extracts the startOffset and endOffset of the RenditionsTable 2101 and uses that (the startOffset and endOffset) to read the first RenditionsTable record.

Step 5. The first RenditionsTable record is read and the initial runtime parameters such as the number of files and events to allocate memory for and the amount of space to allocate for the heap and stack, are extracted. The RenditionTable 2104 PartId is also extracted.

Step 6. The RenditionTable PartId is used to find the startOffset and endOffset of the RenditionTable 2104 from the Part Table 304 entry for this PartId.

Step 7. Each record in the RenditionTable 2104 is then read. In one embodiment, each record is just one 32-bit word with the PartId of a Part that belongs to the Rendition. Each Part TableRecord 314 contains flags and parameters that govern what happens at load time. For example, there may be a flag if the Part should be processed in some manner according to its contentType, parameter0, parameter1 and/or parameter2 values, or according to some other parameter or condition. The MainData and MainCode parts are examples of parts which must be processed upon loading in order to place the necessary code and data in memory before the Rendition starts executing.

Step 8. When the required MainCode 2103 Part TableRecord 314 is found, the contentType will hold the fixed value assigned to the MainCode 2103 contentType and the AutoLoad flag bit in the flags parameter word should be set, and parameter 0 and parameter1 will hold the first and last DartInstructionSet code image address contained in the MainCode 2103 part. While most executable images output from widely available C++ tools will result in a code image that always starts at the same fixed offset, this may not normally be the case for Darts because only the linear contiguous regions necessary for the Renditions that are output as a result of running the MasterDart 230 or saving a set of Renditions of the Dart for backup or sent to another teamed device. In other words, Dart code images do not always start at the same fixed offset and only the linear contiguous regions necessary for the Renditions that are output from MasterDart 230 or Dart through the use of Creationism or the SAVE_INSTRUCITON or the save BUILTIN_INSTRUCTION may normally be present. Advantageously any Dart 700 that forms other Darts, generally only includes the linear contiguously addressed sections of the original code or data output by the DartTools 200 that are needed for the Renditions actually in the generated Dart. For example, once the static constructor code of the MasterDart 230 has been run as part of the load process, there is generally no need for the constructor code to take up space in Darts generated while running the MasterDart 230. This is because the generated Darts do not themselves normally contain the MasterRendition 230. The same is true for the data in the MainData 2102 Part of Dart files generated by the execution of MasterDarts 230 or other Darts.

Step 9. Memory for a Context structure or Context object instance is allocated to keep track of the memory, access rights, and status, associated with the Dart that is being loaded. A unique contextid value is generated to be used as a global reference for calls by the Dart's code or other Darts that may be running on the same DartEngine 600 instance. The flags of the Context will limit the access of the Dart code to the memory that is explicitly allocated as the data, DartHeap, or DartStack of the particular running Dart. Also attempts to access functions, memory or files that are not a part of this Dart or its DartEngine environment, or for which access rights have not been established, as represented by flag values of the context, will result in one embodiment in negative valued error return codes from the DartEngine Process call 4003, which will cause the Dart's execution to end, before illegal access violations can take place.

Step 10. The environmental and initial memory needs expressed in the parameters of the Part TableRecords 314, and RenditionsTable records are extracted. If there is a need to allocate or reallocate memory for any of the engine maintained EventInfo structures, FileInfo structures, or CommSessionInfo structures, or there are other resources needed for the expected execution of the Dart to be loaded, then allocations, reallocations, initializations and the like are performed to prepare the DartContext and DartEngine environment that is shared by DartContexts, DartProcedureContexts, and DartidleContexts running on the same DartEngine instance.

Step 11. A SubFile, such as SubFile 698 (See FIG. 26), is preferentially opened and read to process or execute the Parts of the DartFormat 300 image File as if they were independent files without the need to copy the data into a separate file.

The DartPlatform 50 advantageously uses a unique file system. The file system is processed 612 (See FIG. 26) to create a file abstraction attached to a file identifier (fileId) value that can be used to reference the files in Dart code or when data is to be read, passed, written or shared.

Several BuiltinInstruction 670 (See FIG. 20) operation code values may be used for Read, Write, Open, Close, Rename, and Position operations. A FileInfo structure associated with each fileId in a one-to-one fashion keeps track of the type and form of storage, properties and access rights as well as the current storage locations, position of a current pointer into the file and the like.

Figure 26:
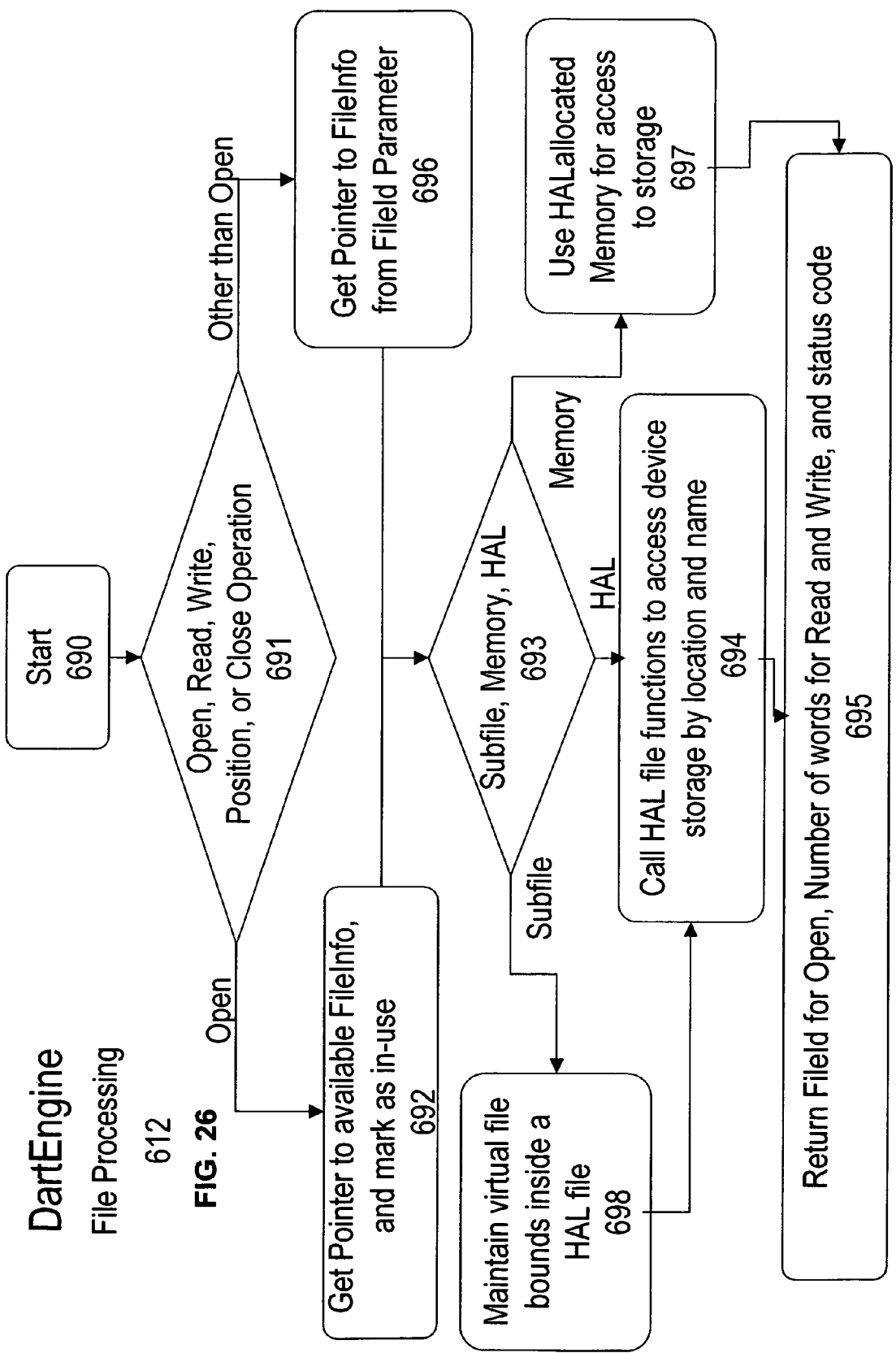
FIG. 26 is an illustration showing a flow chart diagram for file system instruction processing of a DartPlayer.

Advantageously, the device specific halBase object which maps the portable parts of the DartEngine 600 implementation with the small set of functions needed to operate on the DartDevice 400, is kept small and simple because most operations not related to those of actual individually physically stored files are virtualized by the portable code in the DartEngine as shown in FIG. 26.

For the processing of files, only read, write, open, close, position, getPosition, rename and delete methods of the HAL are necessary to be implemented to port the DartEngine 600 to a new DartDevice 400. The portable portion of the DartEngine 600 implementation builds file access abstractions for files that are kept in allocated memory 697 (See FIG. 26), or sub-files of other files. Once opened, a SubFile can be read just like any other file, but the source and boundaries of the data are actually a proper subset of another file previously opened.

Advantageously; a SubFile remains operational even if the source files are closed before the SubFile. The use of a SubFile for reading the code of a Dart for execution allows the code to be executed in place, making it unnecessary to load the code into memory from a file. This is especially advantageous when the Dart is in ROM or the file storage of a DartDevice is implemented in some other quickly readable memory device rather than a slow hard disk drive or the like.

If necessary or desired to improve the speed of execution, the code portion of the Dart associated with the Rendition to be run may be loaded into memory now allocated for holding and running of the code for the DartContext, and a memory file (FIG. 26 697) or its equivalent functionality can be used to execute the actual DartCode.

Step 12. In the particularly advantageous embodiment and implementation being described here, the Dart code generated by the DartTools 200 for the MasterDart 230 or any other Dart 700 which may still contain initial constructors may start execution at the initial constructors procedure that should be called before the main( ) function is called. The code address where execution is to start is in one of the 32-bit words of the RenditionsTable record corresponding to the Rendition instance that is to run.

Step 13. The DartTools 200 automatically put a BuiltinInstruction 659 at the end of the initial constructor with a sub-function value which causes the DartEngine to set the starting execution address and this object instance pointer for continued execution of the MasterDart 230 instructions once the DartEngine.Process method 4003 is called for the first time.

This is the last step (Step 13) in the creation and loading of a Dart according to this particular embodiment of the inventive method and computer program.

Dynamic Generation Of Darts And Dart Procedures—Creationism

The capacity for continual dynamic generation of Darts and/or DartProcedures by Darts and their descendant Darts is one of the more powerful properties of the DartPlatform 50 and Dart technology based systems and methods. Embodiments of the DartPlatform 50 are designed and architected throughout the system to support this continuous efficient generation of Darts from earlier Darts. The methodology for this is referred to as Creationism.

For example the DartSource 100, through the use of C++ extensions, may contain specifications for Parts which can be mixed, matched, and shared across generations of Renditions in Darts generated from the original MasterDart 230 or directly by the other DartTools.

Embodiments of the DartFramework 102 implicitly provide the mechanism and method for specifying Renditions, and all the code, data and Parts that are to be included in each Rendition. This allows the DartTools 200 to parse through the dependency trees of objects generated by the Compiler 201 and Linker 202 to form an effective database of the sections of code, data and resources needed for dynamic generation of Darts and DartProcedures 4000. In a similar fashion the MasterPlayer 203 can trace through all the data, code, methods and functions that are reachable at runtime for any set of starting points, and thereby advantageously form the information needed to generate Darts which contain only the necessary data, code and resources required. Unreachable data, code and content are automatically excluded from DartFormat images based on the contained Renditions starting points and data values.

Another mechanism of the DartPlatform 50 may advantageously be used to limit the amount of code and data necessary is the automatic saving of the entire or selected data state of a running Dart at the time it generates other Darts 700 or DartProcedures 4000, and the automatic reloading of the entire or selected data state as part of the DartEngine's Dart loading steps as enumerated above. Because the data values and content of running darts are part of the DartFormat image themselves, they are easily saved and restored when run, so there is generally no need in generated Darts for the initial constructor and setup code which often makes up much of the kinds of user-centric applications that the DartPlatform 50 is optimized and intended for. For example, when a MasterDart 230 is first loaded, many constructors are called before execution is set to begin at the main( ) function. This is true of most all C++ generated programs as well as of other different software or programming languages that may be used with the invention. Advantageously, the MasterDart 230 could then save itself with a minimal set of instructions in the main( ) function using the builtin functions which utilized the BuiltinInstruction 659 to access the Save( ) method of the DartEngine. Since a complete image of the current data values is saved by default, and then restored when the saved Dart 700 is loaded, there is no need to run the constructor code in the saved Dart 700. For this reason the MasterDart 230 can direct the saving process so that the continuous linear range of the code that executes the initial constructors that have already run, is not included in any of the Renditions in the generated Dart. In this manner the generated Dart can be significantly smaller than the MasterDart 230 that generated it. It is also likely to be much smaller than a similar functionality conventional application executable image which keeps all the static constructor and setup code needed to reestablish data state whenever the application is started.

Eliminating the need to include the initial constructor code is just one of many other mechanisms and methods used to optimize the size, complexity, and computational requirements of generated Darts. These optimizations generally result in smaller size and lower complexity and computational requirements than would be required using conventional mechanisms and methods.

Data member data or member method elimination is performed when a MasterDart 230 or any Dart 700 conforming to the DartFormat 300, running on a MasterPlayer 203 generates a Dart or set of Darts. Through a user interface of the MasterPlayer 203, or execution of the Dart playing on the MasterPlayer 203, any proper subset of Rendition objects can be selected to be included in a Dart 700 to be generated.

Only the Parts and sections of the code and data that are required for the selected Renditions should usually be placed into the generated Dart(s). This is carried out by the DartTools 200 and MasterPlayer 203 by parsing the relationships of the objects both from meta-data generated by the Compiler 201 and Linker 202 and by tracing through the run-time data members, procedure methods calls and actual pointer values, to find all the data members, code members, and methods of each class and then dynamically eliminate from the object instances and accessing code all references and space to and of the data members, structure members, and method members, which are not reachable by running the selected Renditions from their starting Process( ) member functions. Thus all the class information is effectively optimized based on the actual runtime setup of the Dart running on a MasterPlayer 203 once all the starting places have been identified for the Dart(s) 700 to be generated. Also advantageously, all the setup code which is not reachable from a Renditions' starting method are not included in the generated Darts.

Often a significant portion of user-centric applications, such as those the DartPlatform are primarily intended for, consists of or include setup code and data for setting initial screen positions for user interface images, initializing data structures, building graphs of connected objects, generating tables, or the like. The DartFramework 102 includes in most class definitions a Setup( ) method intended to be called only by the MasterRendition or nested calls from other Setup( ) calls. Advantageously, if the MasterRendition is not selected to be included in the generated Dart(s) 700, then none of the Setup( ) methods and other methods and functions and all the data members of classes or static data elements that are not otherwise reachable from the selected Renditions, will not be included in the generated Dart(s) 700. Advantageously, there is nothing special about the Setup( ) call that makes this optimization happen, as any code, data, methods, or the like, not reachable from the runtime starting points selected will not be included in the generated Dart(s) 700 by the DartTools 200.

GatherResources Procedure

The GatherResources procedure or method is another procedure intended to be used in the DartFramework 102 to eliminate unnecessary code and data in generated Dart(s)700. The Setup( ) method or call tree from calls to this method of the MasterRendition may call a hierarchy of GatherResouces( ) related methods and functions to put up user interfaces or dynamically gather data, content or other Resources at the time the MasterDart 230 is run on a MasterPlayer 203.

It may also me noted, in conjunction with the description provided here, that the DartTools 200 may include in a MasterDart 230 a number of Parts to hold the symbol tables, class definitions, and other meta-data as may be needed by the MasterPlayer 203 to perform the just described optimizations. If these Parts are not included in any of the selected Renditions, then advantageously they will not be included in the generated Dart(s) 700.

Some Selected Other Uses of MasterDarts

It is normal for (but not necessary for) MasterDarts 230 to contain DartPlatform 50 code and data of much greater size and complexity than the Dart applications 700 to be generated. This extra code is used for performing the accessing, requesting, initializing, user interfaces, pre-calculating of tables, assembling of Parts, and the like. Thus MasterDart(s) 230, once compiled by the Compiler 201 and linked by the Linker 202, can be used and reused by a programmer or non-programmer to generate customized Dart(s) 700 using new parameters, and Resources, or other data which might change with time or according to other circumstances, such as a stock quote, to generate the Dart applications in a very wide variety either automatically, or at a user's request anytime after being linked by the Linker 202, by running the MasterDart 230 on the MasterPlayer 203.

Dynamic Reconfiguration, Generation, Assembly, and Optimization of Parts

It should by now be appreciated, that MasterDarts 230 as well as the Darts generated from other Darts retain their ability to dynamically reconfigure, generate, assemble and optimize the selection of Parts and parts of Parts for the generation of descendent child Darts adapted for new functions and target transports and environments.

Loading of Parts According to contextType Parameter

Once a Rendition of a Dart 230 has been loaded using the RenditionsTable which references the RenditionTables, which each reference the Parts that are included for each Rendition, all the Parts that require loading are loaded according to their contentType parameter. The DartInstructionSet and extensions implemented by the BuiltinInstruction of the DartInstructionSet make for the efficient reconfiguring and generation of highly optimized Darts 700 and DartProcedures 4000 from any Dart 700 or Dart procedure 4000. In one preferred implementation, a flag bit in the flags parameter of the Part TableEntry record is set only for those parts with require contentType specific processing during loading.

The MasterDart may usually contain the complete code image for all the code that can be reached starting at the MasterRendition object instance in the MainCode part. Similarly, the MasterDart may usually contain the complete data image for all the data that can be reached starting at the MasterRendition object instance. Much of this will be eliminated from generated DartFormat images.

DartFramework, DartRuntime, and DartEngine

The DartFramework 102, DartRuntime 8000, and DartEngine 600 will now be more fully described. The DartFramework assumes for efficiency and effective use of the functionality built into the DartEngine, a certain DartRuntime operation; though, it should be appreciated that most any C++ program can be successfully built and run using most any runtime that can be or has been implemented on any standard set of C++ tools. One of the primary powers of the DartFramework is largely derived from its tight integration and use of the instructions, mechanisms, procedures, and functions implemented as part of the DartEngine. For example, the decompression and building of a bitmap image from a compressed JPEG file or Part may be performed by compiling C++ source code from the JPEG standard examples available widely on the Internet, but such code would be expected to execute much more slowly than the simple use of the builtin functions which employs the BuiltInInstruction (also referred to as BUILTIN_INSTRUCTION elsewhere in this document) to call the DartEngine method to perform the JPEG decompression operation using the native code generated when the DartEngine source code was compiled for the actual processor of the DartDevice.

Similarly, the DartFramework 102 takes advantage of an ecosystem or environment of built-in functionality throughout in the implementation of the DartPlatform 50, including in some embodiments for example, but not requiring all or limited to, the actual DartInstructionSet, the DartRuntime 8000 system, the communications subsystem, the event processing system, the file system (See File System 612 in FIG. 26), the graphics and input systems, the power management system, Dart assembly compression and encryption mechanisms, and the decomposition, access, protection, digital rights management and generation mechanisms.

It should be appreciated that having a well-defined broad set or collection of user-centric functionality expressed with the efficiency of code generated for the native processor embodied in any and every device, is an advantageous and in some embodiments key to making the functions and adaptations necessary for portable applications that are able to extend themselves to other devices practical.

In particular it should be appreciated that while in theory, any Turing compliant instruction set could be used to generate any other code or carry out any algorithm, in practice this approach will never be as execution, memory, power, or cost efficient as a tightly integrated platform which provides a relatively complete platform, and where the necessary computational or memory hungry functionality is implemented in a platform specific fashion as is the case with the DartEngine's processing of the DartInstructionSet.

Generally, in order for a device to be considered a Dart device (DartDevice) 400, a Dart player such as DartPlayer 500, should be installed on the device and there should be at least one communication mechanism supported on the enabled device. The DartPlayer 500 is the device specific executable unit that provides the environment and optional user interfaces necessary to startup, initialize, give processor control to and closedown of a DartEngine 600. The DartEngine 600 is built as an instance of two interconnected classes, the portable playerBase class and the device specific halBase class. When the DartEngine 600 is ported to a new device, a device specific DartPlayer 500 application must be built to encapsulate the DartEngine's execution, and a device specific halBase derived class must be built to provide a bridge from the platform independent parts of the DartEngine to the actual device operating system and/or hardware.

Figure 23:
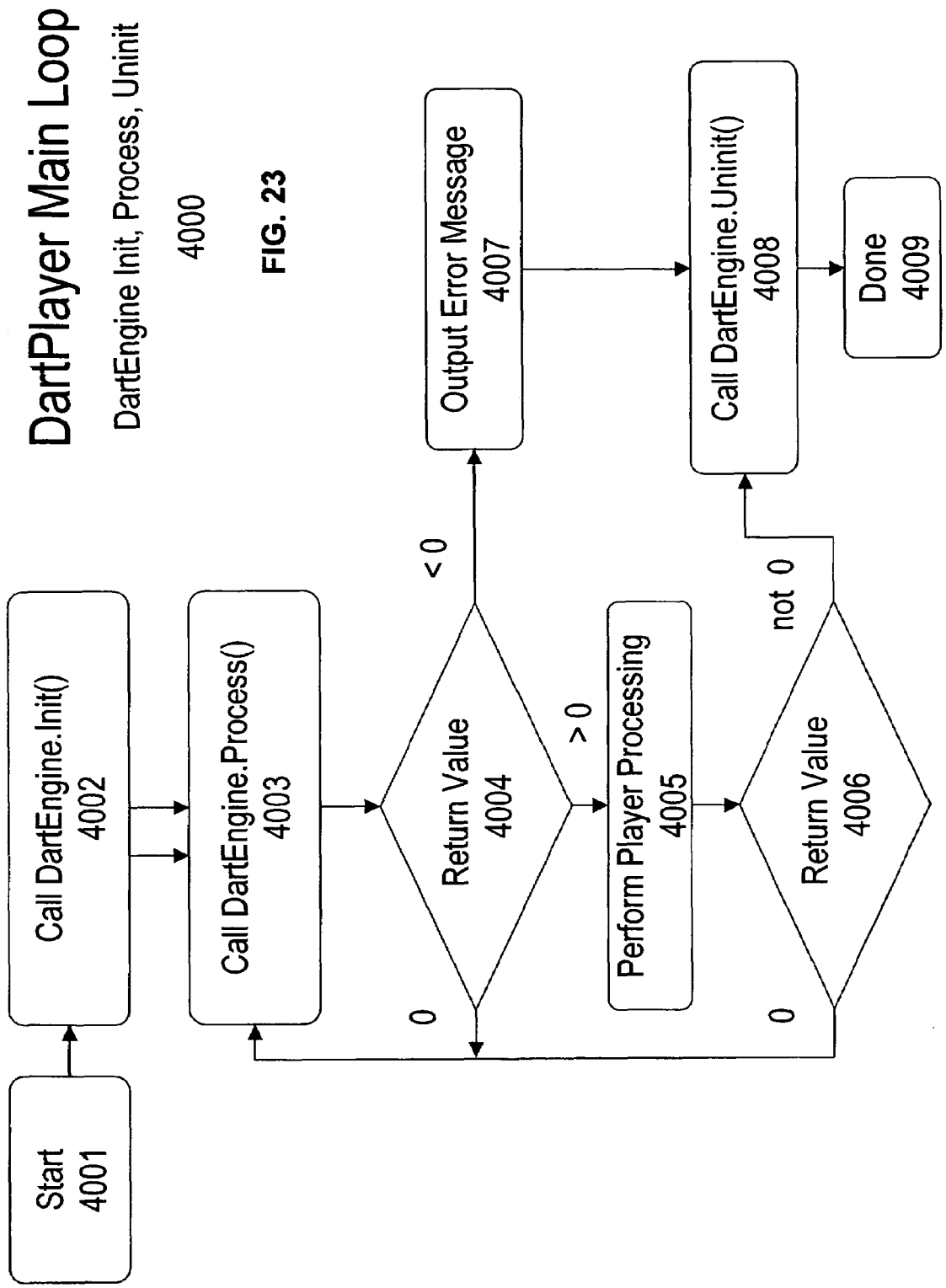
FIG. 23 is an illustration showing a flow chart diagram of the main loop processing flow of a particular embodiment of a DartPlayer.

The DartPlayer 500 main loop flow is shown in FIG. 23. First the DartEngine.Init( ) 6000 function is called with parameters that identify the Dart 700 to be loaded, if any. Then the DartEngine.Process( ) (FIG. 23 4002, FIG. 24 6000) function is called in a loop until a negative value is returned causing DartPlayer.Uninit( ) to be called and the DartPlayer 500 application to close down. Positive return values cause value specific DartPlayer processing to be performed before returning to the main loop (See 4000 FIG. 23).

Figure 16:
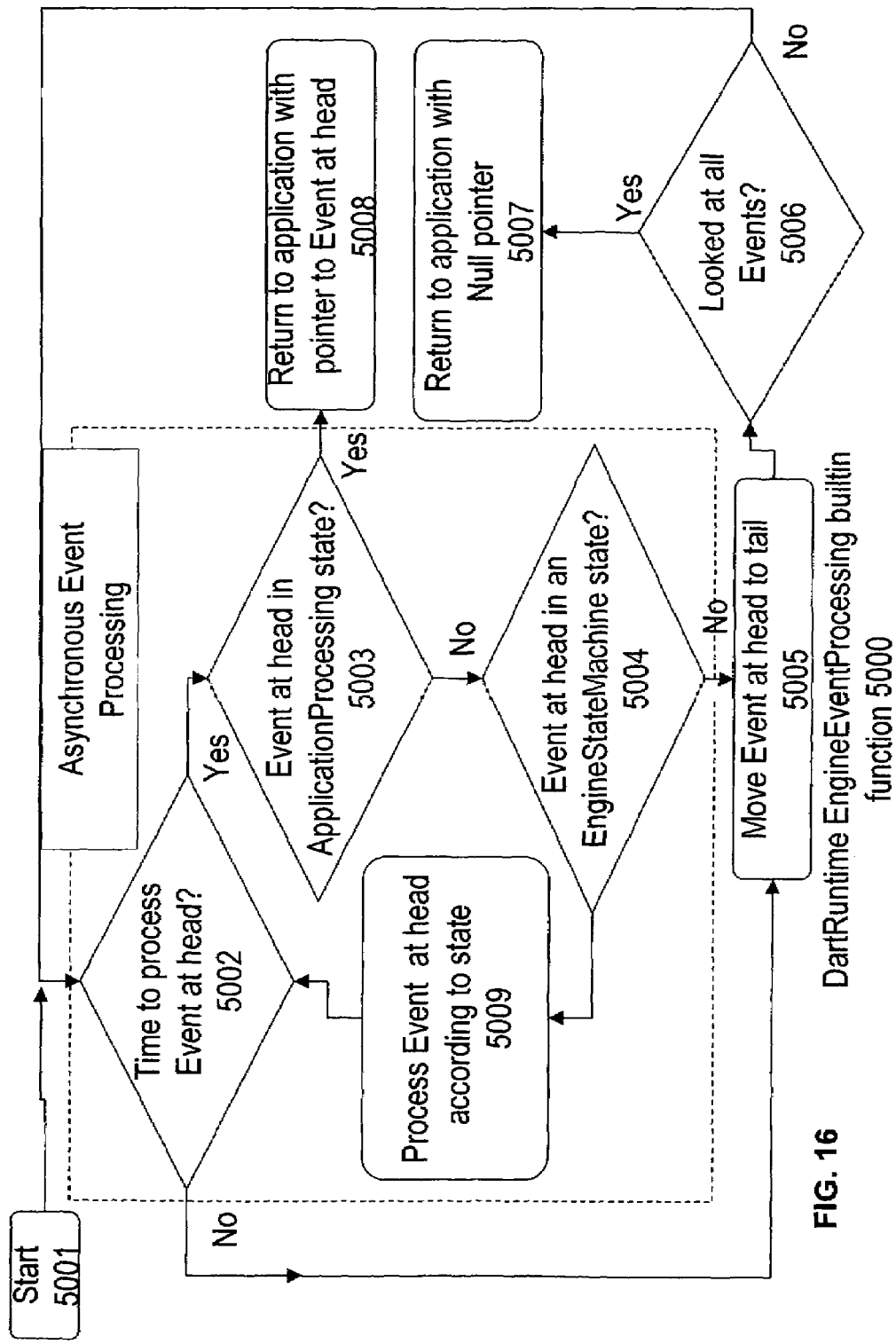
FIG. 16 is an illustration showing a flow chart diagram illustrating aspects of Process Event processing portion of the DartRuntime.

Such specific DartPlayer processing includes releasing control to other applications or processes that may be running on the device, suspending the PlayerEngine thread based on power management values, collecting inputs such as mouse moves and keyboard presses and converting them into calls to add Events 800 to the DartEngine's EventQueue (See 8002 FIGS. 15 and 5000 FIG. 16). If the positive return code value is one of those that is reserved to mean that the Dart is finished processing, then DartProcess.Uninit( ) will be called and the Dart processing will be discontinued. For example, returning the DONE positive return code value is the normal manner in which a running Dart will signal its own termination.

Figure 24:
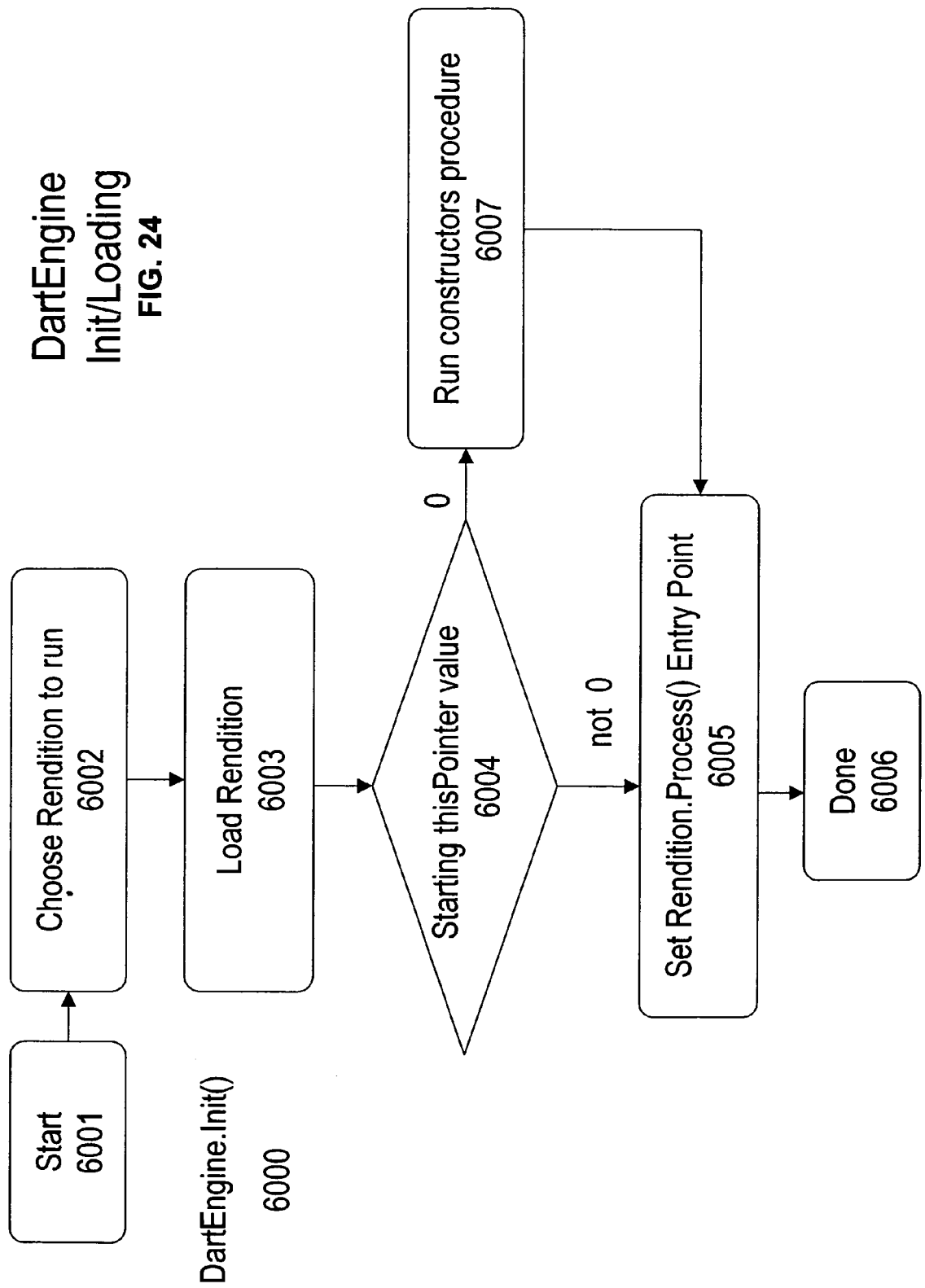
FIG. 24 is an illustration showing a flow chart diagram of the processing that occurs during a call to the DartEngine initialization function by the DartPlayer.

The DartEngine.Init( ) processing is shown in FIG. 24, for calls to DartEngine.Init( ) that include references to a Dart 700 to load. In cases where the DartEngine 600 is called when no Contexts are active, and there is no Dart 700 to load, an IdleProcedure internal to the Dartengine will be loaded into an IdleContext instead of the Dart 700. The IdleProcedure operating in the IdleContext is made up of a loop of DartinstructionSet instructions which performs the processing necessary to keep the DartEngineEvents 4003 FIG. 23 process active. In one preferred implementation, the IdleProcedure simply executes the instructions that cause a call to the EngineEventProcessing function 8002 FIG. 12 and FIG. 15. In one preferred implementation, a single instance of the DartPlayer 500 can in general handle any number of executing Darts 700 in any of several manners. One way is by calling separate loops within the same running native processor thread by modifying the main loop 4000, or by creating any number of separate DartEngine 600 instances, or by using separate threads or any combination of the above. An alternative is for Darts to be explicitly loaded and run as a subdart or child of a running parent Dart. Here the event processing passing through the event processing units will be passed to the event processing units of the subdart once loaded as if it were part of the compiled and linked parent Dart. In the preferred implementation these event processing units are called Gizmos and are instances of the DartFramework class Gizmo.

Gizmos

Darts 700 themselves can also run other Darts 700 in series, or in parallel, or in a highly cooperative fashion where Darts are run as part of the processing hierarchy of other Darts. The DartFramework 102 may be made up largely of Gizmo 115 derived objects. These Gizmos are advantageously configured in a strictly defined linear order according to the references in the child and parent Gizmo pointers (See 10000 FIG. 18). This order is used for collecting Gizmos into interconnected tree graphs which determine their order of execution and their relationships in terms of access rights and view of screen real estate, sense of time, and other environmental characteristics. For example a parent can change the time or rate of apparent time change for a child or children Gizmos and its descendents in order to control their processing and pace. All this is made easier to implement in a robust fashion by strict adherence to the specified order of processing as shown, in the example of FIG. 18.

Figure 18:
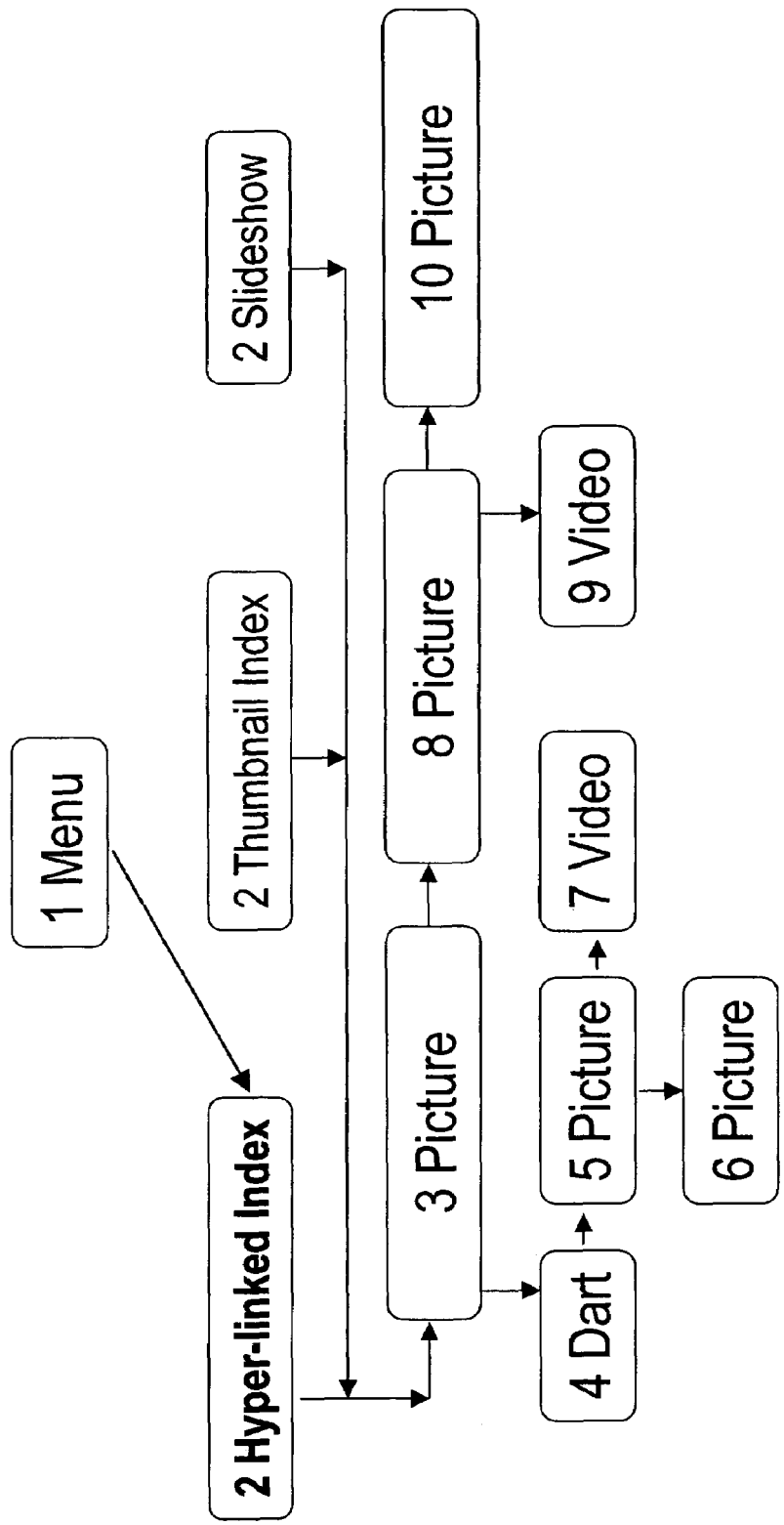
FIG. 18 is an illustration showing a block diagram illustrating the hierarchical processing arrangement and order of execution of Gizmo processing units used in an exemplary embodiment of a slide show or media display application.

FIG. 18 shows an example hierarchy of Gizmo 115 derived objects for a running slide show Dart 700 application. It is important to understand that the slideshow Dart 700 application is using the DartEngine 600 to carry out the DartInstructionSet instructions that make up the code of the slide show Dart. In particular, note that the DartPlayer 500 along with the DartEngine 600 have been compiled, linked, loaded and run using standard build tools that target the DartDevice's 400 native processor and operating system. It is the DartEngine 600 that executes the slide show Dart's 700 code made up from instructions from the DartInstructionSet, which was generated from the DartTools 200. The Menu Gizmo at the top of the hierarchy shown in FIG. 18 is first to get control when the DartInstructionSet based Menu.Process( ) method is started executing on the engine as a result of a DartPlayer.Process( ) call which causes the DartEngine 600 to begin processing the Dart's 700 instructions. Note that in the preferred implementation, the Gizmo at the top of the hierarchy is a Rendition object of a class inheriting from the base Gizmo class as in FIG. 11.

In the example of FIG. 18, each rounded corner box represents a Gizmo derived object that handles a unit of user interface for the slide show application. The Menu handles the user interface for selecting various functions including adding slides, starting the automatic sequencing of the slides, selecting slide transition effects, and the like. One of the options that may be selected from the Menu, is the view of the slide show. Views in this example, may for example include a Hyper-linked Index view where the user can click on the name or description of a slide, a thumbnail index view where the user can click on a small thumbnail view of a slide, and a slide show view where the slides take up most of the screen and on screen arrows, physical buttons or a mouse or pen are used to move forward and backward through the hierarchy of slides. The Menu only has one child Gizmo derived object, but when the user selects a view from the Menu, the pointer to the child Gizmo derived object is changed to the Gizmo that supports the selected view. Thus advantageously all that is needed to change how the user views and navigates the slideshow is to change one pointer in the Menu Gizmo.

Each view in the example has a list of pointers to the three child Gizmo 115 derived objects shown in the row below them in FIG. 18. The children are all simple still pictures or slides, shown in the order from left to right of the order of the pointers in each of the child pointer lists of the three views. The child pointer list of the Gizmo derived object labeled "3" points to three children in the order shown from left to right. The object labeled with a "4" represents a Gizmo 115 derived object that encapsulates a separately produced running subdart, included in the slide show as a single slide, but in fact being capable of containing its own hierarchy of slides which can each themselves contain any picture, view or Darts 700 and all the functionality thereof. The boxes labeled "7" and "9" contain Gizmo 115 derived objects that display real-time playback video/audio slides. It is noted that for this slide, that processing of events by all Gizmo 115 derived objects and the contained Darts 700 of Dart playback Gizmos 115, receive processing control in the exact order of the graph created by the pointers to children and parents. This order is explicitly set forth in the sequence of number values shown inside the boxes in FIG. 18.

Since most all processing by Gizmo 115 derived objects is through a call to its Process( ) method with a pointer to an event to process as parameter, any parent can create or change the parameters or type of events seen by its children, or can decide whether or not to pass an event to be processed its children. So in effect any parent can set the environment for all its children. For example a Dart container Gizmo object does not need to know that it has only been given a portion of the screen real estate available to its parent. Similarly, when a Gizmo 115 derived object accesses its GetTime( ) method, it will automatically request the time from its parent rather than from a builtin call to the engine if the parent has signaled that it is a time source for its children. This ability of parents to control the runtime environment of its children, and their children is a very powerful property of the DartFramework 200 and DartRuntime 8000. This makes it easy to build for example, slide shows of slide shows, collection Darts which just collect Darts and allow the user to select which ones to run, the ability to fetch a control panel in the form of a Dart 700 from a printer or other Dart enabled device and run it in a rectangle embedded inside the fetching Dart.

DartEngine Architecture—Passing of Control

The architecture of the DartEngine 600 facilitates the passing of control from a Dart container Gizmo 115 derived object, to the topmost Gizmo 115 in the hierarchy of the contained Dart by containing BUILTIN_INSTRUCTION functions to allow a containing Gizmo 115 derived object to create a DartContext for the contained Dart 700, get the Dart 700 loaded into that Context, and then calling the contained Dart's 700 Process( ) via a DartEngine's BUILTIN_INSTRUCTION call to the contained Dart's Process( ) method of the Gizmo 115 topmost in its hierarchy.

Along with the calls to manage and pass processing to contained Darts 700, the DartEngine 600 also makes the transition from the container Dart 700 code to the contained Dart's code more efficient by allowing an EventProcessing structure instance containing the pointer to the Event 800 to be processed by the contained Dart, to be in memory accessible directly through the use of a special pointer (see FIG. 32 Pointer Type 11) to memory effectively shared between all DartContexts. This allows the efficient passing of Events 800 and other parameters between Darts 700 which each have otherwise separate address spaces.

When a call is made from one Dart 700 to another Dart 700 the DartEngine remembers the calling Dart's DartContext and then starts operating out of the called Dart's DartContext until the called Dart's DartContext executes a DoneInstruction when the engine stack is at the same place as when the original call was made. Thus the DartEngine 600 makes it very easy and efficient for Darts 700 to run Darts 700 that run Darts 700 ad infinitem as part of the Gizmo 115 derived hierarchy much as they would if they had been generated by the DartTools as one Dart 700. Containing Darts can present any environment it wants to contained Darts 700 just as it can to a child Gizmo 115 derived object.

It might be supposed that the simple passing of control down the entire hierarchy would waste processor time in calling Gizmo 115 derived objects which require no processing, such as a Gizmo 115 derived object that represents a still picture which does not need to be redisplayed. This problem can be militated against in a preferred embodiment by a system for pruning the tree of Gizmo 115 derived object calls. Each EventType 801 value is made up a category flag field where exactly one bit will be set, and a event subtype field for the specific Event 800 to be processed belonging to that category. In one embodiment, there are two sets of flags corresponding to the category flags of an Event Type 801. One flag is set if the Gizmo derived object itself needs to handle events of this type, and the other flag is set if any of its descendents needs to see the specific category of Event 801. In one embodiment, in every pass through the hierarchy, the Gizmo 115 derived objects set the flags for themselves and collect a logically OR'ed collection of the flags set by all the children that it calls. Thus a Gizmo always knows if its children need to be called or not called depending on the category of the Event 800 to be processed. Categories are defined by sets of EventsTypes to make the elimination of unnecessary calls efficient. For example, Events 800 having to do with user input, do not need to be passed down trees of Gizmo 115 derived object which don't contain any Gizmo 115 derived objects that need to process user input.

DartEngine.Process( ) Processing

Examples of the DartEngine.Process( ) processing is shown in the embodiments of FIG. 23, FIG. 15, and FIG. 16. This drives the main execution of the Dart's DartInstructionSet instructions 611. A main loop is executed to get the next instruction from the Dart's instruction stream, decode the opcodes and source and destination fields of the instructions, check that the addressed source and destination parameters are not outside of the data areas of the Dart's DartContext, then jump to the device processor native code of the DartPlayer 600 method or function that carries out the function called for by the opcode field of the instruction. If source or destination fields of the instruction specify parameters outside of those allowed to be accessed, then no dispatch is made based on the opcodes, and control is returned just after the DartPlayer.Process( ) call with a specific negative return value that reflects the specific access violation. This will cause the DartPlayer 500 to call DartPlayer.Uninit( ) and end the Dart's execution with an error message or other optional indicator.

FIG. 22 shows the relationship and some of the functionality of the DartPlayer 500, DartEngine 600 and Hardware Abstraction Layer (HAL) 650. The HAL 650 is the part of the player implemented as a class derived from the halBase class used to encapsulate the device specific access functions needed. Advantageously, the number and complexity of the halBase functions that are required to be implemented is kept to a minimum so that porting to new DartDevice 400 types is quick and easy. Having a minimalist approach to the halBase design also aids in ensuring that separately implemented DartEngines 600 attain a very high degree of compatibility because they share most of the implementation source code functionality. Thus it is highly beneficial to move as much functionality as possible to the portable device independent portions of the DartPlayer 500. Ease of porting and a very high degree of compatibility are key features of embodiments of the DartPlatform 50 that are partly realized through the use of portable code wherever possible, and the use of the same source code on every device wherever possible. Thus while recompilation and linking will often be necessary for each different type of device, most of the functionality will be compiled from the same source code as the other devices that are expected to be able to work cooperatively with the device.

Power Management Features of the Architecture

Power management is another feature which though optional, runs through many parts of the DartPlatfom 50 architecture. When the DartPlayer 500 calls the DartEngine.Process 4003 method, execution of the Gizmo derived object hierarchy starts by setting a variable that holds a response time needed in milliseconds (or any other units) to the highest value representable. As Events are processed by the ordered tree of Gizmo 115 derived objects, each object uses a BUILTIN_INSTRUCTION to tell the DartEngine 600 how long it can wait until it needs to have its Process( ) method called again.

For example, for an object that is displaying a motion video, this might be $\frac{1}{30}^{th}$ of a second if this is the frame rate of the video. The DartEngine 600 collects the lowest response time needs reported by the BUIILTIN_INSTRUCTION which implements gathering of the minimum response time needs passed in as a parameter. When control returns to the DartPlayer 500 after making a complete pass through the hierarchy of the Gizmo tree graph, the DartPlayer 500 or DartEngine 600 can use this information to block its thread or otherwise signal that power is not needed for at least the time indicated. Normally the DartPlayer 500 will block its thread with a timeout equal to the minimum response time collected. The blocking will also terminate if new input arrives that needs to be processed by the Dart 700. It may be appreciated that in many cases the application running on a processor is the only entity that knows the real response time needs at all times, and Dart applications may advantageously be designed and generated in a manner that makes it easy for the DartPlayer 500 to receive this information and make use of it for greatly reducing the power and energy consumption needs of devices without greatly degrading the performance of dynamic applications.

Event Processing Queuing Mechanism

The Event processing queuing mechanism, carried out during the EngineEventProcessing (FIG. 15 8002, FIG. 16 5000) processing may also keep track of or monitor response time needs for asynchronous processes (FIG. 16 the contents of the dashed box) that are not part of the Gizmo.Process(EventInfo *) calling hierarchy. In this way, the minimum response time needs reported by active Darts reflects the combined needs of the mainstream synchronous Dart application processing being performed by the Linear Tasking of the Gizmo tree, and the asynchronous processes handled by the Event processing portions of the DartEngine 600.

Security and Integrity—Execution checks performed During Instruction Decoding

Security, integrity and robustness of the DartPlatform 50 may be at least partially assured through the use of execution checks performed while decoding the instructions of the DartInstructionSet. The addresses of data and source fields of the instructions are tested by the engine to make sure that they refer to data within the range of the executing Darts legally accessible data regions according to the DartContext it is running in. Similarly, Dart applications and the DartinstructionSet instructions that the procedures of the applications are made up of, are limited to accessing only physical storage that belongs to the running Dart. This is to prevent malicious or malfunctioning Darts from having the power to access private data or storage resources that should not be accessible by the running Darts.

The Hardware Abstraction Layer (HAL) file system naming conventions assure that Dart applications have no way to specify a file outside of its legal domain (but see optional deliberate exception). When specifying a file for an operation such as open or delete, the Dart application cannot specify full file paths but merely a locationId and number, or locationId and terminal name string as shown in 5010 FIG. 28. In this way the physical storage accessible is limited in the HAL to the Locations appearing in 5020 FIG. 28. It is up to the HAL to perform the open, close, read, write, position, rename and get-position operations based only on these parameters to specify files. The one intentional but optional exception to the no access outside the HAL enforced sandbox, is that a locationId corresponding to a USER_SPECIFIED_LOCATION may optionally be supported in the HAL for providing access to files outside of the Darts Context limits. It is up to the HAL when opening, deleting or renaming files to explicitly prompt the user for a file selection. This allows applications to import and export files, albeit only with the implicit permission granted by the involvement of the user.

While the present inventive structure, method, apparatus, computer programs, and computer program products have been described with reference to a few specific embodiments, the description is illustrative of the invention and is not to be construed as limiting the invention. Various modifications may occur to those skilled in the art without departing from the true spirit and scope of the invention as defined by the appended claims. All references cited herein are hereby incorporated by reference.

What is claimed is:

1. A method for limiting access to and/or the understanding of resources or capabilities of an interoperability application package and or resources or capabilities of a plurality of interoperability devices so that a first interoperability device is permitted to access or prohibited from accessing the second interoperability device from the plurality of interoperability devices, the method comprising:

(1) executing or attempting to execute an executable device interoperability software application package conforming to an interoperability format of digitally encoded data, code and content, that is completely self-contained and sufficient to carry out an intended purpose of the interoperability software application on a plurality of connected or intermittently connected devices, the executable device interoperability software application package including security features that permit and limit access to and or an understanding of resources or capabilities of the interoperability application package and/ or resources or capabilities of the interoperability devices when executed;

(2) during the execution of the interoperability software application package, forming a basis for security including the following steps:

(a) automatically collecting an entropy state measure security feature associated with the device by sampling aspects of the world outside of the device which are not synchronized to a clock used in the sampling by the device;

(b) generating a device public/private key pair security feature;

(c) generating a unique device Id (uid) security feature; and (d) storing the device public/private key pairs, unique device id, and the collected entropy state measure on the device for continued use whenever the device is active, the collected entropy state measure being sufficient to statistically guarantee that the generated key pair and generated device ids are unique from those generated in a similar manner, but using different gathered entropy;

(e) maintaining at least one table storing lists of the device unique Id, a revoked device unique (uid), and a device teamed uid and mapping access level numbers to sets of access rights flags; the access level and access rights controlling an ability of the interoperability software application package to propagate transitively when permission is allowed to do so from device to device so that any device in the lists can gain access to a new device without the need for farther collection of security access credentials;

(3) forming rules for allowing or preventing the limiting access;

(4) using the formed basis and formed rules to provide a security task at least for the device; and (5) limiting access to and/or the understanding of resources or capabilities of the interoperability application package and/or resources or capabilities of the plurality of interoperability devices so that the first interoperability device is permitted to access or prohibited from accessing the second interoperability device.

2. The method of claim 1, wherein the revocation list storing the revoked device unique identifiers (uid) is transitively maintained so that any device previously teamed with other devices at a particular security level can have its access rights logically revoked for interoperability with any device which transitively learns of the revocation from any other device of the team.

3. The method of claim 1, wherein the interoperability software application package includes at least one linearly contiguous binary encoded part image and the any necessary linearly contiguous part images together into an executable device interoperability software application package in a form where part images can be deterministically located and independently executable images identified, loaded, and executed on a connected device, the executable device interoperability software application package conforming to an interoperability format of digitally encoded data, code and content, that is completely self-contained and sufficient to carry out an intended purpose of the application on a plurality of connected or intermittently connected devices; and wherein the executable device interoperability software application package is self-contained and when executed permits the plurality of devices to interoperate with each other without additional executable software.

4. A method as in claim 3, wherein the at least one linearly continuous binary encoded part image contains at least one of an executable main code part of the interoperability formatted executable device interoperability software application package, and an executable main data part of the interoperability formatted executable device interoperability software application package.

5. A method as in claim 3, wherein the at least one linearly continuous binary encoded part image contains each of an executable main code part of the interoperability formatted executable device interoperability software application package, an executable main data part of the interoperability formatted executable device interoperability software application package, a table of records for each of the independently executable images, and a table of records for each of the parts belonging to a particular independently executable image.

6. A method as in claim 3, wherein the method further includes forming untagged meta information and the packaging includes packaging the formed at least one linearly contiguous binary encoded part image and the any necessary linearly contiguous part images and the formed meta information together in a form where part images can be deterministically located and independently executable images identified, loaded, and executed; and the formed mete information includes:

(a) a table for finding parts given its identifier;

(b) a first information used to find the table of parts;

(c) a second information needed to load and execute the linearly contiguous part images; and (d) a third information used to find the list of independently executable images.

7. The method of claim 1, further comprising: revoking or modifying the rules used to limit access.

8. The method of claim 1, wherein the limiting access to and/or the understanding of resources of comprise one or more of the following in any combination:
   (1) enforcing rules for which devices are allowed to communicate with each other and or for what purposes devices are allowed to communicate
   (2) encrypting data that flows between devices so that other devices which might have access to the data will not be able to understand or make use of the data;
   (3) signing packages of data, content, code or other resources to ensure that the packages have not been modified since the signing took place; and
   (4) managing digital rights to enforce a set of rules for the handling of data, code content, or any other digitally representable resources with regard to one or more of the following actions: sharing, copying, printing, displaying, performing, distributing, playback, rendering, executing, modifying, or any combination of these.

9. The method of claim 1, wherein the forming rules for limiting access further comprise:
   (i) collecting the unique ids of devices and/or applications which wish to interoperate
   (ii) collecting the set of access rights needed or requested for the interoperation;
   (iii) obtaining permission to allow or the directive to disallow the range of access rights;
   (iv) creating a unique id for the set of access rights; and
   (v) storing the unique id and set of access rights on all devices and or in all the application packages which are to interoperate.

10. The method of claim 1, wherein a device or application unique id is revoked, the unique id is placed on a list of revoked unique ids that is maintained and distributed on teamed devices and or other devices so that the device or application will no longer function as part of a team or teams when it tries to interoperate with any of the devices with the revoked unique id which is on such a list.

11. The method of claim 10, wherein when a revoked device forms a communication link with another device which has the revoked device's unique id on its revocation list, the software driving the communication link will initiate the destruction of the unique id and public and private keys of the revoked device.

12. The method of claim 11, wherein the master device is at the headend of a mobile phone network can initiate the destruction of the unique id and public and private keys on the revoked device over the mobile data network or a side channel thereof.

13. The method of claim 1, wherein the rules are stored as lists of the unique ids of devices and applications associated with a certain level of security.

14. The method of claim 13, wherein the rules are stored as lists of the unique ids of devices and applications associated with a certain level of security, and each level of security is associated with certain access rights binary flags, with each binary flag associated with permission to access a particular category of data, resource, code or capability.

15. The method of claim 14, wherein a device or the runtime context in which an executable image is running maintains the access rights flags values which determine which types of access or elements are to be allowed for the executable images running on that device or the executable image running a particular runtime context.

16. The method of claim 15, wherein an interoperability engine running an interoperability instruction set checks any or all of the flag values whenever an application attempts to access the elements or capabilities which correspond to the flags, and does not allow such access if the flag values indicate that such access is not to be allowed.

17. The method of claim 16, wherein one or more of the following are true:
   (1) the interoperability engine is any interoperability engine or the DartEngine; and
   (2) the interoperability instruction set any interoperability instruction set or is the DartInstructionSet.

18. The method of claim 14, wherein the rules embodied by the stored lists are generated using one or more of the following method:
   (1) default mappings for flags to security level numbers are supplied by the manufacturer and optionally modifiable by possibly secured interfaces on the manufactured device;
   (2) the security level and or flag values that are needed for a particular executable image to carry out one or more operations of an interoperability application software package is embedded in the image, which is optionally signed to ensure that the security level and or flag values have not been tampered with;
   (3) when an executable image is to be loaded by an interoperability engine, the embedded level and or flag values are compared to the stored rules to see if permissions to access all the needed access is allowed;
   (4) if all permissions are allowed the executable image is loaded to run in a context that contains the access flag values embedded in the executable image;
   (5) if during execution, assess to any resource or capability for which the flags in the context do not allow access causes the interoperability engine to immediately stop execution without allowing the access; and
   (6) if any of the permissions are not allowed the interoperability engine will not load or run the executable image.

19. A method for limiting access to and or the understanding of resources or capabilities of an interoperability application package and or resources or capabilities of a plurality of interoperability devices so that a first interoperability device is permitted to access or prohibited from accessing the second interoperability device from the plurality of interoperability devices, the method comprising:
   (1) executing or attempting to execute an executable device interoperability software application package conforming to an interoperability format of digitally encoded data, code and content, that is completely self-contained and sufficient to carry out an intended purpose of the interoperability software application on a plurality of connected or intermittently connected devices, the executable device interoperability software application package including security features that permit and limit access to and or an understanding of resources or capabilities of the interoperability application package and/or resources or capabilities of the interoperability devices when executed;
   (1) during the execution of the interoperability software application package, forming a basis for security in at least one of the following steps when a device first starts operation:
      (a) automatically collecting of entropy associated with the device;
      (b) generating a public/private key pair;
      (c) generation of a unique device Id; and (d) storing the public and private key pairs, device unique id, and the entropy state for a random number generator on the device for continued use whenever the device is active, the collected entropy state measure being sufficient to statistically guarantee that the generated key pair and generated device ids are unique from those generated in a similar manner, but using different gathered entropy; and (e) maintaining at least one table storing lists of the device unique Id, a revoked device unique (uid), and a device teamed uid and mapping access level numbers to sets of access rights flags; the access level and access rights controlling an ability of the interoperability software application package to propagate transitively when permission is allowed to do so from device to device so that any device in the lists can gain access to a new device without the need for farther collection of security access credentials;

(3) forming rules for allowing or preventing the limiting access;

(4) use of the formed basis for one or more of the following security tasks:
  (a) enforcing the rules for access to devices, applications and resources;
  (b) securing the rules themselves so that they cannot be modified by an unauthorized user or agent;
  (c) securing the storage of the public and private key pairs, device unique id, and the entropy state for a random number generator;
  (d) securing operating parameters or data to be shared between applications and devices;
  (e) securing communication channels;
  (f) encrypting resources so that they can only be understood or used by a particular device or set of devices, and/or a particular application or set of applications, and/or when accessed using a shared secret; and
  (g) generating universally unique ids and using them for identifying devices, applications, data formats, collections, records, individual media files, or even individual data items valid across all devices and or applications and or datasets or items for all times; and (5) limiting access to and/or the understanding of resources or capabilities of the interoperability application package and/or resources or capabilities of the plurality of interoperability devices so that the first interoperability device is permitted to access or prohibited from accessing the second interoperability device.

20. The method of claim 19, further comprising: revoking or modifying the rules used to limit access.

21. The method of claim 19, wherein the limiting access to and or the understanding of resources of comprise one or more of the following in any combination:

(1) enforcing rules for which devices are allowed to communicate with each other and or for what purposes devices are allowed to communicate;

(2) encrypting data that flows between devices so that other devices which might have access to the data will not be able to understand or make use of the data;

(3) signing packages of data, content, code or other resources to ensure that the packages have not been modified since the signing took place; and (4) managing digital rights to enforce a set of rules for the handling of data, code content, or any other digitally representable resources with regard to one or more of the following actions: sharing, copying, printing, displaying, performing, distributing, playback, rendering, executing, modifying, or any combination of these.

22. The method of claim 19, wherein one or more of the following are true:
  (a) the application package conforms to an interoperability format or the Dart Format and or is a Dart; and
  (b) the limiting access is performed at least in part by an Interoperability Engine or is performed at least in part by a DartEngine or by a DartPlayer.

23. The method of claim 19, wherein the forming the basis for security is performed only once for any particular device.

24. The method of claim 19, wherein the forming the basis for security is comprised of the following steps when a device first starts operation:
  (a) the automatic collection of entropy state;
  (b) the generation of public/private key pairs;
  (c) the generation of a unique device Id; and
  (d) the storage of the public and private key pairs, device unique id, and the entropy state for a random number generator on the device for continued use whenever the device is active.

25. The method of claim 24, wherein the formed basis is used for the generation and storage of unique ids.

26. The method of claim 24, wherein the basis set forth is used for the generation and storage of unique ids.

27. The method of claim 26, wherein the if a device loses its unique id or private or public key and cannot be recovered, it will be necessary for a new unique id and private and public key to be generated for the device before the device can again be used.

28. The method of claim 27, wherein after a new unique id and private and public key is generated for the device, the device is considered for all purposes of security to be a new device.

29. The method of claim 19, wherein the forming rules for limiting access further comprise:
  (i) collecting the unique ids of devices and/or applications which wish to interoperate
  (ii) collecting the set of access rights needed or requested for the interoperation;
  (iii) obtaining permission to allow or the directive to disallow the range of access rights;
  (iv) creating a unique Id for the set of access rights; and
  (v) storing the unique id and set of access rights on all devices and or in all the application packages which are to interoperate.

30. The method of claim 19, wherein use of the basis is used for one or more of the following security procedures alone or in any combination:
  (a) enforcing rules for access to devices and resources;
  (b) securing the rules themselves;
  (c) securing communication channels;
  (d) encrypting resources so that they can only be understood by a particular device or set of devices, and or a particular application or set of applications, and or when accessed using a shared secret;
  (e) generating universally unique ids and using them for identifying devices, applications, data formats, collections, records, individual media files, or even individual data items valid across all devices and or applications and or datasets or items for all times; and
  (f) revoking or modifying the rules used to limit access.

31. The method of claim 19, wherein the resources or capabilities are one or more of the resources or capabilities in the set consisting of:
  (a) a data or data sets of any form;
  (b) a code of any form;
  (c) a content of any form;

(d) a capability to communicate in any form and to any other device;

(e) a capability to control any aspect of the device or any other device;

(f) a capability to control any aspect of the device's operation and or of any other devices' operations;

(g) a capability to render and/or print and/or display and/or modify and/or copy and/or distribute data or any other element which can be represented by a binary sequence or set of binary sequences;

(h) a capability to collect information in any digital form by any means;

(i) a capability to physically change the position, disposition, properties and or location of physical objects;

(j) a capability to run code and process data; and (k) any combination of the above.

32. The method of claim 19, wherein the method applies to the applications whether they are stored as an application image and or running on one or more devices.

33. The method of claim 19, wherein the basis is implemented in a manner where entropy gathering and the random number generation is seeded and then used to generate a unique id is automatically initiated when the device is first turned on or is made use of so that the manufacturer does not need to assign or install different software or hardware to assure that each device has a universally unique id.

34. The method of claim 19, wherein the entropy is gathered by collecting via the execution of software running on a processor timing or data or counter or hardware state values which are at least partially generated by any one or more of: quantum electrical effects, communications or other electrical circuits running on a clock unsynchronized to the processor clock, air currents, or any other physical phenomena.

35. The method of claim 19 wherein a device or application unique id is revoked, the unique id is placed on a list of revoked unique ids that is maintained and distributed on teamed devices and or other devices so that the device or application will no longer function as part of a team or teams when it tries to interoperate with any of the devices with the revoked unique id which is on such a list.

36. The method of claim 35, wherein when a revoked device forms a communication link with another device which has the revoked device's unique id on its revocation list, the software driving the communication link will initiate the destruction of the unique id and public and private keys of the revoked device.

37. The method of claim 36, wherein one or more master devices with certain permission, unique id or shared secret or has the capability to communicate of a special secure channel can initiate the destruction of the unique id and public and private keys on the revoked device over the special secured channel.

38. The method of claim 37, wherein the master device is at the headend of a mobile phone network can initiate the destruction of the unique id and public and private keys on the revoked device over the mobile data network or a side channel thereof.

39. The method of claim 35, wherein the revoked id list is maintained and distributed using the social synchronization procedure.

40. The method of claim 35, wherein only devices with certain permissions, unique id, or shared secret is allowed to place a device or application id on any revocation list.

41. The method of claim 19, wherein the rules are stored as lists of the unique ids of devices and applications associated with a certain level of security.

42. The method of claim 41, wherein the rules are stored as lists of the unique ids of devices and applications associated with a certain level of security, and each level of security is associated with certain access rights binary flags, with each binary flag associated with permission to access a particular category of data, resource, code or capability.

43. The method of claim 42, wherein a device or the runtime context in which an executable image is running maintains the access rights flags values which determine which types of access or elements are to be allowed for the executable images running on that device or the executable image running a particular runtime context.

44. The method of claim 43, wherein an interoperability engine running an interoperability instruction set checks any or all of the flag values whenever an application attempts to access the elements or capabilities which correspond to the flags, and does not allow such access if the flag values indicate that such access is not to be allowed.

45. The method of claim 44, wherein one or more of the following are true:

(1) the interoperability engine is any interoperability engine or the DartEngine; and (2) the interoperability instruction set any interoperability instruction set or is the DartInstructionSet.

46. The method of claim 42, wherein the rules embodied by the stored lists are generated using one or more of the following method:

(1) default mappings for flags to security level numbers are supplied by the manufacturer and optionally modifiable by possibly secured interfaces on the manufactured device;

(2) the security level and or flag values that are needed for a particular executable image to carry out one or more operations of an interoperability application software package is embedded in the image, which is optionally signed to ensure that the security level and or flag values have not been tampered with;

(3) when an executable image is to be loaded by an interoperability engine, the embedded level and or flag values are compared to the stored rules to see if permissions to access all the needed access is allowed;

(4) if all permissions are allowed the executable image is loaded to run in a context that contains the access flag values embedded in the executable image;

(5) if during execution, assess to any resource or capability for which the flags in the context do not allow access causes the interoperability engine to immediately stop execution without allowing the access; and (6) if any of the permissions are not allowed the interoperability engine will not load or run the executable image.

47. The method of claim 19, wherein the method is used for one or more of the following purposes or operations:

(1) assurance that the content, code, and or data hasn't changed since some predetermined date or event;

(2) assurance that the content, code, and or data has been inspected or otherwise certified by a particular party as one or more of the following in any combination:

(a) robust;

(b) devoid of viruses, malicious code, of other undesirable features or operations;

(c) devoid of a predetermined or dynamically determined particular kind of objectionable materials;

(d) to have been created by or received from a particular third party; and (e) being or not being any one or combination of the above;

(3) protection from the spread of software viruses or malicious computer code;
(4) protecting intellectual property rights including but not limited to copyrights and trademarks;
(5) enforcing intellectual property rights and agreements;
(6) obfuscation of the rules, unique ids, code or data on a device so that it is difficult for someone to find and or understand the meaning of the obfuscated items; and
(7) the generation of universally unique ids to assign to data sets, data items, categories of items or any other element or grouping of elements or ideas which needs to be uniquely identified.

48. The method of claim 19, wherein the revocation list storing the revoked device unique identifiers (uid) is transitively maintained so that any device previously teamed with other devices at a particular security level can have its access rights logically revoked for interoperability with any device which transitively learns of the revocation from any other device of the team.

49. The method of claim 19, wherein the interoperability software application package includes at least one linearly contiguous binary encoded part image and the any necessary linearly contiguous part images together into an executable device interoperability software application package in a form where part images can be deterministically located and independently executable images identified, loaded, and executed on a connected device, the executable device interoperability software application package conforming to an interoperability format of digitally encoded data, code and content, that is completely self-contained and sufficient to carry out an intended purpose of the application on a plurality of connected or intermittently connected devices; and
wherein the executable device interoperability software application package is self-contained and when executed permits the plurality of devices to interoperate with each other without additional executable software.

50. A computer program product for use in conjunction with a computer system or information appliance, the computer program product comprising a computer readable storage medium and a computer program mechanism embedded therein, the computer program mechanism comprising:
a program module that directs the computer system or information appliance to function in a specified manner for limiting access to and or the understanding of resources or capabilities of an interoperability application package and or resources or capabilities of a plurality of interoperability devices so that a first interoperability device is permitted to access or prohibited from accessing the second interoperability device from the plurality of interoperability devices, the program module including instructions for:
(1) executing or attempting to execute an executable device interoperability software application package conforming to an interoperability format of digitally encoded data, code and content that is completely self-contained and sufficient to carry out an intended purpose of the interoperability software application on a plurality of connected or intermittently connected devices, the executable device interoperability software application package including security features that permit and limit access to and or an understanding of resources or capabilities of the interoperability application package and/or resources or capabilities of the interoperability devices when executed;
(2) during the execution of the interoperability software application package, forming a basis for security including the following steps:
(a) automatically collecting an entropy state measure security feature associated with the device by sampling aspects of the world outside of the device which are not synchronized to a clock used in the sampling by the device;
(b) generating a device public/private key pair security feature;
(c) generating a unique device Id (uid) security feature; and
(d) storing the device public/private key pairs, unique device id, and the collected entropy state measure on the device for continued use whenever the device is active, the collected entropy state measure being sufficient to statistically guarantee that the generated key pair and generated device ids are unique from those generated in a similar manner, but using different gathered entropy;
(e) maintaining at least one table storing lists of the device unique Id, a revoked device unique (uid), and a device teamed uid and mapping access level numbers to sets of access rights flags; the access level and access rights controlling an ability of the interoperability software application package to propagate transitively when permission is allowed to do so from device to device so that any device in the lists can gain access to a new device without the need for farther collection of security access credentials;
(3) forming rules for allowing or preventing the limiting access;
(4) using the formed basis and formed rules to provide a security task at least for the device; and
(5) limiting access to and/or the understanding of resources or capabilities of the interoperability application package and/or resources or capabilities of the plurality of interoperability devices so that the first interoperability device is permitted to access or prohibited from accessing the second interoperability device.

* * * * *

UNITED STATES PATENT AND TRADEMARK OFFICE
CERTIFICATE OF CORRECTION

PATENT NO.       : 7,596,227 B2                                   Page 1 of 1
APPLICATION NO. : 11/149078
DATED            : September 29, 2009
INVENTOR(S)      : Illowsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twenty-eighth Day of September, 2010

David J. Kappos
*Director of the United States Patent and Trademark Office*